United States Patent
Kramer et al.

(10) Patent No.: US 6,324,525 B1
(45) Date of Patent: *Nov. 27, 2001

(54) SETTLEMENT OF AGGREGATED ELECTRONIC TRANSACTIONS OVER A NETWORK

(75) Inventors: Glenn A. Kramer, San Francisco; Jay C. Weber, Menlo Park, both of CA (US)

(73) Assignee: Hewlett-Packard Company, Palo-Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,559

(22) Filed: Jul. 22, 1998

Related U.S. Application Data

(63) Continuation-in-part of application No. 08/664,824, filed on Jun. 17, 1996, now Pat. No. 5,889,863.

(51) Int. Cl.[7] .................................................. G06F 17/60
(52) U.S. Cl. ................................................................ 705/40
(58) Field of Search .............................. 705/40, 35; 380/25

(56) References Cited

U.S. PATENT DOCUMENTS

| 4,305,059 | 12/1981 | Benton ........................ 340/825.33 |
| 4,977,595 | 12/1990 | Ohta et al. ......................... 380/24 |
| 5,220,501 | 6/1993 | Lawlor et al. .................... 364/408 |
| 5,448,045 | 9/1995 | Clark ................................ 235/382 |
| 5,452,352 | 9/1995 | Talton ............................. 379/355 |
| 5,453,601 | 9/1995 | Rosen .............................. 235/379 |
| 5,455,407 | 10/1995 | Rosen .............................. 235/379 |
| 5,459,304 | 10/1995 | Eisenmann ....................... 235/380 |
| 5,465,206 | * 11/1995 | Hilt et al. .......................... 705/40 |
| 5,465,291 | 11/1995 | Barrus et al. ....................... 379/67 |
| 5,476,259 | 12/1995 | Weingardt .......................... 273/85 |
| 5,478,993 | 12/1995 | Derksen ........................... 235/380 |
| 5,485,510 | 1/1996 | Colbert ............................ 379/145 |
| 5,590,197 | 12/1996 | Chen et al. ........................ 380/24 |
| 5,613,012 | 3/1997 | Hoffman et al. .................. 382/115 |

(List continued on next page.)

FOREIGN PATENT DOCUMENTS

| 0 485 090 | * 10/1991 | (EP) . |
| 0 542 298 | * 11/1991 | (EP) . |
| 97/46961 | * 5/1997 | (WO) . |

OTHER PUBLICATIONS

"Taking those first few steps;" Credit Card management; vol. 9, n8, p. 94+; Nov. 1996.*

Hagan, Patrick J.; Lux, Thomas D.; "Auditing Credit card Operations;" Journal of Bank Accounting & Auditing, vol. 5, n2, pp. 22–26; Winter 1992.*

Tadjer, Rivka; "Internet commerce set for takeoff;" Computer Shopper, vol. 16, n7, p. 626(4); Jul. 1996.*

Griffin, Kate; "The wholesalers' pain reliever;" Credit card Management; vol. 9, n7, pp. 32–36; Oct. 1996.*

*Primary Examiner*—Vincent Millin
*Assistant Examiner*—Forest O Thompson, Jr.

(57) ABSTRACT

In one embodiment, an architecture that consummates an electronic transaction between a first electronic device, such as an acquirer device, a second electronic device, such as an issuer device, and a plurality of electronic terminals, such as merchant terminals, by establishing a communication between the plurality of devices and terminals and accumulating transactions that are approved by the second electronic device. Then, periodically the plurality of transactions are settled using a transfer of monetary value between the first electronic device and the second electronic device. For example, the present invention uses electronic cash transfer to replace conventional settlement, which requires the use of a third-party settlement service.

24 Claims, 78 Drawing Sheets

U.S. PATENT DOCUMENTS

| | | | |
|---|---|---|---|
| 5,642,419 | 6/1997 | Rosen | 380/23 |
| 5,666,420 | 9/1997 | Micali | 380/30 |
| 5,668,878 | 9/1997 | Brands | 380/30 |
| 5,671,279 | 9/1997 | Elgamal | 380/23 |
| 5,677,955 | 10/1997 | Doggett et al. | 380/24 |
| 5,692,132 * | 11/1997 | Hogan | 705/27 |
| 5,696,827 | 12/1997 | Brands | 380/30 |
| 5,696,909 | 12/1997 | Wallner | 395/244 |
| 5,699,528 * | 12/1997 | Hogan | 705/40 |
| 5,703,949 | 12/1997 | Rosen | 380/21 |
| 5,704,046 * | 12/1997 | Hogan | 705/39 |
| 5,708,780 | 1/1998 | Levergood et al. | 395/200.12 |
| 5,714,741 | 2/1998 | Pieterse et al. | 235/380 |
| 5,715,314 | 2/1998 | Payne et al. | 380/24 |
| 5,724,424 | 3/1998 | Gifford | 380/24 |
| 5,724,425 | 3/1998 | Chang et al. | 380/25 |
| 5,848,400 * | 12/1998 | Chang | 705/35 |
| 5,884,288 * | 3/1999 | Chang et al. | 705/40 |
| 5,889,863 * | 3/1999 | Weber | 380/25 |
| 5,893,080 * | 4/1999 | McGurl et al. | 705/40 |
| 5,946,669 * | 8/1999 | Polk | 705/40 |

* cited by examiner

FIG. 5A
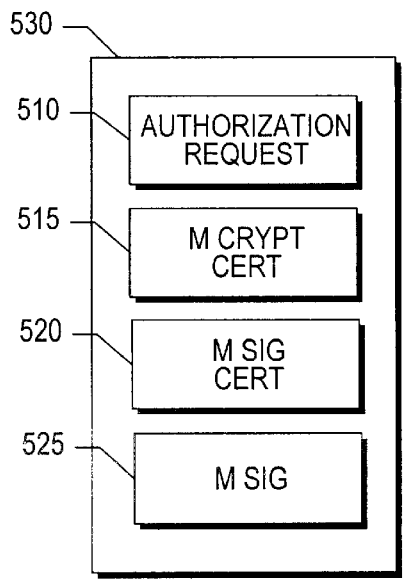
FIG. 5B
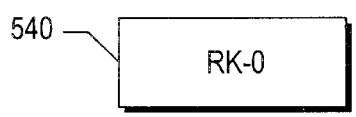
FIG. 5C
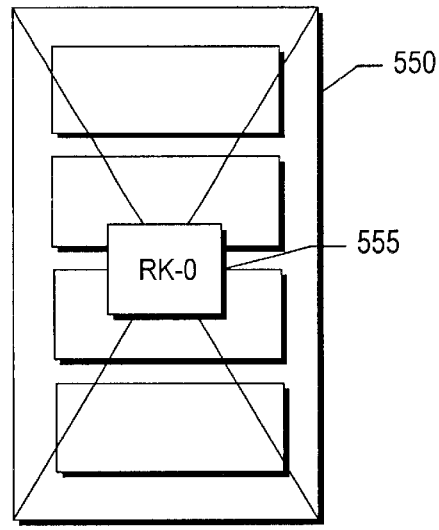
FIG. 5D
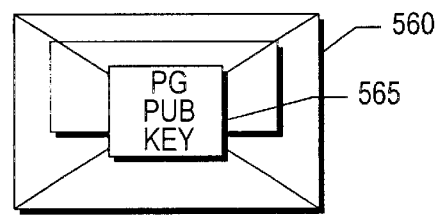
FIG. 5E
FIG. 5F
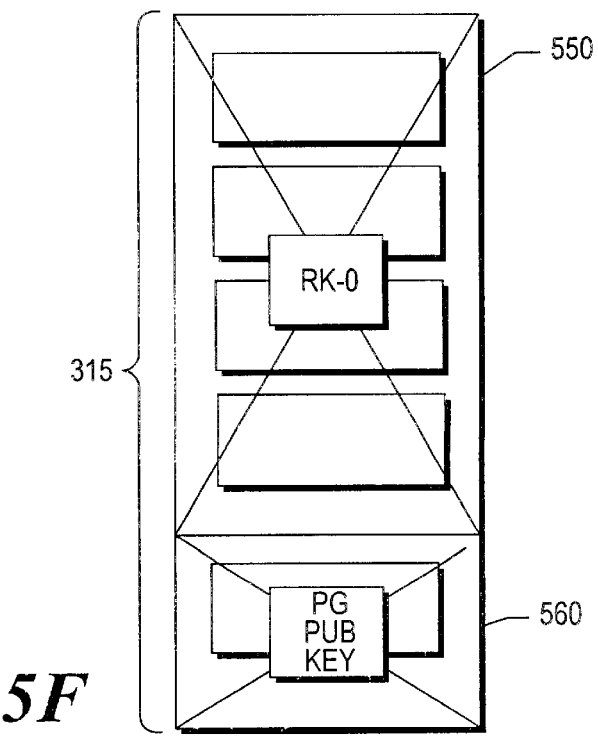

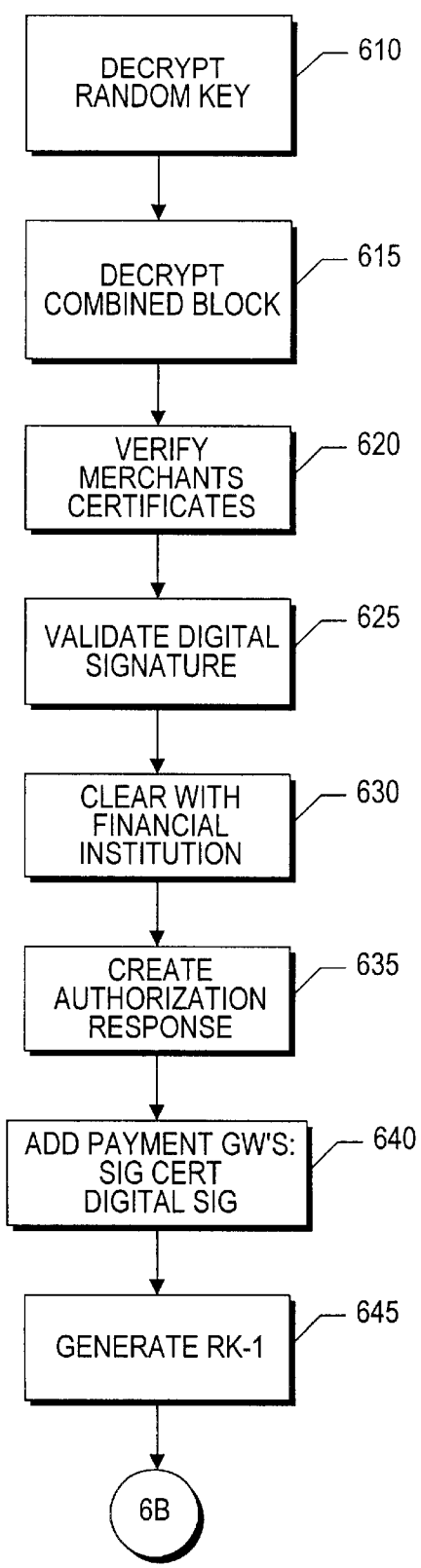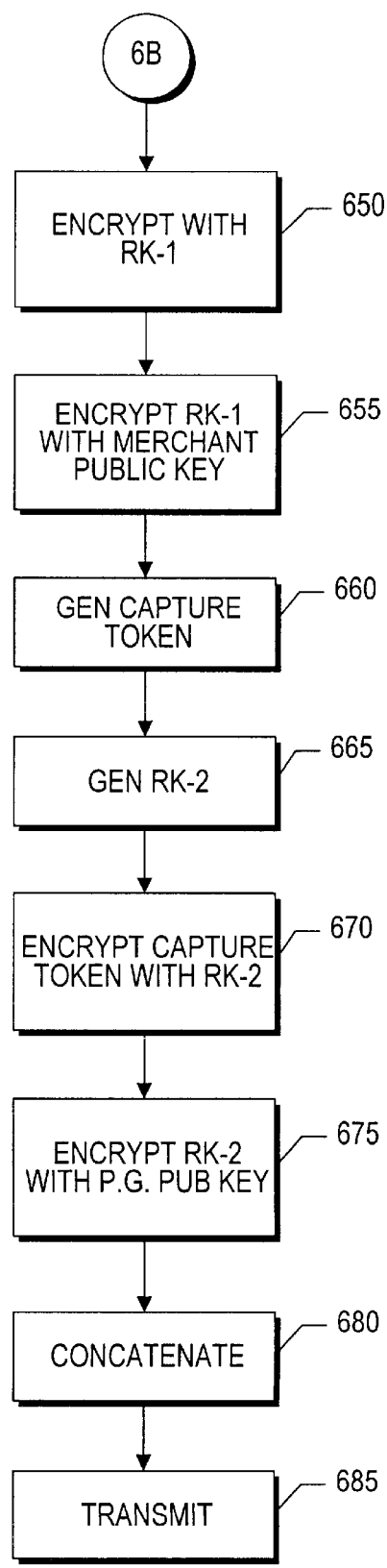
FIG. 6A
FIG. 6B

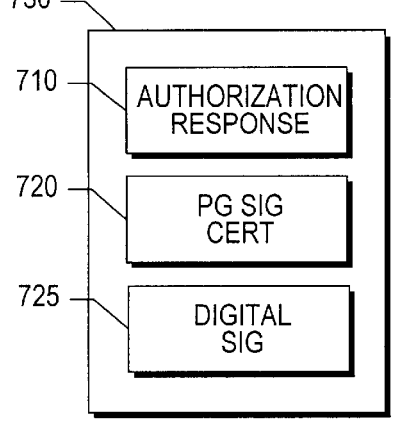
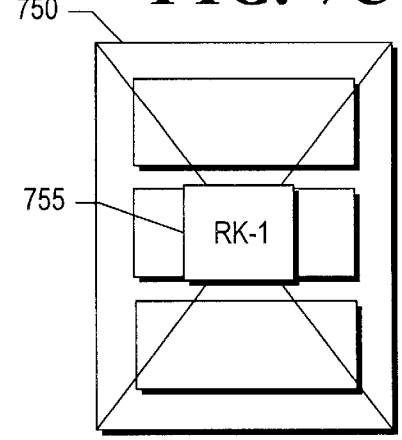
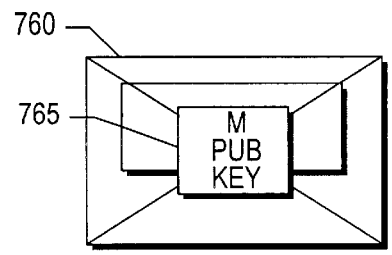
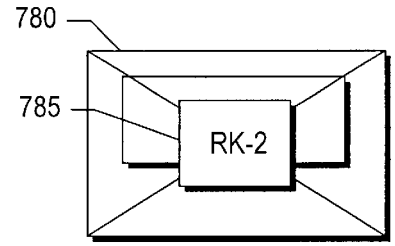
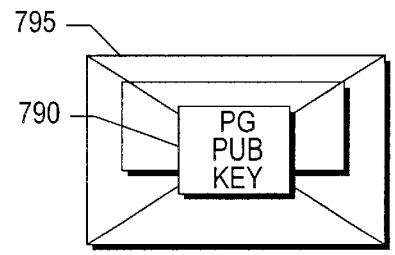
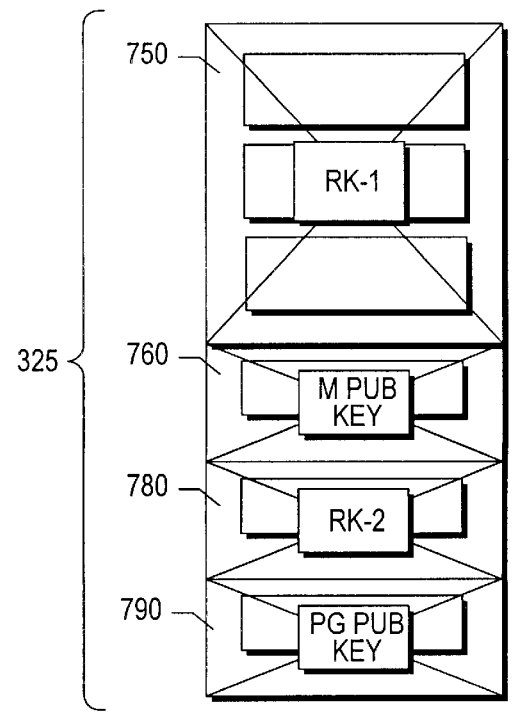

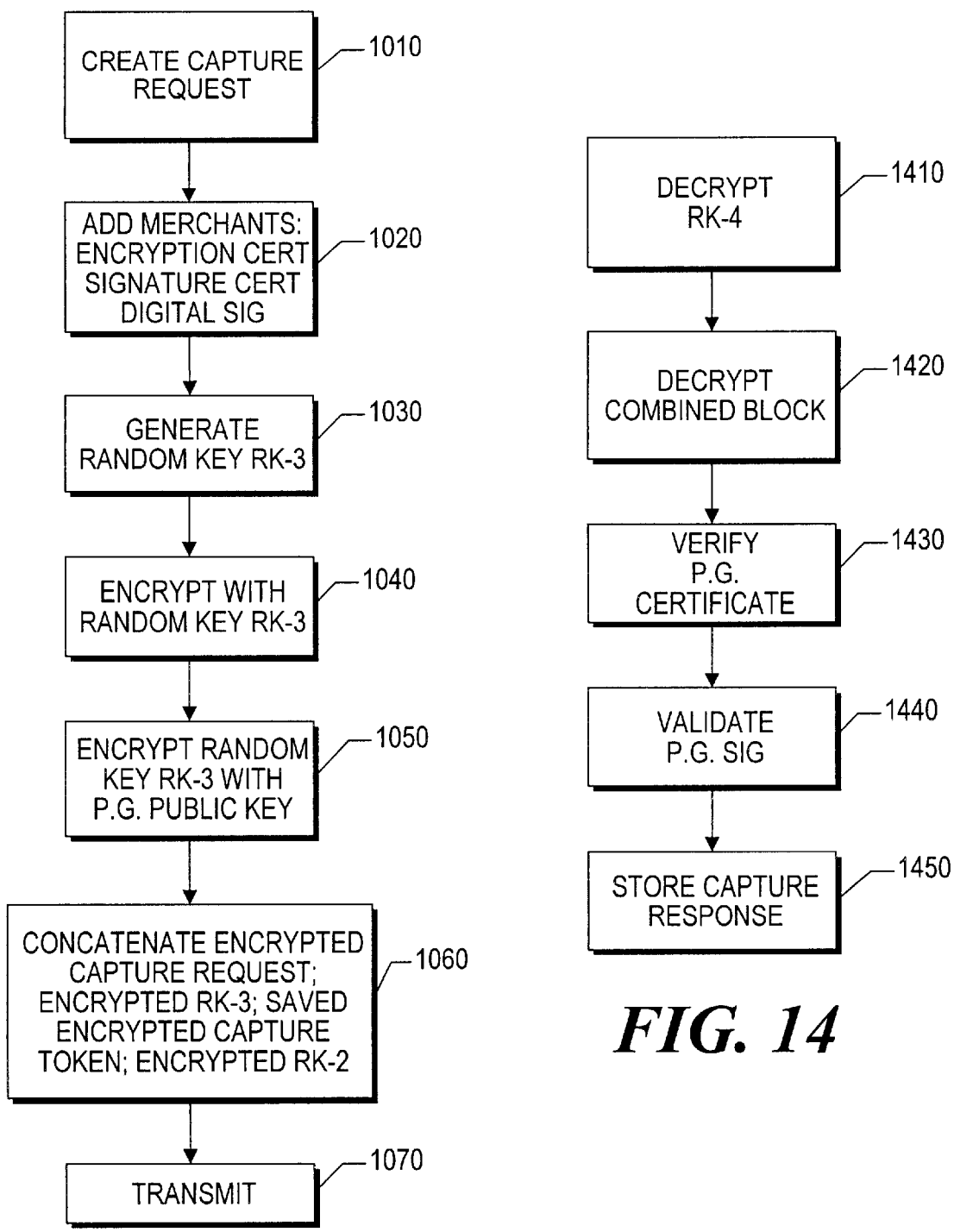

Certificate Issuance Form

Please enter information into all fields If a field does not apply to you, enter N/A

2900 — Card Information
- Card Number: 4417 2222 3333 9191
- 2902 — Expiry Date: 12/98

Personal Information
- First Name: John
- Middle: F.
- Last: Smith — 2904
- Home Phone #: 111 222-3333 (example:555 555-5555) — 2912
- Social Security Number: 111-22-3333 (example: 999-99-9999) — 2908
- Date of Birth: 12/12/72 (month/day/year as 01/25/50) — 2910
- Mother's Maiden Name: Jones (for security purposes only)

Address — 2906
- Line 1: 141-22 Long Drive
- Line 2: Kensington
- Apt. #:
- City: Palo Alto    State: CA    Zip: 94025

VeriFone Wallet Information
- Icon Preference: Wallet ▼ — 2930
- Password: ** — 2932**
- Confirm Password: ** — 2934**

Document Done

*FIG. 29*

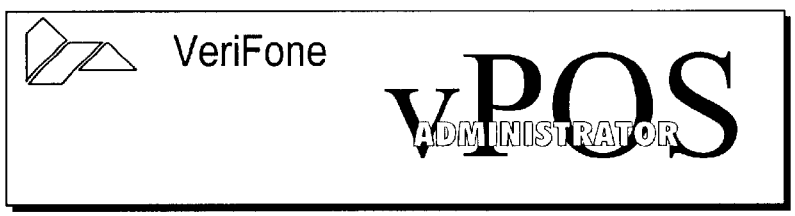

Terminal Totals Report

Note: The transaction is not currently implemented. The report below is a sample.

| Overall Terminal Totals | | |
|---|---|---|
| Sales | Trans. Count | 25 |
|  | Amount | $6161.70 |
| Credits | Trans. Count | 5 |
|  | Amount | ($11.70) |
| Net Sales | | $6150.70 |

| Visa Totals | | |
|---|---|---|
| Sales | Num. of Trans. | 5 |
|  | Amount | $1232.34 |
| Credits | Num. of Trans. | 1 |
|  | Amount | ($2.34) |
| Net Sales | | $1230.00 |

| MasterCard Totals | | |
|---|---|---|
| Sales | Trans. Count | 5 |
|  | Amount | $1232.34 |
| Credits | Trans. Count | 1 |
|  | Amount | ($2.34) |
| Net Sales | | $1230.00 |

| Discover Totals | | |
|---|---|---|
| Sales | Num. of Trans. | 5 |
|  | Amount | $1232.34 |
| Credits | Num. of Trans. | 1 |
|  | Amount | ($2.34) |
| Net Sales | | $1230.00 |

| American Express Totals | | |
|---|---|---|
| Sales | Num. of Trans. | 5 |
|  | Amount | $1232.34 |
| Credits | Num. of Trans. | 1 |
|  | Amount | ($2.34) |
| Net Sales | | $1230.00 |

*FIG. 40*

| JCB Totals | | |
|---|---|---|
| Sales | Num. of Trans. | 5 |
| | Amount | $1232.34 |
| Credits | Num. of Trans. | 1 |
| | Amount | ($2.34) |
| Net Sales | | $1230.00 |

ADMINISTRATOR

Copyright © 1996 VeriFone, Inc.

FIG. 41

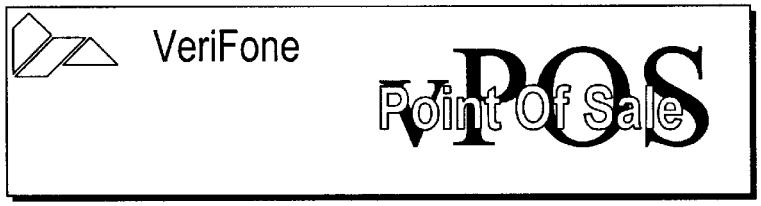

Terminal Setup

Terminal Tables Configuration
Card(s) Definition Table    Review
Acquirer(s) Definition Table    Review
Merchant Configuration Table    Review Help Copyright © 1996 VeriFone, Inc.

FIG. 42

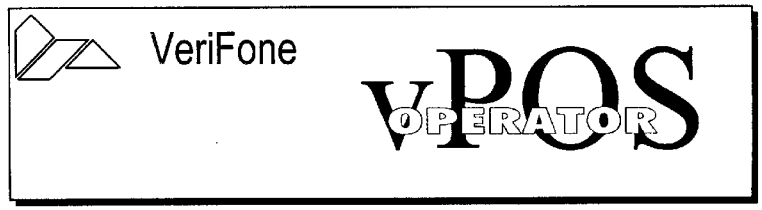

Terminal Type    CDT List Update/Review
Cards acepted by the merchant

Visa

Copyright © 1996 VeriFone, Inc.

FIG. 43

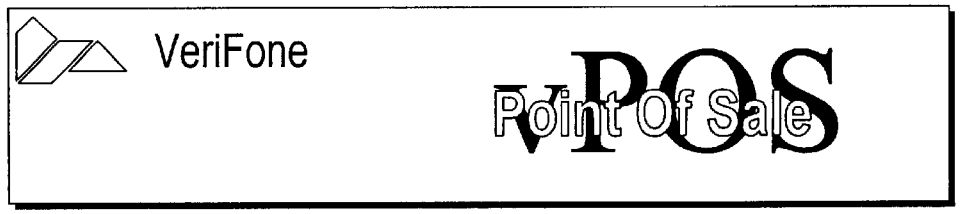
Order Number834100050
Bill To
Account Number 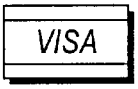
Name on Card      Good Through
Address Line 1
Address Line 2
City              State/Province
Country           Zip/Postal Code
Email             Phone
If you wish to have billing defaults set in your browser, check this box
Total=$59.99
By pressing the PAY button I agree to pay the above total amount according to the card issuer agreement
[RETURN TO SHOPPING]  [PAY]
*FIG. 48*

SETTLEMENT OF AGGREGATED ELECTRONIC TRANSACTIONS OVER A NETWORK

CROSS-REFERENCE TO RELATED APPLICATIONS

This a continuation-in-part of application Ser. No. 08/664,824, filed Jun. 17, 1996, now issued as U.S. Pat. No. 5,889,863.

This application is related to copending application Ser. No. 09/121,470, entitled "Third Party Value Acquisition For Electronic Transaction Settlement Over A Network", filed on Jul. 22, 1999, which is incorporated herein by reference in its entirety.

COPYRIGHT NOTIFICATION

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to secure, electronic payment in exchange for goods and services purchased over a communication network, and more specifically, to settlement of aggregated electronic transactions over a network.

BACKGROUND

The present invention relates to an electronic representation of a monetary system for implementing electronic money payments as an alternative medium of economic exchange to cash, checks, credit and debit cards, and electronic funds transfer. The Electronic-Monetary System is a hybrid of currency, check, card payment systems, and electronic funds transfer systems possessing many of the benefits of these systems with few of their limitations. The system utilizes electronic representations of money that are designed to be universally accepted and exchanged as economic value by subscribers of the monetary system.

Today, approximately 350 billion coin and currency transactions occur between individuals and institutions every year. The extensive use of coin and currency transactions has limited the automation of individual transactions such as purchases, bank account deposits, and withdrawals. Individual cash transactions are burdened by the need to have the correct amount of cash or providing change. Furthermore, the handling and managing of paper cash and coins is inconvenient, costly, and time consuming for both individuals and financial institutions.

Although checks may be written for any specific amount up to the amount available in the account, checks have very limited transferability and must be supplied from a physical inventory. Paper-based checking systems do not offer sufficient relief from the limitations of cash transactions, sharing many of the inconveniences of handling currency while adding the inherent delays and costs associated with processing checks. To this end, economic exchange has striven for greater convenience at a lower cost, while also seeking improved security.

Automation has achieved some of these qualities for large transactions through computerized Electronic Funds Transfer ("EFT") systems. EFT is essentially a process of value exchange achieved through the banking system's centralized computer transactions. EFT services are a transfer of payments utilizing electronic "checks," which are used primarily by large commercial organizations.

Home banking bill payment services are examples of an EFT system used by individuals to make payments from a home computer. Currently, home banking initiatives have found few customers. Of the banks that have offered services for payments, account transfers, and information over the telephone lines using personal computers, less than one percent of the bank's customers are using the service. Home banking has not been a successful product, because, for example, the customer cannot deposit and withdraw money as needed in this type of system.

Current EFT systems, credit cards, or debit cards, which are used in conjunction with an on-line system to transfer money between accounts, such as between the account of a merchant and that of a customer, cannot satisfy the need for an automated transaction system providing an ergonomic interface. Examples of EFT systems that provide non-ergonomic interfaces are disclosed in U.S. Pat. Nos. 5,476,259; 5,459,304; 5,452,352; 5,448,045; 5,478,993; 5,455,407; 5,453,601; 5,465,291; and 5,485,510.

To implement an automated, convenient transaction that can dispense some form of economic value, there has been a trend towards off-line payments. For example, numerous ideas have been proposed for some form of "electronic money" that can be used in cashless payment transactions as alternatives to the traditional currency and check types of payment systems. See U.S. Pat. No. 4,977,595, entitled "METHOD AND APPARATUS FOR IMPLEMENTING ELECTRONIC CASH," and U.S. Pat. No. 4,305,059, entitled "MODULAR FUNDS TRANSFER SYSTEM." The more well-known techniques include magnetic stripe cards purchased for a given amount and from which a prepaid value can be deducted for specific purposes. Upon exhaustion of the economic value, the cards are thrown away. Other examples include memory cards or so called smart cards which are capable of repetitively storing information representing value that is likewise deducted for specific purposes. A smart card is generally a hand-held portable device that includes a microprocessor, input-output ports, and a non-volatile memory (e.g., a few kilobytes of memory).

It is desirable for a computer operated under the control of a merchant to obtain information offered by a customer and transmitted by a computer operating under the control of the customer over a publicly accessible packet-switched network (e.g., the Internet) to the computer operating under the control of the merchant, without risking the exposure of the information to interception by third parties that have access to the network, and to assure that the information is from an authentic source. It is further desirable for the merchant to transmit information, including a subset of the information provided by the customer, over such a network to a payment gateway computer system that is designated, by a bank or other financial institution that has the responsibility of providing payment on behalf of the customer, to authorize a commercial transaction on behalf of such a financial institution, without the risk of exposing that information to interception by third parties. Such institutions include, for example, financial institutions offering credit or debit card services.

One such attempt to provide such a secure transmission channel is a secure payment technology such as Secure Electronic Transaction (hereinafter "SET"), jointly developed by the Visa and MasterCard card associations, and described in Visa and MasterCard's *Secure Electronic Transaction (SET) Specification*, Feb. 23, 1996, which is herein incorporated by reference in its entirety. Other such secure payment technologies include Secure Transaction Technology ("STT"), Secure Electronic Payments Protocol ("SEPP"), Internet Keyed Payments ("IKP"), Net Trust, and Cybercash Credit Payment Protocol. One of ordinary skill in the art readily comprehends that any of the secure payment technologies can be substituted for the SET protocol without undue experimentation. Such secure payment technologies require the customer to operate software that is compliant with the secure payment technology, interacting with third-party certification authorities, thereby allowing the customer to transmit encoded information to a merchant, some of which can be decoded by the merchant, and some of which can be decoded only by a payment gateway specified by the customer.

Another such attempt to provide such a secure transmission channel is a general-purpose secure communication protocol such as Netscape, Inc.'s Secure Sockets Layer (hereinafter "SSL"), as described in Freier, Karlton & Kocher (hereinafter "Freier"), *The SSL Protocol Version 3.0*, March 1996, and herein incorporated by reference in its entirety. SSL enables secure transmission between two computers. SSL has the advantage that it does not require special-purpose software to be installed on the customer's computer, because it is already incorporated into widely available software that many people utilize as their standard Internet access medium, and SSL does not require that the customer interact with any third-party certification authority. Instead, the support for SSL may be incorporated into software already in use by the customer (e.g., the commercially available Netscape Navigator World Wide Web browsing tool).

However, although a computer on an SSL connection may initiate a second SSL connection to another computer, a drawback to the SSL approach is each SSL connection supports only a two-computer connection. Therefore, SSL does not provide a mechanism for transmitting encoded information to a merchant for retransmission to a payment gateway such that a subset of the information is readable to the payment gateway but not to the merchant. Thus, although SSL allows for robustly secure two-party data transmission, it does not meet the ultimate need of the electronic commerce market for robustly secure three-party data transmission.

Other examples of general-purpose secure communication protocols include Private Communications Technology ("PCT") from Microsoft, Inc., Secure Hyper-Text Transport Protocol ("SHTTP") from Terisa Systems, Shen, Kerberos, Photuris, and Pretty Good Privacy ("PGP"), which meets the IPSEC criteria. One of ordinary skill in the art readily comprehends that any of the general-purpose secure communication protocols can be substituted for the SSL transmission protocol without undue experimentation.

More recently, banks desired an Internet payment solution that emulates existing Point of Sale (POS) applications that are currently installed on their host computers and require minimal changes to their host systems. This is a critical requirement, because any downtime for a bank's host computer system represents an enormous expense. Currently, VeriFone supports over fourteen hundred different payment-related applications. The large number of applications is necessary to accommodate a wide variety of host message formats, diverse methods for communicating to a variety of hosts with different dial-up and direct-connect schemes, and different certification around the world. In addition, there are a wide variety of business processes that dictate how a Point of Sale (POS) terminal queries a user for data and subsequently displays the data. Also, various vertical market segments, such as hotels, car rental agencies, restaurants, retail sales, mail sales, and telephone sales require interfaces for different types of data to be entered, and provide different discount rates to merchants for complying with various data types. Moreover, a plethora of report generation mechanisms and formats are utilized by merchants that banking organizations work with appropriately.

Internet-based payment solutions require additional security measures that are not found in conventional POS terminals. This additional requirement is necessitated, because Internet communication is done over publicly-accessible, unsecured communication lines in stark contrast to the private, secure, dedicated phone or leased line service utilized between a traditional merchant and an acquiring bank. Thus, it is critical that any solution utilizing the Internet for a communication backbone employ some form of cryptography.

As discussed above, the current state-of-the-art in Internet-based payment processing is a protocol referred to as SET. Because SET messages are uniform across all implementations, banks cannot differentiate themselves in any reasonable way. Also, because SET is not a proper superset of all protocols utilized today, there are bank protocols that cannot be mapped or translated into SET, because they require data elements for which SET has no placeholder. Further, SET only handles the message types directly related to authorizing and capturing credit card transactions and adjustments to these authorizations or captures. In a typical POS terminal in the physical world, these messages comprise almost the entire volume of the total number of messages between the merchant and the authorizing bank, but only half of the total number of different message types. These message types, which are used infrequently, but which are critical to the operation of the POS terminal must be supported for proper transaction processing.

SUMMARY

In one embodiment, messages flow over the Internet directly from a merchant to card issuers, thereby bypassing the merchant's acquirer altogether. Switching is handled by a DNS (Domain Name Server) (robustly configured) so that host tables in acquirer switching systems are not needed. With an appropriate issuer gateway, the merchant can perform an authorization routed directly to the issuer, without going through the acquirer. The only problem with this is that, with the acquirer out of the message path, the acquirer is not doing any aggregation, so the bank's role as aggregator is bypassed. If aggregation functions can be eliminated, then the architecture can be very powerful. This is precisely what evolving technologies, such as electronic cash systems enable.

In one embodiment, a method for consummating a series of electronic transactions between a first electronic device, such as an acquirer device, and a second electronic device, such as an issuer device, and a plurality of electronic terminals, such as a plurality of merchant terminals of different merchants, includes establishing a communication between the plurality of devices and terminals and accumulating transactions that are approved by the second electronic device. Then, periodically the series of transactions are settled using a transfer of monetary value between the first electronic device and the second electronic device.

BRIEF DESCRIPTION OF THE DRAWINGS

The foregoing and other aspects and advantages are better understood from the following detailed description of the present invention with reference to the drawings, in which:

FIGS. 5A through 5F depict views of the payment authorization request and its component parts in accordance with a preferred embodiment;

FIGS. 6A and 6B depict the stages of processing a payment authorization request and generating and transmitting a payment authorization request response in accordance with a preferred embodiment;

FIGS. 7A through 7J depict views of the payment authorization response and its component parts in accordance with a preferred embodiment;

FIG. 10 depicts the stages of generating and transmitting a payment capture request in accordance with a preferred embodiment;

FIG. 14 depicts the stages of processing a payment capture response in accordance with a preferred embodiment;

FIG. 29 is an illustration of a certificate issuance form in accordance with a preferred embodiment;

FIGS. 36 through 48 are screen displays in accordance with a preferred embodiment;

DETAILED DESCRIPTION

Recently, the Internet was proposed as a communication medium connecting personal computers with specialized reader hardware for facilitating reading and writing to smart cards. However, the Internet is not a secure communication medium, and value transfer is not secured. Thus, secure value transfer processing to facilitate smart card processing over the Internet is needed. In addition, support to ensure that no third party can hijack a value transfer transaction is required. For example, a hijack can occur if a third party diverts the transaction before it even starts. In the prior art face-to-face solution, both parties can confirm the other party's identity. However, the Internet generally separates the parties with miles of network lines.

Figure 1A:
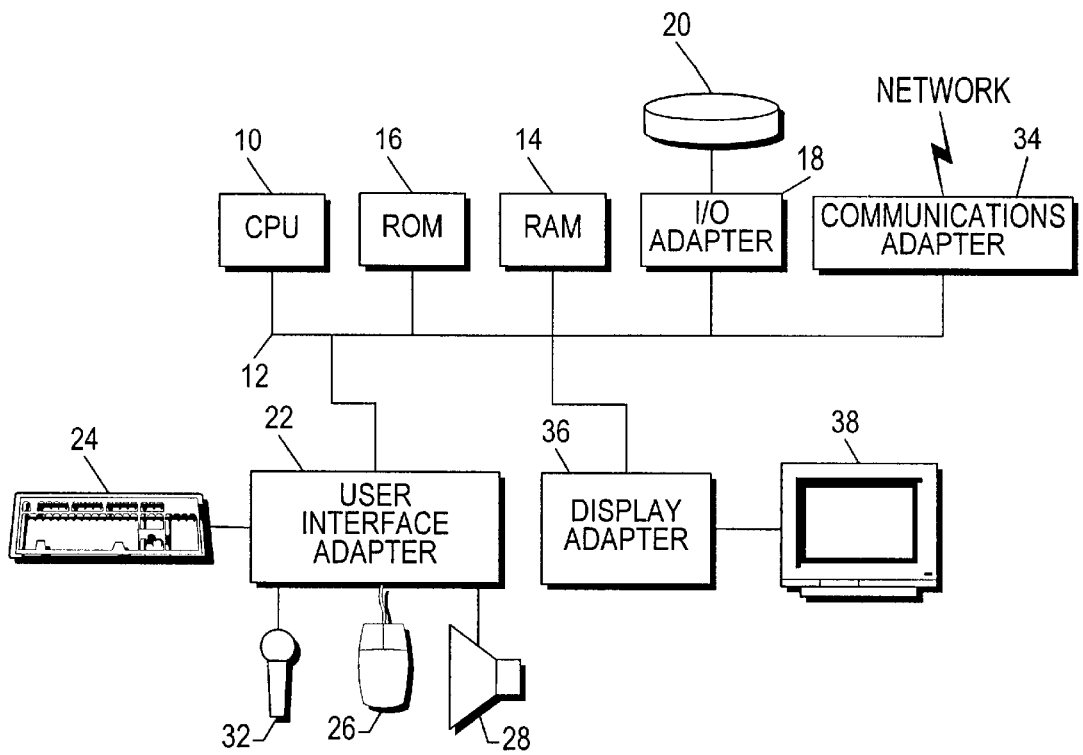
FIG. 1A is a block diagram of a representative hardware environment in accordance with a preferred embodiment.

A preferred embodiment of a system in accordance with the present invention is preferably practiced in the context of a personal computer such as a commercially available IBM PS/2, Apple Macintosh computer, or UNIX-based workstation. FIG. 1A is a block diagram of a representative hardware environment in accordance with a preferred embodiment. In particular, FIG. 1A illustrates a hardware configuration of a typical workstation having a central processing unit 10, such as a microprocessor, and a number of other units interconnected via a system bus 12. The workstation shown in FIG. 1A also includes a Random Access Memory (RAM) 14, a Read Only Memory (ROM) 16, an I/O adapter 18 for connecting peripheral devices such as disk storage units 20 to bus 12, a user interface adapter 22 for connecting a keyboard 24, a mouse 26, a speaker 28, a microphone 32, and possibly other user interface devices such as a touch screen (not shown) to bus 12, a communications adapter 34 for connecting the workstation to a communication network (e.g., a data processing network), and a display adapter 36 for connecting bus 12 to a display device 38. The workstation typically has resident thereon an operating system such as the Microsoft Windows NT™ or the Microsoft Windows 95™ Operating System (OS), the IBM OS/2, the Apple MAC OS, or the UNIX OS such as the HP-UX OS. Those skilled in the art will appreciate that the present invention may also be implemented on platforms and operating systems other than those mentioned above.

A preferred embodiment is written using the JAVA programming language, the C programming language, and the C++ programming language and utilizes an object-oriented programming methodology. Object-oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

Generally, OOP is a process of developing computer software using objects, which includes analyzing the problem, designing the system, and constructing the program. An object is a software package that typically includes both data and a collection of related structures and procedures. Because an object includes both data and a collection of structures and procedures, it can be visualized as a self-sufficient component that does not require other additional structures, procedures, or data to perform its specific task. Therefore, OOP views a computer program as a collection of largely autonomous components, called objects, each of which is responsible for a specific task. This concept of packaging data, structures, and procedures together in one component or module is called encapsulation.

In general, OOP components are reusable software modules that present an interface that conforms to an object model and are accessed at run-time through a component integration architecture. A component integration architecture is a set of architecture mechanisms which allow software modules in different process spaces to utilize each others capabilities or functions. This is generally implemented by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the computer programmer to create an object that is a part of another object. For example, the object representing a piston engine is said to have a composition-relationship with the object representing a piston. In reality, a piston engine comprises a piston, valves, and many other components; the fact that a piston is an element of a piston engine can be logically and semantically represented in OOP by two objects. OOP also allows creation of an object that "depends from" another object. If there are two objects, one representing a piston engine and the other representing a piston engine which the piston is made of ceramic, then the relationship between the two objects is not that of composition. A piston engine in which the piston is ceramic does not make up a piston engine. Rather, it is merely one kind of piston engine that has one more limitation than the piston engine; its piston is made of ceramic. In this case, the object representing the ceramic piston engine is called a derived object, and it inherits all of the aspects of the object representing the piston engine and adds further limitation(s) or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, and lubrication). To access each of these functions in any piston engine object, a programmer would call the same functions with the same names, but each type of piston engine may have different (e.g., overriding) implementations of functions behind the same name. This ability to hide different implementations of a function behind the same name is called polymorphism and it greatly simplifies communication among objects.

With the concepts of composition-relationship, encapsulation, inheritance, and polymorphism, an object can represent just about anything in the real world. In fact, our logical perception of the reality is perhaps the only theoretical limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus, or graphics objects.

An object can represent an inventory such as a personnel file or a table of the latitudes and longitudes of cities.

An object can represent user-defined data types such as time, angles, and complex numbers, or points on the plane.

With this enormous capability of an object to represent just about any logically separable matter, OOP allows the software developer to design and implement a computer program that is a model of some aspects of reality, whether that reality is an article of manufacture, a machine (e.g., a system), a process, or a composition of matter.

Moreover, because the object can represent anything, the software developer can create an object that can be used as a component in a larger software project in the future. For example, if 90% of a new OOP software program consists of proven, existing components made from preexisting reusable objects, then only the remaining 10% of the new software project has to be written and tested from scratch. Because 90% already came from an inventory of extensively tested, reusable objects, the potential domain from which an error could originate is 10% of the program (assuming errors do not arise from integrating the new objects with the reusable objects). As a result, OOP enables software developers to build objects out of other, previously built, objects.

This process of manufacturing OOP technology closely resembles complex machinery being built out of assemblies and sub-assemblies. Therefore, OOP technology makes software engineering more like hardware engineering in that software is built from existing components, which are available to the developer as objects. All this adds up to an improved quality of the software as well as an increased speed of software development.

Programming languages are beginning to fully support the OOP principles, such as encapsulation, inheritance, polymorphism, and composition-relationship. With the advent of the well-known C++ language, many commercial software developers have embraced OOP. C++ is an OOP language that offers a fast, machine-executable code (i.e., after compilation of the C++ source code). Furthermore, C++ is suitable for both commercial-application projects and systems-programming projects. For now, C++ appears to be the most popular choice among many OOP programmers, but there is a host of other well-known OOP languages, such as Smalltalk, common lisp object system (CLOS), and Eiffel. Additionally, OOP capabilities are being added to more traditional, popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations.

For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard graphical user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it is called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the programmer writes code that instantiates objects and calls their member functions. Its possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved.

A preferred embodiment of the invention utilizes the well-known HyperText Markup Language (HTML) to implement documents on the Internet together with a general-purpose secure communication protocol for a transport medium between the client and the merchant. One skilled in the art readily recognizes that HTTP (HyperText Transfer Protocol) or other protocols could be readily substituted for HTML without undue experimentation. Information on these products is available in T. Berners-Lee, D. Connoly, "RFC 1866: Hypertext Markup Language-2.0" (November 1995), which is herein incorporated by reference in its entirety, and R. Fielding, H, Frystyk, T. Berners-Lee, J. Gettys, and J. C. Mogul, "Hypertext Transfer Protocol— HTTP/1.1:HTTP Working Group Internet Draft" (May 2, 1996), which is herein incorporated by reference in its entirety. HTML is a well-known data format used to create hypertext documents that are portable from one platform to another. HTML documents are Standard Generalized Markup Language (SGML) documents with generic semantics that are appropriate for representing information from a wide range of domains. HTML has been in use by the World-Wide Web (WWW) global information initiative since about 1990. HTML is an application of ISO Standard 8879:1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystems, Inc.'s well-known Java™ programming language solves many of the client-side problems by:

Improving performance on the client side;

Enabling the creation of dynamic, real-time Web applications; and

Providing the ability to create a wide variety of user interface components.

With Java™, developers can create robust User Interface (UI) components. For example, custom "widgets" (e.g., real-time stock tickers and animated icons) can be created and client-side performance is improved. Unlike HTML, Java™ supports the notion of client-side validation and offloading appropriate processing onto the client for improved performance. Accordingly, using Java™, dynamic, real-time Web pages can be created. Moreover, using the above-mentioned custom UI components, dynamic Web pages can also be created.

Sun Microsystems, Inc.'s Java™ programming language has emerged as an industry-recognized language for "programming the Internet." Sun defines Java™ as follows: a simple, object-oriented, distributed, interpreted, robust, secure, architecture-neutral, portable, high-performance, multi-threaded, dynamic, buzzword-compliant, general-purpose programming language. Java™ supports programming for the Internet in the form of platform-independent Java™ applets. Java™ applets are small, specialized applications that comply with Sun's Java™ Application Programming Interface (API) allowing developers to add "interactive content" to Web documents (e.g., simple animations, page adornments, and basic games). Applets execute within a Java™-compatible browser (e.g., Netscape Navigator) by copying code from the server to client. From a language standpoint, a core feature set of Java™ is based on C++. Sun's Java™ literature states that Java™ is basically C++ with extensions from Objective C for more dynamic method resolution.

Another technology that provides functions similar to Java™ is provided by Microsoft and ActiveX Technologies to give developers and Web designers the wherewithal to build dynamic content for the Internet and personal computers. ActiveX includes tools for developing animation, 3-D virtual reality, video, and other multimedia content. The tools use Internet standards, work on multiple platforms, and are being supported by over 100 companies. The group's building blocks are called ActiveX Controls, which are small, fast components that enable developers to embed parts of software in HTML pages. ActiveX Controls work with a variety of programming languages including Microsoft Visual C++, Borland Delphi, Microsoft Visual Basic programming system and, in the future, Microsoft's development tool for Java™, code-named "Jakarta." ActiveX Technologies also includes ActiveX Server Framework, allowing developers to create server applications. One of ordinary skill in the art readily recognizes that ActiveX or other technologies could be substituted for Java™ without undue experimentation to practice the invention.

Figure 1B:
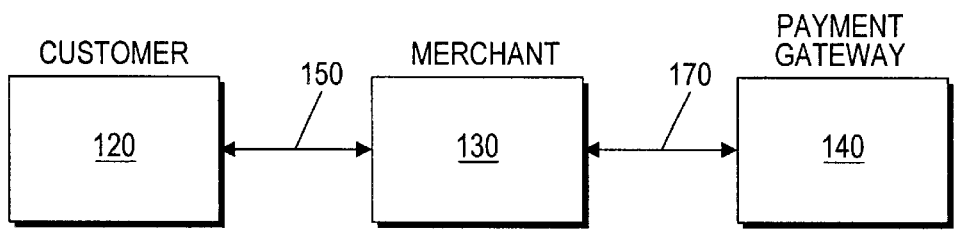
FIG. 1B depicts an overview in accordance with a preferred embodiment.

FIG. 1B depicts an overview in accordance with a preferred embodiment. A customer computer system 120 is in communication with a merchant computer system 130. A customer-merchant session 150 operates under a general-purpose secure communication protocol such as the SSL protocol. Merchant computer system 130 is additionally in communication with a payment gateway computer system 140. Payment gateway computer system 140 is a system that provides electronic commerce services to support a financial institution such as a bank and that interfaces to the financial institution to support the authorization and capture of transactions. A customer-institution session 170 operates under a variant of a secure payment technology such as the SET protocol, as described herein, referred to as Merchant-Originated Secure Electronic Transactions ("MOSET"), as is more fully described herein.

Certificate Processing

Merchants generally require a mechanism for verifying legitimate cardholders of valid, branded bankcard account numbers. A preferred embodiment utilizes technology to link a cardholder to a specific bankcard account number and reduce the incidence of fraud and thereby the overall cost of payment processing. Payment processing includes a mechanism that allows for cardholder confirmation that a merchant has a relationship with a financial institution allowing it to accept bankcard payments. Cardholders should also be provided with a way to identify merchants with whom they can securely conduct electronic commerce. Merchant authentication is ensured by the use of digital signatures and merchant certificates.

In a preferred embodiment, a holder of a payment instrument (cardholder) surfs (browses WWW sites) the WWW (Internet) for required items. This is typically accomplished by using a browser to view on-line catalog information on the merchant's WWW page. However, order numbers can also be selected from paper catalogs or a CD-ROM and entered manually into the system. This method allows a cardholder to select the items to be purchased either automatically or manually. Then, the cardholder is presented with an order form containing the list of items, their prices, and totals. The totals could include, for example, shipping, handling, and taxes. The order form is delivered electronically from the merchant's server or created on the cardholder's computer by electronic shopping software. An alternative embodiment supports a negotiation for goods by presenting frequent shopper identification and information about a competitor's prices.

Once the price of goods sold and the payment option(s) have been selected, the cardholder submits a completed order and the payment instruction. The order and payment instructions are digitally signed by cardholders who possess certificates. The merchant then requests payment authorization from the cardholder's financial institution. Then, the merchant sends confirmation of the order and eventually ships the requested goods or performs the requested services. The merchant also requests payment from the cardholder's financial institution.

Figure 1C:
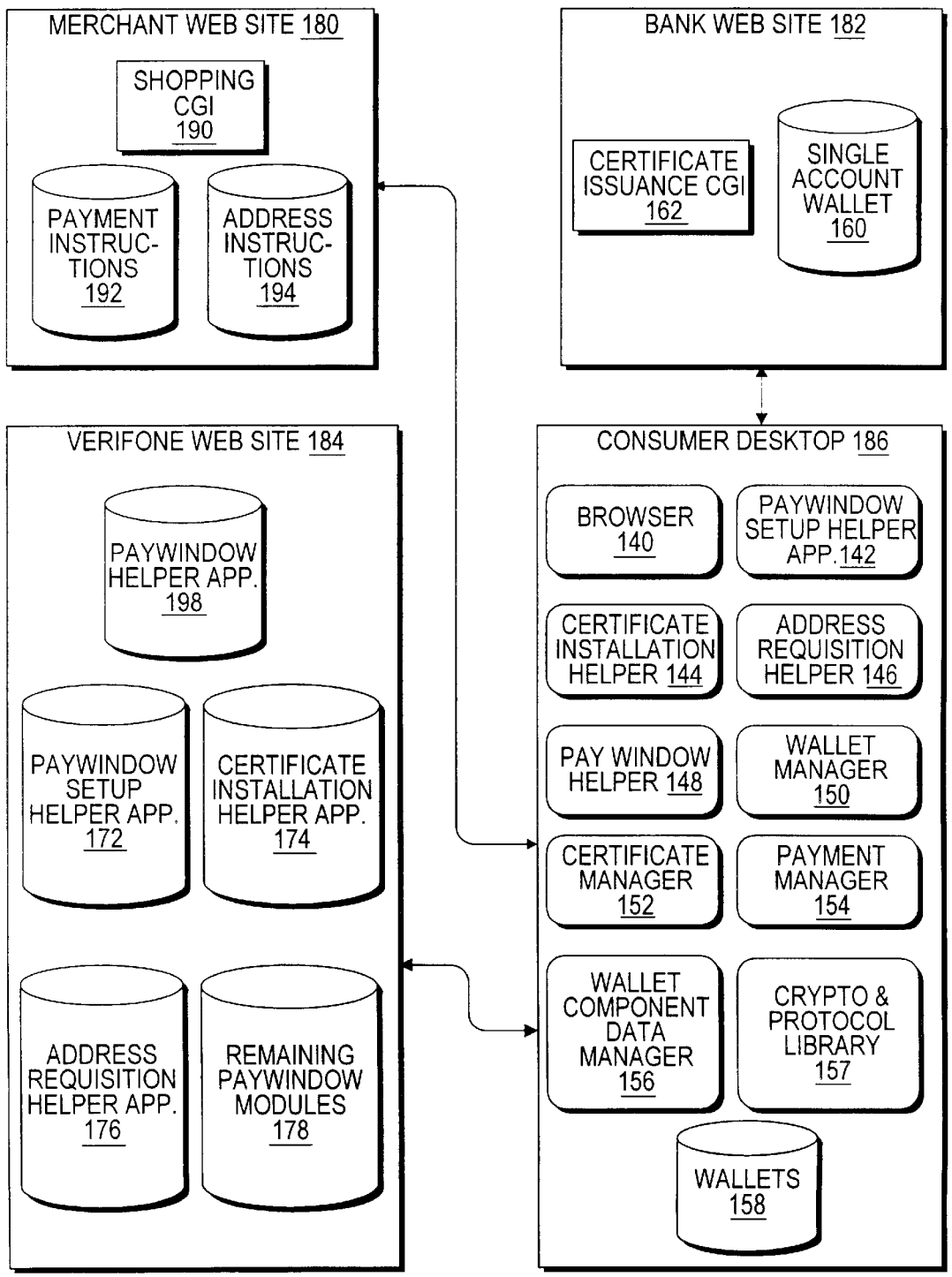
FIG. 1C is a block diagram of a payment processing system in accordance with a preferred embodiment.

FIG. 1C is a block diagram of a payment processing system in accordance with a preferred embodiment. The Certificate Issuance 162 resides at a bank web site 182. It is utilized for issuing SET-complaint, X.500 certificates to consumers. The implementation of this system may vary from one bank to another. However, the system gathers a consumer's personal information, and after processing the information, the system issues a certificate along with a payment instrument to the consumer.

A Single Account Wallet 160 at bank web site 182 represents the MIME message that is created by the Certificate Issuance system. This MIME message contains a VeriFone wallet. The VeriFone wallet contains a single payment instrument and the certificate associated with it. For security reasons, the private key is not included in the wallet. The consumer has to specify a private key before using the instrument for payment. When the consumer is issued the certificate, this MIME message is sent to a browser, which resides at a consumer desktop 186. The browser launches a Certificate Installation application 174, 144, which is defined as a helper application in the browser. The Certificate Installation application 174, 144 reads the MIME message and installs a wallet into a wallet database 158.

Various helper applications 188, 172, 174, 176 are provided to make the consumer's shopping experience easy and efficient. A Paywindow helper application 188 is utilized by the consumer to authorize the payment to the merchant, to administer their wallets, to review their previously completed payment transactions, and to perform housekeeping activities on the wallets. This application is defined as a 'helper' application on the consumer's desktop. The browser launches this application when the merchant system sends a MIME message requesting payment.

PayWindow Setup Helper application 172 is used by the consumer to install helper applications and other modules from the web site onto the consumer desktop. When a consumer attempts to install an application for a first time, the consumer does not have a helper application on the desktop. Thus, the first time installation of an application requires a consumer to perform two steps. First, the user downloads the system package to their desktop, and then the user runs setup to decompress and install the system. Thereafter, whenever the consumer gets a new release of system software, the browser launches this helper application, which in turn installs the appropriate other system modules.

Certificate Installation Helper Application 174 is utilized to install a wallet that is issued by a bank. When the bank's certificate issuance web system sends the MIME message containing the VeriFone wallet, the browser launches this application. This application queries a consumer to determine if the payment instrument contained in the wallet is to be copied to an existing wallet or to be kept in the new wallet. This application then installs the payment instrument and the certificate into wallet database 158.

Certificate Issuance CGI scripts 162 and Single Account Wallet 160 at Bank Web Site 182 is processed as described in the native system. The Certificate Installation Applet of Bank Web Site 182 is utilized by the Certificate Issuance CGI scripts 162 system to deliver a consumer's certificate to the consumer's desktop.

Customer-to-Merchant Communication

Figure 2:
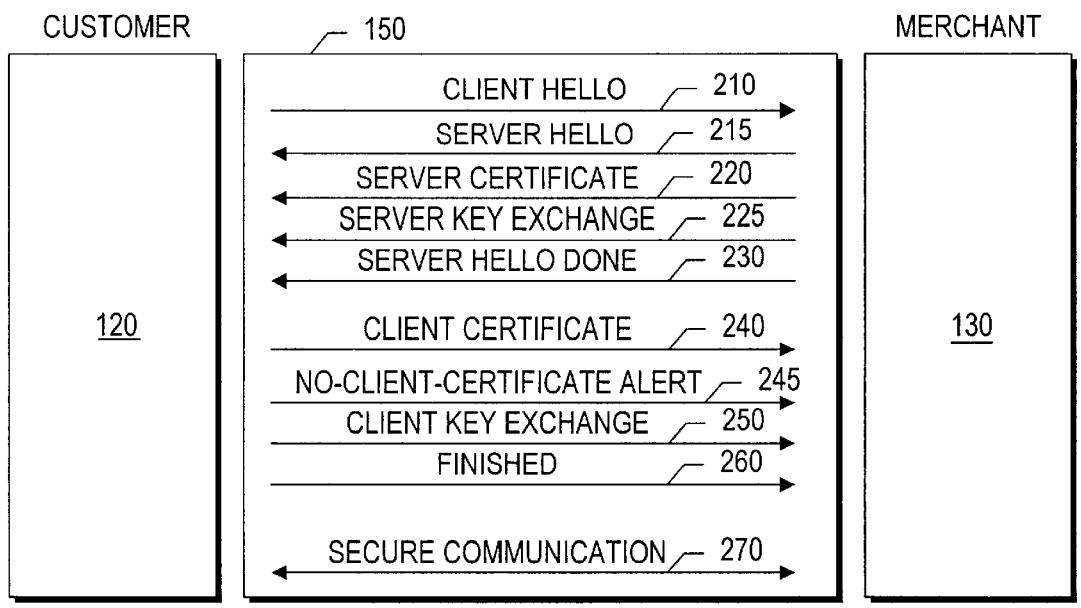
FIG. 2 depicts a more detailed view of the customer computer system in communication with the merchant system using the customer-merchant session operating under the SSL protocol in accordance with a preferred embodiment.

FIG. 2 depicts a more detailed view of customer computer system 120 in communication with merchant system 130 using customer-merchant session 150 operating under the SSL protocol (as documented in Freier (cited and incorporated by reference above)) in accordance with a preferred embodiment. Customer computer system 120 initiates communication with merchant computer system 130 using any well-known access protocol (e.g., Transmission Control Protocol/Internet Protocol ("TCP/IP")). A description of TCP/IP is provided in Information Sciences Institute, "Transmission Control Protocol DARPA Internet Program Protocol Specification(RFC 793)" (September, 1981), which is herein incorporated by reference in its entirety, and Information Sciences Institute, "Internet Protocol DARPA Internet Program Protocol Specification(RFC 791)" (September, 1981), which is herein incorporated by reference in its entirety. In this implementation, customer computer system 120 acts as a client and merchant computer system 130 acts as a server.

Customer computer system 120 initiates communication by sending a "client hello" message 210 to merchant computer system 130. When a client first connects to a server it sends client hello message 210 as its first message. The client can also send client hello message 210 in response to a hello request on its own initiative in order to renegotiate the security parameters in an existing connection. Client hello message 210 includes a random structure, which is used later in the protocol. Specifically, the random structure includes the current time and date in standard UNIX 32-bit format according to the sender's internal clock and twenty-eight bytes of data generated by a secure random number generator. Client hello message 210 further includes a variable length session identifier. If not empty, the session identifier value identifies a session between the same client and server whose security parameters the client wishes to reuse. The session identifier may be from an earlier connection, the current connection, or another currently active connection. For example, it is useful to specify the current connection if the client only wishes to update the random structures and derived values of a connection, and it is useful to specify another currently active connection if the client wishes to establish several simultaneous independent secure connections to the same server without repeating the full handshake protocol. Client hello message 210 further includes an indicator of the cryptographic algorithms supported by the client in order of the client's preference (i.e., ordered according to client preference).

In response to client hello message 210, if merchant computer system 130 wishes to correspond with customer computer system 120, then it responds with a server hello message 215. If merchant computer system 130 does not wish to communicate with customer computer system 120, then it responds with a message, which is not shown, indicating refusal to communicate.

Server hello message 215 includes a random structure, which is used later in the protocol. The random structure in server hello message 215 is in the same format as, but has contents independent of, the random structure in client hello message 210. Specifically, the random structure includes the current time and date in standard UNIX 32-bit format according to the sender's internal clock and twenty-eight bytes of data generated by a secure random number generator. Server hello message 215 further includes a variable length session identifier. The session identifier value identifies a new or existing session between the same client and server. Server hello message 215 further includes an indicator of the cryptographic algorithms selected from among the algorithms specified by client hello message 210, which is utilized in further encrypted communications.

Optionally, merchant computer system 130 transmits a server certificate 220. If transmitted then, server certificate 220 enables customer computer system 120 to authenticate the identity of merchant computer system 130.

If merchant computer system 130 does not transmit server certificate 220, or if server certificate 220 is suitable only for authentication, then merchant computer system 130 optionally transmits a server key exchange message 225. Server key exchange message 225 identifies a key that can be used by customer computer system 120 to decrypt further messages sent by merchant computer system 130.

After transmitting server hello message 215, and optionally transmitting server certificate 220 or server key exchange message 225 or both, merchant computer system 130 transmits a server hello done message 230 and waits for a further response from customer computer system 120.

Customer computer system 120 optionally transmits a client certificate 240 to merchant computer system 130. If transmitted, then client certificate 240 enables merchant computer system 130 to authenticate the identity of customer computer system 120. Alternatively, customer computer system 120 may transmit a no-client-certificate alert 245 to indicate that the customer has not registered with any certification authority.

If customer computer system 120 does not transmit client certificate 240, or if client certificate 240 is suitable only for authentication, then customer computer system 120 optionally transmits a client key exchange message 250. Client key exchange message 250 identifies a key that may be used by merchant computer system 130 to decrypt further messages sent by customer computer system 120.

After optionally transmitting client certificate 240, and no-client-certificate alert 245 or client key exchange message 250 or both, customer computer system 120 transmits a finished message 260.

At this point, customer computer system 120 and merchant computer system 130 have performed the following operations:

1) negotiated an encryption scheme that can be commonly employed in further communications, and 2) communicated to each other a set of encryption keys that can be used to decrypt further communications between the two computer systems.

Customer computer system 120 and merchant computer system 130 can thereafter engage in secure communications 270 with less risk of interception by third parties.

Among the messages communicated by customer computer system 120 to merchant computer system 130 may be messages that specify goods or services to be ordered and payment information, such as a credit card number and related information, collectively referred to as "payment information," that can be used to pay for the goods or the services (or both) ordered. In order to obtain payment, the merchant supplies this information to the bank or other payment gateway responsible for the proffered payment method. This enables the merchant to perform payment authorization and payment capture.

Payment authorization is a process by which permission is granted by a payment gateway operating on behalf of a financial institution to authorize payment on behalf of the financial institution. In one embodiment, payment authorization is a process that assesses transaction risk, confirms that a given transaction does not raise the account holder's debt above the account's credit limit, and reserves the specified amount of credit; and payment capture is a process that triggers the movement of funds from the financial institution to the merchant's account after settlement of the account.

Payment Authorization

Merchants generally utilize point-of-sale (POS) products for credit and debit transactions on a daily basis. However, handling Internet transactions is destined to become a necessary function for every payment processing system. Today, merchants often transmit data received over the Internet inefficiently. Some fax the information or waste time keying data into a non-Internet system.

An embodiment in accordance with the present invention allows an acquirer processor to accept transactions from Internet storefronts (e.g., Web sites that offer goods or services or both for sale) without altering a current host environment. The system converts payment protocol messages and simultaneously manages transactions from a number of Internet merchant servers. As the number of transactions grows, the payment gateway can be cost-effectively and efficiently scaled to handle the increased business, and the payment gateway can be configured to work with specific business processes used by the acquirer. Thus, the payment gateway supports Internet processing utilizing payment processing operations.

Accordingly, the payment gateway provides support for configuring and installing the Internet payment capability utilizing existing host POS technology. The payment gateway also provides an intuitive Graphical User Interface (GUI) with support built-in to accommodate future payment instruments such as debit cards, electronic checks, electronic cash, and micropayments. The payment gateway implements secure transactions using the well-known RSA (Rivest Shamir Adleman) public-key cryptography system (or Elliptic Curve Cryptography (ECC) can be used) and the well-known MasterCard/Visa Secure Electronic Transaction (SET) protocol. The gateway also provides full functionality for merchant payment processing including authorization, capture, settlement, and reconciliation while providing monitor activity with reporting and tracking of transactions sent over the Internet. Finally, the payment gateway also implements Internet payment procedures that match current processor business models to ensure consistency for merchants.

Figure 3:
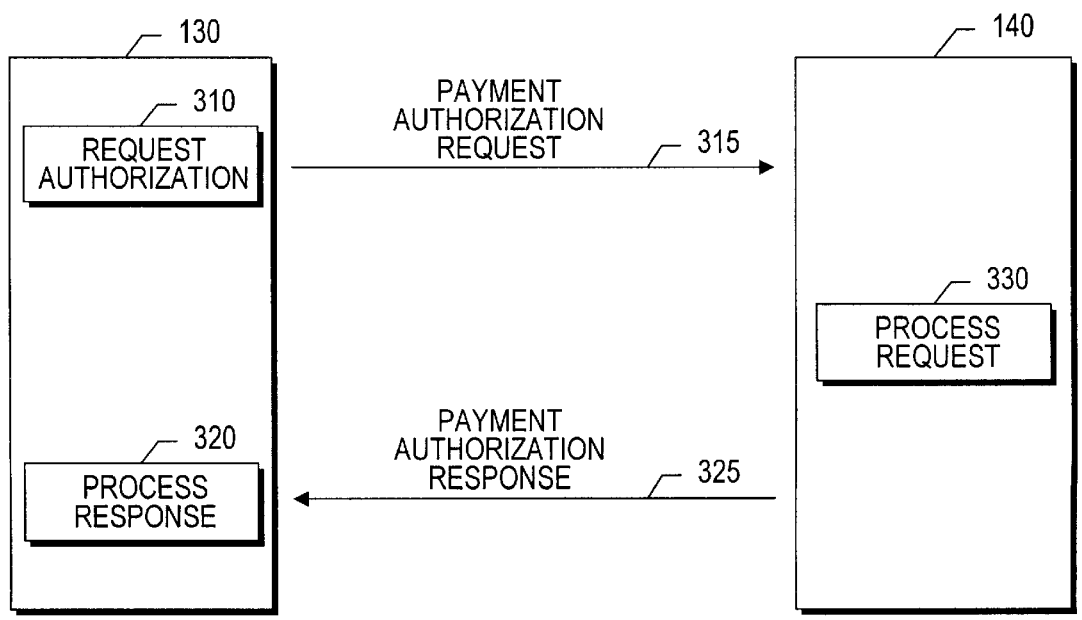
FIG. 3 depicts an overview of the method of securely supplying payment information to a payment gateway in order to obtain payment authorization in accordance with a preferred embodiment.

FIG. 3 depicts an overview of the method of securely supplying payment information to a payment gateway in order to obtain payment authorization in accordance with a preferred embodiment. In function block 310, merchant computer system 130 generates a payment authorization request 315 and transmits it to payment gateway computer system 140. In function block 330, payment gateway system 140 processes payment authorization request 315, generates a payment authorization response 325, and transmits it to merchant computer system 130. In function block 320, merchant computer system 130 processes payment authorization response 325 and determines whether payment for the goods or the services (or both) sought to be obtained by the customer hag been authorized.

Payment Authorization Request Generation

Figure 4:
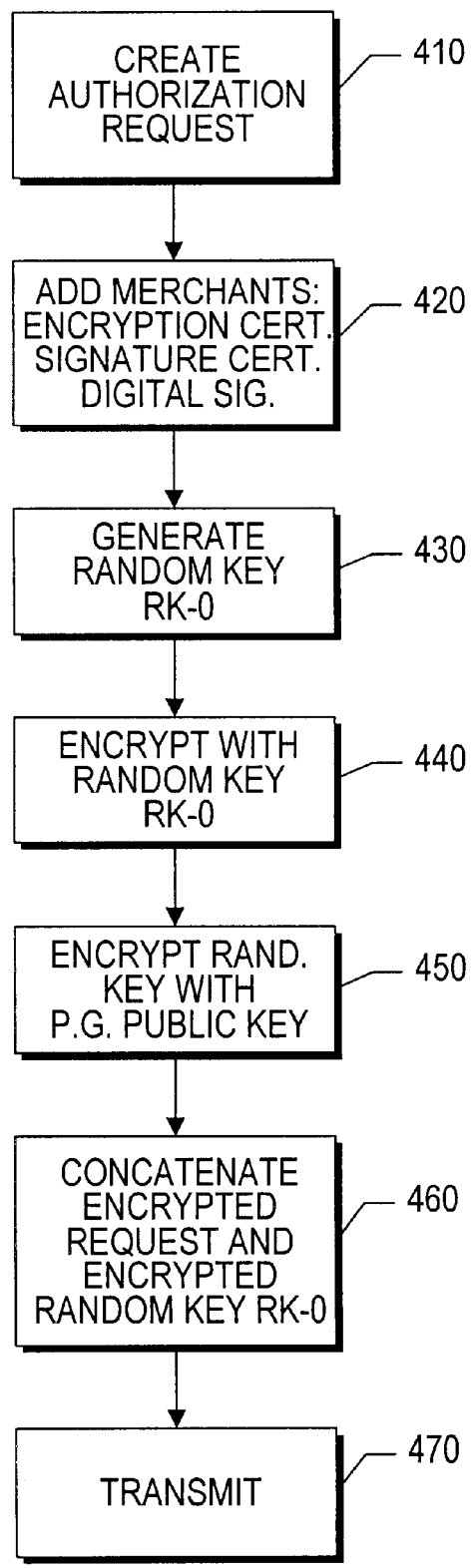
FIG. 4 depicts the stages of generating and transmitting a payment authorization request in accordance with a preferred embodiment.

FIG. 4 depicts the stages of generating and transmitting a payment authorization request in accordance with a preferred embodiment. FIGS. 5A through 5F depict views of the payment authorization request and its component parts in accordance with a preferred embodiment. In function block 410, merchant computer system 130 creates a basic authorization request 510. Basic authorization request 510 is a data area that includes information for determining whether a request should be granted or denied. Specifically, it includes such information as the party who is being charged, the amount to be charged, the account number of the account to be charged, and any additional data, such as passwords, needed to validate the charge. This information is either calculated based upon prior customer merchandise selection or provided by the customer over secure link 270 established in the customer-merchant general-purpose secure communication protocol session. FIG. 5A depicts basic authorization request 510 in accordance with a preferred embodiment.

In function block 420, merchant computer system 130 combines basic authorization request 510, a copy of its encryption public key certificate 515, and a copy of its signature public key certificate 520. Merchant computer system 130 calculates a digital signature 525 for the combined contents of a combined block 530 including basic authorization request 510, encryption public key certificate 515, and signature public key certificate 520, and appends it to the combination of the combined basic authorization request 510, encryption public key certificate 515, and signature public key certificate 520. Merchant computer system 130 calculates digital signature 525 by first calculating a "message digest" based upon the contents of the combined basic authorization request 510, encryption public key certificate 515, and signature public key certificate 520. A message digest is the fixed-length result that is generated when a variable length message is fed into a one-way hashing function. Message digests help verify that a message has not been altered because altering the message would change the digest. The message digest is then encrypted using merchant computer system's 130 digital signature private key, thus forming a digital signature. FIG. 5B depicts combined block 530 formed by function block 420 and including basic authorization request 510, encryption public key certificate 515, signature public key certificate 520, and digital signature 525, in accordance with a preferred embodiment.

In function block 430, merchant computer system 130 generates a random encryption key RK-0 540. Random encryption key RK-0 540 is a symmetric encryption key. A symmetric encryption key is a key characterized by the property that a message encrypted with a symmetric key can be decrypted with that same key, which is unlike an asymmetric key pair, such as a public-key/private-key key pair, in which a message encrypted with one key of the key pair may only be decrypted with the other key of the same key pair. FIG. 5C depicts random encryption key RK-0 540 in accordance with a preferred embodiment.

In function block 440, merchant computer system 130 encrypts combined block 530 using random encryption key RK-0 540 to form an encrypted combined block 550. FIG. 5D depicts encrypted combined block 550 in accordance with a preferred embodiment. The encryption state of encrypted combined block 550 is graphically shown by a random key lock 555, which indicates that encrypted combined block 550 is encrypted using random key RK-0 540.

In function block 450, merchant computer system 130 encrypts random key RK-0 540 using the public key of payment gateway system 140 to form an encrypted random key 560. FIG. 5E depicts encrypted random key 560 in accordance with a preferred embodiment. The encryption state of encrypted random key 560 is graphically shown by a payment gateway public key lock 565, which indicates that encrypted random key 560 is encrypted using the public key of payment gateway system 140.

In function block 460, merchant computer system 130 concatenates encrypted combined block 550 and encrypted random key 560 to form merchant authorization request 315. FIG. 5F depicts merchant authorization request 315 including encrypted combined block 550 and encrypted random key 560 in accordance with a preferred embodiment. In function block 470, merchant computer system 130 transmits merchant authorization request 315 to payment gateway system 140.

Payment Authorization Request Processing

FIGS. 6A and 6B depict the stages of processing a payment authorization request and generating and transmitting a payment authorization request response in accordance with a preferred embodiment. Function blocks 610 through 630 depict the stages of processing a payment authorization request, and function blocks 635 through 685 depict the stages of generating and transmitting a payment authorization request response.

In function block 610, payment gateway computer system 140 applies its private key to encrypted random key 560 contained within received merchant authorization request 315, thereby decrypting it and obtaining a cleartext version of random key RK-0 540. In function block 615, payment gateway computer system 140 applies random key RK-0 540 to encrypted combined block 550, thereby decrypting it and obtained a cleartext version of combined block 530. Combined block 530 includes basic authorization request 510, a copy of merchant computer system's 130 encryption public key certificate 515, and a copy of merchant computer system's 130 signature public key certificate 520, as well as merchant signature 525.

In function block 620, payment gateway computer system 140 verifies merchant computer system's 130 encryption public key certificate 515 and merchant computer system's 130 signature public key certificate 520. Payment gateway computer system 140 performs this verification by making a call to the certification authorities associated with each certificate. If verification of either certificate fails, then payment gateway system 140 rejects the authorization request.

In function block 625, payment gateway computer system 140 validates merchant digital signature 525. Payment gateway computer system 140 performs this validation by calculating a message digest over the contents of the combined basic authorization request 510, encryption public key certificate 515, and signature public key certificate 520. Payment gateway computer system 140 then decrypts digital signature 525 to obtain a copy of the equivalent message digest calculated by merchant computer system 130 in function block 420. If the two message digests are equal, then the digital signature 525 is validated. If validation fails, then payment gateway computer system 140 rejects the authorization request.

In function block 630, payment gateway computer system 140 determines the financial institution for which authorization is required by inspection of basic authorization request 510. Payment gateway computer system 140 contacts the appropriate financial institution using a secure means (e.g., a direct-dial modem-to-modem connection or a proprietary internal network that is not accessible to third parties), and using prior art means, obtains a respond indicating whether the requested payment is authorized.

Payment Authorization Response Generation

Function blocks 635 through 685 depict the stages of generating and transmitting a payment authorization request response. FIGS. 7A through 7J depict the stages of generation and transmitting a payment authorization request response. FIGS. 7A through 7J depict vies of the payment authorization response and its component parts in accordance with a preferred embodiment.

In function block 635, payment gateway computer system 140 creates a basic authorization response 710. Basic authorization response 710 is a data area that includes information for determining whether a request was granted or denied. FIG. 7A depicts basic authorization response 710 in accordance with a preferred embodiment.

In function block 640, payment gateway computer system 140 combines basic authorization response 710 and a copy of its signature public key certificate 720. Payment gateway computer system 140 calculates a digital signature 725 for the combined contents of combined block 730 that includes basic authorization response 710 and signature public key certificate 720, and appends the signature to the combination of the combined basic authorization response 710 and signature public key certificate 720. Payment gateway computer system 140 calculates digital signature 725 by first calculating a message digest based on the contents of the combined basic authorization response 710 and signature public key certificate 720. The message digest is then encrypted using merchant computer system's 140 digital signature private key, thus forming a digital signature. FIG. 7B depicts combined block 730 formed in function block 640 and containing basic authorization response 710, the signature public key certificate 720, and digital signature 725 in accordance with a preferred embodiment.

In function block 645, payment gateway computer system 140 generates a first symmetric random encryption key RK-1 740. FIG. 7C depicts random encryption key RK-1 740 in accordance with a preferred embodiment.

In function block 650, payment gateway computer system 140 encrypts combined block 730 using random encryption key RK-1 740 to form an encrypted combined block 750. FIG. 7D depicts encrypted combined block 750 in accordance with a preferred embodiment. The encryption state of encrypted combined block 750 is graphically shown by a random key lock 755, which indicates that encrypted combined block 750 is encrypted using random encryption key RK-1 740.

In function block 655, payment gateway computer system 140 encrypts random encryption key RK-1 740 using the public key of merchant computer system 130 to form an encrypted random key RK-760. FIG. 7E depicts encrypted random key RK-1 760 in accordance with a preferred embodiment. The encryption state of encrypted random key RK-1 760 is graphically shown by a merchant public key lock 765, which indicates that encrypted random key RK-1 760 is encrypted using the merchant public key.

In function block 660, payment gateway computer system 140 generates a random capture token 770. Random capture token 770 is utilized in subsequent payment capture processing to associate the payment capture request with the payment authorization request being processed. FIG. 7F depicts random capture token 770 in accordance with a preferred embodiment.

In function block 665, payment gateway computer system 140 generates a second symmetric random encryption key RK-2 775. FIG. 7G depicts second random encryption key RK-2 775 in accordance with a preferred embodiment.

In function block 670, payment gateway computer system 140 encrypts capture token 770 using random encryption key RK-2 775 to form an encrypted capture token 780. FIG. 7H depicts encrypted capture token 780 in accordance with a preferred embodiment. The encryption state of encrypted capture token 780 is graphically shown by a random key lock 785, which indicates that encrypted capture token 780 is encrypted using random key RK-2 775.

In function block 675, payment gateway computer system 140 encrypts second random encryption key RK-2 775 using its own public key to form an encrypted random key RK-2 790 in accordance with a preferred embodiment. FIG. 7I depicts encrypted random key RK-2 790. The encryption state of encrypted random key 790 is graphically shown by a payment gateway public key lock 795, which indicates that encrypted random key 790 is encrypted using the payment gateway public key.

In function block 680, payment gateway computer system 140 concatenates encrypted combined block 750, encrypted random key RK-1 760, encrypted capture token 780, and encrypted random key RK-2 790 to form merchant authorization response 325. FIG. 7J depicts merchant authorization response 325 including encrypted combined block 750, encrypted random key RK-1 760, encrypted capture token 780, and encrypted random key RK-2 790 in accordance with a preferred embodiment. In function block 685, payment gateway computer system 140 transmits merchant authorization response 325 to merchant system 130.

Payment Authorization Response Processing

Figure 8:
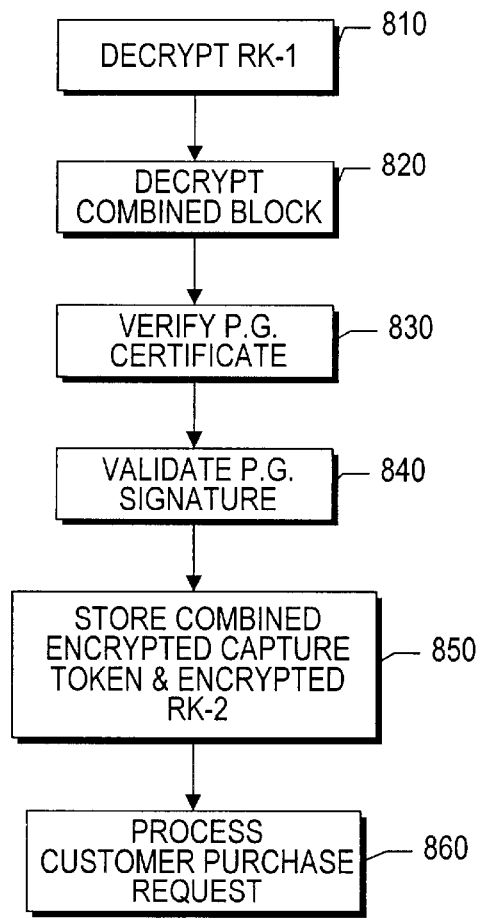
FIG. 8 depicts the stages of processing a payment authorization response in accordance with a preferred embodiment.

FIG. 8 depicts the stages of processing a payment authorization response in accordance with a preferred embodiment. In function block 810, merchant computer system 130 applies its private key to encrypted random key RK-1 760 contained within received merchant authorization response 325, thereby decrypting it and obtaining a cleartext version of random key RK-1 740. In function block 820, merchant computer system 130 applies random key RK-1 740 to encrypted combined block 750, thereby decrypting it and obtaining a cleartext version of combined block 730. Combined block 730 includes basic authorization response 710, a copy of payment gateway computer system's 140 signature public key certificate 720, as well as payment gateway digital signature 725.

In function block 830, merchant computer system 130 verifies payment gateway computer system's 140 signature public key certificate 720. Merchant computer system 130 performs this verification by making a call to the certification authority associated with the certificate. If verification of the certificate fails, then merchant computer system 130 concludes that the authorization response is counterfeit and treats it as though the authorization request had been rejected.

In function block 840, merchant computer system 130 validates payment gateway digital signature 725. Merchant computer system 130 performs this validation by calculating a message digest over the contents of combined basic authorization request 710 and signature public key certificate 720. Merchant computer system 130 then decrypts digital signature 725 to obtain a copy of the equivalent message digest calculated by payment gateway computer system 140 in function block 640. If the two message digests are equal, then digital signature 725 is validated. If validation fails, then merchant computer system 130 concludes that the authorization response is counterfeit and treats it as though the authorization request had been rejected.

In function block 850, merchant computer system 130 stores encrypted capture token 780 and encrypted random key RK-2 790 for later use in payment capture.

In function block 860, merchant computer system 130 processes the customer purchase request in accordance with authorization response 710. If authorization response 710 indicates that payment is authorized, then merchant computer system 130 fills the requested order. If the authorization response indicates that payment is not authorized, or if merchant computer system 130 determined in function block 830 or function block 840 that the authorization response is counterfeit, then merchant computer system 130 indicates to the customer that the order cannot be filled.

Payment Capture

Figure 9:
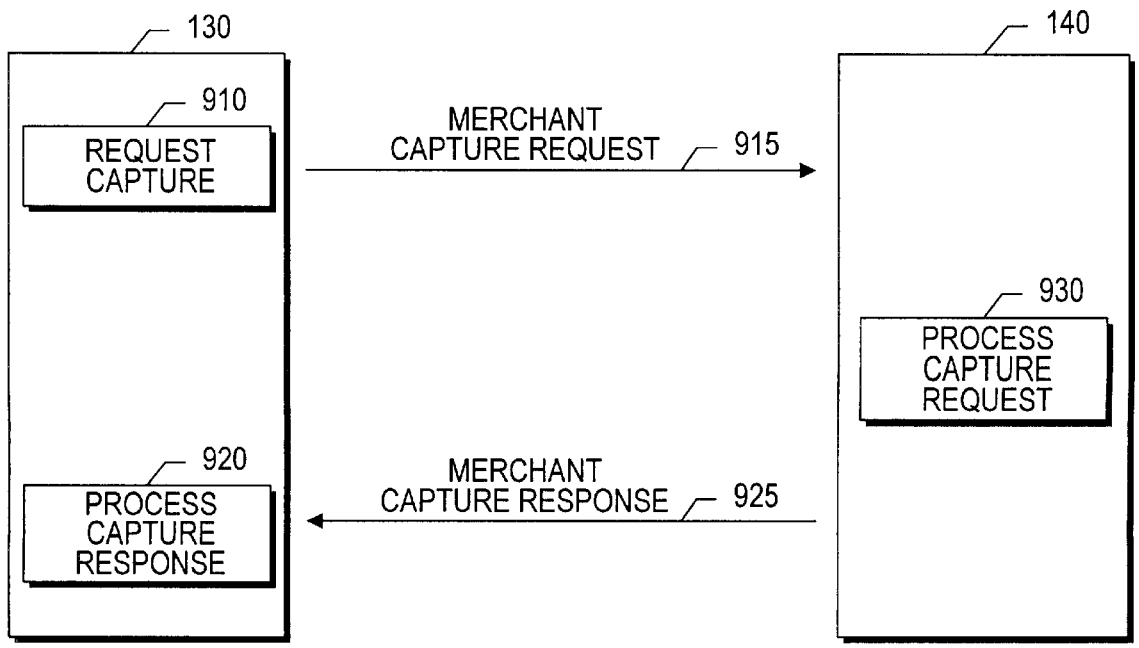
FIG. 9 depicts an overview of the method of securely supplying payment capture information to the payment gateway computer system in order to obtain payment capture in accordance with a preferred embodiment.

FIG. 9 depicts an overview of the method of securely supplying payment capture information to payment gateway computer system 140 in order to obtain payment capture in accordance with a preferred embodiment. In function block 910, merchant computer system 130 generates a merchant payment capture request 915 and transmits it to payment gateway computer system 140. In function block 930, payment gateway computer system 140 processes payment capture request 915, generates a payment capture response 925, and transmits it to merchant computer system 130. In function block 920, merchant computer system 130 processes payment capture response 925 and verifies that payment for the goods or the services (or both) sought to be obtained by the customer have been captured.

Payment Capture Request Generation

Figure 11A:
FIGS. 11A through 11F depict views of the payment capture request and its component parts in accordance with a preferred embodiment.

FIG. 10 depicts the stages of generating and transmitting a payment capture request in accordance with a preferred embodiment. FIGS. 11A through 11F depict views of the payment capture request and its component parts in accordance with a preferred embodiment. In function block 1010, merchant computer system 130 creates a basic capture request 1110. Basic capture request 1110 is a data area that includes information needed by payment gateway computer system 140 to trigger a transfer of funds to the merchant operating merchant computer system 130. Specifically, basic capture request 1110 includes a capture request amount, a capture token, a date, summary information of the purchased items, and a Merchant ID (MID) for the particular merchant. FIG. 11A depicts basic capture request 1110 in accordance with a preferred embodiment.

Figure 11B:
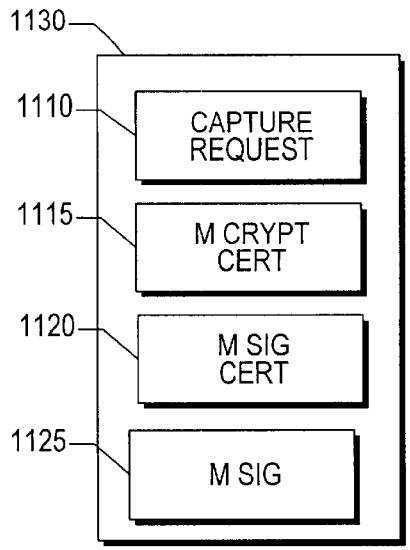

In function block 1020, merchant computer system 130 combines basic capture request 1110, a copy of its encryption public key certificate 1115, and a copy of its signature public key certificate 1120. Merchant computer system 130 calculates a digital signature 1125 for the combined contents of the combined block 1130 including basic capture request 1110, encryption public key certificate 1115, and signature public key certificate 1120, and appends it to the combination of the combined basic capture request 1110, encryption public key certificate 1115, and signature public key certificate 1120. Merchant computer system 130 calculates digital signature 1125 by first calculating a message digest over the contents of the combined basic capture request 1110, encryption public key certificate 1115, and signature public key certificate 1120. The message digest is then encrypted using merchant computer system's 130 digital signature private key, thus forming a digital signature. FIG. 11B depicts combined block 1130 formed by function block 1020 and including basic capture request 1110, encryption public key certificate 1115, signature public key certificate 1120, and digital signature 1125.

Figure 11C:
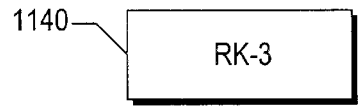

In function block 1030, merchant computer system 130 generates a random encryption key RK-3 1140. Random encryption key RK-3 1140 is a symmetric encryption key. FIG. 11C depicts random encryption key RK-3 1140 in accordance with a preferred embodiment.

Figure 11D:
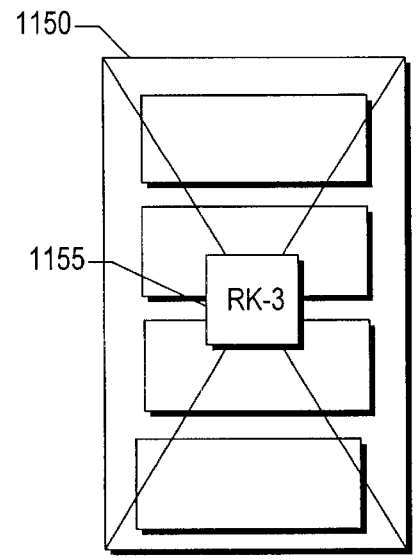

In function block 1040, merchant computer system 130 encrypts combined block 1130 using random encryption key RK-3 1140 to form an encrypted combined block 1150. FIG. 11D depicts encrypted combined block 1150 in accordance with a preferred embodiment. The encryption state of encrypted combined block 1150 is graphically shown by a random key lock 1155, which indicates that encrypted combined block 1150 is encrypted using random key RK-3 1140.

Figure 11E:
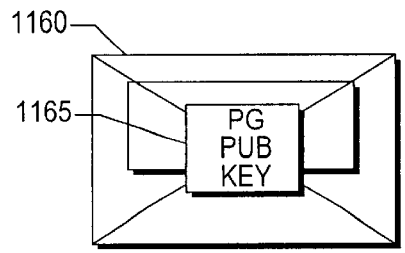

In function block 1050, merchant computer system 130 encrypts random encryption key RK-3 1140 using the public key of payment gateway computer system 140 to form an encrypted random key 1160. FIG. 11E depicts encrypted random key 1160 in accordance with a preferred embodiment. The encryption state of encrypted random key 1160 is graphically shown by a payment gateway public key lock 1165, which indicates that encrypted random key RK-3 1160 is encrypted using the payment gateway public key.

Figure 11F:
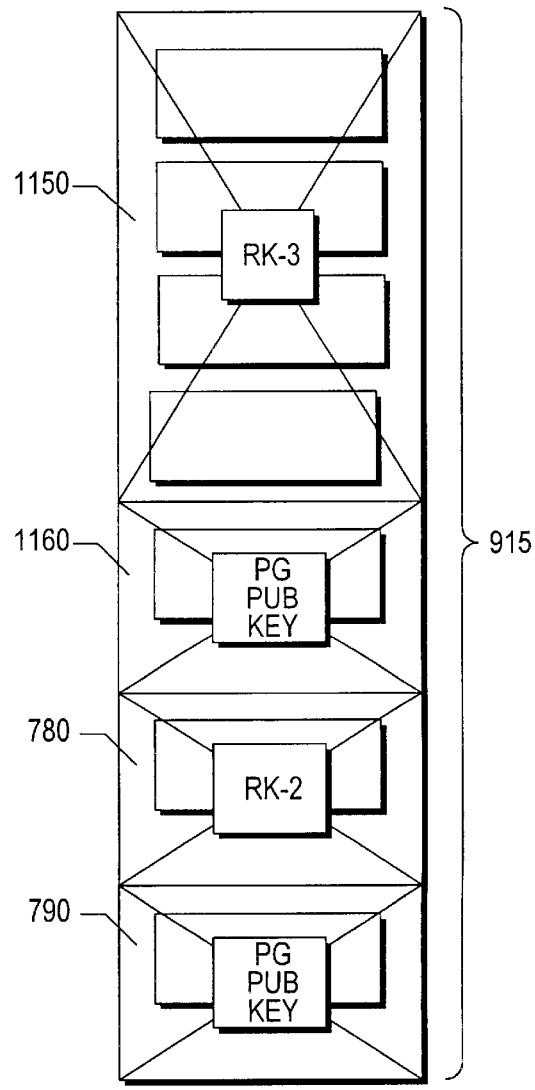

In function block 1060, merchant computer system 130 concatenates encrypted combined block 1150, encrypted random key 1160, and encrypted capture token 780 and encrypted random key RK-2 790 that were stored in function block 850 to form merchant capture request 915. FIG. 11F depicts merchant capture request 915, including encrypted combined block 1150, encrypted random key 1160, encrypted capture token 780, and encrypted random key RK-2 790 in accordance with a preferred embodiment. In function block 1070, merchant computer system 130 transmits merchant capture request 915 to payment gateway computer system 140.

Payment Capture Request Processing

Figure 12A:
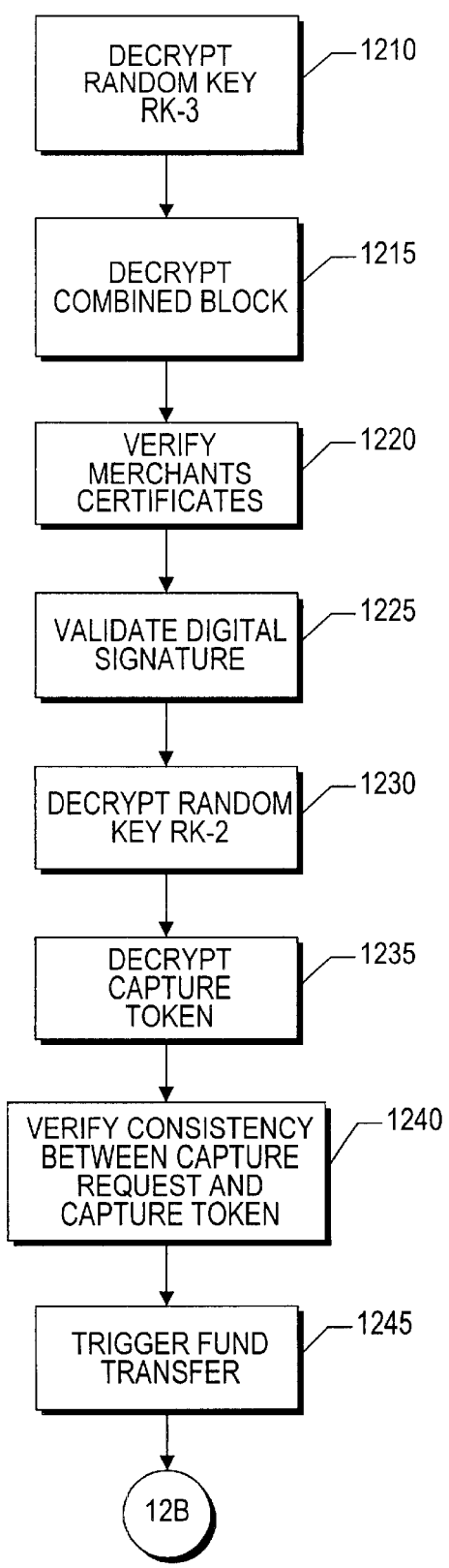
FIGS. 12A and 12B depict the stages of processing a payment capture request and generating and transmitting a payment capture request response in accordance with a preferred embodiment.
Figure 12B:
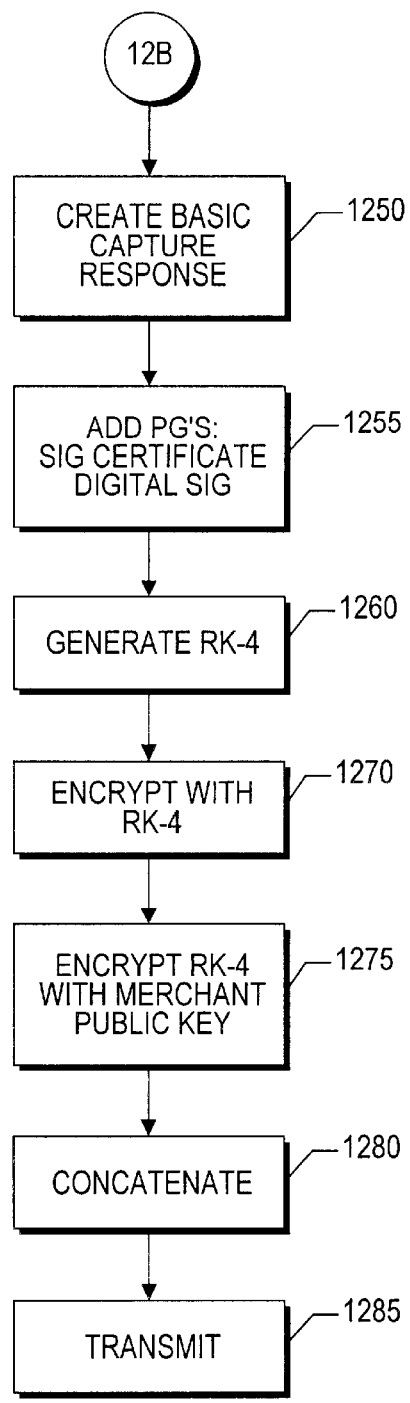

FIGS. 12A and 12B depict the stages of processing a payment capture request and generating and transmitting a payment capture request response in accordance with a preferred embodiment. Function blocks 1210 through 1245 depict the stages of processing a payment capture request, and function blocks 1250 through 1285 depict the stages of generating and transmitting a payment capture request response.

In function block 1210, payment gateway computer system 140 applies its private key to encrypted random key 1160 contained within received merchant capture request 915, thereby decrypting it and obtaining a cleartext version of random key RK-3 1140.

In function block 1215, payment gateway computer system 140 applies random key RK-3 1140 to encrypted combined block 1150, thereby decrypting it and obtaining a cleartext version of combined block 1130. Combined block 1130 includes basic capture request 1110, a copy of merchant computer system's 130 encryption public key certificate 1115, a copy of merchant computer system's 130 signature public key certificate 1120, and merchant digital signature 1125.

In function block 1220, payment gateway computer system 140 verifies merchant computer system's 130 encryption public key certificate 1115 and merchant computer system's 130 signature public key certificate 1120. Payment gateway computer system 140 performs this verification by making a call to the certification authorities associated with each certificate. If verification of either certificate fails, then payment gateway computer system 140 rejects the capture request.

In function block 1225, payment gateway computer system 140 validates merchant digital signature 1125. Payment gateway computer system 140 performs this validation by calculating a message digest over the contents of the combined basic capture request 1110, encryption public key certificate 1115, and signature public key certificate 1120. Payment gateway computer system 140 then decrypts digital signature 1125 to obtain a copy of the equivalent message digest calculated by merchant computer system 130 in function block 1020. If the two message digests are equal, then digital signature 1125 is validated. If validation fails, then payment gateway computer system 140 rejects the capture request.

In function block 1230, payment gateway computer system 140 applies its private key to encrypted random key RK-2 790 contained within received merchant capture request 915, thereby decrypting it and obtaining a cleartext version of random key RK-2 775.

In function block 1235, payment gateway computer system 140 applies random key RK-2 775 to encrypted capture token 780, thereby decrypting it and obtaining a cleartext version of capture token 770.

In function block 1240, payment gateway computer system 140 verifies that a proper transaction is being transmitted between capture token 770 and capture request 1110. A capture token includes data that the gateway generates at the time of authorization. When the authorization is approved, the encrypted capture token is given to the merchant for storage. At the time of capture, the merchant returns the capture token to the gateway along with other information required for capture. Upon receipt of the capture token, the gateway compares a message made of the capture request data and the capture token data and transmits this information over a traditional credit/debit network. If an improperly formatted transaction is detected, then payment gateway computer system 140 rejects the capture request.

In function block 1245, payment gateway computer system 140 determines the financial institution for which capture is requested by inspection of basic capture request 1110. Payment gateway computer system 140 contacts the appropriate financial institution using a secure means (e.g., a direct-dial modem-to-modem connection or a proprietary internal network that is not accessible to third parties), and using prior art means, instructs a computer at the financial institution to perform the requested funds transfer after settlement.

Payment Capture Response Generation

Function blocks 1250 through 1285 depict the stages of generating and transmitting a payment capture request response. FIGS. 13A through 13F depict views of the payment capture response and its component parts in accordance with a preferred embodiment.

Figure 13A:
FIGS. 13A through 13F depict views of the payment capture response and its component parts in accordance with a preferred embodiment.

In function block 1250, payment gateway computer system 140 creates a basic capture response 1310. Basic capture response 1310 is a data area that includes information for indicating whether a capture request was granted or denied. FIG. 13A depicts basic capture response 1310 in accordance with a preferred embodiment.

Figure 13B:
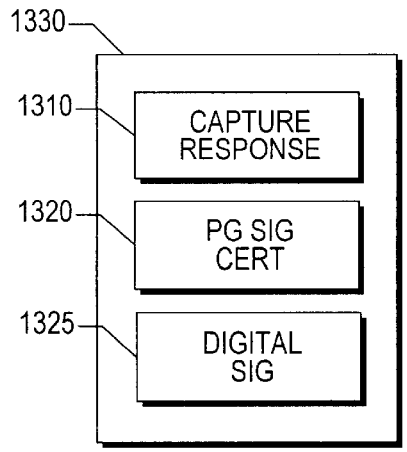

In function block 1255, payment gateway computer system 140 combines basic capture response 1310 and a copy of its signature public key certificate 1320. Payment computer system 140 calculates a digital signature 1325 for the combined contents of combined block 1330 including basic capture response 1310 and signature public key certificate 1320, and appends digital signature 1325 to the combination of the combined basic capture response 1310 and signature public key certificate 1320. Payment gateway computer system 140 calculates digital signature 1325 by first calculating a message digest over the contents of the combined basic capture response 1310 and signature public key certificate 1320. The message digest is then encrypted using the merchant computer system's 140 digital signature private key, thus forming a digital signature. FIG. 13B depicts combined block 1330 formed by function block 1255 and including basic capture request 1310, signature public key certificate 1320, and digital signature 1325 in accordance with a preferred embodiment.

Figure 13C:

In function block 1260, payment gateway computer system 140 generates a symmetric random encryption key RK-4 1340. FIG. 13C depicts random encryption key RK-4 1340 in accordance with a preferred embodiment.

Figure 13D:
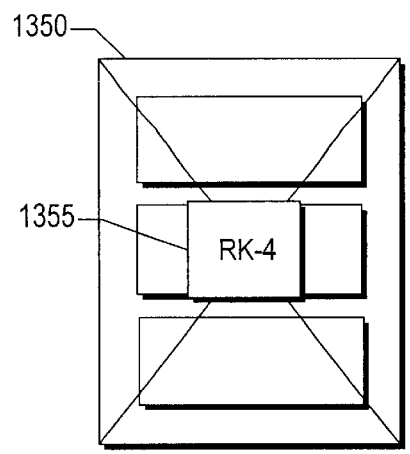

In function block 1270, payment gateway computer system 140 encrypts combined block 1330 using random encryption key RK-4 1340 to form an encrypted combined block 1350. FIG. 13D depicts encrypted combined block 1350 in accordance with a preferred embodiment. The encryption state of encrypted combined block 1350 is graphically shown by a random key lock 1355, which indicates that encrypted combined block 1350 is encrypted using random key RK-4 1340.

Figure 13E:
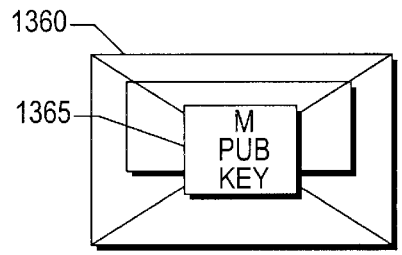

In function block 1275, payment gateway computer system 140 encrypts random encryption key RK-4 1340 using the public key of merchant computer system 130 to form an encrypted random key RK-4 1360. FIG. 13E depicts encrypted random key RK-4 1360 in accordance with a preferred embodiment. The encryption state of encrypted random key 1360 is graphically shown by a merchant public key lock 1365, which indicates that encrypted random key 1360 is encrypted using the merchant public key.

Figure 13F:
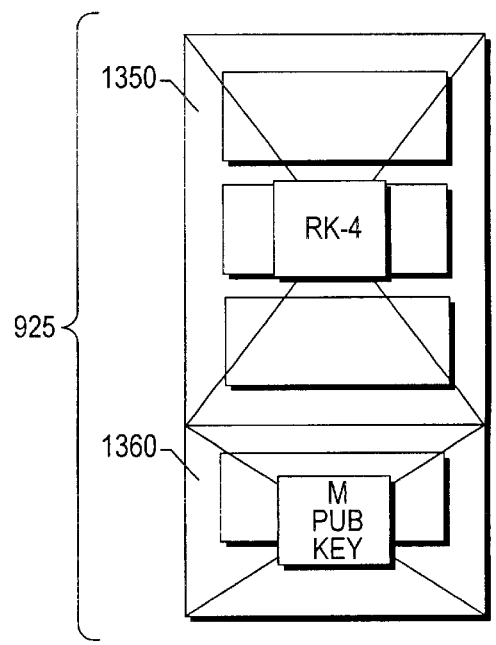

In function block 1280, payment gateway computer system 140 concatenates encrypted combined block 1350 and encrypted random key RK-4 1360 to form merchant capture response 925. FIG. 13F depicts merchant capture response 925 including encrypted combined block 1350 and encrypted random key RK-4 1360 in accordance with a preferred embodiment. In function block 1285, payment gateway computer system 140 transmits merchant capture response 925 to merchant system 130.

Payment Capture Response Processing

FIG. 14 depicts the stages of processing a payment capture response in accordance with a preferred embodiment. In function block 1410, merchant computer system 130 applies its private key to encrypted random key RK-4 1360 contained within received merchant capture response 925, thereby decrypting it and obtaining a cleartext version of random key RK-4 1340.

In function block 1420, merchant computer system 130 applies random key RK-4 1340 to encrypted combined block 1350, thereby decrypting it and obtaining a cleartext version of combined block 1330. Combined block 1330 includes basic capture response 1310, a copy of payment gateway computer system's 140 signature public key certificate 1320, and payment gateway digital signature 1325.

In function block 1430, merchant computer system 130 verifies payment gateway computer system's 140 signature public key certificate 1320. Merchant computer system 130 performs this verification by making a call to the certification authority associated with the certificate. If verification of the certificate fails, then merchant computer system 130 concludes that the capture response is counterfeit and raises an error condition.

In function block 1440, merchant computer system 130 validates payment gateway digital signature 1325. Merchant computer system 130 performs this validation by calculating a message digest over the contents of the combined basic capture response 1310 and signature public key certificate 1320. Merchant computer system 130 then decrypts digital signature 1325 to obtain a copy of the equivalent message digest calculated by payment gateway computer system 140 in function block 1255. If the two message digests are equal, then digital signature 1325 is validated. If validation fails, then merchant computer system 130 concludes that the authorization response is counterfeit and raises an error condition.

In function block 1450, merchant computer system 130 stores basic capture response 1310 for later use by legacy system accounting programs (e.g., to perform reconciliation between the merchant operating merchant computer system 130 and the financial institution from whom payment was requested), thereby completing the transaction.

Accordingly, the system of the present invention permits immediate deployment of a secure payment technology architecture such as the SET architecture without first establishing a public-key encryption infrastructure for use by consumers. It thereby permits immediate use of SET-compliant transaction processing without the need for consumers to migrate to SET-compliant application software.

Virtual Point of Sale Details

A virtual Point of Sale (vPOS) Terminal Cartridge is described in accordance with a preferred embodiment. The vPOS Terminal Cartridge provides payment functionality similar to what a commercially available VeriFone POS terminal ("gray box") provides for a merchant today, but the vPOS allows a merchant to process payments securely using the Internet. It provides full payment functionality for a variety of payment instruments.

Payment Functionality

Figure 15A:
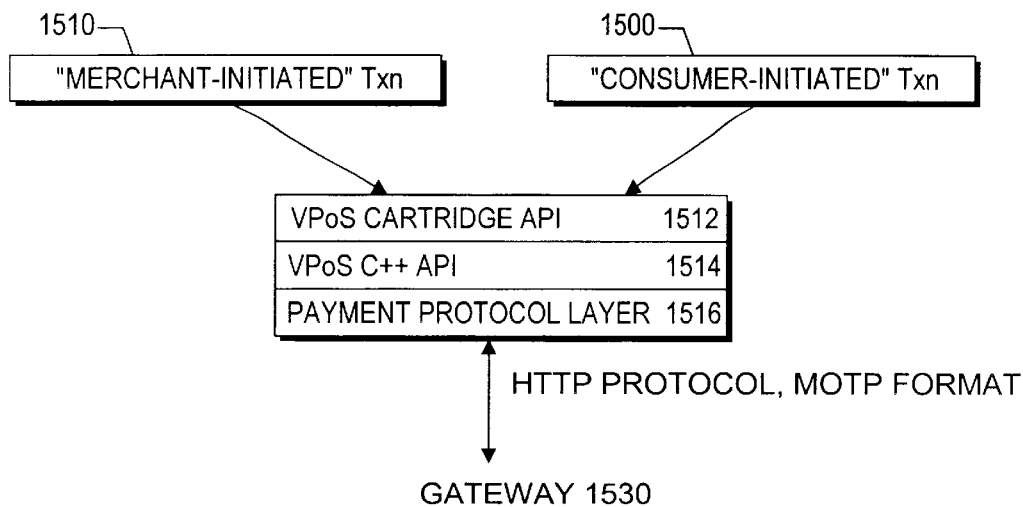
FIGS. 15A and 15B depict transaction processing of merchant and consumer transactions in accordance with a preferred embodiment.

FIG. 15A illustrates a payment processing flow in accordance with a preferred embodiment. The payment functionality provided by the vPOS terminal is divided into two main categories: a "Consumer-Initiated" category 1500; and a "Merchant-Initiated" category 1510. Some payment transactions require communication with the acquirer bank through a gateway 1530. The normal flow of a transaction is via a vPOS Cartridge API 1512 to a vPOS C++ API 1514 into a payment protocol layer 1516, which is responsible for converting data into the appropriate format for transmission to gateway 1530 for additional processing and forwarding to existing host payment authorization systems. Host legacy format refers to an existing authorization system for credit card approval currently utilized with the VeriFone Point of Sale (POS) gray terminals. The output from payment protocol layer 1516 is transmitted to the authorization processing center via gateway 1530. These transactions are referred to as "Online Transactions" or "Host Payments." The transactions that can be done locally by the merchant without having to communicate with the acquirer bank are referred to as "Local Functions and Transactions." To support different types of payment instruments, the vPOS Terminal payment functionality is categorized as set forth below.

Host Payment Functionality: These transactions require communication with the final host, either immediately or at a later stage. For example, an Online Authorization-Only transaction, when initiated, communicates with the host immediately. However, an Off-line Authorization-Only transaction is locally authorized by the vPOS terminal without having to communicate with the host, but at a later stage this off-line authorization transaction is sent to the host. Within the Host Payment Functionality some transactions have an associated Payment Instrument, but others do not. These two kinds of transactions are:

Host Financial Payment Functionality: These transactions have a Payment Instrument (e.g., Credit Card, Debit Card, E-Cash, or E-Check) associated with them. An example of this transaction is the "Return" transaction, which is initiated upon returning merchandise to the merchant.

Host Administrative Payment Functionality: These transactions do not require a payment instrument and provide either administrative or inquiry functionality. Examples of these transactions are "Reconcile" or "Batch Close."

Local Functions and Transactions: These transactions do not require communication with the host at any stage and provide essential vPOS terminal administrative functionality. An example of this is the vPOS terminal configuration function, which is required to set up the vPOS terminal. Another example is the "vPOS Batch Review" function, which is required to review the different transactions in the vPOS Batch or the Transaction Log.

Payment Instruments

A preferred embodiment of a vPOS terminal supports various Payment Instruments. A consumer chooses a payment based on personal preferences. Some of the Payment Instruments supported include:

Credit Cards
Debit Cards
Electronic Cash
Electronic Checks
Micro-Payments (electronic coin)
Smart Cards vPOS Functionality

Figure 15B:
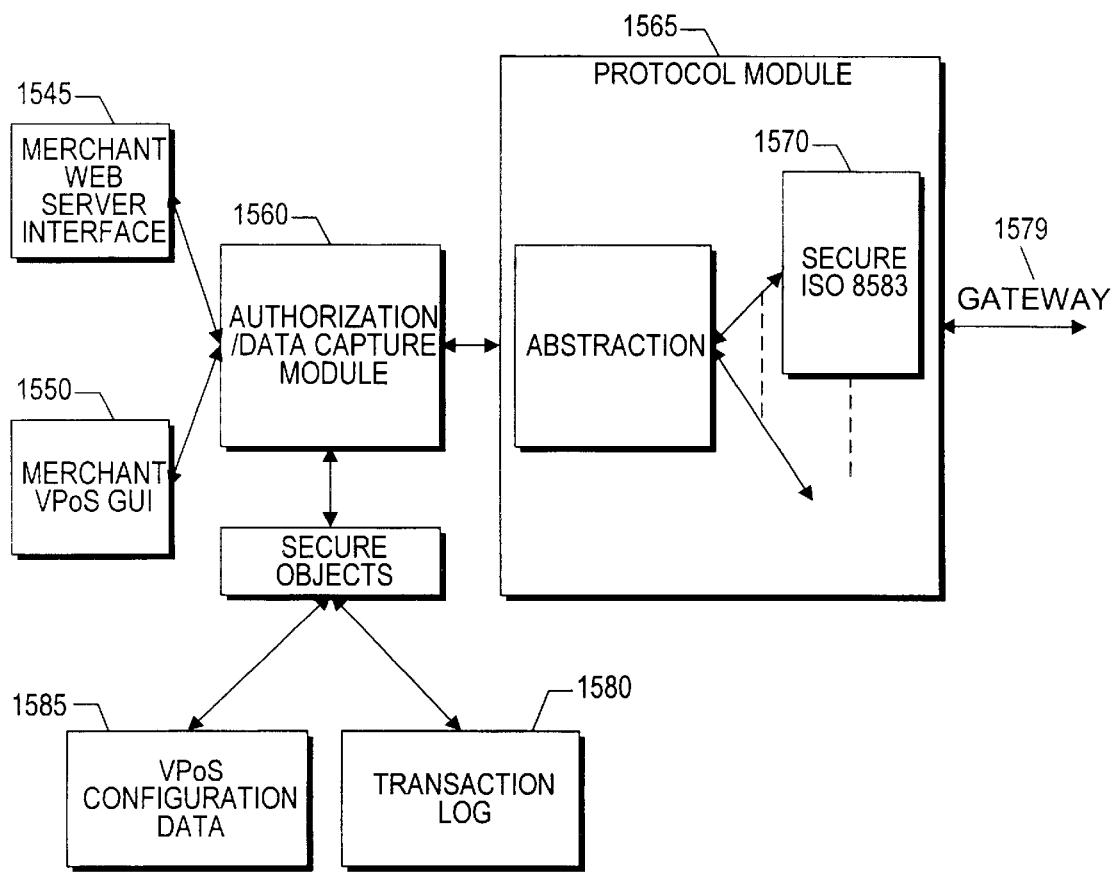

In the block diagram shown in FIG. 15B, the vPOS provides an interface for transactions that are initiated both by the consumer and the merchant in accordance with a preferred embodiment. The merchant initiates a transaction from a Graphical User Interface (GUI) 1550 and all the transactions that are initiated by the consumer are routed by a Merchant WEB Server interface 1545.

An Authorization/Data Capture Module 1560 processes the requests originated by the merchant or the consumer and routes them to a Protocol Module 1565. Protocol Module 1565 is responsible for building a payment protocol request packet 1570 (e.g., an SSL-encapsulated ISO 8583 packet) before sending the request to a Gateway 1579. Gateway 1579 then awaits a response from Protocol Module 1565, and upon receiving the response, Gateway 1579 parses the data and provides unwrapped data to Authorization/Data Capture Module 1560. Authorization/Data Capture Module 1560 analyzes the response and updates a Transaction Log 1580. Transaction Log 1580 includes information concerning any successfully completed transactions and the accumulators or the transaction totals. The vPOS terminal creates and maintains Transaction Log 1580, and vPOS Configuration Data 1585 includes information that is used to configure the behavior of the vPOS. The entire vPOS functionality is thread-safe and hence using the vPOS in a multi-threaded environment does not require any additional interfacing requirements.

Payment Functionality

As discussed above, the different Payment Functionality provided by the vPOS terminal can be divided into two main categories such as "Merchant Initiated" and "Consumer Initiated." Some of these transactions require communication with the Gateway, and these transactions are referred to as "Online Transactions." Transactions that can be done locally to the merchant without having to communicate with the gateway are referred to as "Local Functions/Transactions." In order to provide support for many different types of Payment Instruments, the vPOS Payment Functionality has been categorized.

Host payment functionality and transactions require communication with the host either immediately or at a later stage. Each of the host financial payment transactions are in this category and require a Payment Instrument. These transactions can be initiated with different types of Payment Instruments, which the vPOS terminal supports in accordance with a preferred embodiment.

An authorization without capture transaction is used to validate the card holder's account number for a sale that needs to be performed at a later stage. The transaction does not confirm a sale's completion to the host, and there is no host data capture in this event. The vPOS captures this transaction record and later forwards it to the host to confirm the sale in a forced post transaction request. An authorization without capture transaction can be initiated both by the consumer and the merchant.

A forced post transaction confirms to a host computer that a completion of a sale has been accomplished and requests data capture of the transaction. The forced post transaction is used as a follow-up transaction after doing an authorization (Online or Offline) transaction. The forced post transaction can be initiated only by the merchant.

The authorization with post transaction is a combination of authorization without capture and forced post transactions. This transaction can be initiated both by the consumer and the merchant.

The offline post transaction is identical to the "authorization without capture" transaction, except that the transaction is locally captured by the vPOS without initiating communication with a host. A forced post operation is done as a follow-up operation of this transaction. This transaction can be initiated by both the consumer and the merchant.

The return transaction is used to credit the return amount electronically to the consumer's account when purchased merchandise is returned. The vPOS captures the return transaction record when the merchandise is returned, and this transaction can be initiated only by the merchant.

The void transaction cancels a previously completed draft capture transaction. The vPOS GUI provides an interface for retrieving a transaction record required to be voided from the batch and passes it to the Authorization/Data Capture module after confirmation. The batch record is updated to reflect the voided transaction after getting an approval from the Gateway. This transaction can be initiated only by the merchant.

The pre-authorization transaction is identical to the authorization without capture transaction, but the consumers' "open-to-buy" amount is reduced by the pre-authorization amount. An example of this type of transaction is the "check-in" transaction in a hotel environment. A check-in transaction sends a pre-authorization request to the host so that an amount required for the customers' stay in the hotel is reserved. The pre-authorization transaction is followed by a pre-authorization complete transaction. This transaction can be initiated both by the consumer and the merchant.

The pre-authorization complete transaction is done as a follow-up to the pre-authorization transaction. This transaction informs the host of the actual transaction amount. The pre-authorization complete transaction amount could be more or less than the pre-authorization amount. An example is the "check-out" transaction in a hotel environment. The check-out amount can be less than or more than the check-in amount. This transaction can only be initiated by a merchant.

The adjust transaction is initiated to make a correction to the amount of a previously completed transaction. The adjust transaction can be initiated only by the merchant.

The host administrative transactions do not require any payment instrument. The balance inquiry transaction is used for on-line inquiry into the balance of the merchant's account. The batch data or the configuration data is not affected by this transaction.

The reconciliation or close transaction is processed at the end of the day to start the settlement process for the transactions captured by the host for that particular vPOS.

The host log-on transaction is an administrative transaction that is used to synchronize the vPOS with the host at the start of the day and also initiate a fresh batch at the vPOS terminal.

The parameters download transaction is used to download the vPOS configuration information from the host and set-up the vPOS in the event of any change in the configuration data. A test transaction is used to detect the presence of a host and the status of a link from the vPOS to the host.

Local transactions or functions are initiated by a merchant and do not require communication with the Gateway. These transactions can only be initiated by a merchant. The totals or accumulators review is a local information inquiry function and is used to retrieve the local (merchant's) totals. The detail transaction or the batch review function is used to retrieve all the records from the transaction log or the batch. The clear batch function is used to start a fresh batch. This transaction is utilized to electronically reconcile the vPOS with the host and to manually reconcile the vPOS with the host. After completing the manual reconciliation processing, the merchant can initiate this transaction to start a fresh batch. The clear accumulator function is similar to the clear batch functionality and resets all vPOS terminal accumulators to zero. This function is required when the merchant is not able to reconcile the vPOS with the host electronically.

The vPOS unlock or start transaction is a local function used to start the vPOS at the start of the day. The vPOS lock or stop function is used to lock or stop the vPOS from accepting any transactions. The vPOS configuration setup function is used to setup the vPOS configuration data. The vPOS configuration data is divided into different tables, for example, the Card/Issuer Definition Table (CDT), the Host/Acquirer Definition Table (HDT), the Communications Parameters Table (CPT), and the Terminal Configuration Table (TCT). The following sections explain each of these configuration tables in detail in accordance with a preferred embodiment.

Host Definition Table (HDT)

This table contains information specific to the acquirer.

| Field | Attributes/Bytes | Field Description/Comments |
|---|---|---|
| Terminal Identifier | ANS(20) | Terminal ID for this acquirer/host |
| Merchant Identifier | ANS(20) | Merchant ID for this acquirer/host |
| Current Batch Number | N(6) | Batch Number for the batch currently existing on the vPOS |
| Transaction Number | I(2) | Reference Number for next transaction in the vPOS transaction log/batch (vPOS generated) |
| TPDU | AN(10) | Transport Protocol Data Unit - Required for building the ISO 8583 packet. |
| STAN | L(4) | Systems Trace Number - Message Number of the transaction to be transmitted next for this acquirer. |
| NII | N(3) | Network International Identifier - Required for building the ISO 8583 packet. |
| Host Name or Label | ANS(20) | Name for identifying the host (e.g., "AMEX-SIN"). This is only a text string and is used for the purpose of identifying the host. |
| No. of advice messages | I(2) | No. of off-line transactions (advice messages) that can be piggy-backed at the end of an on-line transaction. If set to zero then piggy-backing is disabled. |

The following fields specify whether Data Capture is required for a particular transaction for this acquirer.

| Field | Attributes/Bytes | Field Description/Comments |
|---|---|---|
| Host Protocol Type | I(2) | Host Protocol type (e.g., ISO 8583 or SET) |
| Host Protocol Sub-Type | I(2) | Sub protocol type (e.g., AMEX-ISO8583 or MOSET) |
| Auth Only DC Flag | Bit(1 bit) | 1 = REQUIRED, 0 = NOT REQUIRED |
| Auth Capture DC Flag | Bit(1 bit) | 1 = REQUIRED, 0 = NOT REQUIRED |
| Adjust DC Flag | Bit(1 bit) | 1 = REQUIRED, 0 = NOT REQUIRED |
| Refund DC Flag | Bit(1 bit) | 1 = REQUIRED, 0 = NOT REQUIRED |
| Cash Advance DC Flag | Bit(1 bit) | 1 = REQUIRED, 0 = NOT REQUIRED |
| Cash Back DC Flag | Bit(1 bit) | 1 = REQUIRED, 0 = NOT REQUIRED |
| Off-line Auth DC Flag | Bit(1 bit) | 1 = REQUIRED, 0 = NOT REQUIRED |
| Void DC Flag | Bit(1 bit) | 1 = REQUIRED, 0 = NOT REQUIRED |
| Pre-Auth DC Flag | Bit(1 bit) | 1 = REQUIRED, 0 = NOT REQUIRED |
| Pre-Auth Complete DC Flag | Bit(1 bit) | 1 = REQUIRED, 0 = NOT REQUIRED |

Card Definition Table (CDT)

This table contains information that is specific to the card issuer.

| Field | Attributes/Bytes | Field Description/Comments |
|---|---|---|
| Host Index | I(2) | Index into the HDT or the acquirer that maps to this card issuer. |
| PAN Low Range | N(19) | Low end of the PAN range. |
| PAN High Range | N(19) | High end of the PAN range. |
| Mininum PAN digits | I(2) | The minimum number of digits in the PAN for this acquirer. |
| Maximum PAN digits | I(2) | The maximum number of digits in the PAN for this acquirer. |
| Card Label | ANS(20) | Card Issuer Name for identification (e.g., VISA). |

The following fields specify whether a particular transaction is allowed for a card range.

| Field | Attributes/Bytes | Field Description/Comments |
|---|---|---|
| Auth Only Allowed | Bit(1 bit) | 1 = ALLOWED, 0 = NOT ALLOWED |
| Auth Capture Allowed | Bit(1 bit) | 1 = ALLOWED, 0 = NOT ALLOWED |
| Adjust Allowed | Bit(1 bit) | 1 = ALLOWED, 0 = NOT ALLOWED |
| Refund Allowed | Bit(1 bit) | 1 = ALLOWED, 0 = NOT ALLOWED |
| Cash Advance Allowed | Bit(1 bit) | 1 = ALLOWED, 0 = NOT ALLOWED |
| Cash Back Allowed | Bit(1 bit) | 1 = ALLOWED, 0 = NOT ALLOWED |
| Off-line Auth Allowed | Bit(1 bit) | 1 = ALLOWED, 0 = NOT ALLOWED |
| Void Allowed | Bit(1 bit) | 1 = ALLOWED, 0 = NOT ALLOWED |
| Pre-Auth Allowed | Bit(1 bit) | 1 = ALLOWED, 0 = NOT ALLOWED |
| Pre-Auth Complete Allowed | Bit(1 bit) | 1 = ALLOWED, 0 = NOT ALLOWED |

Communications Parameter Table (CPT)

This table contains communications parameters information specific to an acquirer. The HDT and this table have a one-to-one mapping between them.

| Field | Attributes/Bytes | Field Description/Comments |
|---|---|---|
| Primary Address | AN(100) | Primary Host Address (e.g., Telephone number, IP address) |
| Secondary Address | AN(100) | Secondary Host Address to be used if the Primary Address is busy or not available. |
| Tertiary Address | AN(100) | Tertiary Host Address. |

-continued

| Field | Attributes/Bytes | Field Description/Comments |
|---|---|---|
| Response Time-out | I(2) | Time-out value (in seconds) before which the vPOS should receive a response from the host. |

Terminal Configuration Table (TCT)

This table contains information specific to a particular vPOS terminal.

| Field | Attributes/Bytes | Field Description/Comments |
|---|---|---|
| Merchant Name | ANS(100) | Name of the merchant having the vPOS terminal. |
| vPOS Lock Flag | Bit (1 bit) | 1 = vPOS Locked, 0 = vPOS Unlocked |

URL Table

The table below enumerates the URLs (Universal Resource Locators) corresponding to the transactions supported by the vPOS Terminal Cartridge in accordance with a preferred embodiment. Note that the GET method is allowed for all transactions; however, for transactions that either create or modify information on the merchant server, a GET request returns an HTML page from which the transaction is performed via a POST method.

| Transaction | URL | POST | Access Control |
|---|---|---|---|
| HOST FINANCIAL PAYMENT FUNCTIONALITY | | | |
| auth capture | /vPOSt/mi/authcapture/ | allowed | merchant login/password |
| auth capture | /vPOSt/ci/authcapture/ | allowed | no access control |
| auth only | /vPOSt/mi/authonly/ | allowed | merchant login/password |
| auth only | /vPOSt/ci/authonly/ | allowed | no access control |
| adjust | /vPOSt/mi/adjust/ | allowed | merchant login/password |
| forced post | /vPOSt/mi/forcedpost/ | allowed | merchant login/password |
| offline auth | /vPOSt/mi/offlineauth/ | allowed | merchant login/password |
| offline auth | /vPOSt/ci/offlineauth/ | allowed | no access control |
| pre auth | /vPOSt/mi/preauth/ | allowed | merchant login/password |
| pre auth comp | /vPOSt/mi/preauthcomp/ | allowed | merchant login/password |
| return | /vPOSt/mi/return | allowed | merchant login/password |
| return | /vPOSt/ci/return/ | allowed | no access control |
| void | /vPOSt/mi/void/ | allowed | merchant login/password |
| HOST ADMINISTRATIVE PAYMENT FUNCTIONALITY | | | |
| balance inquiry | /vPOSt/mi/bi/ | not allowed | merchant login/password |
| host logon | /vPOSt/mi/hostlogon/ | allowed | merchant login/password |
| parameter download | /vPOSt/mi/parametersdnld/ | not allowed | merchant login/password |
| reconcile | /vPOSt/mi/reconcile/ | allowed | merchant login/password |
| test host | /vPOSt/mi/testhost/ | not allowed | merchant login/password |
| LOCAL FUNCTIONS & TRANSACTIONS | | | |
| accum review | /vPOSt/mi/accum/review/ | not allowed | merchant login/password |
| batch review | /vPOSt/mi/batch/review/ | not allowed | merchant login/password |
| cdt review | /vPOSt/mi/cdt/review/ | not allowed | merchant login/password |
| cdt update | /vPOSt/mi/cdt/update/ | allowed | merchant login/password |
| cpt review | /vPOSt/mi/cpt/review | not allowed | merchant login/password |
| cpt update | /vPOSt/mi/cpt/update/ | allowed | merchant login/password |
| clear accum | /vPOSt/accum/clear/ | allowed | merchant login/password |
| clear batch | /vPOSt/mi/batch/clear/ | allowed | merchant login/password |
| hdt review | /vPOSt/mi/hdt/review/ | not allowed | merchant login/password |
| hdt update | /vPOSt/mi/hdt/update/ | allowed | merchant login/password |
| lock vPOS | /vPOSt/mi/lock/ | allowed | merchant login/password |
| query txn | /vPOSt/ci/querytxn/ | not allowed | no access control |
| query txn | /vPOSt/mi/querytxn/ | not allowed | merchant login/password |
| tct review | /vPOSt/mi/tct/review/ | not allowed | merchant login/password |
| tct update | /vPOSt/mi/tct/update/ | allowed | merchant login/password |
| unlock vPOS | /vPOSt/mi/unlock/ | allowed | merchant login/password |

URL Descriptions

This section describes the GET and POST arguments that are associated with each transaction URL. It also describes the results from the GET and POST methods. For URLs that produce any kind of results, the following fields are present in the HTML document that is returned by the vPOS Terminal Cartridge:

| | |
|---|---|
| txnDate | Date of the transaction (mm/dd/yy or dd/mm/yy) |
| txnTime | Time of the transaction (hh:mm:ss GMT or hh:mm:ss local time) |
| merchantId | Merchant ID of the merchant using the vPOS terminal |
| terminalId | vPOS Terminal Id |
| txnNum | Transaction number of the given transaction |
| txnType | Type of transaction |

For URLs that deal with financial transactions, the following fields are present in the HTML document that is returned by the vPOS terminal cartridge:

| | |
|---|---|
| txnAmount | Transaction amount that is being, for example, authorized, forced posted, or voided |
| poNumber | Purchase order number |
| authIdentNum | Authorization ID number for the transaction |
| retRefNum | Retrieval reference number for the given transaction |
| piInfo | Payment instrument information, which generally varies for different payment instruments. For example, in the case of credit cards, the credit card number (piAcctNumber) and expiration date (piExpDate) are returned. |

Accumulate Review

URL Functionality: This is a local information inquiry function that retrieves the local (merchant's) transaction totals (accumulators).
GET Arguments: None.
GET Results: Retrieves the transaction totals for the merchant. Currently, the total is returned as an HTML document. The transaction totals currently returned are:

| | |
|---|---|
| creditAmt | Total Credit Amount since the last settlement logged in the vPOS terminal |
| creditCnt | Total Credit Count since the last settlement logged in the vPOS terminal |
| debitAmt | Total Debit Amount since the last settlement logged in the vPOS terminal |
| debitCnt | Total Debit Count since the last settlement logged in the vPOS terminal |

Note: Accum Review is a local function as opposed to Balance Inquiry, which is performed over the Internet with the host.

Adjust

URL Functionality: Corrects the amount of a previously completed transaction.
GET Arguments: None
GET Results: Because the Adjust transaction modifies data on the merchant server, the POST method should be used. Using the GET method returns an HTML form that uses the POST method to perform the transaction.
POST Arguments:

| | |
|---|---|
| pvsTxnNum | Previous transaction number |
| txnAdjusted Amount | The adjusted transaction amount. Note that the original transaction amount is easily retrievable from the previous transaction number. |

POST Results: On success, pvsTxnNum and txnAdjustedAmount are presented in the HTML document, in addition to the transaction fields described above.

Auth Capture

URL Functionality: This transaction is a combination of Auth Only (Authorization without capture) and Forced Post transactions.
GET Arguments: None
GET Results: Because the Auth Capture transaction modifies data on the merchant server side, the POST method should be used. Using the GET method returns an HTML form that uses the POST method to perform the transaction.
POST Arguments:

| | |
|---|---|
| piAcctNumber | Payment Instrument account number (e.g., Visa credit card number) |
| piExpDate | Expiration date |
| txnAmt | Transaction amount |

POST Results: On success, an HTML document that contains the transaction fields described above is returned. On failure, an HTML document that contains the reason for the failure of the transaction is returned. The transaction is logged into a vPOS Terminal transaction log for both instances.

Auth Only

URL Functionality: Validates the cardholder's account number for a sale that is performed at a later stage. The transaction does not confirm the sale to the host, and there is no host data capture. The vPOS captures this transaction record and later forwards it to confirm the sale in the Forced Post transaction request.
GET Arguments: None.
GET Results: Because the Auth Only transaction modifies data on the merchant server side, the POST method should be used. Using the GET method returns an HTML form that uses the POST method to perform the transaction.
POST Arguments:

| | |
|---|---|
| piAcctNumber | Payment Instrument account number (e.g., Visa credit card number) |
| piExpDate | Expiration date |
| txnAmt | Transaction amount |

POST Results: On success, an HTML document that contains the transaction fields is returned. On failure, an HTML document that contains the reason for the failure of the transaction is returned. The transaction is logged into vPOS Terminal transaction log for both instances.
NOTE: The /vPOSt/ci/authonly/ URL should be used for customer-initiated transactions, and /vPOSt/mi/authonly/ should be used for merchant-initiated transactions.

Balance Inquiry

URL Functionality: Performs an on-line inquiry or the merchant's balance.
GET Arguments: None
GET Results:

| | |
|---|---|
| mrcht BlnceAmt | Merchant balance amount for a given merchant. The balance amount at any given time is the difference between the credit and debit amount since the last settlement between the merchant and the acquirer. |

Batch Review

URL Functionality: Retrieves all records from the transaction log or the batch.
GET Arguments: None
GET Results: The GET method retrieves the transactions that have been batched in the vPOS terminal for future reconciliation. The batch can be cleared from the vPOS terminal after a manual reconciliation between the acquirer and the vPOS. The batch data is retrieved as a set of records and is formatted as a table in the HTML document. The following fields are present in a typical record:

| | |
|---|---|
| nTransType | Transaction type |
| nPurch OrderNo | Purchase order number |
| szAcctNum | Customer's payment instrument account number |
| szExpDate | Customer's payment instrument expiration date |
| szTransAmt | Transaction amount |
| szTransDate | Transaction date |
| szTransTime | Transaction time |

-continued

| | |
|---|---|
| szRetrieval-RefNum | Transaction's retrieval reference number |
| szAuthId | Authorization ID for the transaction |
| szOrigAmt | Original transaction amount |
| szBatchNum | Batch number for the given transaction |
| nCurrency Type | Currency in which the transaction was done |
| lnTransNum | Transaction number |

CDT Review

URL Functionality: Displays the vPOS terminal configuration data corresponding to the Card Definition Table (CDT).
GET Arguments: None
GET Results: The GET method returns a default HTML form that contains the current configuration values. The form can be modified and posted using the /vPOSt/mi/cdt/update/ URL to update the card definition table. Not all fields in the card definition table are editable. The following fields are returned in a form to the user (not all of these fields are editable by a merchant):

| | |
|---|---|
| nHostIndex | Index into the Host Definition Table or the Acquirer that maps to this card issuer |
| sZPANLo | Low end of the PAN (Primary Account Number) range |
| szPANHi | High end of the PAN range |
| nMaxPANDigit | Maximum number of digits in the PAN for this acquirer |
| NMinPANDigit | Minimum number of digits in the PAN for the acquirer |
| szCardLabel | Card Issuer's name |
| Transactions | Specifies if a particular transaction is allowed for a given card range |
| Available bit vector | |

CDT Update

URL Functionality: Updates the vPOS terminal configuration data corresponding to the Card Definition Table (CDT).
GET Arguments: None
GET Results: The GET method returns a default HTML form that contains the current configuration values. The form can be filled out and posted using the /vPOSt/mi/cdt/update URL to update the card definition table.
POST Arguments: Editable CDT fields
POST Results: Depends on editable CDT fields

Clear Accumulator

URL Functionality: Zeroes out the accumulator totals currently resident in the vPOS terminal
GET Arguments: None
GET Results: Presents a form that uses the POST method to zero the accumulators
POST Arguments: None
POST Results: Zeroes the accumulators/transaction totals in the vPOS terminal

Clear Batch

URL Functionality: Zeroes out the transaction logs currently batched in the vPOS terminal
GET Arguments: None
GET Results: Presents a form that uses the POST method to clear the batch
POST Arguments: None
POST Results: Zeroes the transactions that comprise the batch in the vPOS terminal

Forced Post

URL Functionality: Confirms to the host the completion of a sale and requests for data capture of the transaction. This is used as a follow-up transaction after doing an Authorization (Online or Off-line) transaction.
GET Arguments: None
GET Results: Returns the HTML form for performing the Forced Post transaction
POST Arguments:
   pvsTxnNum the previous transaction number from an auth only transaction
POST Results: On success, pvsTxnNum is presented in the HTML document. On failure, an HTML document is returned that contains the reason for the failure of the transaction.

HDT Review

URL Functionality: Displays the vPOS terminal configuration data corresponding to the Host Definition Table (HDT)
GET Arguments: None
GET Results: The GET method returns a default HTML form that contains the current configuration values. The form can be modified and posted using the /vPOSt/mi/hdt/update URL to update the hosts definition table. Not all fields in the host definition table are editable. The following fields are returned in a form to the user (not all of these fields are editable by a merchant):

| | |
|---|---|
| szTermID | Terminal ID for this vPOS terminal |
| szMerchID | Merchant ID for this vPOS terminal |
| szCurr BatchNum | Current batch number existing on the vPOS |
| szTransNum | Reference number for the next transaction in the vPOS transaction log/batch. This is generated by vPOS and is not editable by the merchant. |
| szTPDU | Transport Protocol Data Unit. Required for building the ISO 8583 packet. |
| InSTAN | System trace number; message number of the next transaction to be transmitted to this acquirer |
| szNII | Network International Number. Required for building the ISO 8583 packet. |
| sZHostName | Name for identifying the host |
| nHostType | Host type |
| nNumAdv | Number of off-line transactions that can be piggy-backed at the end of an on-line transaction |
| Data Capture | Specifies for which transactions data capture is required |
| Required Bit vector | |

HDT Update

URL Functionality: Updates the vPOS terminal configuration data corresponding to the Host Definition Table (HDT)
GET Arguments: None
GET Results: The GET method returns a default HTML form that contains the current configuration values. The form can be filled out and posted to the merchant server using the /vPOSt/mi/hdt/update URL to update the host definition table.

Unlock vPOS

URL Functionality: Local function that starts the vPOS at the start of the day

GET Arguments: None
GET Results: Returns an HTML form that uses the POST method to perform this transaction
POST Arguments: None
POST Results: Resets a Boolean flag on the merchant server that enables transactions to be accepted by the vPOS terminal Offline Auth URL Functionality: This transaction is same as the "Authorization Only" transaction, except that the transaction is locally captured by the vPOS terminal without having to communicate with the host. A Forced Post operation is done as a follow-up operation of this transaction.
GET Arguments: None
GET Results: Because the Offline Auth transaction modifies data on the merchant server side, the POST method should be used. Using the GET method returns an HTML form for using the POST method to perform the transaction.
POST Arguments:

| | |
|---|---|
| piAcctNumber | Payment Instrument account number (e.g., Visa credit card number) |
| piExpDate | Expiration date |
| txnAmt | Transaction amount |

POST Results: On success, an HTML document that contains the transaction fields is returned, as described above with respect to the Auth Only functionality. On failure, an HTML document that contains the reason for the failure of the transaction is returned. The transaction is logged into the vPOS terminal transaction log for both instances.

Parameter Download

URL Functionality: Downloads the vPOS configuration information from the host and sets up the vPOS in the event of the configuration data being changed
GET Arguments: None
GET Results: Retrieves an HTML form that uses the POST method for the parameter download transaction
POST Arguments: None
POST Results: Downloads the following parameters from the host and uploads them into the vPOS terminal configuration table
  card/issuer definition table (CDT)
  host/acquirer definition table (HDT)
  communications parameter table (CPT)
  terminal configuration table (TCT)
The various configuration parameters can be reviewed and modified using the URLs for the desired functionality.

Pre Auth

URL Functionality: Used in lodging and hotel establishments to pre-authorize a charge that is completed some time in future
GET Arguments: None
GET Results: Retrieves the HTML form for posting the pre-authorization transaction
POST Arguments:

| | |
|---|---|
| piAcctNumber | Payment Instrument account number (e.g., Visa credit card number) |
| piExpDate | Expiration date |

Pre Auth Comp

URL Functionality: Completes a pre-authorization transaction
GET Arguments: None
GET Results: Retrieves the HTML form for posting the pre-authorization completion transaction
POST Arguments:
  pvsTxnNum Previous transaction number from an auth only transaction
POST Results: On success, pvsTxnNum is presented in the HTML document. On failure, an HTML document is returned that contains the reason for the failure of the transaction.

Reconcile

URL Functionality: This transaction is done at the end of the day to confirm to the host to start the settlement process for the transactions captured by the host for that particular vPOS batch.
GET Arguments: None
GET Results: Retrieves the HTML form for posting the Reconcile transaction.
POST Arguments: None
POST Results: On success, the reconcile function prints any discrepancies in the merchant's batch of transactions and totals vis-a-vis the host's batch of transactions in totals. The output format is a combination of the output of the Batch Review and Accum Review transactions.

Return

URL Functionality: Credits the return amount electronically to the consumer's account when previously purchased merchandise is returned. The vPOS terminal captures the transaction record for this transaction.
GET Arguments: None
GET Results: Retrieves the HTML form for posting the Return transaction
POST Arguments:
  prevTxnNum Reference to the previous transaction number
The previous transaction has access to the following fields:

| | |
|---|---|
| txnAmount | Transaction amount |
| piAccountNum | Payment instrument account number |
| piExpDate | Payment instrument expiration date |

POST Results: On success, pvsTxnNum is presented in the HTML document.

Test Host

URL Functionality: Checks the presence of the host and also the integrity of the link from the vPOS to the host
GET Arguments: None
GET Results: On success, an HTML document is returned that reports success in connecting to the host. On failure, an HTML document is returned that reports the error encountered in testing the host.

Lock vPOS

URL Functionality: This local function locks or stops the vPOS terminal from accepting any transactions.
GET Arguments: None
GET Results: Returns an HTML form that posts the locking of the vPOS terminal
POST Arguments: None
POST Results: On success, an HTML document is returned that contains the status that vPOS terminal was successfully locked. On failure, an HTML document is returned that reports the cause of failure of the operation (e.g., access denied, the vPOS terminal is already locked, or is presently processing a transaction)

Void

URL Functionality: Cancels a previously completed draft capture transaction
GET Arguments: None
GET Results: Retrieves an HTML form for posting the Void transaction
POST Arguments:
  pvsTxnNum Transaction number from a previous Auth Only transaction

Host Logon

URL Functionality: Administrative transaction used to sign-on the vPOS with the host at the start of the day and also to download encryption keys for debit transactions
GET Arguments: None
GET Results: Retrieves an HTML form for posting the Host Logon transaction
POST Arguments: None
POST Results: The result is an HTML document indicating the success or failure of the host logon operation.

CPT Review

URL Functionality: Returns the vPOS terminal configuration data corresponding to the Communications Parameter Table (CPT)
GET Arguments: None
GET Results: The GET method returns a default HTML form that contains the current configuration values corresponding to the vPOS terminal's communication parameters. The form can be filled out and posted to the merchant server using the /vPOSt/mi/cpt/update URL to update the communications parameter table. The following fields are returned in a form to the user:

| | |
|---|---|
| szAcqPriAddress | Primary Host address |
| szAcqSecAddress | Secondary Host address |
| szActTerAddress | Tertiary Host address |
| nRespTimeOut | Time-out value (in seconds) before which the vPOS should receive a response from the host |

CPT Update

URL Functionality: Updates the vPOS terminal configuration data corresponding to the Communications Parameter Table (CPT)
GET Arguments: None
GET Results: The GET method returns a default HTML form that contains the current configuration values. The form can be modified and posted to update the communication parameter table.
POST Arguments:

| | |
|---|---|
| szAcqPriAddress | Primary Host address |
| szAcqSecAddress | Secondary Host address |
| szActTerAddress | Tertiary Host address |
| nRespTimeOut | Time-out value (in seconds) before which the vPOS should receive a response from the host |

POST Results: On success, the HTML document returned by the vPOS contains the values set by the merchant. On failure, the HTML document contains the reason for the failure of the invocation of the URL.

TCT Review

URL Functionality: Returns the vPOS terminal configuration data corresponding to the Terminal Configuration Table (TCT)
GET Arguments: None
GET Results: The GET method returns a default HTML form that contains the current configuration values. The form can be filled out and posted using the /vPOSt/mi/tct/update URL to update the terminal configuration table. The following fields are returned in a form to the user:

| | |
|---|---|
| szMerchName | Merchant name |
| szSupervisorPwd | Supervisor password |
| fvPOSLock | 1 = vPOS locked, 0 = vPOS unlocked |
| szAuthOnlyPwd | Password for initiating auth-only transaction |
| szAuthCaptPwd | Password for initiating auth with capture transaction |
| szAdjustPwd | Password for adjust transaction |
| szRefundPwd | Password for refund transaction |
| szForcedPostPwd | Password for forced post transaction |
| szOfflineAuthPwd | Password for offline auth transaction |
| szVoidPwd | Password for void transaction |
| szPreAuthPwd | Password for pre-authorization transaction |
| szPreAuthCompPwd | Password for pre-authorization completion |

TCT Update

URL Functionality: Updates the vPOS terminal configuration data corresponding to the Terminal Configuration Table (TCT)
GET Arguments: None
GET Results: The GET method returns a default HTML form that contains the current configuration values. The form can be filled out and posted using the /vPOSt/mi/tct/update URL to update the terminal configuration table.
POST Arguments: All arguments in TCT Review functionality are the returned values from the /vPOSt/mi/tct/update the URL.

| | |
|---|---|
| sZMerchName | Merchant name |
| szSupervisorPwd | Supervisor password |
| fvPOSLock | 1 = vPOS locked, 0 = vPOS unlocked |
| szAuthOnlyPwd | Password for initiating auth-only transaction |
| szAuthCaptPwd | Password for initiating auth with capture transaction |
| szAdjustPwd | Password for adjust transaction |
| szRefundPwd | Password for refund transaction |
| szForcedPostPwd | Password for forced post transaction |
| szOfflineAuthPwd | Password for offline auth transaction |
| szVoidPwd | Password for void transaction |
| szPreAuthPwd | Password for pre-authorization transaction |
| szPreAuthCompPwd | Password for pre-authorization completion |

POST Results: On success, the POST modifies values of the terminal configuration table parameters. On failure, the HTML document contains the reason for the failure of the transaction.

Query Transactions

URL Functionality: Permits the merchant and customer to query a given transaction corresponding to a transaction number GET Arguments:

txnNum Transaction number

GET Results: For a given transaction, the URL returns an HTML document. If a transaction refers to an older transaction, then the transaction's entire history is made available.

URL results

Depending upon the method (GET/POST) as well as the success or failure of the HTTP request, different documents are returned to the user. The vPOS terminal provides a framework whereby different documents are returned based upon a number of preferences. Currently, the language and content-type are supported as preferences.

A simple framework is proposed here. Each of the transactions has a set of documents associated with it: form for the payment transaction, GET success, GET failure, POST success, and POST failure.

In the directory structure defined below, documents are stored corresponding to the preferences. The top level of the directory structure is the content-type, and the next level is the language (for NLS support). For example, to create text/html content in English and French, the directory structure given below would contain the HTML documents for each of the transactions. The vPOS terminal cartridge has a configuration file that allows the user to specify the content-type as well as the language to be used for a cartridge. For example, the vPOS terminal cartridge supports one content-type and language for each server.

Data Structures & Functions

Functions

A brief description of the Virtual Point of Sale Terminal cartridge functions are provided below. In particular, vPOSTInit( ), vPOSTExec( ) and vPOSTShut( ) are the entry points for each cartridge in accordance with a preferred embodiment. The other functions implement some of the key vPOST cartridge functionality. A source code listing of the vPOS code is provided below to further accentuate the detailed disclosure of a preferred embodiment.

vPOSTInit()

```
/* vPOST cartridge Initialization here */
WRBReturnCode
vPOSTInit( void **clientCtx ){
    vPOSTCtx *vPOSTCxp;
    /* Allocate memory for the client context */
    if(!(vPOSTCxp = (vPOSTCtx *)malloc(sizeof(vPOSTCtx))))
        return WRB_ERROR;
    *clientCtx = (void *)vPOSTCxp;
    return (WRB_DONE);}
``` vPOSTShut()

```
WRBReturnCode
vPOSTShut( void *WRBCtx, void *clientCtx ){
    *WRBCtx;    /* not used */
    assert( clientCtx );
    /* Free the client context allocated in vPOSTInit() routine
        free( clientCtx );
        return (WRB_DONE);}
``` vPOSTExec()

```
/* The driver cartridge routine */
WRBReturnCode
vPOSTExec( void *WRBCtx, void *clientCtx )
{
    vPOSTCtx      *vPOSTCxp;
    char    *uri;
    char    *txnMethod;   /* HTTP method */
    enum evPOSTTxn      *txn;   /* vPOST transaction */
    char    *txnOutFile; /* Output file from transaction */
    char    **txnEnv; /* environment variables values for
                            transaction */
    char    *txnContent; /* transaction's POST data content */
    WRBEntry       *WRBEntries;
    int            numEntries;
    vPOSTCXp = (vPOSTCtx *) clientCtx;
    /* WRBGetURL gets the URL for the current request */
    if(!(uri = WRBGetURL( WRBCtx )))
        return (WRB_ERROR);
    /* WRBGetContent() gets the QueryString/POST data content */
    if(!(txnContent = WRBGetContent( WRBCtx ))) {
        return WRB_ERROR;
    }
    /* WRBGetParserContent() gets the parsed content */
    if(WRB_ERROR == WRBGEtParsedContent( WRBCtx,
        &WRBEntries, &numEntries)) {
        return WRB_ERROR;
    }
    /* WRBGetEnvironment() gets the HTTP Server Environment */
    if(!(txnEnv = WRBGetEnvironment( WRBCtx ))) {
    return WRB_ERROR;
    }
    /* vPOSTGetMethod() gets the method for the current request */
    if(!(method = vPOSTGetMethod( txnEnv ))){
        return (WRB_ERROR);
    }
    /* vPOSTGetTxn() gets the vPOST transaction for the request */
    txn = vPOSTGetTxn( uri );
    if(eTxnError == txn) {
        return (WRB_ERROR);
    }
    /* vPOSTExecuteTransaction() executes the vPOST transaction */
    txnOutFile = vPOSTExecuteTransaction( WRBCtx, txn,
        txnMethod, txnEnv, txnContent );
    if(!(txnOutFile)) {
        return (WRB_ERROR);
    }
    /* Write out the file */
    vPOSTWriteFile( txnOutFile );
    return (WRB_DONE);
}
``` vPOSTGetTxn()

```
enum evPOSTTxn
vPOSTGetTxn( char *uri )
{
    /*
    * The function scans the uri and extracts the string
    * corresponding to the transaction and returns it to the
    * caller.
    */
}
```

Transaction Log Format

This section describes the format of a record for the transaction log for the vPOST cartridge.

| Field Name | Field Description |
|---|---|
| nTransType | Transaction Type |
| nPurchOrderNo | Purchase Order Number |
| szAcctNum | Payment Instrument Account number |
| szExpDate | Payment instrument expiration date |

| | |
|---|---|
| szTransAmt | Transaction amount |
| szTransDate | Date of transaction (configurable to be mm/dd/yy or dd/mm/yy) |
| szTransTime | Time of transaction (configurable to be GMT or local time) |
| szRetrieval RefNum | Retrieval reference number |
| szAuthID | Authorization ID |
| szOrigAmt | Original transaction amount |
| szBatchNum | Batch number to which this particular transaction belongs in the vPOST batch |
| nCurrencyType | Currency |
| lnTransNum | Transaction number |

Payment Instruments

As discussed above, the vPOS terminal supports different Payment Instruments and each of the Payment Functions described above can be initiated by these different Payment Instruments. The consumer making a purchase from a merchant provides a choice of payment options depending upon their personal preference. The Payment Instrument Class Hierarchy that is used by the different vPOS terminal Payment Functions is described further below.

Figure 16:
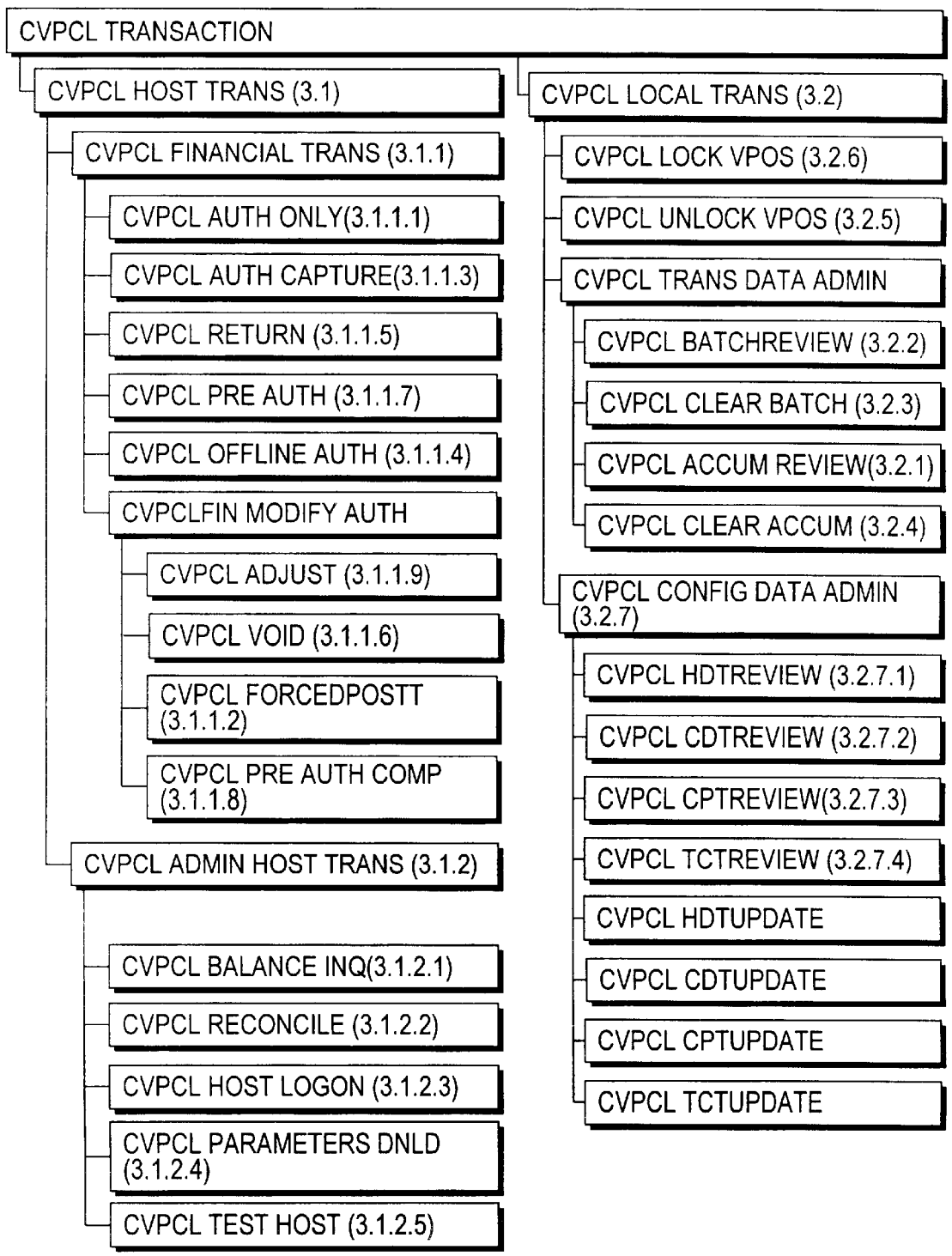
FIG. 16 illustrates a transaction class hierarchy block diagram in accordance with a preferred embodiment.

FIG. 16 illustrates a transaction class hierarchy block diagram in accordance with a preferred embodiment. The CVPCL Transaction class definition is described below in accordance with a preferred embodiment.

Class Name:
 CVPCLTransaction
Data:
 Transaction Type (int)
 Transaction Date and Time (CPCLDateTime)
 Card Definition Table (CVPCL_CDT)
 Host Definition Table (CVPCL_HDT)
 Communications Parameters Table (CVPCL_CPT)
 Terminal Configuration Parameters (CVPCL_TCT)
 Batch Record (CVPCLBatch)
 Accumulator Record (CVPCLAccum)
Member Functions:
 CVPCLTransaction( );
 EStatus GetTransType( );
 EStatus GetTransDateTime(CPCLDateTime&);
 EStatus SetTransType(const int);
 virtual EStatus InitializeTrans(TvPOSParamsBlk *)=0;
 virtual EStatus ExecuteTrans(TvPOSResultsBlk *)=0;
 virtual EStatus ShutDown( )=0;

Host Transaction Class Definitions

This section includes the host transaction class definitions in accordance with a preferred embodiment.

Host Transaction Class (CVPCLHostTrans)

This is an abstract base class derived from the CVPCL Transaction class and is used for deriving transaction classes that need to communicate with the host either immediately or at a later stage.
Class Name:
 CVPCLHostTrans
Data:
Member Functions:
 CVPCLHostTrans( );

Financial Transaction Class
(CVPCLFinancialTrans)

This is an abstract base class derived from the CVPCLHostTrans. This class is used to derive transaction classes that require a payment instrument (e.g., a Credit Card) associated with them to perform the transaction.
Class Name
 CVPCLFinancialTrans
Data:
 Transaction Amount (CVPCLAmt)
 Purchase Order Number (char[ ]])
 Transaction Number (char[ ])
 Authorization Identification Number (char[ ])
 Retrieval Reference Number (char[ ])
 Batch (CVPCLBatch)
 Accumulators (CVPCLAccumulators)
Member Functions:
 CVPCLFinancialTrans( );
 EStatus GetTransAmt(CVPCLAmt&);
 EStatus GetPurchOrderNum(char *);
 EStatus GetTransRefNum(char *);
 EStatus GetRetRefNum(char *);
 EStatus GetAuthId(char *);
 EStatus GetCurrencyType(EPCLCurrency *);
 EStatus SetPurchOrderNum(const char *);
 EStatus SetTransRefNum(const char *);
 EStatus SetRetRefNum(const char *);
 EStatus SetAuthId(const char *);
 EStatus SetCurrencyType (const char *)

Financial Credit Card Transaction Class
(CVPCLFinCCTrans)

This is the base abstract class for the financial host transaction that require a Credit Card payment instrument. This class is derived from the CVPCLFinancialTrans.
Class Name:
 CVPCLFinCCTrans
Data:
 Credit Card Payment Instrument (CPCLCreditCard)
Member Functions:
 CVPCLFinCCTrans( );

Credit Card Authorization Only Transaction Class
(CVPCL_CCAuthOnly)

This is the class derived from the CVPCLFinCCTrans class and implements the Authorization Only Transaction.
Class Name:
 CVPCL_CCAuthOnly
Data:
Member Functions:
 CVPCL_CCAuthOnly( );
 EStatus InitializeTrans(TvPOSParamsBlk *);
 EStatus ExecuteTrans(TvPOSResultsBlk *);
 EStatus ShutDownTrans( );
 EStatus FormBatchRec( );

Credit Card Authorization with Capture Transaction
Class (CVPCL_CCAuthCapt)

This is the class derived from the CVPCLFinCCTrans class and implements the Authorization with Data Capture Transaction.

Class Name:
  CVPCL_CCAuthCapt
Data:
Member Functions:
  CVPCL_CCAuthCapt( );
  EStatus InitializeTrans(TvPOSParamsBlk *);
  EStatus ExecuteTrans(TvPOSResultsBlk *);
  EStatus ShutDownTrans( );
  EStatus FornBatchRec( );

Credit Card Return Transaction Class (CVPCL_CCReturn)

This is the class derived from the CVPCLFinCCTrans class and implements the Return Transaction.
Class Name:
  CVPCL_CCReturn
Data:
Member Functions:
  CVPCL_CCReturn( );
  EStatus InitializeTrans(TvPOSParamsBlk *);
  EStatus ExecuteTrans(TvPOSResultsBlk *);
  EStatus ShutDownTrans( );
  EStatus FormBatchRec( );

Credit Card Pre-Authorization Transaction Class (CVPCL_CCPreAuth)

This is the class derived from the CVPCLFinCCTrans class and implements the Pre-Authorization Transaction.
Class Name:
  CVPCL_CCPreAuth
Data:
Member Functions:
  CVPCL_CCPreAuth( );
  EStatus InitializeTrans(TvPOSParamsBk *);
  EStatus ExecuteTrans(TvPOSResultsBlk *);
  EStatus ShutDownTrans( );
  EStatus FormBatchRec( );

Credit Card Off-line Authorization Only Transaction Class (CVPCL_CCOfflineAuth)

This is the class derived from the CVPCLFinCCTrans class and implements the Offline Authorization Class Transaction.
Class Name:
  CVPCL_CCOfflineAuth
Data:
Member Functions:
  CVPCL_CCOfflineAuth( );
  EStatus InitializeTrans(TvPOSParamsBlk *);
  EStatus ExecuteTrans(TvPOSResultsBlk *);
  EStatus ShutDownTrans( );
  EStatus FormBatchRec( );

Credit Card Adjust Transaction Class (CVPCL_CCAdjust)

This is the class derived from the CVPCLFinCCTrans class and implements the Adjust Transaction.
Class Name:
  CVPCL_CCAdjust
Data:
Member Functions:
  CVPCL_CCAdjust( );
  EStatus InitializeTrans(TvPOSParamsBlk *);
  EStatus ExecuteTrans(TvPOSResultsBlk *);
  EStatus ShutDownTrans( );
  EStatus FormBatchRec( );

Credit Card Void Transaction Class (CVPCL_CCVoid)

This is the class derived from the CVPCLFinCCTrans class and implements the Void Transaction.
Class Name:
  CVPCL_CCVoid
Data:
Member Functions:
  CVPCL_CCVoid( );
  EStatus InitializeTrans(TvPOSParamsBlk *);
  EStatus ExecuteTrans(TvPOSResultsBlk *);
  EStatus ShutDownTrans( );
  EStatus FormBatchRec( );

Credit Card Forced Post Transaction Class (CVPCL_CCForcedPost)

This is the class derived from the CVPCLFinCCTrans class and implements the Forced Post Transaction.
Class Name:
  CVPCL_CCForcedPost
Data:
Member Functions:
  CVPCL_CCForcedPost( );
  EStatus InitializeTrans(TvPOSParamsBlk *);
  EStatus ExecuteTrans(TvPOSResultsBlk *);
  EStatus ShutDownTrans( );
  EStatus FormBatchRec( );

Pre-Authorization Complete Transaction Class (CVPCL_CCPreAuthComp)

This is the class derived from the CVPCLFinCCTrans class and implements the Pre-Authorization Completion Transaction.
Class Name:
  CVPCL_CCPreAuthComp
Data:
Member Functions:
  CVPCL_CCPreAuthComp( );
  EStatus InitializeTrans(TvPOSParamsBlk *);
  EStatus ExecuteTrans(TvPOSResultsBlk *);
  EStatus ShutDownTrans( );
  EStatus FormBatchRec( );

Credit Card Balance Inquiry Class (CVPCL_CCBalanceInq)

This class is derived from the CVPCLFinCCTrans class and is used to perform the Merchant Balance Inquiry function.
Class Name:
  CVPCL_CCBalanceInq
Data:
Member Functions:
  CVPCL_CCBalanceInq( );

EStatus InitializeTrans(TvPOSParamsBlk *);
EStatus ExecuteTrans(TvPOSResultsBlk *);
EStatus ShutDownTrans( );

Administrative Host Transaction Class (CVPCLAdminHostTrans)

This is an abstract base class derived from the CVP-CLHostTrans class and is used to derive the administrative host transaction classes.
Class Name:
  CVPCLAdminHostTrans
Data:
Member Functions:
  CVPCLAdminHostTrans( );
  int GetHostIndex( );
  EStatus SetHostIndex (const int);

Reconcile Transaction Class (CVPCLReconcile)

This is the class derived from the CVPCLAdminHostTrans class and implements the Reconcile or Close functionality.
Class Name:
  CVPCLReconcile
Data:
Member Functions:
  CVPCLReconcile( );
    EStatus InitializeTrans(TvPOSParamsBlk *);
    EStatus ExecuteTrans(TvPOSResultsBlk *);
    EStatus ShutDownTrans( );

Host Log-on Transaction Class (CVPCLHostLogon)

This is the class derived from the CVPCLAdminHostTrans class and implements the Host Log-on Transaction.
Class Name:
  CVPCLHostLogon
Data:
Member Functions:
  CVPCLHostLogon( );
    EStatus InitializeTrans(TvPOSParamsBlk *);
    EStatus ExecuteTrans(TvPOSResultsBlk *);
    EStatus ShutDownTrans( );

Parameters Download Transaction Class (CVPCLParamsDwnld)

This is the class derived from the CVPCLAdminHostTrans class and implements the Parameters Download (vPOS configuration information from the host) functionality.
Class Name
  CVPCLParamsDwnld
Data:
Member Functions:
  CVPCLParamsDwnld( );
    EStatus InitializeTrans(TvPOSParamsBlk *);
    EStatus ExecuteTrans(TvPOSResultsBlk *);
    EStatus ShutDownTrans( );

Test Transaction Class (CVPCLTestHost)

This is the class derived from the CVPCLAdminHostTrans class and implements the Test functionality that is used to test the host and the link.
Class Name:
  CVPCLTestHost
Data:
Member Functions:
  CVPCLTestHost( );
    EStatus InitializeTrans(TvPOSParamsBlk *);
    EStatus ExecuteTrans(TvPOSResultsBlk *);
    EStatus ShutDownTrans( );

Local Transaction Class Definitions (CVPCLLocalTrans)

This is the abstract base class for all the transactions that are performed locally to the vPOS.
Class Name:
  CVPCLLocalTrans
Data:
  Record Number (int)
  Host Index (int)
Member Functions:
  CVPCLocalTrans( );
    int GetRecNum( );
    int GetHostIndex( )
    EStatus SetRecNum(const int);
    EStatus SetHostIndex(const int);

Virtual POS Lock/Stop Class (CVPCLvPOSLock)

This class implements the vPOS Lock or the Stop Local functionality. Under the locked state the vPOS does not accept any transaction requests. The class is derived from the CVPCLLocalTrans base class.
Class Name:
  CVPCLvPOSLock
Data:
Member Functions:
  CVPCLvPOSLock( );
    EStatus InitializeTrans(TvPOSParamsBlk *);
    EStatus ExecuteTrans(TvPOSResultsBlk *);
    EStatus ShutDownTrans( );

Virtual POS UnLock/Start Class (CVPCLvPOSUnlock)

This class implements the vPOS UnLock or the Start Local functionality. The class is derived from the CVPCLLocalTrans base class.
Class Name:
  CVPCLvPOSUnLock
Data:
Member Functions:
  CVPCLvPOSUnlock( );
    EStatus InitializeTrans(TvPOSParamsBlk *);
    EStatus ExecuteTrans(TvPOSResultsBlk *);
    EStatus ShutDownTrans( );

Transaction Data Administration Class (CVPCLTransDataAdmin)

This is an abstract base class used to derive the classes that are required to review and manage the transaction data that includes the batch data and the accumulator data. The CVPCLTransDataAdmin class is derived from the CVPCLLocalTrans base class.
Class Name:
  CVPCLTransDataAdmin Data:
Member Functions:
  CVPCLTransDataAdmin( );

Batch Review Class (CVPCLBatchReview)

This class is derived from the CVPCLTransDataAdmin base class and implements the batch review functionality
Class Name:
  CVPCLBatchReview
Data:
Member Functions:
  CVPCLBatchReview( );
    EStatus InitializeTrans(TvPOSParamsBlk *);
    EStatus ExecuteTrans(TvPOSResultsBlk *);
    EStatus ShutDownTrans( );

Clear Batch Class (CVPCLClearBatch)

This class is derived from the CVPCLTransDataAdmin base class and implements the clear batch functionality, which is used to clear the batch in the event of doing a manual reconciliation between the vPOS and the acquirer.
Class Name:
  CVPCLClearBatch
Data:
Member Functions:
  CVPCLClearBatch( );
    EStatus InitializeTrans(TvPOSParamsBlk *);
    EStatus ExecuteTrans(TvPOSResultsBlk *);
    EStatus ShutDownTrans( );

Accumulators Review Class (CVPCLAccumReview)

This class is derived from the CVPCLTransDataAdmin base class and implements the Accumulators Review functionality.
Class Name:
  CVPCLAccumReview
Data:
Member Functions:
  CVPCLAccumReview( );
    EStatus InitializeTrans(TvPOSParamsBlk *);
    EStatus ExecuteTrans(TvPOSResultsBlk *);
    EStatus ShutDownTrans( );

Clear Accumulators Class (CVPCLClearAccum)

This class is derived from the CVPCLTransDataAdmin base class and implements the Accumulators Clear functionality.
Class Name:
  CVPCLClearAccum
Data:
Member Functions:
  CVPCLClearAccum( );
    EStatus InitializeTrans(TvPOSParamsBlk *);
    EStatus ExecuteTrans(TvPOSResultsBlk *);
    EStatus ShutDownTrans( );

vPOS Configuration Data Administration Class (CVPCLConfigDataAdmin)

This is an abstract base class and is used to derive classes that implement the functionality for managing the vPOS configuration data. The class is derived from the CVPCLLocalTrans base class.
Class Name:
  CVPCLConfigDataAdmin
Data:
Member Functions:

Acquirer Data or the Host Definition Table Review Class (CVPCL_HDTReview)

This class is derived from the CVPCLConfigDataAdmin class and implements the Host Definition Table Review functionality.
Class Name:
  CVPCL_HDTReview
Data:
Member Functions:
  CVPCL_HDTReview( );
    EStatus InitializeTrans(TvPOSParamsBlk *);
    EStatus ExecuteTrans(TvPOSResultsBlk *);
    EStatus ShutDownTrans( );

Issuer Data or the Card Definition Table Review Class (CVPCL_CDTReview)

This class is derived from the CVPCLConfigDataAdmin class and implements the Card Definition Table Review functionality.
Class Name:
  CVPCL_CDTReview
Data:
Member Functions:
  CVPCL_CDTReview( );
    EStatus InitializeTrans(TvPOSParamsBlk *);
    EStatus ExecuteTrans(TvPOSResultsBlk *);
    EStatus ShutDownTrans( );

Communication Parameters Table Review Class (CVPCL_CPTReview)

This class is derived from the CVPCLConfigDataAdmin class and implements the Communications Parameters Table Review functionality.
Class Name:
  CVPCL_CPTReview
Data:
Member Functions
  CVPCL_CPTReview( );
    EStatus InitializeTrans(TvPOSParamsBlk *);
    EStatus ExecuteTrans(TvPOSResultsBlk *);
    EStatus ShutDownTrans( );

Terminal Configuration Table Review Class (CVPCL_TCTReview)

This class is derived from the CVPCLConfigDataAdmin class and implements the Terminal Configuration Table Review functionality.
Class Name:
  CVPCL_TCTReview
Data:
Member Functions:
  CVPCL_TCTReview( );
    EStatus InitializeTrans(TvPOSParamsBlk *);
    EStatus ExecuteTrans(TvPOSResultsBlk *);
    EStatus ShutDownTrans( );

Acquirer Data or the Host Definition Table Update Class (CVPCL_HDTUpdate)

This class is derived from the CVPCLConfigDataAdmin class and implements the Host Definition Table Update functionality.

Class Name:
  CVPCL__HDTUpdate
Data:
Member Functions:
  CVPCL__HDTUpdate( );
  EStatus InitializeTrans(TvPOSParamsBlk *);
  EStatus ExecuteTrans(TvPOSResultsBlk *);
  EStatus ShutDownTrans( );

Issuer Data or the Card Definition Table Update Class (CVPCL__CDTUpdate)

This class is derived from the CVPCLConfigDataAdmin class and implements the Card Definition Table Update functionality.
Class Name:
  CVPCL__CDTUpdate
Data:
Member Functions:
  CVPCL__CDTUpdate( );
  EStatus InitializeTrans(TvPOSParamsBlk *);
  EStatus ExecuteTrans(TvPOSResultsBlk *);
  EStatus ShutDownTrans( );

Communications Parameters Table Update Class (CVPCL__CPTUpdate)

This class is derived from the CVPCLConfigDataAdmin class and implements the Communications Parameters Table Update functionality.
Class Name:
  CVPCL__CPTUpdate
Data:
Member Functions:
  CVPCL__CPTUpdate( );
  EStatus InitializeTrans(TvPOSParamsBlk *);
  EStatus ExecuteTrans(TvPOSResultsBlk *);
  EStatus ShutDownTrans( );

Terminal Configuration Table Update Class (CVPCL__TCTUpdate)

This class is derived from the CVPCLConfigDataAdmin class and implements the Terminal Configuration Table Update functionality.
Class Name:
  CVPCL__TCTUpdate
Data:
Member Functions:
  CVPCL__TCTUpdate( );
  EStatus InitializeTrans(TvPOSParamsBlk *);
  EStatus ExecuteTrans(TVPOSResultsBlk *);
  EStatus ShutDownTrans( );

Batch Class (CVPCLBatch)

This class defines the batch record and the operations that are performed on the batch.

Class Name:
  CVPCLBatch
Data:
  Batch Record Structure (TvPOSBatchRec)

```
// Definition of the TvPOSBatchRec is as below,
typedef struct__vPOSBatchRec
{
    char    szTransAmt[];
    char    szTransDate[];
    char    szTransTime[];
    char    szRetrievalRefNum[];  // Trans.  //Ref. No. sent by the host
    char    szAuthId[];  // Approval Code sent by the host
    char    szOrigAmt[];  // Original amount   //for - Adjust
    char    szPurchOrderNum[];
    char    szBatchNum[];
    EPCLTransType  TransType;
    EPCLPmtInst    PmtInst;
    EPCLCurrency   CurrencyType;
    EPCLDecimals   NumDecDigits;
    unsigned int nTransRefNum;  // Running //  //Ref. Number gen. by the
        //vPOS for every approved txn.   unsigned long lnSTAN; //
Sys. Trace Number incr. by vPOS
        // for every trans. that is trans. to host
    TPmtInstData PayInstData;
} TvPOSBatchRec;
```
Member Functions:
  CVPCLBatch();
  EStatus SetTransType(const EPCLTransType);
  EStatus SetRetRefNum(const char *);
  EStatus SetAuthID(const char *);
  EStatus SetPurchOrderNum(const char *);
  EStatus SetTransRefNum(const long);
  EStatus SetTransAmt(const char *);
  EStatus SetBatchNum(const char *);
  EStatus SetSTAN(const long);
  EStatus SetDateMMDDYYYY(const char *);
  EStatus SetTimeHHMMSS(const char *);
  EStatus SetPmtInst(const EPCLPmtInst);
  EStatus SetCCAcctNum(const char *);
  EStatus SetCCExpDate(const char *);
  EStatus SetOrigAmt(const char *);
  EStatus GetBatchRec(TvPOSBatchRec *);
  EStatus InitBatch();
  EStatus OpenBatch(const char *, FILE **, const char *);
  EStatus CloseBatch(FILE *);
  EStatus AddBatchRec (); // Adds a record to the batch
  EStatus GetBatchRec (const long); // Gets a record from the batch
  EStatus UpdateBatchRec (const long); // Update batch record with NR
  EStatus DeleteBatchRec (const long); // Deletes the batch record

Accumulator Class (CVPCLAccum)

This class defines the Accumulator record and the operations on the accumulators.
Class Name:
  CVPCLAccum
Data:
  Credit Amount (char szCreditAmt[AMT__SZ+1])
  Credit Count (int nCreditCnt)
  Debit Amount (char szDebitAmt[AMT__SZ+1)
  Debit Count (int nDebitCnt)
Member Functions:
  int OpenAccum(int fHandle);
  int GetAccum (int nAccumType, int *pnAccumCnt, char *pszAccumAmt);
  int CloseAccum(int fHandle);
  int CleanAccum( );

Host Definition Table Class (CVPCL__HDT)

This class defines the Host Definition Table record and the operations on the table.

```
Class Name:
    CVPCL_HDT
Data:
    Host Definition Table Record Structure (TvPOSHDTRec)
    The TvPOSHDTRec structure contains the following fields,
    typedef struct_vPOSHDTRec
    {
            char    szTermId[];
            char    szMerchId[];
            char    szBatchNum[];
            char    szTPDU[];
            char    szNII[];
            char    szHostName[];
            EPCLHostProtType HostProtType;
            EPCLHostProtSubType HostProtSubType;
            // Data Capture Required Flags
            vPOSBool fAuthOnlyDC;
            vPOSBool fAuthCaptDC;
            vPOSBool fForcedPostDC;
            vPOSBool fAdjustDC;
            vPOSBool fReturnDC;
            vPOSBool fOfflineAuthDC;
            vPOSBool fVoidDC;
            vPOSBool fPreAuthDC;
            vPOSBool fPreAuthCompDC;
            unsigned int nNumAdv; // Max. No. of piggy-
            back trans. allowed
            unsigned int nTransRefNum;
            unsigned long  lnSTAN;        // Systems Trace Number
    } TvPOSHDTRec;
Member Functions:
    CVPCL_HDT();
    EStatus Clean HDT();
    EStatus LoadHDTRec(const int);
    EStatus SaveHDTRec(const int);
    EStatus GetNumRecs(int *);
    EStatus GetHDTRec(TvPOSHDTRec *);
    EStatus GetTermId(char *);
    EStatus GetMerchId(char *);
    EStatus GetBatchNum(char *);
    EStatus GetTransRefNum(unsigned int *);
    EStatus GetTPDU(char *);
    EStatus Get NII(char *);
    EStatus GetHostName(char *);
    EStatus GetHostProtType(EPCLHostProtType *);
    EStatus GetHostProtSubType(EPCLHostProtSubType *);
    EStatus GetNumAdv(unsigned int *);
    EStatus GetSTAN(unsigned long *);
    EStatus GetAuthOnlyDC(vPOSBool *);
    EStatus GetAuthCaptDC(vPOSBool *);
    EStatus GetAdjustDC(vPOSBool *);
    EStatus GetReturnDC(vPOSBool *);
    EStatus GetForcedPostDC(vPOSBool *);
    EStatus GetOfflineAuthDC(vPOSBool *);
    EStatus GetVoidDC(vPOSBool *);
    EStatus GetPreAuthDC(vPOSBool *);
    EStatus GetPreAuthCompDC(vPOSBool *);
    EStatus SetHDTRec(TvPOSHDTRec *);
    EStatus SetTermId(const char *);
    EStatus SetMerchID(const char *);
    EStatus SetBatchNum(const char *);
    EStatus SetTransRefNum(const unsigned int);
    EStatus SetTPDU(const char *);
    EStatus SetSTAN(const unsigned long);
    EStatus SetNII(const char *);
    EStatus SetHostName(const char *);
    EStatus SetHostProtType(const EPCLHostProtType);
    EStatus SetHostProtSubType(const EPCLHostProtSubType);
    EStatus SetNumAdv(const int);
    EStatus SetAuthOnlyDC(const vPOSBool);
    EStatus SetAuthCaptDC(const vPOSBool);
    EStatus SetAdjustDC(const vPOSBool);
    EStatus SetReturnDC(const vPOSBool);
    EStatus SetForcedPostDC(const vPOSBool);
    EStatus SetOfflineAuthDC(const vPOSBool);
    EStatus SetVoidDC(const vPOSBool);
    EStatus SetPreAuthDC(const vPOSBool);
    EStatus SetPreAuthCompDC(const vPOSBool);
```

Card Definition Table Class (CVPCL_CDT)

This class defines the Card Definition Table record and the operations on the table.

```
Class Name:
    CVPCL_CDT
Data:
    Card Definition Table Record Structure (TvPOSCDTRec)
    The TvPOSCDTRec structure contains the following fields,
    typedef struct_vPOSCDTRec
    {
            char    szPANLo[];
            char    SZPANHi[];
            char    szCardLabel[];
            int     nHostIndex;
            int     nMinPANDigit;
            int     nMaxPANDigit;
            // Transaction Allowed Flags
            vPOSBool fAuthonlyAllwd;
            vPOSBool fAuthCaptAllwd;
            vPOSBool fForcedPostAllwd;
            vPOSBool fAdjustAllwd;
            vPOSBool fReturnAllwd;
            vPOSBool fOfflineAuthAllwd;
            vPOSBool fVoidAllwd;
            vPOSBool fpreAuthAllwd;
            vPOSBool fPreAuthCompAllwd;
    } TvPOSCDTRec;
Member Functions:
    CVPCL_CDT();
    EStatus CleanCDT();
    EStatus LoadCDTRec(const int);
    EStatus SaveCDTRec(const int);
    EStatus GetNumRecs(int *);
    EStatus GetCDTRec(TvPOSCDTRec *);
    EStatus GetPANLo(char *);
    EStatus GetPANHi(char *);
    EStatus GetCardLabel(char *);
    EStatus GetCDTHostIndex(int *);
    EStatus GetMinPANDigit(int *);
    EStatus GetMaxPANDigit(int *);
    EStatus GetAuthOnlyAllwd(vPOSBool *);
    EStatus GetAuthCaptAllwd(vPOSBool *);
    EStatus GetAdjustAllwd(vPOSBool *);
    EStatus GetReturnAllwd(vPOSBool *);
    EStatus GetOfflineAuthAllwd(vPOSBool *);
    EStatus GetVoidAllwd(vPOSBool *);
    EStatus GetPreAuthAllwd(vPOSBool *);
    EStatus GetPreAuthCompAllwd(vPOSBool *);
    EStatus GetForcedPostAllwd(vPOSBool *);
    EStatus SetCDTRec(TvPOSCDTRec *);
    EStatus SetHostIndex(const int);
    EStatus SetMinPANDigit(const int);
    EStatus SetMaxPANDigit(const int);
    EStatus SetPANLo(const char *);
    EStatus SetPANHi(const char *);
    EStatus SetCardLabel(const char *);
    EStatus SetAuthOnlyAllwd(const vPOSBool);
    EStatus SetAuthCaptAllwd(const vPOSBool);
    EStatus SetAdjustAllwd(const vPOSBool);
    EStatus SetReturnAllwd(const vPOSBool);
    EStatus SetForcedPostAllwd(const vPOSBool);
    EStatus SetOfflineAuthAllwd(const vPOSBool);
    EStatus SetVoidAllwd(const vPOSBool);
    EStatus SetPreAuthAllwd(const vPOSBool);
    EStatus SetPreAuthCompAllwd(const vPOSBool);
```

Communications Parameters Table Class (CVPCL_CPT)

This class defines the communications parameters table and the operations on the table.

```
Class Name:
    CVPCL_CPT
Data:
    Communications Parameters Table Record Structure
    (TvPOSCPTRec)
    The TvPOSCPTRec structure contains the following fields,
    typedef struct_vPOSCPTRec
    {
        char    szAcqPriAddress[];
        char    szAcqSecAddress[];
        char    szAcqTerAddress[];
        int     nRespTimeOut;
    } TvPOSCPTRec;
Member Functions:
    CVPCL_CPT();
    EStatus Clean CPT();
    EStatus LoadCPTRec(const int);
    EStatus SaveCPTRec(const int);
    EStatus GetNumRecs(int *);
    EStatus GetCPTRec(TvPOSCPTRec *);
    EStatus GetAcqPriAddress(char *);
    EStatus GetAcqSecAddress(char *);
    EStatus GetAcqTerAddress(char *);
    EStatus GetRespTimeOut(int *);
    EStatus SetCPTRec(TvPOSCPTRec *);
    EStatus SetAcqPriAddress(const char *);
    EStatus SetAcqSecAddress(const char *);
    EStatus SetAcqTerAddress(const char *);
    EStatus SetRespTimeOut(const int);
```

Terminal Configuration Table Class (CVPCL_TCT)

This class defines the vPOS terminal configuration parameters table and the operations on the table.

```
Class Name:
    CVPCL_TCT
Data:
    Terminal Configuration Table Record Structure
    (TvPOSTCTRec)
    The TvPOSTCTRec structure contains the following fields,
    typedef struct_vPOSTCTRec
    {
        char      szMerchName[];
        vPOSBool  fvPOSLock;          // vPOS Lock/Unlock
                                       Toggle Flag
    } TvPOSTCTRec;
Member Functions:
    CVPCL_TCT();
    EStatus LoadTCTRec();
    EStatus SaveTCTRec();
    EStatus Clean TCT();
    EStatus GetTCTRec(TvPOSTCTRec *);
    EStatus GetMerchName(char *);
    EStatus GetvPOSLock(vPOSBool *);
    EStatus SetMerchName(const char *);
    EStatus SetvPOSLock(const vPOSBool);
```

Amount Class (CVPCLAmount)

This class defines the amount data items and the operations on them.
Class Name:
   CVPCLAmount
Data:
   Amount (char[ ])
   Currency Type (EPCLCurrency)
Member Functions:
   CVPCLAmount( );
   EStatus Initialize(const CPCLAmount&);
   EStatus Initialize(const char *);
   EStatus Initialize(const long);
   void operator=(const char *);
   void operator=(const long);
   EStatus GetAmount(char *);
   operator const char * ( ) const;
   operator const long ( );

Payment Instruments Class (CPCLPmtInst)

This section defines the Payment Instrument Class hierarchy.
Class Name:
   CPCLPmtInst
Data:
   Payment Instrument Type (EPCLPmtInst)
Member Functions:
   CPCLPmtInst( );
   EStatus GetPmtInstType(EPCLPmtInst *);

Bank Cards Class (CPCLBankCard)

This class is derived from the CPCLPmtInst class and implements the bank cards class.
Class Name:
   CPCLBankCard
Data:
   Account Number (char[ ])
   Expiration Date (CPCLDateTime)
   Index into the CDT table (int)
Member Functions:
   CPCLBankCard( );
   EStatus Initialize( );
   EStatus SetAcctNum(const char *);
   EStatus SetExpDate(const char *);
   EStatus GetAcctNum(char *);
   EStatus GetExpDate(char *);
   EStatus ValidateCard( );
   int GetCDTIndex( );
   vPOSBool DoLuhnCheck( );
   vPOSBool DoCardRanging( );
   EStatus Do ValidateExpDate( );

Credit Cards Class (CPCLCreditCard)

This class is derived from the CPCLBankCard class and has the same data and the methods as the CPCLBankCard class.
Class Name:
   CPCLCreditCard
Data:
Member Functions:
   CPCLCreditCard( );

Debit Cards Class (CPCLDebitCard)

This class is derived from the CVPCLBankCard class and implements the debit card class.
Class Name:
   CPCLDebitCard
Data:
   Card Holder Encrypted PIN (char[ ])

Member Functions:
  CPCLDebitCard( );
  EStatus GetEncryptedPIN(char *);
  EStatus SetEncryptedPIN(char *);

vPOS Class Library Interface and API Definition

This section explains the classes that provide the interface to the vPOS class library.

Data Structures Required for the vPOS Interface Class

Transaction Parameters Structure (TvPOSParamsBlk)

This structure is a subset of all the transaction parameters required for the different transactions.

```
typedef struct_vPOSParamsBlk
{
        char szTransAmt[];      // Without decimal point
                                // Left most two digits implied
                                //to be decimal digits
        char szPurchOrderNum[];
        char szRetRefNum[];
        char szBatchNum[];
        char szNewBatchNum[];
        char szOrigAmt[];
        char szCPSData[];
        char szAuthId[];        // Auth Id for
        //offline auth-only transaction
        int HostIndex;
        unsigned int nTransRefNum;
        vPOSBool fvPOSLock;
        ECPSDataType eCPSType;
        EPCLTransType TransType;
        EStatus TransResult;
        EPCLPmtInst PmtInst;
        EPCLCurrency CurrencyType;
        EPCLDecimals NumDecDigits;
        EVPCLAccumType AccumType;
        TPmtInstData PayInstData;
        union_vPOSConfigData
        {
            TvPOSHDTRec srHDTRec;
            TvPOSCDTRec srCDTRec;
            TvPOSCPTRec srCPTRec;
            TvPOSTCTRec srTCTRec;
        } vPOSConfigData;
        void *Context;
        // Context from the calling interface
        EStatus (*vPOSCallBack)(TvPOSResultsBlk *, void *);
} TvPOSParamsBlk;
```

Transaction Results Structure (TvPOSResultsBlk)

This structure contains all the fields returned from the host and other fields that are required for doing terminal data capture.

```
        typedef struct_vPOSResultsBlk
        {
          char szNewBatchNum[ ];
            int nhostIndex;
            EStatus TransResult;
            TvPOSBatchRec srBatchRec;
            TvPOSAccumRec srAccumRec;
            char szCardLabel[ ];
            TvPOSHDTRec srHDTRec;
            TvPOSCDTRec srCDTRec;
            TvPOSCPTRec srCPTRec;
            TvPOSTCTRec srTCTRec;
```
} TvPOSResultsBlk;

The various status codes for the enumeration EStatus are detailed below.

vPOS Interface Class (CvPOSInterface)

This class provides the interface to the vPOS Transaction Class Library.
Class Name:
  CvPOSInterface
Data:
Member Functions:
  CvPOSInterface( );
  // Creates the Transaction Object, takes care
  // of other initialization and executes the
  // transaction
  CVPCLTransaction *pclTransFactory(TvPOSParamsBlk *);
  EStatus DestroyTrans(CVPCLTransaction *);

vPOS API Definition

This section describes the vPOS API that allows for interfacing with the vPOS Class Library. All the different vPOS transactions can be initiated using the API defined in this section.

vPOSInitialize—Initialize vPOS

This API is used to start and initialize the vPOS. The API definition is disclosed below.
API Definition:
  vPOSBool vPOSInitialize(void);
Parameters:
  None
Returns:
  TRUE or FALSE indicating whether the function call was a success.

vPOSExecute—Execute a vPOS Transaction

This API is used to execute a particular vPOS transaction.
API Definition:
  vPOSBool vPOSExecute(TvPOSParamsBlk *, TvPOSResultsBlk *)
Parameters:
  Pointer to the Parameters Structure (TvPOSParamsBlk)
  Pointer to the Results Structure (TvPOSResultsBlk)
Returns:
  TRUE or FALSE indicating whether the function call was a success.

vPOSShutDown—Shutdown the vPOS

This is used to shutdown the vPOS.
API Definition:
  vPOSBool vPOSShutDown(void)
Parameters:
  None
Returns:
  TRUE or FALSE indicating whether the function call was a success.

vPOS Status Codes

This section details the different status codes (listed under the enumeration EStatus) that the vPOS returns for the different operations performed.

enum EStatus

```
{
    eSuccess = 0,              // Function call or operation
                               // successful
    eFailure,                  // General failure
    evPOSLocked,               // vPOS locked, transaction not allowed
                               // Transaction related error codes
    ePmtInstNotSupported,      // Payment Instrument not supported
    eTransNotSupported,        // Transaction type not supported
    eTransInitErr,             // Transaction Initialization Failed
    eAdjustNotAllwd,           // Adjust not allowed on this
                               // transaction
    eVoidNotAllwd,             // Void not allowed on this transaction
    eForcedPostNotAllwd,       // Forced Post not allowed on this
                               // transaction
    ePreAuthCompNotAllwd,      // Pre-Auth. not allowed on this
                               // transaction
    eAmtErr,                   // Error in the amount passed
    eHDTLoadErr,               // Error during loading the HDT table
    eCDTLoadErr,               // Error during loading the CDT table
    eCPTLoadErr,               // Error during loading the CPT table
    eTCTLoadErr,               // Error during loading the TCT table
    eHDTWriteErr,              // Error during writing to the HDT
                               // table
    eCDTWriteErr,              // Error during writing to the CDT
                               // table
    eCPTWriteErr,              // Error during writing to the CPT
                               // table
    eTCTWriteErr,              // Error during writing to the TCT
                               // table
    eTCTFieldErr,              // Error handling a TCT table field
    eLuhnErr,                  // Luhn check failed on the account
    eRangingErr,               // Card range not found
    ePANLenErr,                // PAN length error
    eExpiredCard,              // Card expired
    eInvalidMonth,             // Invalid month in the expiration date
    eFileOpenErr,              // General file open error
    eFileCloseErr,             // General file close error
```

Message Sequence Diagram

Figure 17:
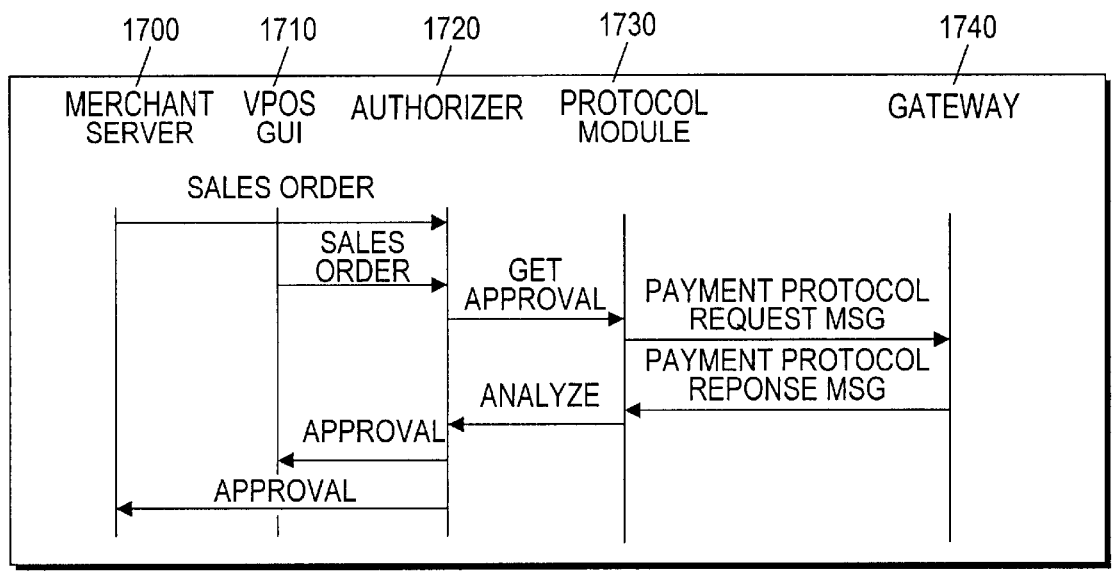
FIG. 17 shows a typical message flow between the consumer, the merchant, the vPOS terminal, and the Gateway in accordance with a preferred embodiment.

FIG. 17 shows a typical message flow between the consumer, merchant, vPOS terminal, and the Gateway in accordance with a preferred embodiment. This section describes the different classes listed in the previous section, their data, and members, and defines the type of transaction that is to be performed. Processing commences at stage 1700 when a merchant server receives a sales order and passes it via a vPOS Graphical User Interface (GUI) 1710 to an authorizer 1720 for approval and subsequent protocol processing 1730 and ultimately transmission via a Gateway 1740 to the network.

vPOS/Architecture

The architecture of the Virtual Point of Sale (vPOS) and Virtual Gateway (Gateway) architecture maintains SET compliance while providing support for additional message types that are not enabled in the SET standard. The architecture includes isolation of cryptographic details in a single module to facilitate single version government approval while maximizing the flexibility of the system for customization and facilitating transfer of updated versions on an acquirer specific basis.

FIGS. 18A through 18E are block diagrams of the extended SET architecture in accordance with a preferred embodiment. Processing commences at function block 1800 for a consumer-originated transaction via the World Wide Web (WWW) or at function block 1810 for a merchant-originated transaction on the Internet. In either case, control passes immediately to a WWW server 1820 for the transaction to be appropriately formatted and the appropriate interface page presented, whether the transaction is a store front 1822, a shopping cart 1824, a pay page 1826, a standard terminal administration 1828–1830 transaction, or an extended terminal transaction 1834. If processing requires authentication of the transaction, then control passes through a Virtual Point of Sale (vPOS) Application Programming Interface (API) library 1840 for SET compliant transactions and through the vPOS API extensions library 1844 for extensions to the SET protocol. Then, at function block 1842 if the transaction is SET compliant, and at function block 1845 if the transaction is not SET compliant, a library of protocol stack information is used to conform the message before it is transmitted to a Gateway site for ultimate delivery to a bank host 1874 for authorization.

Extended SET messages are processed at the Gateway site on a two track basis with the division criteria being SET compliance (which will change over time as more functionality is put into SET) or SET extensions. Set compliant messages are processed via a protocol stack library 1862, and SET extensions are processed via a protocol stack extension library 1864. Then, at function block 1870, a Gateway Engine 1870 processes SET and Host specific code including gateway administration extensions 1872 that bypass the normal processing and flow directly from merchant and consumer WWW server 1820 to gateway administration extensions 1872 to Gateway Engine 1870.

As described above, there are three channels by which messages are exchanged between a vPOS 1846 and a Gateway 1856.

1. Standard SET Messages

The standard SET messages are originated by the merchant software either via pay page 1826 directly controlled by the consumer or via an operator interface including a set of HTML pages and associated executables launched by the pages (e.g., pay page 1826 and standard terminal administration 1828–1830.)

Each SET message type (e.g., authorization or capture) transmits a different set of data, and each SET message type requires a different Protocol Data Unit (PDU) to describe its encoding. Examples of how Standard SET messages are encoded are given in the SET documentation previously incorporated by reference.

2. Extended SET Messages

The Extended SET messages are utilized as an "escape mechanism" to implement acquirer-specific messages such as settlement and reconciliation, employee logon and logoff, and parameter download. The messages are developed as a set of name-value pairs encapsulated in a PKCS-7 wrapper and wrapped in Multipurpose Internet Mail Extensions (MIME), described in a book by N. Borenstein & N. Freed, "RFC 1521: MIME (Multipurpose Internet Mail Extensions) Part One: Mechanisms for Specifying and Describing the Format of Internet Message Bodies" (September 1993), which is herein incorporated by reference in its entirety. The name-value pairs can have arbitrary (8-bit) data so that arbitrary items can be passed through the extended SET channel, including executable programs and Dynamic Load Libraries (DLLs).

Figure 18B:
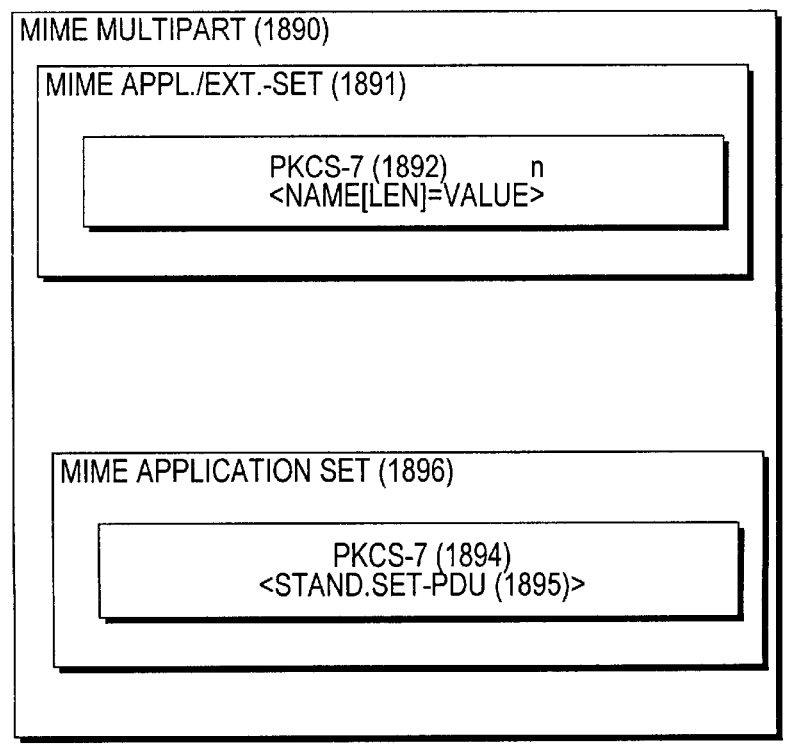
FIGS. 18A through 18E are block diagrams of the extended SET architecture in accordance with a preferred embodiment.

FIG. 18B illustrates a multipart MIME message with one Extended SET message and one Standard SET authorizing message in accordance with a preferred embodiment. MIME is utilized as an outer wrapper 1890 to allow an Extended SET message 1891 to be transmitted as a component of messages embedded in one MIME multipart message. In this manner, a standard SET message can be sent with an Extended SET message in one vPOS Gateway communication transaction.

Embedding the Extended SET messages in a PKCS-7 wrapper enables the same message authentication to occur as in standard SET messages. Thus, for SET-compliant and non-SET-compliant messages, the same mechanism can be used to restrict which entities the vPOS or Gateway will trust in any communications. An important concept in Extended SET is that all messages, of any type, are sent in a uniform name/value pair format, which allows a single Protocol Data Unit to suffice for any type of message sent through the Extended SET channel. Because arbitrary data can be sent this way, a mechanism is provided to preclude the use of the Extended SET channel by parties other than approved financial institutions. If this is not ensured, then the National Security Agency (NSA) and the U.S. Department of Commerce will not approve the software for export (under current U.S. Government restrictions regarding export of software encryption technology).

SET itself to some degree ensures that this Extended SET channel is used only by financial institutions. The protocol stack extension library only processes messages that have been signed by a financial institution SET certificate that is in turn signed by a payment instrument brand certificate (such as Visa or MasterCard).

Stronger control over the Extended SET channel can be achieved by further restricting processing of messages to those signed (either instead of or in addition to the financial institution SET certificate) by a second certificate belonging to a third-party agency, either governmental or private (e.g., VeriFone, as manufacturer of the software).

Figure 18A:
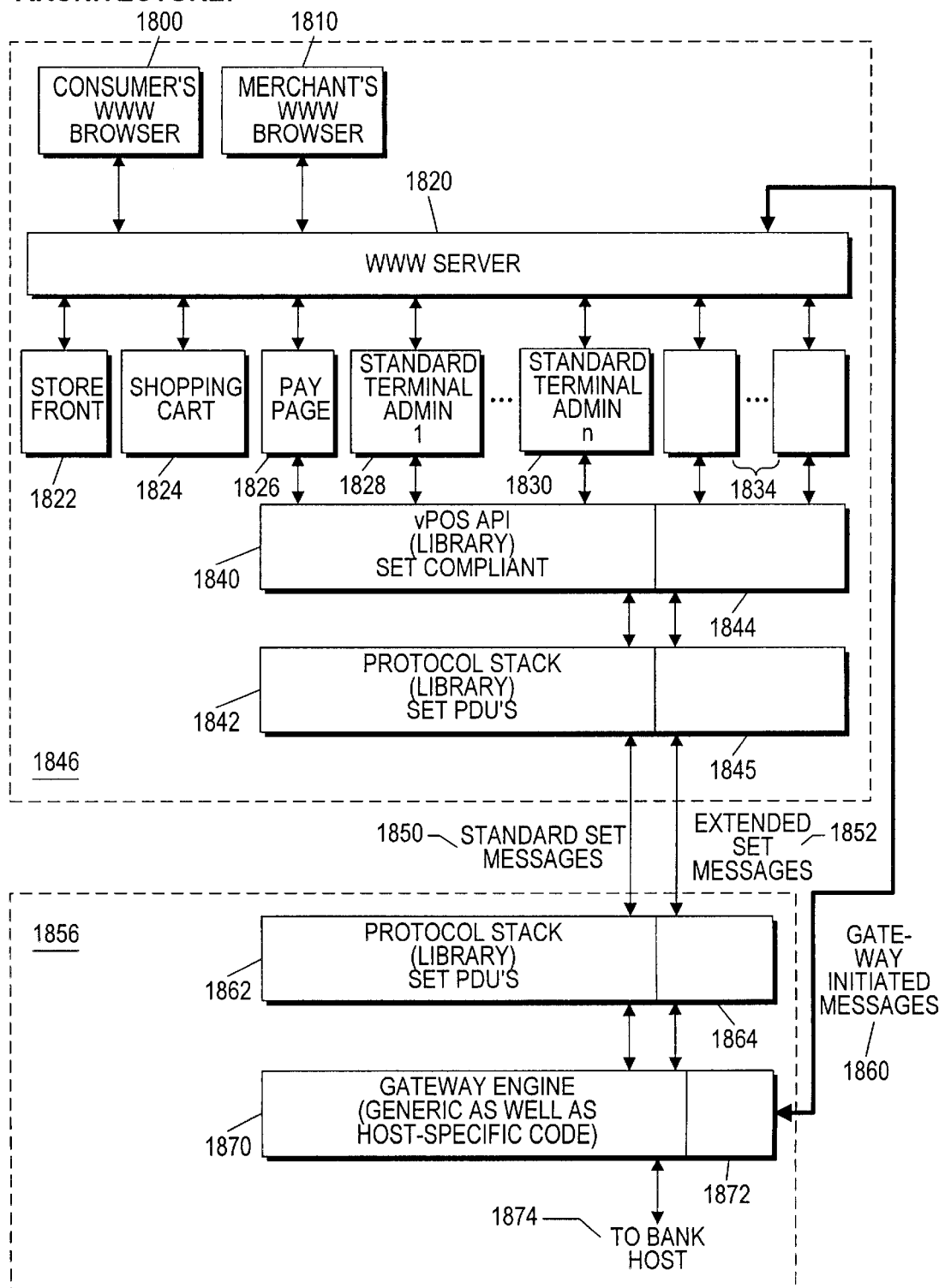

In this way, a particular set of Extended SET messages can be implemented by Bank X, and a different set of messages by Bank Y. If a vPOS has an extended terminal transaction interface as shown in FIG. 18A at block 1834 for Bank X and has been configured to only accept messages from a Gateway with Bank X's certificate, then it will be able to communicate those messages to a Gateway that has the certificate for Bank X and accepts messages of the types in Bank X's message set. The vPOS will not be able to connect to the Bank Y gateway or to any other system that purports to communicate via Extended SET. This restriction is further secured by utilizing a public key certificate that is "hard wired" into the vPOS and that is distributed only to gateways that use the Extended SET mechanism.

Figure 18C:
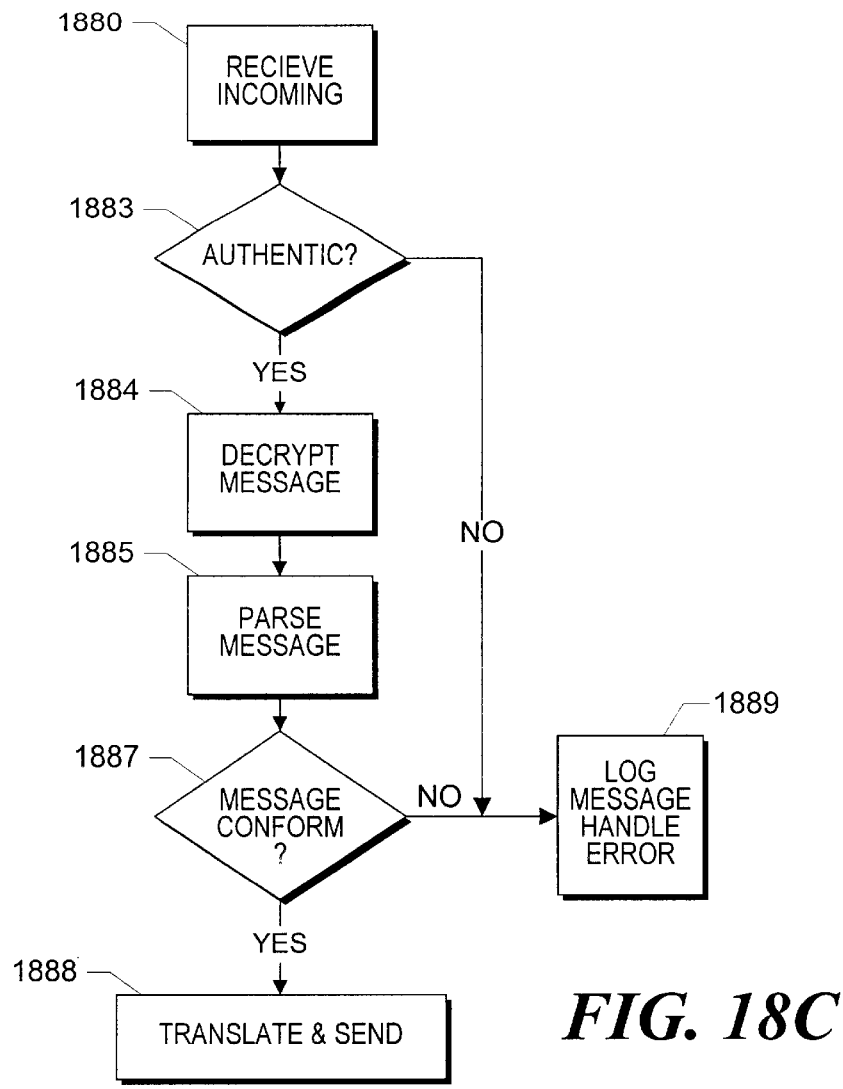

FIG. 18C is an example flowchart of message processing in accordance with a preferred embodiment. Processing commences at function block 1880 when a message is received by an HTTPS server or other listener and passed to decision block 1883 to determine if the sending vPOS has transmitted an authentic message, and if the vPOS is authorized to communicate with this gateway. If the message is not authentic, then the message is logged as an error, and the error is handled as shown in function block 1889. If the message is authentic, then the message is decrypted at function block 1884, and the PDU parses the message into name and value pairs. Then, based on the message type and the extended SET version information, the remaining message is parsed at function block 1885, and the message is checked for conformance to the appropriate specification as shown at decision block 1887. If the message does not conform, then it is logged and the error handled at function block 1889. If the message conforms to the proper specification in decision block 1887, then the message is translated into the appropriate host format and sent to the host as shown in function block 1888. Thus, when a gateway receives an incoming message from a vPOS and parses the Extended SET portion of the message, a single MIME message can transmit a SET message or an Extended Set Message or both.

An export license for the encryption software can be obtained on a case-by-case basis from the U.S. Department of Commerce, and because there will be potentially millions of vPOS's it is desirable to obtain a commodities jurisdiction for the vPOS, to enable a single version of the vPOS (rather than one version for each bank) to be supported by the vPOS architecture. The architecture described here ensures that the single version of vPOS, no matter how it is configured with extended terminal transaction interfaces, cannot be used to communicate any data other than that contained in the extended SET messages that have been approved for export by the U.S. Department of Commerce to be used exclusively for a specific bank.

Figure 18D:
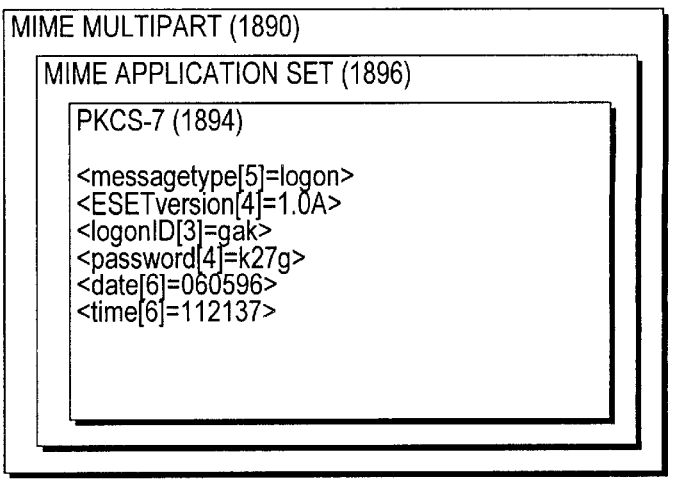

FIG. 18D is an example of a simple message between vPOS and the Gateway using the Extended SET channel enabling an employee to sign on, or "logon", to a given terminal in accordance with a preferred embodiment. The message includes the employee's logon ID, a password to be verified by the bank host computer, and the date and time as shown in a message 1894.

Although the contents of the message are shown without encryption in FIG. 18D, it should be noted that the information (including the logon password) are SET encrypted inside a PKCS-7 wrapper. Certain fields may be designated as mandatory for an Extended SET message to allow the Gateway or the vPOS to decide how to handle the message. For example, in message 1894, only two fields, "messagetype" and "ESETversion", are mandatory. These fields inform the Gateway that this message is of type "logon," and that the vPOS is using version "1.0A" of the ESET message formats defined for the Gateway. In this embodiment, the length indicator "[5]" is used to distinguish the length (in bytes) of the field of type "messagetype" in the message. In this way, there are no special end-of-data characters, and therefore arbitrary data need not have any "escaped" characters.

It should be noted that using escaped characters will work equally well. Total message integrity is assured by the digital signatures in the PKCS-7 wrapper. This does not, however, preclude the use of other checksumming schemes for additional pinpointing of transmission or encoding errors. The messagetype and ESETversion name and value pairs facilitate Gateway look up of what name and value pairs are expected in the "logon" message. Some name and value pairs may be mandatory, and others may be optional.

Figure 18E:
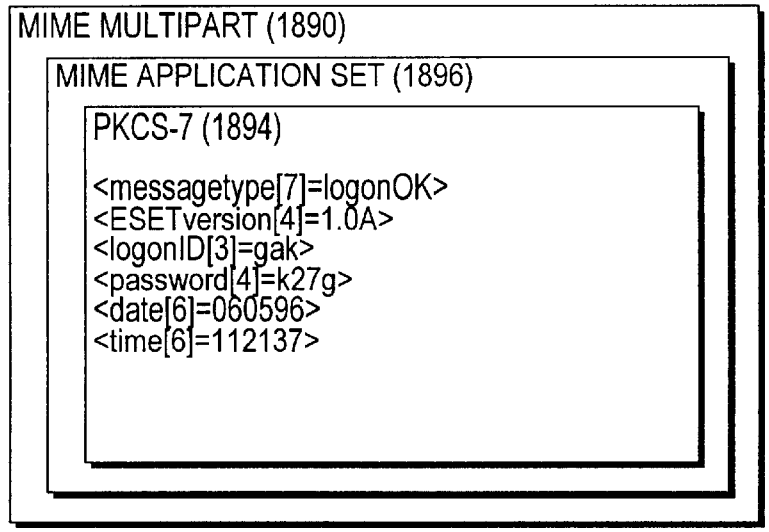

FIG. 18E is an example of a simple message between the vPOS and the Gateway using the Extended SET channel enabling an employee to sign on, or "logon", to a given terminal in accordance with a preferred embodiment. In response to the logon request message from the vPOS, the Gateway responds with a "logon accepted" message 1894, as depicted in FIG. 18E, which the vPOS, upon receipt and authentication, then uses to unlock the terminal for that user.

3. Gateway-initiated Messages

Because SET messages between a merchant and an acquirer are currently merchant-initiated (as specified in the SET documentation), there must be a separate mechanism for initiating a message from a gateway, for example, to request the upload of management information base (MIB) data or to download new parameters. This is accomplished by requiring the Gateway to send a message to the merchant via a MIME-encapsulated PKCS-7 conformant message containing name and value pairs to the merchant server directly rather than to the SET module. This channel is shown in FIG. 18A at block 1860.

The message is verified for origination from the acquirer and is utilized to either initialize a merchant action such as to update the merchant's administration page (for example, by blinking a message saying, "PLEASE RE-INITIALIZE YOUR TERMINAL") or by initiating a request and response message pair originating from the merchant (for example, "HERE ARE THE CONTENTS OF MY MIB"). This is achieved by calling one of the extended terminal transaction interfaces (FIG. 18A at 1834), which in turn initiates a SET or Extended SET transaction.

Thread-Safe vPOS—TID Allocation

In a preferred embodiment, physical terminals process a single transaction at a time, because clerks usually process one transaction at a time. Web Servers can process many transactions at a time, and thus, payment requests can often occur simultaneously. Thus, the vPOS Software supports multi-tasking and supports multiple threads to be active at the same time in the same system as well as the same process. One of ordinary skill in the art can implement such support in the vPOS software without undue experimentation.

However, the authorizing banks require that all transaction requests include a Terminal ID (TID), and for many banks no single TID can be active in any two transaction requests that overlap in time. Thus, the vPOS requires dynamic allocation of TIDs to requesting threads.

One way of providing for multiple TID's is to assign a "base" TID, and either an "extension" (a set of extra digits appended to the base) or an increment (a number that is added to the base to obtain the complete TID). Although such a solution can be used for the majority of banks and processors, not all banks and processors can accommodate this solution. One example is First Data Corporation. For its well-known ENVOY protocol, the terminal ID must use the Luhn check as recited in an ISO standard, which adds a checksum digit to the terminal ID to reduce chances of fraud or of mistyped information. Thus, to be general enough to handle all bank and processor situations, a pool of TID's is used. The TID's stored in the pool need not be a sequential set of numbers; in fact, they can be alpha or special or numeric combinations, and the TID's need not have any relation to one another. In a preferred embodiment, a TID is represented as a token in a pool that can be associated with a particular transaction.

To provide for this requirement, the vPOS provides a TID pool in tabular form in a database management system (DBMS). A table has two columns: TID NAME and Allocation date and time. If the TID date is null, then the TID is not in use and can be assigned. A date and time field is utilized to allow TID allocations to expire. TID requests are made utilizing an SQL query on the TID Pool to find the first null or expired date and time, which is replaced with the current date and time and the TID name returned.

Remote vPOS

The unique architecture of Cardholder 120, Merchant 130, and Gateway 140, as shown in FIG. 1B, provides communication capability between the modules utilizing the Internet to support linkages 150 and 170. Because the Internet is so pervasive, and access is available from virtually any computer, utilizing the Internet as the communication backbone for connecting the cardholder, merchant, and access to the authorizing bank through a gateway allows the merchant vPOS software to be remotely located from the merchant's premises.

For example, the cardholder could pay for goods from any computer system attached to the Internet at any location in the world. Similarly, the merchant vPOS system could be located at a central host site where merchant vPOS systems for various merchants all reside on a single host with their separate access points to the Internet. The merchant could utilize any other computer attached to the Internet utilizing the SSL or SET protocol to query the remote vPOS system and obtain capture information, payment administration information, inventory control information, audit information, and process customer satisfaction information. Thus, without having to incur the overhead of maintaining is sufficient computer processing power to support the vPOS software, a merchant can obtain the information necessary to run a business smoothly and avoid hiring IT personnel to maintain the vPOS system.

vPOS Multi-Merchant Processing

Multiple merchant processing refers to the ability of a plurality of merchants to process their individual vPOS transactions securely on a single computer. The multi-merchant processing architecture relies on each payment page obtaining the merchant name in a hidden field on the payment page. The vPOS engine receives the merchant name with a particular transaction and synchronizes the processing utilizing a SET merchant method. The SET merchant method causes the vPOS API to look up a unique registry tree based on the merchant name. This process causes the vPOS engine to engage the appropriate configuration to process the transaction at hand utilizing a Registry Tree. A Registry Tree includes Card Definition Tables (CDTs), Acquirer Definition Tables (ADTs), Merchant Definition Tables (MDTs), and Protocol Configuration Tables (PCTs). The CDTs point to specific ADTs, because each supported card can be supplied by a distinct acquirer. This is one form of split connection. Each of the ADTs in turn point to PCTs, and some acquirers can support multiple parallel gateways. A merchant's name refers to a unique database in the database management system that includes, for example, TIDs.

For example, to fully qualify a particular merchant in a multi-merchant system, the ADT is queried to ascertain the particular Gateway (VFITest), then if Bank of America requires verification of network communication information, then the particular CDT is accessed with, for example, VISA. The particular merchant will service VISA transactions utilizing a particular acquirer. The particular piece of merchandise will also be detailed in a database. Finally, the merchant Configurations will also be stored in the database to facilitate E-mail and name lookup.

vPOS Client

The interaction between the vPOS and a client commences when a pay page solicits parameters of a transaction. Then, the parameters are validated to be sure the payment instrument, for example, card number is not null. Then, a transaction object is created (e.g., AUTHONLY), and the object is initialized and stuffed with parameters of the transaction (e.g., ao.setpan(accnum)), and the object is executed. This execution invokes the vPOS engine. The vPOS engine further validates the parameters based on the particular merchant's configuration. For example, some merchants do not accept American Express Cards, but will take Visa, and all merchants generally check the expiration date of the card. Assuming a valid and acceptable card has been tendered, then a TID is assigned (expiring, existing TIDs) or block a new TID from the TID Pool. This generates a STAN, XID, RRPID unique tag and creates an initial record in the transaction database, which is flagged as before gateway processing in case the transaction crashes and must be backed out. The protocol parameters are then identified in the registry based on card type, and a particular acquirer identified. Then, a protocol object is created and executed to extract results from the protocol object and the before gateway "bit" is flipped to again flag the location of the transaction in the process as it is submitted to the Gateway. The results received back from the Gateway are placed into a transaction object, which is reported back to the pay page and ultimately back to the pay page user.

vPOS Merchant Pay Customization

A novel feature of the vPOS software provides payment page customization based on a merchant's preferences. This feature automatically lists cards that are accepted by a particular merchant based on the active terminal configuration. Each approved card for a particular merchant is linked to the display via a URL that provides a pointer to the credit card information supported by the merchant. Each card has an entry in a data structure referred to as the Card Definition Table (CDT).

Figure 19:
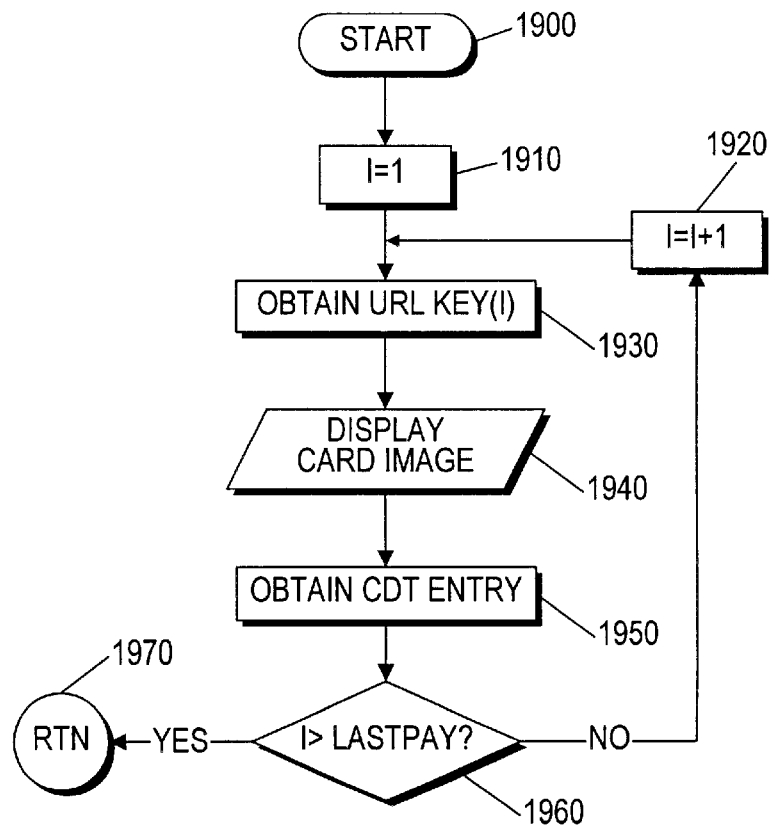
FIG. 19 is a flow diagram of vPOS merchant pay customization in accordance with a preferred embodiment.

The vPOS merchant pay customization software in accordance with a preferred embodiment is provided in FIG. 19, which illustrates the logic utilizing a flow diagram, and in a listing of the source code provided below in accordance with a preferred embodiment. Processing commences at terminal 1900 and immediately flows to function block 1910 at which an index variable is initialized for stepping through each of the accepted payment instruments for the merchant's page. Then, at function block 1930, a URL key is obtained associated with the current merchant pay page and index value. The URL key is a registry key name that points to a picture of a credit card that the merchant has associated with the pay page and which the merchant accepts as payment. At output block 1940, the card image associated with the URL key is obtained and displayed on the terminal. The CDT entry is obtained at function block 1950 utilizing the URL key. The CDT is utilized for storing information associated with each card. Then, at decision block 1960, a test is performed to determine if the last payment method card has been processed and displayed on the merchant display. If not, then the index is incremented at function block 1920 and the loop reiterated to process the next card at function block 1930. If all the cards have been processed, then control is returned to the merchant program for processing the transaction at terminal 1970.

Figure 20A:
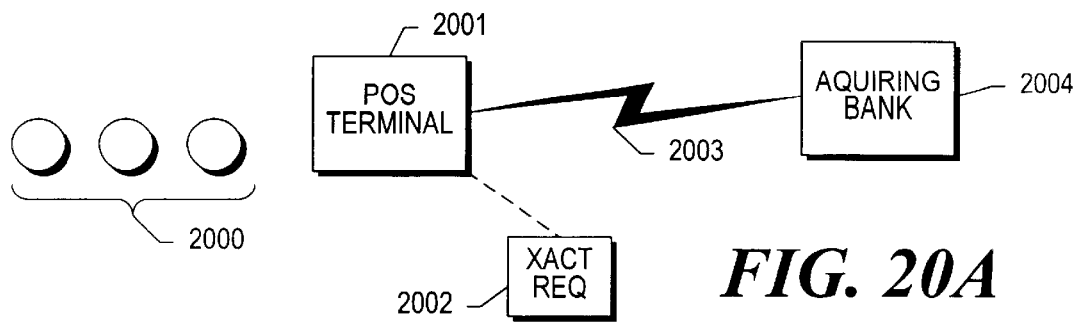
FIGS. 20A through 20H are block diagrams and flow diagrams setting forth the detailed logic of thread processing.

FIGS. 20A through 20H are block diagrams and flow diagrams setting forth the detailed logic of thread processing. FIG. 20A illustrates a prior art approach to POS processing utilized in most grocery stores and department stores today. POS Terminal 2001 accepts transactions provided to it one at a time by customers 2000. For each transaction, a POS Terminal 2001 builds a transaction request 2002 and transmits it to an acquiring bank 2004 over a communications link 2003.

Figure 20B:
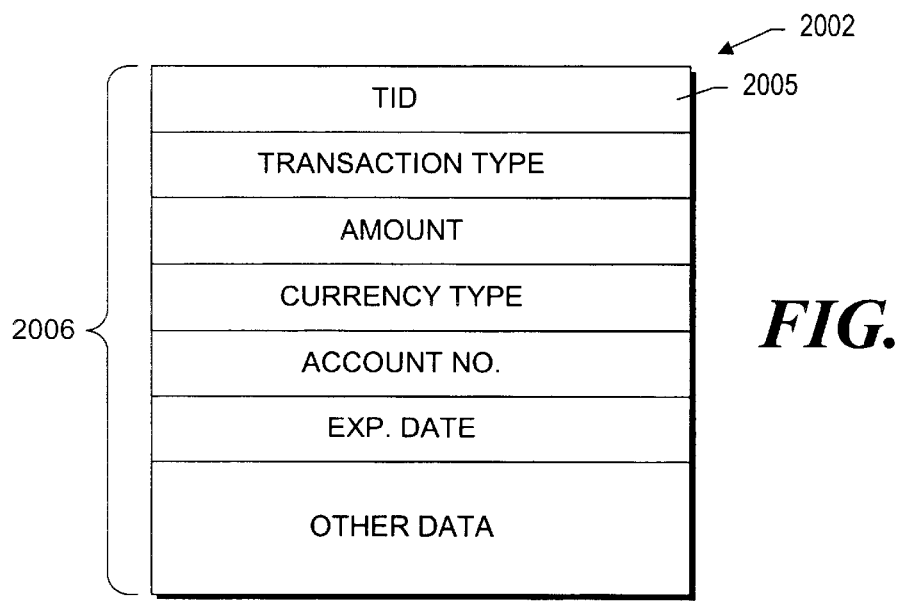

FIG. 20B is a prior art data structure 2002 representing a POS transaction request. Data structure 2002 includes a TID field 2005, which identifies the physical terminal from which the transaction originates. In addition to the TID field, data structure 2002 also includes other data 2006 necessary to process a transaction, which includes such fields as a transaction type, a transaction amount, a currency type (such as U.S. dollars), credit card account number, and credit card expiration date.

Figure 20C:
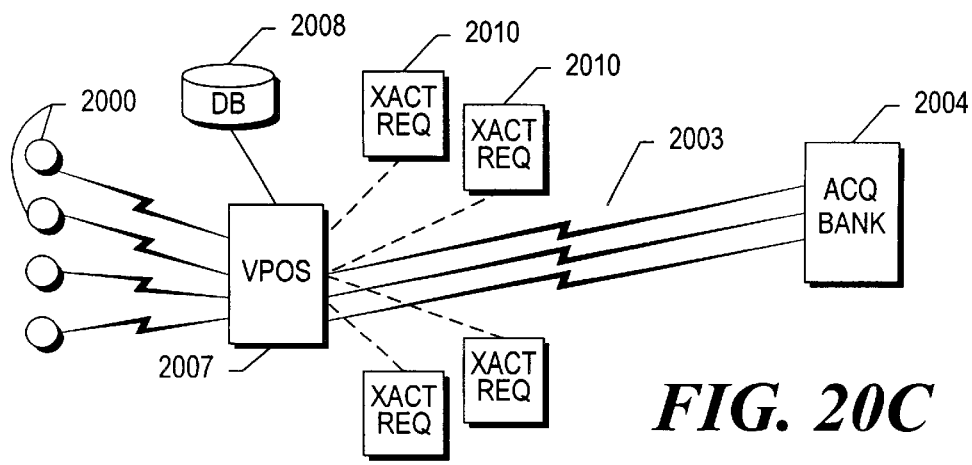

FIG. 20C illustrates a vPOS architecture in accordance with a preferred embodiment with account requests being processed by a single acquiring bank. A vPOS 2007 processes a plurality of customers 2000 concurrently. For each such customer 2000, vPOS 2007 builds a data structure 2010, representing the transaction to be performed for that customer. Each data structure 2010 contains a unique "virtual terminal" ID. Then, vPOS 2007 selects a virtual terminal ID using a TID allocation database 2008. For each data structure 2010, vPOS 2007 initiates communication with acquiring bank 2004 using communication link 2003.

Figure 20D:
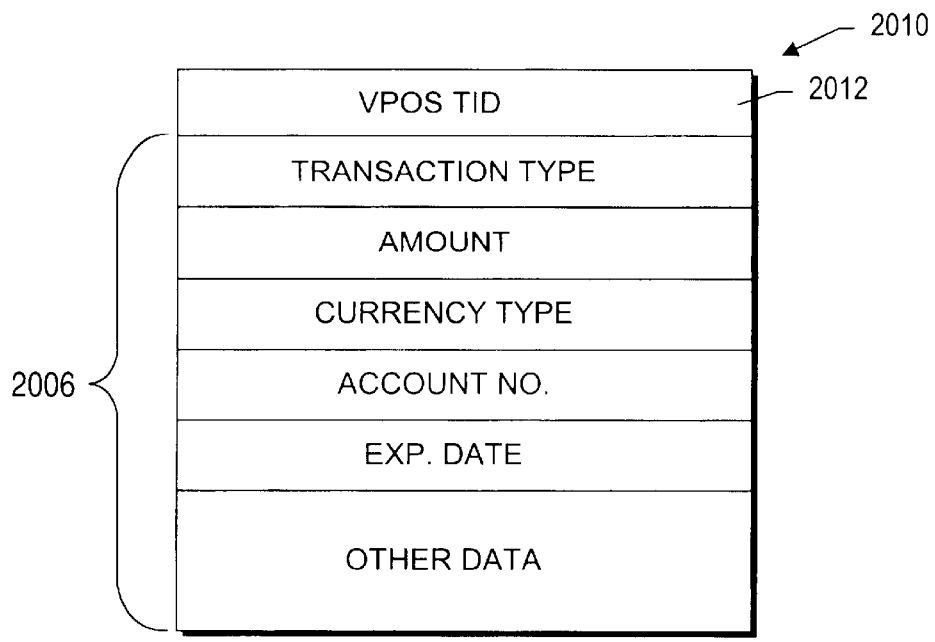

FIG. 20D is a data structure 2010 representing a vPOS transaction request in accordance with a preferred embodiment. Data structure 2010 includes a TID field 2012, which identifies a virtual terminal ID associated with a particular transaction. In addition to TID field 2012, data structure 2010 also includes other data 2006 necessary to process a transaction. Data 2006 includes such fields as a transaction type, a transaction amount, a currency type (such as U.S. dollars), credit card account number, and credit card expiration date.

Figure 20E:
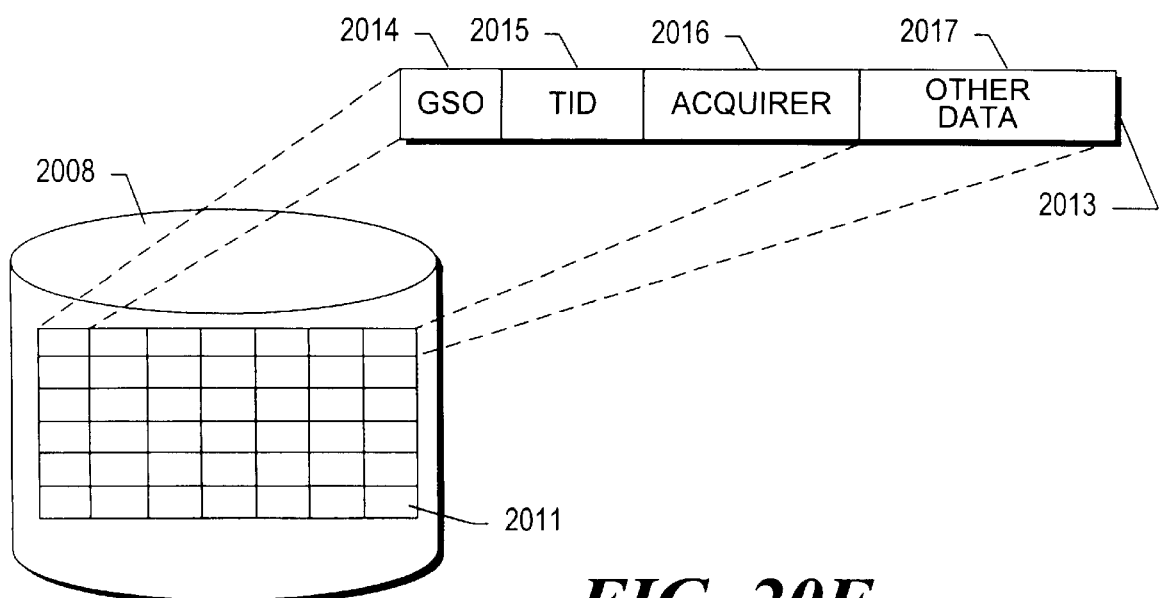

FIG. 20E illustrates a TID allocation database 2008 in accordance with a preferred embodiment. Database 2008 includes a TID allocation table 2011. TID allocation table 2011 includes a plurality of rows, one for each TID used by each acquiring bank. One such row 2013 is illustrated in detail. Row 2013 includes a good and service order (GSO) identifier 2014, which identifies the order being transmitted; a TID field 2015, which identifies a terminal ID that can be used with a particular acquiring bank; and an acquiring bank field 2016, which identifies the acquiring bank for which the TID is valid. In addition, row 2013 can optionally include other fields 2017 that can be used in conjunction with the order processing. A null GSO value indicates that the TID and Acquirer combination is not currently in use.

Figure 20F:
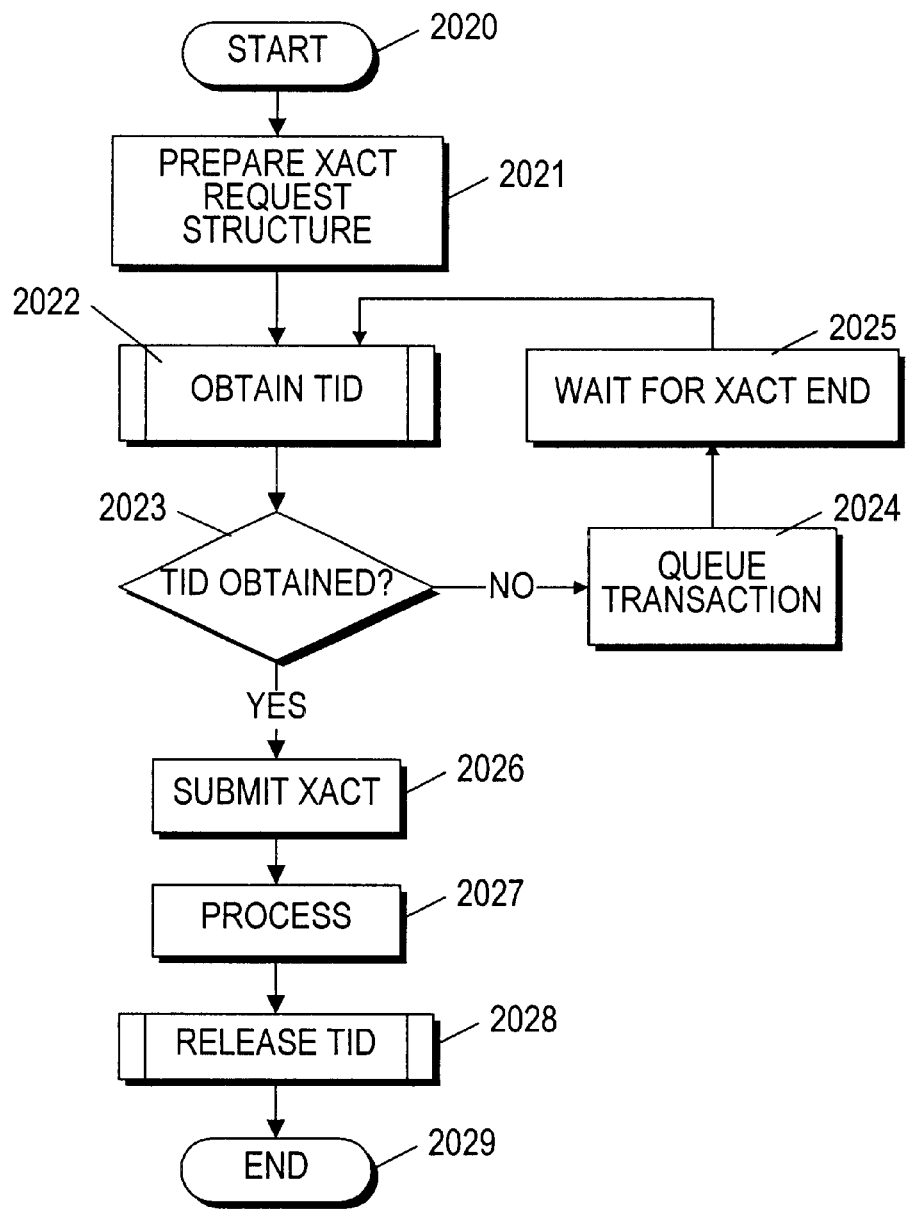
Figure 20G:
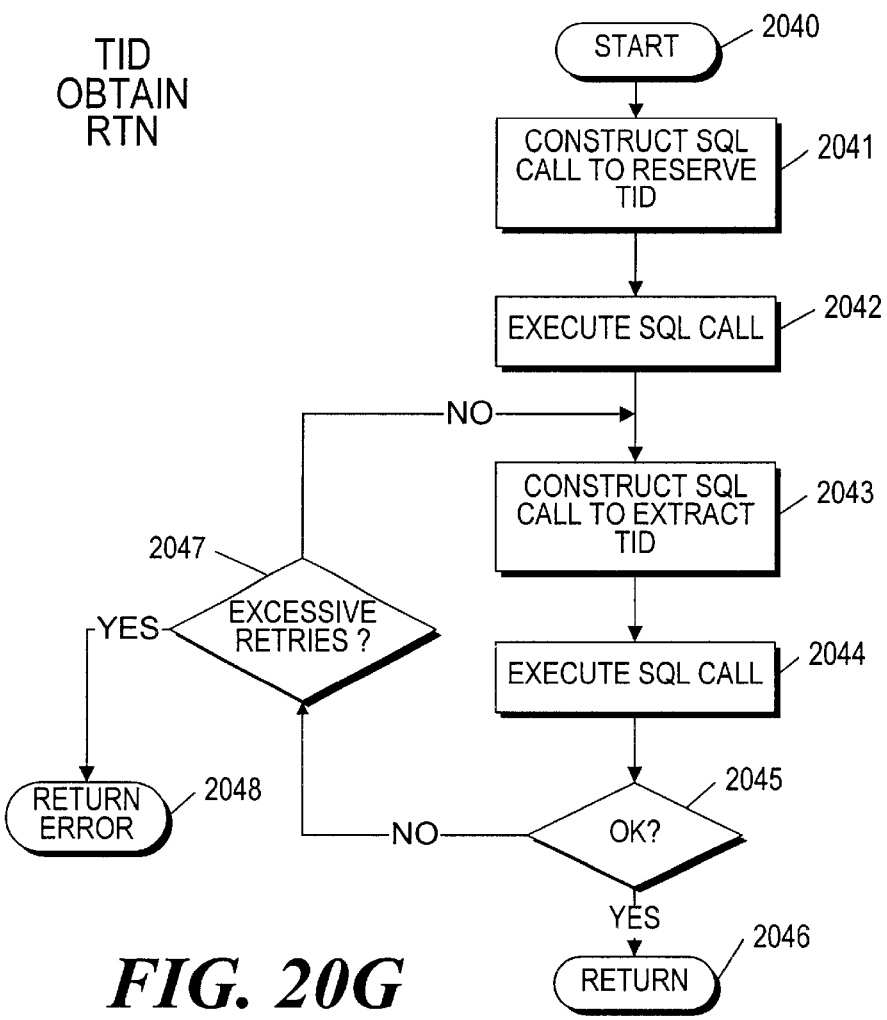
Figure 20H:
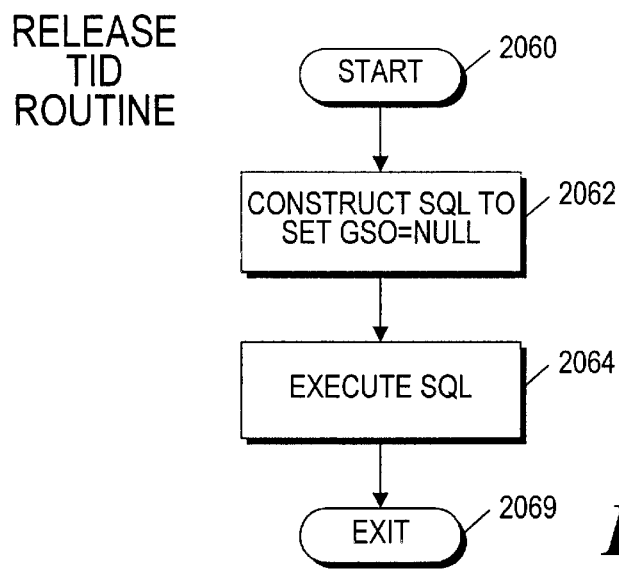

FIGS. 20F through 20H are flow diagrams of the detailed logic used to perform virtual terminal ID allocation in accordance with a preferred embodiment. FIG. 20F illustrates the main line operation of virtual TID allocation in accordance with a preferred embodiment. In stage 2020, execution begins. In stage 2021, a skeletal transaction request structure is prepared. In stage 2022, the main line routine obtains a virtual TID for inclusion within the transaction request structure, as will be more fully disclosed below with reference to FIG. 20G. In stage 2023, the routine verifies that a TID was obtained. If the TID was not obtained, for example, if more transactions are currently being processed than there are TIDs, then execution continues to stage 2024. In stage 2024, the transaction request is put in a queue for future processing. In stage 2025, the routine waits for a transaction process to end, which would free up a TID in use. At that point, control resumes from stage 2022, and the routine again attempts to obtain a TID.

If the TID was successfully obtained in stage 2023, then control proceeds to stage 2026. In stage 2026, the routine submits the transaction to the acquiring bank. In stage 2027, the transaction is processed. In stage 2028, the routine makes a database call to free up the TID that was used in the transaction. In stage 2029, transaction processing ends.

FIG. 20G depicts in detail the process of obtaining a TID from the database in accordance with a preferred embodiment. Execution begins in stage 2040. In stage 2041, the routine constructs a database call to reserve a TID for processing, for example, by constructing an SQL statement to retrieve a TID row from the database. In stage 2042, the routine executes the database call that was constructed in stage 2041. In stage 2043, the routine constructs a second database call to extract the TID from the row that was reserved in stage 2042. In stage 2044, the database call constructed in stage 2043 is executed to obtain the TID. In stage 2045, a return code is checked to verify whether the TID was successfully obtained. If the TID was successfully obtained, then control proceeds to stage 2046, which returns to the calling program. However, if the TID was not obtained, then control proceeds to stage 2047. In stage 2047, the routine checks to see whether an excessive number of retries have already been attempted. If there have been an excessive number of retries, then control proceeds to stage 2048, which exits with an error indication. If there has not been an excessive number of retries, then control proceeds once again to stage 2043 to retry the extraction operation.

FIG. 20H depicts the operation of releasing a TID that had been used in a prior transaction in accordance with a preferred embodiment. Execution begins in stage 2060. In stage 2062, the routine constructs a database call to update the row for the selected TID so that the value for the good and service order is null, thereby indicating that the selected TID is not associated with any good or service order and is therefore free for reuse. In stage 2064, the routine executes the SQL statements constructed in stage 2062, thereby releasing the TID for use in future transactions. In stage 2069, the routine returns to the calling program.

A source code listing for the transaction request processing is provided in a CD-ROM Appendix in accordance with the preferred embodiment.

```
#include "rr.h"
#ifndef_NT
#define_NTextern void_setenvp();
#endif
////////////////////////////////////////////////////////////
// AcquireBillHtml
// On Pay page, output form entries to acquire billing information
////////////////////////////////////////////////////////////
EStatus AcquireBillHtml(CWSINT& clWSINT, int nTot, CProf& clProfile, EPCLCurrency
eCurrency){
    //Current time
    time_t tNow; //FIG. out current year for Credit card expiry
    struct tm *tmNow;
    char szYear[DB_YEAR_SZ + 1];
    char szAmount[FORMATTED_CURRENCY + 1];
    time(&tNow);
    tmNow = localtime(&tNow);
    strftime(&szYear[0], (size_t)DB_YEAR_SZ + 1, "%Y", tmNow);//needs extra 1 for null
    int nYear = atoi(szYear);
/*<TH>Payment Type</TH>\n<TD><INPUT SIZE = 20 NAME=b_instrument VALUE=\" "\
        << clProfile.m_b_instrument << "\"></TD>"\
        << "*/
    clWSINT << "<CENTER><TABLE BORDER=0><CAPTION ALIGN = TOP><B>Bill
To</B></CAPTION>\n";
    clWSINT << "<TR ALIGN=LEFT<TH>Account Number</TH><TD COLSPAN =
5><INPUT
SIZE = 56 MAXLENGTH = "
        << ACCT_NUM_SZ << " NAME=b_card> </TD></TR>\n";
    clWSINT << "<TR ALIGN=LEFT><TH>Name on Card</TH><TD><INPUT SIZE= 20
MAXLENGTH= " << NAME_SZ
        << " NAME=b_name VALUE=\" " << clProfile.m_b_name
        << "\"> </TD><TH>Expiration</TH><TD>Month <SELECT NAME =
b_expire_month><OPTION> 01\n <OPTION> 02\n" <<
        "<OPTION> 03\n <OPTION> 04\n<OPTION> 05\n<OPTION> 06\n<OPTION>
07\n<OPTION> 08\n<OPTION> 09\n" <<
        "<OPTION> 10\n<OPTION> 11\n<OPTION> 12\n</SELECT> Year <SELECT
NAME = b_expire_year><OPTION>" << nYear <<
        "<OPTION>" << nYear + 1 << "<OPTION>" << nYear + 2 << "<OPTION>" <<
        nYear
+ 3 << "<OPTION>" << nYear + 4 <<
        "</SELECT></TD></TR>\n";
    //<TH>Expires</TH><TD>Month <INPUT SIZE=3 NAME=b_expire_month> Year <INPUT
SIZE=5 NAME=b_expire_year></TD></TR>\n";
    clWSINT << "<TR ALIGN=LEFT><TH>Address Line 1</TH><TD COLSPAN=5><INPUT
SIZE=56 MAXLENGTH= " << ADDR_SZ
        << " NAME=b_addr1 VALUE=\" " << clProfile.m_b_addr1 << "\"> </TD></TR>\n";
    clWSINT << "<TR ALIGN=LEFT><TH>Address Line 2</TH><TD COLSPAN=5><INPUT
SIZE=56 MAXLENGTH= " << ADDR_SZ
        << " NAME=b_addr2 VALUE=\" " << clProfile.m_b_addr2 << "\"> </TD></TR>\n";
    clWSINT << "<TR ALIGN=LEFT><TH>City</TH><TD><INPUT MAXLENGTH= " <<
CITY_SZ << " NAME=b_city VALUE=\" "
        << clProfile.m_b_city << "\"> </TD>" <<
        "<TH>State/Province</TH><TD><INPUT
MAXLENGTH= " << STATE_SZ
        << " NAME=b_state VALUE=\" " << clProfile.m_b_state << "\"> </TD></TR>\n";
    clWSINT << "<TR ALIGN=LEFT><TH>Country</TH><TD><INPUT MAXLENGTH= "
        <<
COUNTRY_SZ
        << " NAME=b_country VALUE=\" " << clProfile.m_b_country << "\">
```

-continued

```
</TD><TH>Zip/Postal Code</TH><TD><INPUT MAXLENGTH= "
        << ZIP_SZ << " NAME=b_zip VALUE=\" " << clProfile.m_b_zip << "\">
</TD></TR>\n";
    clWSINT << "<TR ALIGN=LEFT><TH>Email</TH><TD><INPUT MAXLENGTH= " <<
BEMAIL_SZ << " NAME=b_email VALUE=\" "
        << clProfile.m_b_email << "\"> </TD>" << "<TH>Phone</TH><TD><INPUT
MAXLENGTH= " << BPHONE_NUM_SZ
        << " NAME=b_phone VALUE=\" " << clProfile.m_b_phone << "\">
</TD></TR>\n";
    clWSINT << "</TABLE></CENTER><P>\n";
    //NPW << " NAME=b_addr1> </TD>" << "<TH>Payment
Instrument</TH>\n<TD><SELECT NAME =b_instrument>";
    //hack from ini (bug) which pay instruments supported
    //NPW clWSINT << "<OPTION> Credit Card\n" << "<OPTION> Debit
Card\n</SELECT></TD></TR>\n";
    CurrFormat(nTot, eCurrency, szAmount);
    clWSINT << "<CENTER><FONT SIZE=5>Total = " << szAmount <<
"</FONT></CENTER>";
    return (eSuccess);
}
////////////////////////////////////////////////////////
// PayButtonsHtml
// Output buttons on pay page: return to shop, pay, pay window,
// modify order
////////////////////////////////////////////////////////
void PayButtonsHtml(CWSINT& clWSINT, char* pszShopUrl, CRRReg& clReg){
    char *pszHomeUrl = clWSINT.LookUp("home_url");
    char *pszModifyUrl = clWSINT.LookUp("modify_url");
    char *pszSoftUrl = clWSINT.LookUp("soft_url");
    if(!pszHomeUrl) pszHomeUrl = pszShopUrl; //Home Page
    //if(!pszModifyUrl) pszModifyUrl = pszShopUrl; //Shopping Cart typically
    clWSINT << "<CENTER><H4>By pressing the Pay! button I agree to pay the above total
amount<br> according to the card issuer agreement<H4></CENTER>\n";
    clWSINT << "<CENTER>\n<A HREF = " << pszShopUrl << "> <IMG SRC=" <<
clReg.m_szReturnShop << " BORDER = 0></A>\n";
#ifdef_SC
    clWSINT << "<INPUT TYPE = IMAGE NAME = gso SRC = " << clReg.m szModifyOrder
<< " BORDER = 0>\n;
#else
    if(pszModifyUrl)
        clWSINT << "<A HREF = " << pszModifyUrl << "> <IMG SRC=" <<
clReg.m_szModifyOrder << " BORDER = 0></A>\n";
#endif
    clWSINT << "<INPUT TYPE = HIDDEN NAME = home_url VALUE = " << pszHomeUrl
<< ">\n"
        << "<INPUT TYPE = IMAGE NAME = vPOS SRC = " << clReg.m_szPay << " BORDER =
0>\n"
        << "<INPUT TYPE = HIDDEN NAME = shop_url VALUE = " << pszShopUrl << ">\n"
        << "<INPUT TYPE = HIDDEN NAME = store VALUE = " << clWSINT.LookUp("store")
<<
">\n";//Can't be NULL or error previously
    if(pszSoftUrl)
        clWSINT << "<INPUT = TYPE HIDDEN NAME = soft_url VALUE = " <<
pszSoftUrl << ">\n";
clWSINT << "</CENTER>\n";
}
////////////////////////////////////////////////////////
// DisplayPayPage
// Outputs billing form, buttons, and static gso
////////////////////////////////////////////////////////
EStatus DisplayPayPage(CWSINT& clWSINT, CRRReg& clReg, int nError) {
    EStatus eStat;
    char szFileLine[BUFFER_SZ + 1];
    char *pszTag, *pszRefererUrl, *pszShopUrl, *pszExePath, *pszServerName;
    time_t tNow;
    int nTagExist = FALSE;
    HKEY hCardsKey; //To enumerate cards
    long retCode;
    int nNoCards;
    DWORD dwtype, dwlen;
    HKEY hCardKey;
    char szCardBuf[MAX_PATH + 1], szCardPic[MAX_PATH + 1];
#ifdef_SC
    CPOLBk clBkGso;
#else
    char *pszTxn, *pszGsoNum, *pszGsoOpaque, *pszTot;
#endif
    //Shipping headers. If come from gso page and cookies are not set, set.
    CProf *pProfile;
    pProfile = new CProf();
```

-continued

```
    if(!pProfile) return (eRRNewFailed);
    eStat = pProfile->Init(clWSINT);
    if(eStat != eSuccess) return (eStat); //Init failed
#ifdef_SC /*No session cookie for the pay page. This means the user will either use a long term
cookie or type in their info each time*/    clWSINT << "Set-Cookie: profile=" << pProfile-
>GetCookieLine() << "; path=/\n";
/*    if(clWSINT.LookUp("Server Name"))
        clWSINT << "; domain = " << clWSINT.LookUp("Server Name") << ";\n";*/
#endif
#ifdef_SC
    //Shipping filled in?
    if(!(pProfile->m_s_name[0] && pProfile->m_s_addr1[0] && pProfile->m_s_city[0]&&
pProfile->m_s_state[0] &&
        pProfile->m_s_zip[0] && pProfile->m_s_country[0] && pProfile->m_s_ship[0])) {
        eStat = DisplayGsoPage(clWSINT, clReg, ERROR_DISPLAY); //bug, return
correct?
        return eStat;
    }
    //Creates shopping basket from CGI/Cookies
    eStat = clBkGso.Init(clWSINT, *pProfile, clReg);
    if(eStat != eSuccess) return (eStat); //eRRBasketCreateError //Cookies then other headers
    clBkGso.ToCookies(clWSINT, REGULAR);
#endif
    //clWSINT << "Pragma: no-cache\n";
    clWSINT << "Content-type: text/html\n\n";
    //Where to position the page. if all information is filled in, here
    if(!nError) {clWSINT << "<A NAME=jump></A>";}
    //Output HTML
    ifstream ifPay;
    ifPay.open(clReg.m_szPayTemplate, ios::in|ios::nocreate);
    if(ifPay.fail()) return (eRRCantOpenPayTemplate); //couldn't read pay template file
    //HTML Template
    while (ifPay) {
        ifPay.getline(szFileLine, BUFFER_SZ);
        if(!(pszTag = strstr(szFileLine, DYNAMIC_TAG)))
    clWSINT << szFileLine << "\n";
        else {
            nTagExist = TRUE;
            //Null the tag, Output the beginning of the line,
    //make the dynamic basket call, output the rest of the line
            if(strlen(szFileLine) == strlen(DYNAMIC_TAG))
        pszTag[0] = NULL;
            else {
                pszTag[0] = (char) NULL;
                pszTag += strlen(DYNAMIC_TAG) + 1; //was 9
            }
            clWSINT << szFileLine;
            //Dynamic call
            pszRefererUrl = clWSINT.LookUp("Referer");
            if(!pszRefererUrl) return (eRRNoRefererUrl);
            pszExePath = clWSINT.LookUp("Executable Path");
            if(!pszExePath) return (eRRNoExePath);
            pszServerName = clWSINT.LookUp("Server Name");
            if(!pszServerName) return (eRRNoServerName);
            clWSINT << "<FORM METHOD = POST ACTION = http";
        if(clReg.m_nUseSSL)
                clWSINT << "s";
            clWSINT << "://" << pszServerName << pszExePath << "#jump>";
            /*clWSINT << "<FORM METHOD = POST ACTION = " << pszExePath
<< "#jump>";*/
            //Setting Long Cookies
            clWSINT << "<CENTER>If you wish to have billing and shipping defaults
set in your browser, check this box "
                << "<INPUT TYPE = CHECKBOX
NAME=long_cookies></CENTER>\n";
            //Fill it in message
            if(nError) {
                clWSINT << "<A NAME=jump></A>";
                clWSINT << "<CENTER><H4>You must fill in <I>all</I> of the
billing information except for <I>address line 2</I> and <I>email</I>.</H4></CENTER>";
            }
            //GsoNum
#ifdef_SC
            time(&tNow); //For multithreading, append instantiation number
            clWSINT << "<TABLE ALIGN=RIGHT><TR><TH>Order
Number</TH><TD>" << tNow
                << "</TD></TR></TABLE><BR CLEAR=ALL>\n<INPUT
TYPE=HIDDEN NAME= b_gso_num VALUE = " << tNow << ">\n";
#else
```

-continued

```
            //Pay page API: transaction type, GSO#, gso opaque
            pszGsoNum = clWSINT.LookUp("b_gso_num");
            if(pszGsoNum)
                clWSINT << "<TABLE ALIGN=RIGHT><TR><TH>Order
Number</TH><TD>" << pszGsoNum
                << "</TD></TR></TABLE><BR CLEAR=ALL>\n<INPUT
TYPE=HIDDEN NAME=b_gso_num VALUE = " << pszGsoNum << ">\n";
            else {
                time(&tNow); //For multithreading, append instantiation number
                clWSINT << "<TABLE ALIGN=RIGHT><TR><TH>Order
Number</TH><TD>" << tNow
                << "</TD></TR><TABLE><BR CLEAR=ALL>\n<INPUT
TYPE=HIDDEN NAME=b_gso_num VALUE = " << tNow << ">\n";
            }
            //Some pay page only specifics: transaction to execute, gso opaque
            pszTxn = clWSINT.LookUp("transaction");
            if (pszTxn)
                clWSINT << "<INPUT TYPE=HIDDEN NAME=transaction
VALUE = " << pszTxn << ">\n";
            pszGsoOpaque = clWSINT.LookUp("gso_opaque");
            if(pszGsoOpaque)
                clWSINT << "<INPUT TYPE=HIDDEN NAME=gso_opaque
VALUE = \" " << pszGsoOpaque << "\">\n";
#endif
#ifdef_SC
            //Bill to information & Payment Instrument
            eStat = AcquireBillHtml(clWSINT, clBkGso.GetTot(), *pProfile,
(EPCLCurrency) clReg.m_eDefaultCurrency);
#else
            //Pay Page alone requires a total
            pszTot = clWSINT.LookUp("total");
            if(!pszTot) return (eRRNoPayTotal);
            eStat = AcquireBillHtml(clWSINT, atoi(pszTot), *pProfile,
(EPCLCurrency) clReg.m_eDefaultCurrency);
            clWSINT << "<INPUT TYPE=HIDDEN NAME=total VALUE = " <<
pszTot <<
">\n";
#endif
            if(eStat != eSuccess) return (eStat); //error from db? within AcquireBillHtml
            clWSINT << "<P>\n";
            //Output Buttons on Form
            pszShopUrl = clWSINT.LookUp("shop_url");
            if(!pszShopUrl)
                PayButtonsHtml(clWSINT, pszRefererUrl, clReg);
            else
                PayButtonsHtml(clWSINT, pszShopUrl, clReg);
            //Registry Card LookUp
            clWSINT << "<CENTER><TABLE CELLSPACING =
5><TR><TH>Cards Accepted:</TH>";
            RegOpenKeyEx(clReg.m_hStoreKey, "API\\CDT", 0, KEY_READ,
&hCardsKey);
            dwlen = sizeof(int);
            RegQueryValueEx(hCardsKey, "NoOfRows", 0, &dwtype,
(LPBYTE)&nNoCards, &dwlen);
            for (int i = 0; i < nNoCards; i++) {
                RegEnumKey(hCardsKey, i, szCardBuf, MAX_PATH + 1);
                RegOpenKeyEx(hCardsKey, szCardBuf, 0, KEY_READ,
&hCardKey);
                dwlen = MAX_PATH + 1;
                retCode = RegQueryValueEx(hCardKey, "CardPicture", 0,
&dwtype, (LPBYTE)szCardPic, &dwlen);
                if(retCode != ERROR_SUCCESS) return eRRRegistryFailure;
                clWSINT << "<TD><IMG SRC = " << szCardPic << "></TD>";
                RegCloseKey(hCardKey);
    }           RegCloseKey(hCardsKey);
                clWSINT << "</TR></TABLE></CENTER>";
                clWSINT << "</FORM>\n<HR>\n";
#ifdef_SC
            //Output static HTML Table
            clBkGso.ToHtml(clWSINT, NOEDIT);
            //Output static Shipping information
            StaticShipHtml(clWSINT, *pProfile);//Also NO_EDIT
            clWSINT << "<HR>\n";
#else
            //Pay page alone takes and passes through a gso
            if(pszGsoOpaque)
                clWSINT << pszGsoOpaque << "\n";
#endif
            //Rest of Line from template file
```

-continued

```
            if(pszTag) clWSINT << pszTag;
        }
    }
    if(nTagExist != TRUE)
        return(eRRNoDynamicTag);
    else
        return (eSuccess);
}
////////////////////////////////////////
//Receipt Page
//////////////////////////////////////////////////////////////////////#ifdef_SC
//////////////////////////////////////////////////////
// StaticShipHtml
// On Pay page, output Static table of shipping information
// based on cookies set in prior page
//////////////////////////////////////////////////////
void StaticShipHtml(CWSINT& clWSINT, CProf clProfile) {
    clWSINT << "<CENTER><TABLE CELLSPACING=10><CAPTION ALIGN = TOP><B>Ship To<B></CAPTION>\n";
    clWSINT<< "<TR><TH ALIGN=LEFT>Name</TH><TD>" << clProfile.m_s_name << "</TD>" <<
        "<TH ALIGN=LEFT>Address Line 1</TH><TD>" << clProfile.m_s_addr1 << "<TD></TR>\n";
    clWSINT << "<TR><TH ALIGN=LEFT>Address Line 2</TH><TD>" << clProfile.m_s_addr2 << "</TD>" <<
        "<TH ALIGN=LEFT>City</TH><TD>" << clProfile.m_s_city << "</TD></TR>\n";
    clWSINT << "<TR><TH ALIGN=LEFT>State/Province</TH><TD>" << clProfile.m_s_state << "</TD>" <<
        "<TH ALIGN=LEFT>Zip/Postal Code</TH><TD>" << clProfile.m_s_zip << "</TD></TR>\n";
    clWSINT << "<TR><TH ALIGN=LEFT>Country</TH><TD>" << clProfile.m_s_country << "</TD>" <<
        "<TH ALIGN=LEFT>Shipping Method</TH><TD>" << clProfile.m_s_ship << "</TD></TR>\n";
    clWSINT << "</TABLE></CENTER><P>";}
#endif
//////////////////////////////////////////////////////
// StaticBillHtml
// On Receipt page, output static table of billing information
//////////////////////////////////////////////////////
void StaticBillHtml(CWSINT& clWSINT, CProf clProfile) {
    /*<TH>Payment Type</TH>\n<TD>" << clProfile.m_b_instrument
        << "</TD>*/
    clWSINT << "<CENTER><TABLE CELLSPACING=10><CAPTION ALIGN = TOP><B>Bill To<B></CAPTION>\n";
    clWSINT << "<TR ALIGN=LEFT><TH>Account Number</TH><TD COLSPAN=3>" << clProfile.m_b_card << "</TD></TR>\n";
    clWSINT << "<TR ALIGN=LEFT><TH>Name on Card</TH><TD>" << clProfile.m_b_name <<
        "</TD><TD><B>Expires:</B><I>Month</I> " << clProfile.m_b_expire_month <<
        " <I>Year</I> " << clProfile.m_b_expire_year << "</TD></TR>\n";
    clWSINT << "<TR ALIGN=LEFT><TH>Address Line 1</TH><TD COLSPAN=3>" << clProfile.m_b_addr1 << "</TD></TR>\n";
    clWSINT << "<TR ALIGN=LEFT><TH>Address Line 2</TH><TD COLSPAN=3>" << clProfile.m_b_addr2 << "</TD></TR>\n";
    clWSINT << "<TR ALIGN=LEFT><TH>City</TH><TD>" << clProfile.m_b_city << "</TD>"
        << "<TH>State/Province</TH><TD>" << clProfile.m_b_state << "</TD></TR>\n";
    clWSINT << "<TR ALIGN=LEFT><TH>Country</TH><TD>" << clProfile.m_b_country <<
        "</TD><TH>Zip/Postal Code</TH><TD>" << clProfile.m_b_zip << "</TD></TR>\n";
    clWSINT << "<TR ALIGN=LEFT><TH>Email</TH><TD>" << clProfile.m_b_email << "</TD>"
        << "<TH>Phone</TH><TD>" << clProfile.m_b_phone << "</TD></TR>\n";
    clWSINT << "</TABLE></CENTER><P>\n";
}
//////////////////////////////////////////////////////
//vPOSReceipt
//Generates a receipt from the return block and profile info
//////////////////////////////////////////////////////
#ifdef vPOS_OLE
    #ifdef_SC
        void vPOSReceipt(CWSINT& clWSINT, /* CVPCLFinCCTrans */
CVPCL_OleCCAuthOnly *pTxn, CProf& clProfile, CRRReg& clReg, CPOLBk& clBkGso){
    #else
        void vPOSReceipt(CWSINT& clWSINT, /* CVPCLFinCCTrans */
CVPCL_OleCCAuthOnly *pTxn, CProf& clProfile, CRRReg& clReg)
#else
    #ifdef_SC
```

-continued

```
        void vPOSReceipt(CWSINT& clWSINT, CVPCLFinCCTrans *pTxn, CProf&
clProfile, CRRReg& clReg, CPOLBk& clBkGso) {
    #else
        void vPOSReceipt(CWSINT& clWSINT, CVPCLFinCCTrans *pTxn, CProf&
clProfile, CRRReg& clReg) {
    #endif
#endif
    //Set Long cookies (if applicable)
    struct tm *tmNow;       char szDate[32]; //what is the max date? in this format/bug
    time_t tNow;
    time(&tNow);
    tNow += clReg.m_nProfileLife * 86400;//ini constant for length of cookie stay
    tmNow = localtime(&tNow);
    strftime(szDate, (size_t)31, "%a, %d-%b-%y %H:%M:%S GMT", tmNow);
    if(clWSINT.LookUp("long cookies"))
        clWSINT << "Set-Cookie: cust_profile=" << clProfile.GetCookieLine() << ";
expires="
                << szDate << "; path=/\n"; //Profile cookies
#ifdef_SC //Shopping cart sets local cookies on receipt
        clWSINT << "Set-Cookie: profile=" << clProfile.GetCookieLine() << "; expires="
                << szDate << "; path=/\n"; //Profile cookies
#endif
    /*clWSINT << "; domain = " << clWSINT.LookUp("Server Name") << ";\n";*/
#ifdef_SC
    //Delete shopping basket
    clBkGso.ToCookies(clWSINT, EXPIRE);
#endif
    clWSINT << "Pragma: no-cache\n";
    clWSINT << "Content-type: text/html\n\n";
    clWSINT << "<HTML><BODY " << clReg.m_szBackgroundString << ">\n";
    clWSINT << "<A NAME=jump></A>\n";
    clWSINT << "<CENTER><IMG SRC=" << clReg.m_szReceiptBanner << "></CENTER>\n";
    clWSINT << "<CENTER><H2>This is your receipt. Please save it using the <I>Save As</I>
option from the <I>File Menu</I> in your browser</H2></CENTER>";
    //vPOS Return Block
    char szGso[PURCH_ORDER_NUM_SZ + 1];
    char szTransAmt[AMT_SZ + 1];
    char szDisplayTransAmt[FORMATTED_CURRENCY + 1]; //Extra point for decimal
    enum EPCLCurrency eCurr;// = (EPCLCurrency) clReg.m_eDefaultCurrency;
    enum EPCLDecimals eDec;// = eTwoDecDigits;
    char szTime[TRANS_TIME_SZ + 1];
    char szPan[ACCT_NUM_SZ +1];
    char szExpDate[EXP_DATE_SZ + 1];
    char szRetRefNum[RET_REF_NUM_SZ + 1];
    pTxn->GetRespTransAmt(szTransAmt, AMT_SZ + 1, &eCurr, &eDec);       pTxn-
>GetPurchOrderNum(szGso, PURCH_ORDER_NUM_SZ +1);
    pTxn->GetRespTransDate(szDate, TRANS_DATE_SZ + 1);
    pTxn->GetRespTransTime(szTime, TRANS_TIME_SZ + 1);
    pTxn->GetRetRefNum(szRetRefNum, RET_REF_NUM_SZ +1);
    pTxn->GetPAN(szPan, ACCT_NUM_SZ +1);
    pTxn->GetExpDate(szExpDate, EXP_DATE_SZ+1);
    clWSINT <<"<CENTER><TABLE BORDER=0 CELLSPACING=10><CAPTION><B>" <<
clReg.m_szShopName
        << " - Order Number</B> - " << szGso
        << "</CAPTION>\n<TR ALIGN=LEFT><TH>Time</TH><TD>" << szTime[0]
        << szTime[1] << ":" << szTime[2] << szTime[3] << ":" << &szTime[4] <<
"</TD><TH>Date</TH><TD>"
        << szDate[0] << szDate[1] << "/" << szDate[2] << szDate[3] << "/" << &szDate[4]
<< "</TD></TR>"
        << "<TR ALIGN=LEFT><TH>Account Number</TH><TD COLSPAN=3><B>" <<
szPan << "</B></TD></TR>"
        << "<TR ALIGN=LEFT><TH>Authorization Code</TH><TD>" << "No Auth?"
        << "</TD><TH>Reference Number</TH><TD>" << szRetRefNum <<
"</TD></TR>"
        << "</TABLE></CENTER>";
    CurrFormat(atoi(szTransAmt), eCurr, szDisplayTransAmt);    clWSINT <<
"<CENTER><FONT SIZE=5>Total = " << szDisplayTransAmt << "</FONT></CENTER><HR>\n";
    //transtype, time, date, acct #, expire, vPOS id, transaction type, auth code, ref#, amount
    //Soft goods fulfillment
    char *pszSoftUrl = clWSINT.LookUp("soft_url");
    if(pszSoftUrl)
        clWSINT << pszSoftUrl << "<HR>";
#ifdef_SC
    //Static Gso, placeholder crap until do LnGrp     clBkGso.ToHtml(clWSINT, NOEDIT);
    clWSINT << "<HR>";
    //Static Billing
    StaticBillHtml(clWSINT, clProfile);
    clWSINT << "<HR>";
    //Static Shipping
```

-continued

```
    StaticShipHtml(clWSINT, clProfile);
    clWSINT << "<HR>";
#else
    //Static passed gso if it exists
    char *pszGso = clWSINT.LookUp("gso_opaque");
    if(pszGso) clWSINT << pszGso;
    //Static Billing
    StaticBillHtml(clWSINT, clProfile);
    clWSINT << "<HR>";
#endif
    //Merchant Signature Block (if/when applicable)
    //Buttons
    char *pszHomeUrl = clWSINT.LookUp("home_url");
    char *pszShopUrl = clWSINT.LookUp("shop_url");
    clWSINT << "<CENTER>\n<A HREF = " << pszShopUrl
        << "> <IMG SRC=" << clReg.m_szReturnShop << " BORDER = 0></A>\n"
        << "<A HREF = " << pszHomeUrl << "> <IMG SRC=" << clReg.m_szHome << " BORDER = 0></A>\n"
        << "</CENTER><HR>\n";
    //Acquirer Banner
    char szPANLo[ACCT_NUM_SZ + 1], szPANHi[ACCT_NUM_SZ + 1], szBuf[MAX_PATH + 1];
    char    szTruncPAN[ACCT_NUM_SZ+1];
    HKEY hCardsKey, hCardKey;
    DWORD dwtype, dwlen;
    int nNoCards, nPANLen;
    long retCode;
    RegOpenKeyEx(clReg.m_hStoreKey, "API\\CDT", 0, KEY_READ &hCardsKey);
    dwlen = sizeof(int);
    RegQueryvalueEx(hCardsKey, "NoOfRows", 0, &dwtype, (LPBYTE)&nNoCards, &dwlen);
    for (int i = 0; i < nNoCards; i++) {
        RegEnumKey(hCardsKey, i, szBuf, MAX_PATH + 1);
        RegOpenKeyEx(hCardsKey, szBuf 0, KEY_READ, &hCardKey);
        dwlen = ACCT_NUM_SZ + 1;
        retCode = RegQueryValueEx(hCardKey, "PANLo", 0, &dwtype,
(LPBYTE)szPANLo, &dwlen);
        if (retCode != ERROR_SUCCESS) return;
        dwlen = ACCT_NUM_SZ + 1;
        retCode = RegQueryValueEx(hCardKey, "PANHi", 0, &dwtype,
(LPBYTE)szPANHi, &dwlen);
        if(retCode != ERROR_SUCCESS) return;
        nPANLen = strlen(szPANLo);
        strncpy(szTruncPAN, szPan, nPANLen);
        szTruncPAN[nPANLen]= '\0';
        if((atoi(szTruncPAN) >= atoi(szPANLo)) && (atoi(szTruncPAN) <=
atoi(szPANHi))) {
            char szAcquirer[MAX_PATH + 1], szAcquirerBanner[MAX_PATH + 1];
            szAcquirer[0] = NULL; szAcquirerBanner[0] = NULL;
            HKEY hAcquirersKey, hAcquirerKey;
            int nNoAcquirers = 0;
            dwlen = MAX_PATH + 1;
            RegQueryValueEx(hCardKey, "Acquirer", 0, &dwtype,
(LPBYTE)szAcquirer, &dwlen);
            RegOpenKeyEx(clReg.m_hStoreKey, "API\\ADT", 0, KEY_READ,
&hAcquirersKey);
            dwlen = sizeof(int);
            retCode = RegQueryValueEx(hAcquirersKey, "NoOfRows", 0, &dwtype,
(LPBYTE)&nNoAcquirers, &dwlen);
            for (int j = 0; j < nNoAcquirers; j++) {
                retCode = RegEnumKey(hAcquirersKey, j, szBuf, MAX_PATH
+1); //Get jth Acquirer subkey in szbuf
                if(retCode != ERROR_SUCCESS) break;
                if(!strcmp(szBuf, szAcquirer)) {
                    RegOpenKeyEx(hAcquirersKey, szBuf, 0, KEY_READ,
&hAcquirerKey);
                    dwlen = MAX_PATH + 1;
                    retCode = RegQueryValueEx(hAcquirerKey,
"AcquirerBanner", 0, &dwtype, (LPBYTE)szAcquirerBanner, &dwlen);
                    if(retCode != ERROR_SUCCESS) break;
            clWSINT << "<CENTER><IMG SRC=" << szAcquirerBanner <<
"></CENTER>\n";
                    RegCloseKey(hAcquirerKey);
                    break;
                }
            }
            RegCloseKey(hAcquirersKey);
            break;
        }
        RegCloseKey(hCardKey);
```

-continued

```
    }
    RegCloseKey(hCardsKey);
    clWSINT << "</HTML>";
}
////////////////////////////////////////////////////////
// vPOSPay
// Create a PO object and invoke the vPOS
////////////////////////////////////////////////////////
EStatus vPOSPay(CWSINT& clWSINT, CRRReg& clReg) {
    EStatus eStat;
    EPCLTransType eTxn;
    char *pszTxn = clWSINT.Lookup("transaction");
    char szBuf[MAX_CGI_VAR + 1]; //used for cgi variable tstore and for number later
#ifdef _SC
    CPOLBk clBkGso; //GSO data structure
#else
    //Total for transaction
    char *pszTotal = clWSINT.Lookup("total");
    if(!pszTotal) return(eRRNoPayTotal);
#endif
    //Profile object
    CProf *pProfile;
    pProfile = new Cprof();
    if(!pProfile) return (eRRNewFailed);
    eStat = pProfile->Init(clWSINT);
    if(eStat != eSuccess) return (eStat);
    //Check billing information
    if(!(pProfile->m_b_name[0] && pProfile->m_b_addr1[0] && pProfile->m_b_city[0] &&
pProfile->m_b_state[0] &&
        pProfile->m_b_zip[0] && pProfile->m_b_country[0] && pProfile->m_b_phone[0]
&&
        pProfile->m_b_card[0] && pProfile->m_b_expire_month[0] && pProfile-
>m_b_expire_year[0])) {
        eStat = DisplayPayPage(clWSINT, clReg, TRUE);
        return eStat;
    }
    //Payment transaction for a credit card
#ifdef vPOS_OLE
    CVPCL_OleCCAuthOnly *pTxn;
#else
    CVPCLFinCCTrans *pTxn;
#endif
    if(pszTxn) {
        eTxn = eNumTransTypes;
        if(!strcmp("authonly", pszTxn))
            eTxn = eTransAuthOnly;/*
        if(!strcmp("authcapture", pszTxn))
            eTxn = eTransAuthCapture;
        if(!strcmp("offlineauth", pszTxn))
            eTxn = eTransOfflineAuth;*/
    }
    else
        eTxn = clReg.m_eDefaultAuthTrans;
    //Create Transaction object
    switch (eTxn) {
    case eTransAuthOnly:
            #ifdef vPOS_OLE
                pTxn = new CVPCL_OleCCAuthOnly();
            #else
                pTxn = new CVPCL_CCAuthOnly();
            #endif
            if(!pTxn) return eFailure; // Transaction Init Failure
    break;
    default:
        return eRRIllegalTransaction;
    }
    //Transaction Initialize
    char *pszMerchant = clWSINT.Lookup("store");
    sprintf(szBuf, "MerchName=");
    strncat(szBuf, pszMerchant, (MAX_CGI_VAR-10)); //The 10 is for MerchName=
    // Connect to the OLE Automation Server
#ifdef vPOS_OLE
    eStat = pTxn->CreateDispatch();
    if(eSuccess != eStat) {
        return eFailure;
    }
#endif
    eStat = pTxn->InitTrans(szBuf);
    if(eStat != eSuccess) return eFailure; //eRRTxnInitFailed
```

-continued

```
    //GSO Number
    char* b_gso_num = clWSINT.LookUp("b_gso_num");
    if(!b_gso_num) return (eRRNoGsoNum);
    //Compose Gso object
    //CPOLPO clPO(&b_gso_num);
    //Creates shopping basket from CGI/Cookies. This information is borrowed by
    //Line Group class. For each item in the basket, put it in the PO object. We use a member
function
    //That others using the library cannot use because they may not have a basket object at their
disposal.
    //Those others must use the Set methods directly
    //Then get prices from database. If prices differ, error code
#ifdef_SC
    eStat = clBkGso.Init(clWSINT, *pProfile, clReg);
    if(eStat != eSuccess) return (eStat);
//  eStat = clPO.InitFromBk(clBkGso);
    if(eStat != eSuccess) return (eStat);
#endif
    //set all stuff from profile object
    //set custcookie
    //set cust id
    //set personal message
    //Pay Page standalone. Call an integrator function, execute vPOS stuff, call an ending
function.
    //The calls before and after are for the integrator to reconcile his database with the vPOS.
    //GSO VERIFICATION suggestions
    //Check to see if this purchase order exists in the database & if it is linked properly with this
price
    //Insert GSO and line items into db with before vPOS Txn status        //eStat =
GsoVerify(b_gso_num, pszTotal); //For integrator to fill in.
    //if(eStat != eSuccess) return eStat; //Failed lookup check
#ifdef_SC
    int nTot;
/*  nTot = clBkGso.GetTot() * 100;
    if(((clBkGso.GetTot() * 100) - nTot)>= .5)
        ++nTot;
    sprintf(szBuf, "%.2f", nTot/100.0) ;//Transaction Amount, hack to get past 2 digits*/
    //erase szBuf below. Lose precision by flooring this integer. need to define round up/down
    sprintf(szBuf, "%d", (int)clBkGso.GetTot());
    pTxn->SetReqTransAmt(szBuf, (EPCLCurrency) clReg.m_eDefaultCurrency,
eTwoDecDigits);
#else
    //Amount
    NumClean(pszTotal);
    pTxn->SetReqTransAmt(pszTotal, (EPCLCurrency) clReg.m_eDefaultCurrency,
eTwoDecDigits);
#endif
//GSO Num
pTxn->SetPurchOrderNum(b_gso_num);
//Retry Counter
pTxn->SetRRPid(1); //The first time a transaction is executed this must be set to 1
//AVS Data
if(clReg.m_nAVS) {
    char avs_zip[ZIP_SZ + 1];
    strncpy(avs_zip, pProfile->m_b_zip, ZIP_SZ);
    avs_zip[ZIP_SZ] = NULL;
    NumClean(avs_zip);
    pTxn->SetAVSData(avs_zip);
}
pTxn->SetBName(pProfile->m_b_name);
pTxn->SetBStreetAddress1(pProfile->m_b_addr1);
pTxn->SetBStreetAddress2(pProfile->m_b_addr2);
pTxn->SetBCity(pProfile->m_b_city);
pTxn->SetBStateProvince(pProfile->m_b_state);
pTxn->SetBZipPostalCode(pProfile->m_b_zip); //Insert as is zip into db
pTxn->SetBCountry(pProfile->m_b_country);
pTxn->SetBEMail(pProfile->m_b_email);
pTxn->SetBDayTimePhone(pProfile->m_b_phone);
//Card Number and expiry date
NumClean(pProfile->m_b_card);
char szDate[DB_MONTH_SZ + DB_YEAR_SZ + 1];
strncpy(szDate, pProfile->m_b_expire_month, DB_MONTH_SZ);
szDate[DB_MONTH_SZ] = NULL;
strncat(szDate, pProfile->m_b_expire_year, DB_YEAR_SZ);
pTxn->SetPAN(pProfile->m_b_card);
pTxn->SetExpDate(szDate);
//Execute Transaction
eStat = pTxn->ExecuteTrans();
if(eStat != eSuccess) return eStat; //DB or Internal Error of some kind
```

-continued

```
//Transaction Shutdown
eStat = pTxn->ShutDownTrans();
if(eStat != eSuccess) return eFailure; //eRRTxnShutFailed
//Gso after for integrator to fill in
//Gso_reconcile(success or failure, gso number);
//Delete cookies GSO. Set shipping/billing cookies. Send receipt - member function of PO object.
#ifdef_SC
vPOSReceipt(clWSINT, pTxn, *pProfile, clReg, clBkGso); //This should be PO object #else
vPOSReceipt(clWSINT, pTxn, *pProfile, clReg); //Use Get Methods for Receipt#endif#ifdef
vPOS_OLE
// Disconnect from the server
pTxn->ReleaseDispatch();
#endif
return (eSuccess);
```

Default Gateway Configuration

The vPOS is initially shipped enabled to connect to a default gateway with a single instance of a gateway defined that accesses a predefined site for testing of an installation before bringing it online in a production mode. The test installation contacts and converses with an actual gateway that simulates live transactions. After the installation checks out utilizing a set of test transactions, the test gateway downloads the pre-checked customizations to the installation so that it can switch over to the production acquirer. This download processing is enabled in extensions to SET in accordance with a preferred embodiment.

Internet Transaction Gateway

Payment methods that issue cards for conducting business generally utilize four major entities, which are the issuer, consumer, merchant, and the acquirer. The issuing bank that provides the consumer with a credit card is usually not the same bank as the acquiring bank that serves the merchant. When the consumer utilizes a credit card to pay for a purchase, the merchant swipes the card through the POS terminal, which makes a connection to the merchant's acquirer via the telephone network and transmits an authorization request with data read from the magnetic stripe. The acquirer's host processor, depending on the card number, will either perform local processing or switch the request to the correct issuing bank's host processor through the interchange network. In a few seconds, the authorization response is returned to the originating POS indicating either an approval or a rejection.

The Internet is a viable infrastructure for electronic commerce. Ubiquitous browser software for the WWW provides around-the-clock access to a large base of information content provided by Web servers. Utilizing a preferred embodiment, consumers using browsers can shop at virtual stores and malls presented as Web pages managed by the merchants' servers. Consumers can make purchases and pay for them using credit cards or other digital payment instruments in a secure manner. For such Internet-based payments to be authorized, a "gateway" is necessary at the back end to channel transactions to legacy processors and interchange networks.

Figure 21A:
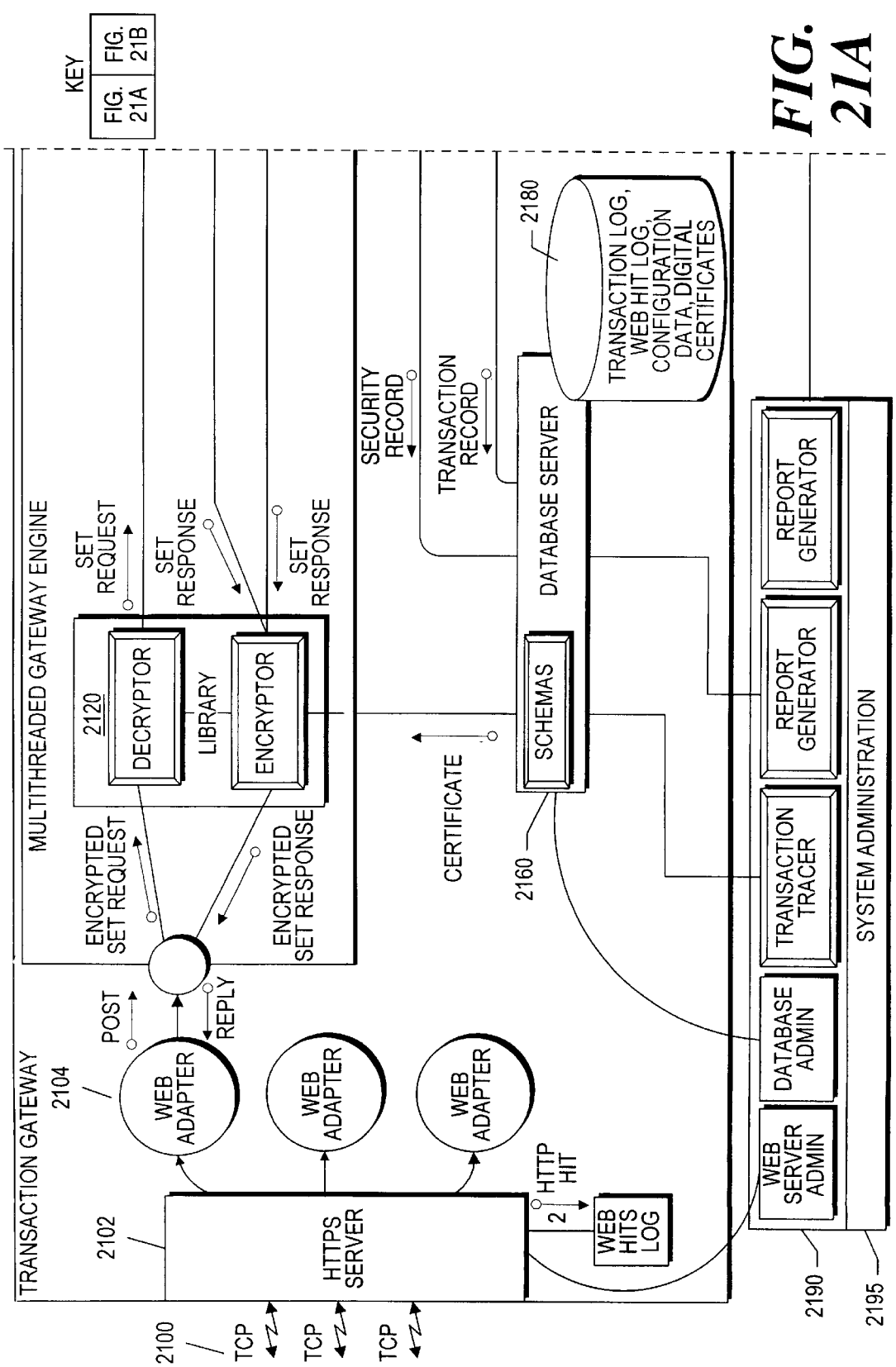
FIGS. 21A and 21B are a detailed diagram of a multi-threaded gateway engine in accordance with a preferred embodiment.
Figure 21B:
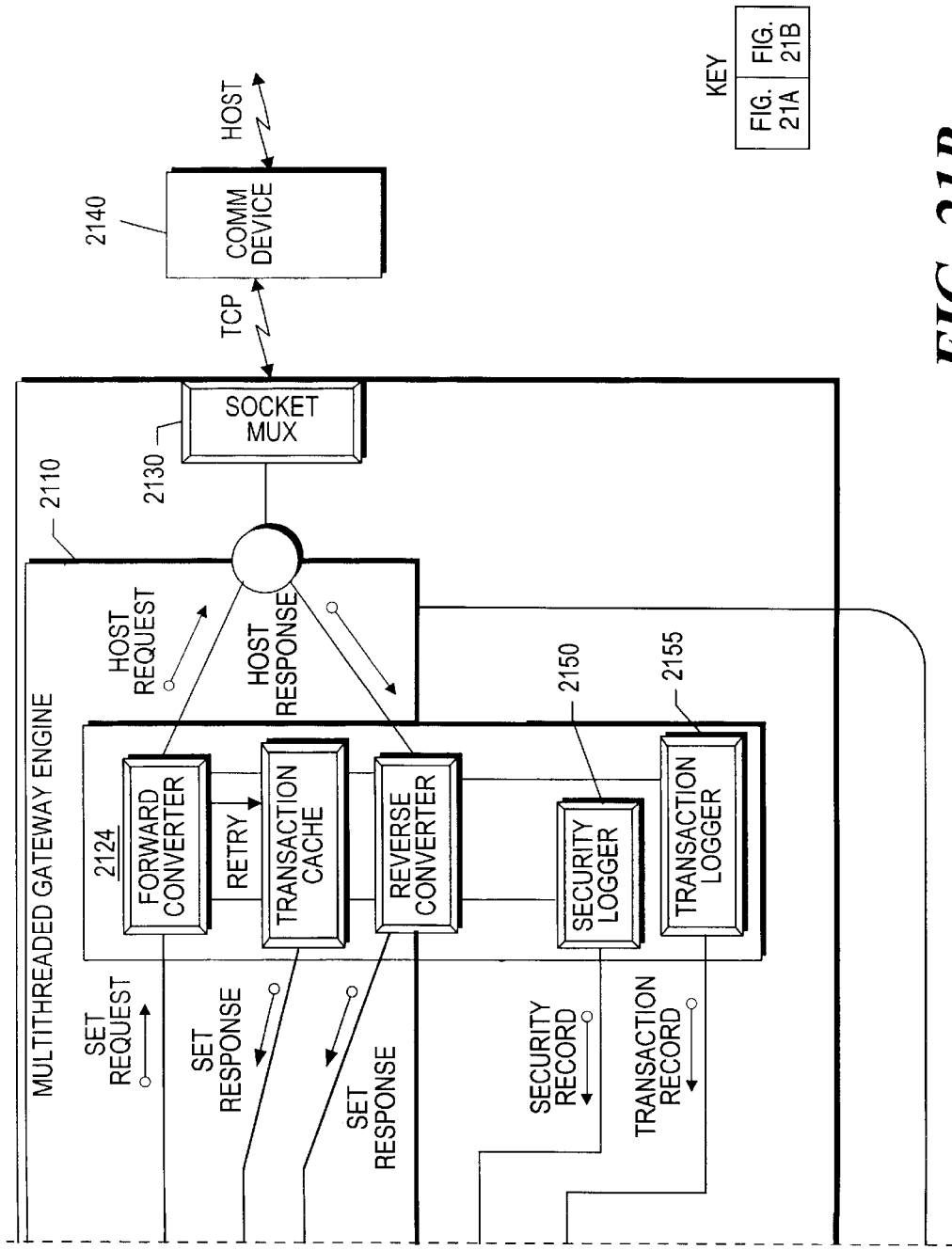

FIG. 21 is a detailed diagram of a multithreaded gateway engine in accordance with a preferred embodiment. Processing commences when a TCP transaction 2100 is received by an HTTPS Server 2102 and parsed to an appropriate Web Adaptor 2104, which posts an encrypted SET transaction to a multithreaded gateway engine 2110. The encrypted SET request is received at a decryptor 2120, decrypted into a standard SET transaction, and authenticated for converting by a forward converter 2124. Forward converter 2124 determines if the request is an original request, an honest retry attempt, or a replay attack. The converted transaction is passed to a socket multiplexor 2130 to communicate via an existing communication link 2140 to a host computer. A security logger 2150 is also utilized for passing security records back via a database server 2160 to a database administration application 2190. A transaction logger 2155 also utilizes database server 2160 to capture transaction logs in a database 2180. Other system administration tasks 2195 include a web server administration task 2190, which logs web hits in a log 2170.

Figure 22:
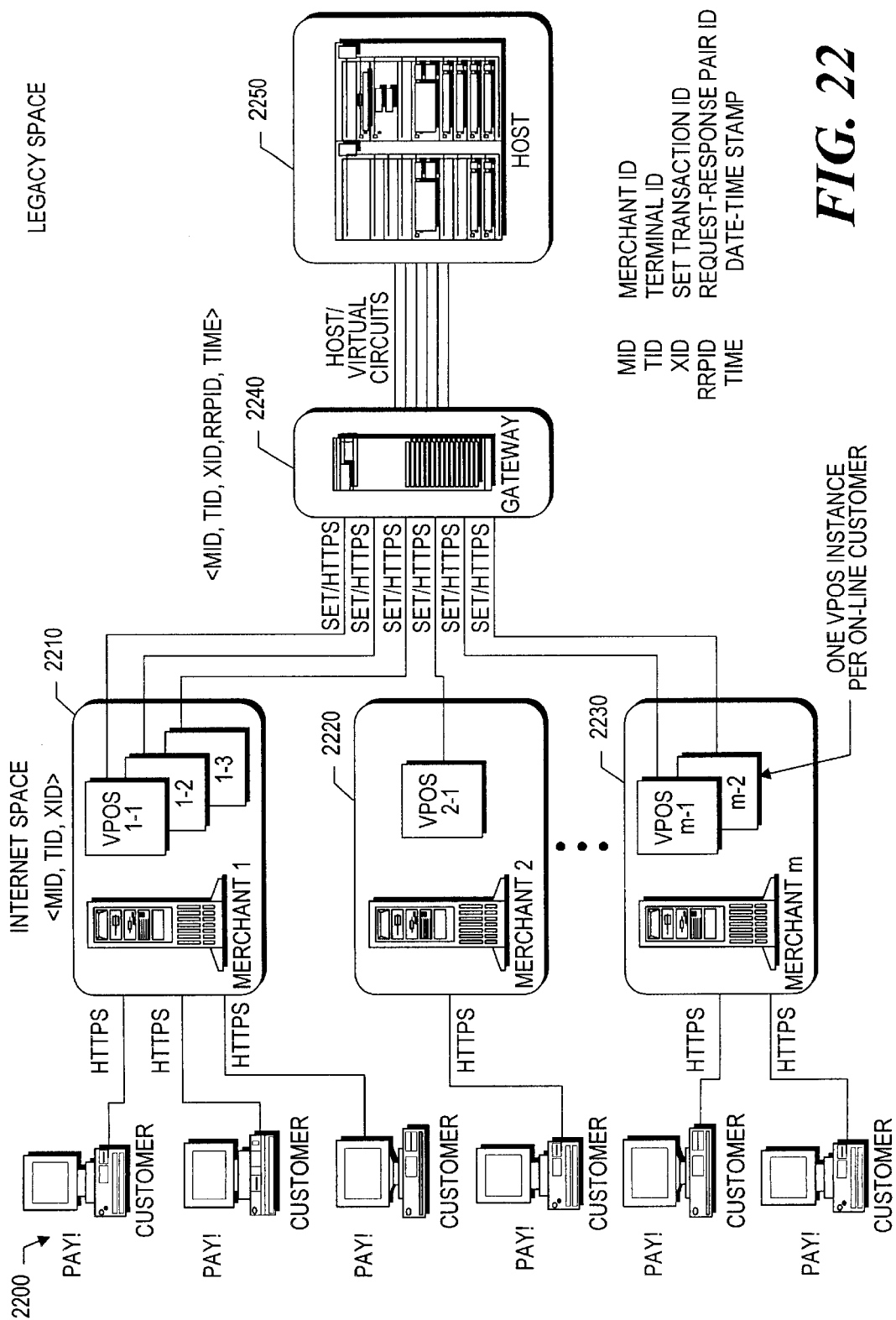
FIG. 22 is a flow diagram of Internet-based processing in accordance with a preferred embodiment.

FIG. 22 is a flow diagram of Internet-based processing in accordance with a preferred embodiment. Processing flows from customers 2200 that are paying for products over the Internet or any other communication medium utilizing HTTPS or other protocols to one or more merchants 2210, 2220, or 2230 to a gateway 2240, which directs transactions to a particular host processor 2250 for authorization processing in accordance with a preferred embodiment.

Internet Payment Authorization

In a preferred embodiment, the Gateway is a secure computer system that mediates transactions between the merchants' servers and a payment processor. The Gateway supports secure communications between merchants using the Internet on one side, and a processor using standard secure financial networks on the other side. Between the two interfaces, the Gateway maintains a detailed log of all transactions, whether in-progress, completed, or failed. The Gateway accepts transactions from merchants and converts them into legacy compatible formats before forwarding them to the host processor. Responses from the host, after the reverse conversions, will be returned to the originating merchants.

Figure 23:
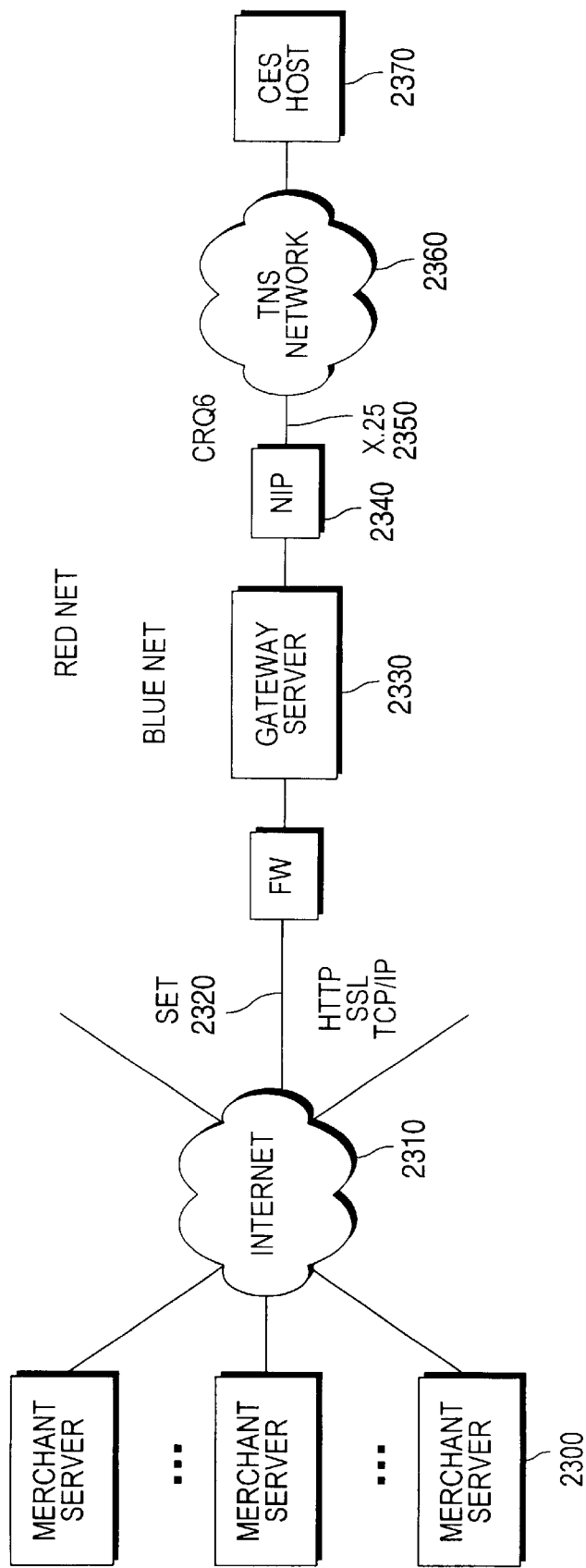
FIG. 23 illustrates a Gateway's role in a network in accordance with a preferred embodiment.

The Gateway performs various functions, including the following:
- Receives encrypted credit card transactions from the merchants via the Internet
- Unwraps and decrypts transactions
- Authenticates digital signatures of transactions based on certificates
- Supports all transaction types and card types
- Accepts concurrent transactions from each of the merchant servers
- Converts transaction data to legacy formats and forwards the mapped requests (in the clear) to a payment processor over existing communication links
- Converts transaction responses, correlates them with the original requests, and sends the mapped responses back to the merchants Provides logging, monitoring, reporting, and system administration FIG. 23 illustrates a Gateway's 2330 role in a network in accordance with a preferred embodiment. Gateway 2330 strictly conforms to all SET stipulations regarding certificate management, PKCS signed data encapsulation, PKCS encrypted data encapsulation, ASN.1 representation, DER encoding, MIME encapsulation, and message sequencing. A merchant server 2300 communicates via the Internet 2310 using the SET protocol 2320 through Gateway server 2330 using a network interface processor 2340 to communicate to a legacy network 2360 in, for example, the well-known X.25 protocol 2350. A legacy host 2370 ultimately receives and processes the transaction from merchant server 2300 without modification to its code.

Internet Communication Protocols

As discussed above, the TCP/IP protocol suite is utilized at the transport level. At the application level, in compliance with the SET standard, all requests arrive at Gateway 2330 in MIME encapsulated HTTP format. Similarly, all responses from Gateway 2330 to the merchant servers (e.g., merchant server 2300) are transferred in HTTP. The HTTP protocol stipulates that a request-response pair will go through the same TCP connection, and that the originator, in this case a merchant server, will establish a connection to send the request and will take down the connection when it has received the response.

Host Payment Protocols

Message conversions performed by the Gateway will generally be significantly more than format transliterations: per-protocol differences in data elements and message semantics must be considered carefully. Some of the transaction types that are supported in a preferred embodiment are listed below.

| Transaction Types |
| --- |
| Credit card sale with capture |
| Credit card sale without capture |
| Credit card sale with capture including AVS (MasterCard and VISA) |
| Credit card sale without capture including AVS (MasterCard and VISA) |
| Credit card return (Credit) |
| Credit card post authorization (Force Post) |
| Credit card post authorization (Force Post) with partial reversal support, enhanced authorization data, and AVS result code (VISA) |
| Credit card sale with capture - Void |
| Credit card return (Credit) - Void |
| Totals request (for balancing) |

Host Communications Protocols

A virtual, private network (VPN) between the Gateway and the host processor is established to expedite host communication. In addition, two Network Interface Processors (NIPs) are utilized such as a "near end" NIP that interfaces to the Gateway and a "far end" NIP that interfaces to the host. The NIPs handle virtual connections between themselves. The far-end NIP is responsible for specific communication details. The near-end NIP is an IP-addressable device that converts TCP messages and packets, and it is installed on a public network 2330, which is a LAN outside the corporate firewall. The Gateway on the secure public network 2330 utilizes TCP/IP 2320 to communicate with the near-end NIP.

Gateway Features

In order to sustain reliable operations and enable graceful evolution, the Gateway is designed with some important attributes, including the following: Security, Availability, Performance, Scalability, and Manageability, as discussed below.

Security
Channel Security

At the application level, SET provides signed and encrypted data encapsulations of payment information portions of the transaction messages. Transport-level encryption of the entire message packet is required for additional security. The HTTPS protocol (i.e., HTTP over SSL 3.0) is utilized between the merchants and the Gateway. The virtual connections between the near-end NIP and the host are part of a private network. The termination will occur outside the firewall. Data between the Gateway and the host is sent in the clear with no encryption. In this network configuration, a transaction between a merchant's vPOS and the host will cross the firewall four times: SET request from vPOS to Gateway, legacy request from Gateway to NIP, LEGACY response from NIP back to Gateway, and SET response from Gateway back to vPOS.

Certificate Management
Payment Protocol Certificates

The Gateway uses certificates to authenticate the two parties involved in each MOSET transaction. Through a Certificate Authority, one certificate is issued for the Gateway and one certificate for each of the merchant servers.

Secure Channel Certificates

SSL will require separate certificates for the Gateway and the merchants.

Availability

Site redundancy and location redundancy allows the Gateway to sustain service through virtually instantaneous recovery from internal failures or external disasters that cause physical damages to the system. Minimum-outage recovery is possible with redundant configurations of important components.

Site Redundancy

The Gateway supports connections to a proprietary bank network and supports mirrored disk arrays.

Location Redundancy

The Gateway architecture supports location redundancy in which a secondary remote system is connected to the primary system via dedicated WAN links for software-driven database duplication.

Scalability

The Gateway software architecture, the choice of third-party software components, and the selection of hardware platforms enable the system to gracefully adapt and evolve to take on new demands in different dimensions.

For example, the Gateway resides on an HP 9000 that is housed in a standard 19" EIA rack. The Gateway hardware configuration is provided below in accordance with a preferred embodiment.

| Gateway Hardware Configuration |
| --- |
| Server Hardware Description |
| K-Class SMP Server - Model K420 - Standard Configuration |
| 120 MHz PA-RISC 7200 CPU |
| 128 MB ECC RAM |
| Built-in I/O includes Fast/Wide/Differential SCSI-2, EtherTwist 802.3 |

-continued

Gateway Hardware Configuration

Server Hardware Description

Figure 24:
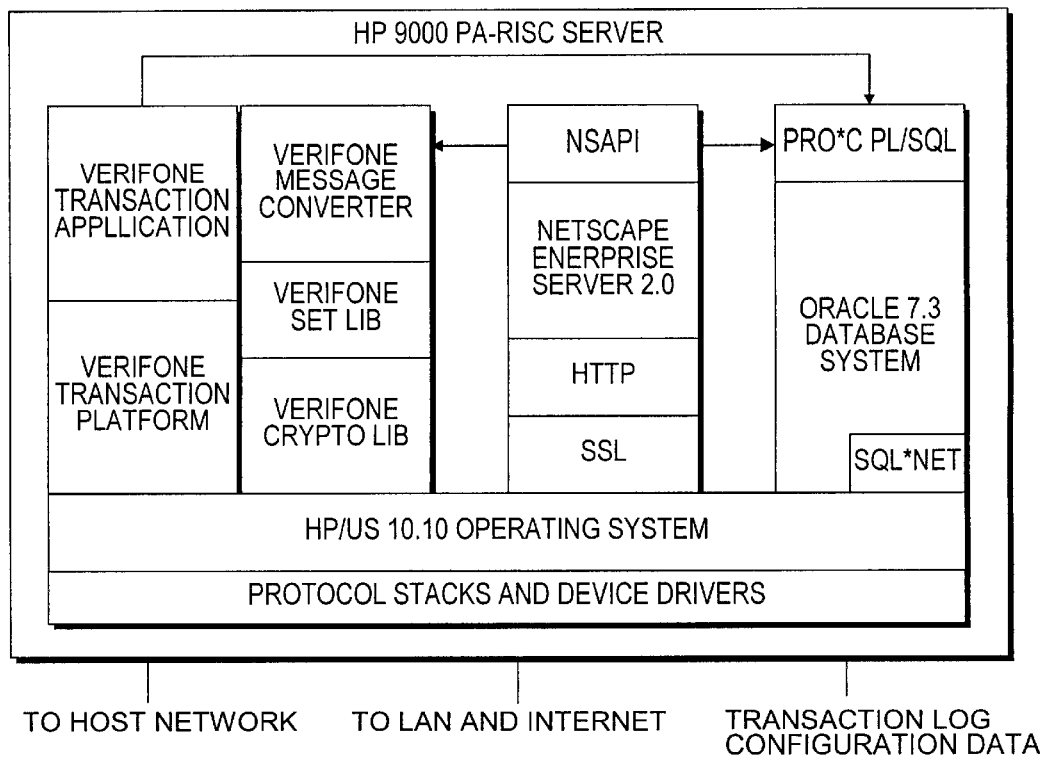
FIG. 24 is a block diagram of the Gateway in accordance with a preferred embodiment.

LAN, AUI, RS-232C Connectors, Centronics Parallel Port,
and Internal Modem
650 MB CD-ROM Drive
HP-UX 10.10 Operating System (with two-user license)
4 HP-PB Slots
Additions SCSI-2 Disk Controller
    to support disk mirroring over dual SCSI-2 buses
1   2 GB Internal SCSI-2 Disk Drive, 20 MB/s transfer rate, not mirrored
    for systems software and swap space
1   4 GB External High-Availability Disk Arrays
    for databases - total of 4 x 2 MB modules required
1   4 GB DAT drive with data compression
1   HP-PB Slot Expansion Option
    provides 4 additional HP-PB slots for peripheral controllers
2   FDDI interface cards (each card uses 2 HP-PB slots)
1   Option for eight-user license for HP-UX Cryptographic Hardware The encryption and decryption algorithms used in processing SET and SSL messages generally require significant computational power. Accordingly, a "security processor" is deployed with the Gateway to boost the performance of cryptographic algorithms. The processor is a networked peripheral device to the HP 9000 server. It provides cryptographic services suitable for SET and SSL processing, and its services are accessible via calls to software libraries running on HP-UX. FIG. 24 is a block diagram of the Gateway in accordance with a preferred embodiment, as discussed below.

VPOS Terminal Architecture

Figure 25:
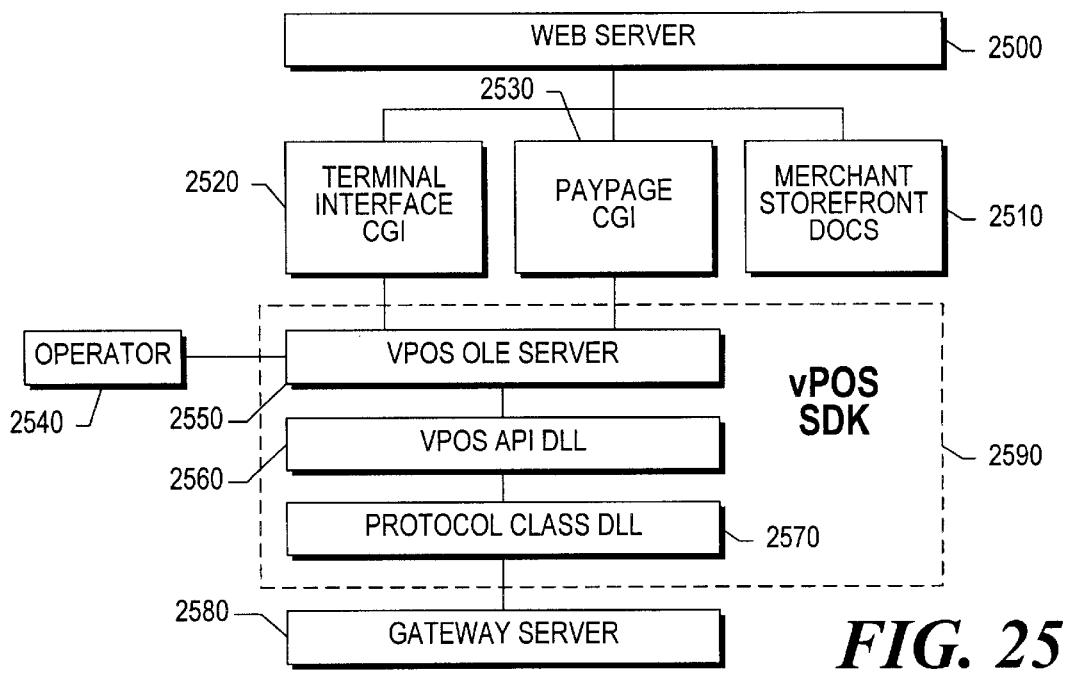
FIG. 25 is a block diagram of the vPOS Terminal Architecture in accordance with a preferred embodiment.

FIG. 25 is a block diagram of the vPOS Terminal Architecture in accordance with a preferred embodiment. The Internet 2500 provides the communication processing necessary to enable the vPOS Terminal architecture. A terminal interface Common Gateway (CG) 2520 communicates via the Internet 2500 to provide information to a vPOS OLE Server 2550 that formats information in accordance with a vPOS API DLL 2560, which uses a protocol class DLL 2570 to flesh out the message for delivery to a Gateway Server 2580. The collection of vPOS OLE Server 2550, vPOS API DLL 2560, and protocol class DLL 2570 make up the vPOS Software Development ToolKit (SDK), which are used to enable vPOS applications for interfacing with an Operator 2540.

Gateway Architecture

Operating System Software

The Gateway runs under the HP-UX Version 10.10 operating system and will be upgraded to support future significant system releases. HP-UX 10.10 conforms to major standards, including the following:

X/Open UNIX 95 (conforming with the Single UNIX Specification, SPEC 1170)
    X/Open Portability Guide Issue 4 Base Profile (XPG4) OSF APES
    IEEE POSIX 1003.1 and 1003.2
    AT&T System V Interface Definition (SVID3 base and kernel extensions subset) Level 1 API support
    UC Berkeley Software Distribution 4.3 (BSD 4.3) including such features as job control, fast file system, symbolic links, long file names, and the C shell
    System V.4 File System Directory Layout This compliance with various software standards assures that although a preferred embodiment of the invention is disclosed in association with a best mode of practicing and using the present invention, it will be apparent to one of ordinary skill in the art that other similar software and hardware environments can be readily substituted without undue experimentation.

Relational Database Management System (RDBMS) Software

The Gateway uses Oracle7 Server version 7.3 as the RDMBS and will be upgraded to use future significant system releases. The multi-threaded, multi-server architecture of Oracle7 provides applications with scalability to high-volume transaction workloads. When deployed with the HP 9000 K-Class platform, Oracle7 performs a symmetrically parallel database operation across all available processors. In addition, Oracle7 includes options for creating high-availability systems such as the following:

The Oracle7 Parallel Server option extends the reliability of applications by transparently harnessing the power of clustered computers in a single logical processing complex that can tolerate individual machine failures.
    Oracle7 Symmetric Replication provides high data availability. Data can be replicated from the primary system to one or more alternative sites.

HTTP Server

The Gateway utilizes Netscape's Enterprise Server 2.0 as the HTTP server. The server is designed for large-scale Internet commerce deployment. Enterprise Server 2.0 achieves performance and reliability with such features as optimized caching, SMP support, enhanced memory management, and SNMP-based performance monitoring. Efficient process management features minimize system load and increase server reliability. Security features are provided using the SSL 3.0 protocol.

Protocol Stacks

Internet and LAN—The TCP/IP protocol stack will be provided as part of the HP-UX operating system.

Other Application-Level Protocols

Application-level protocols enable client-server interoperability. Each of the following protocols are transported using TCP or UDP.

HTML. HTML will be used to define screens for Gateway system administration.
    HTTP. The HTTP layer is part of Enterprise Server 2.0. The server is administered with a Web browser.
    SQL*Net. The Gateway's Oracle7 database can be accessed by administration clients using SQL*Net. Administration software can establish database connectivity to retrieve data for generating transaction reports.
    SNMP. Enterprise Server 2.0 can be monitored using the well-known SNMP (Simple Network Management Protocol). The Gateway utilizes SNMP for remote system management.

Transaction Performance Monitoring and Measurement

The "hits" performance indicators are available from the Web server. Statistics can be generated at any time to highlight the load pattern or to pinpoint the time when the server was most active.
    Gateway statistics about transaction requests (by transaction type) and transaction results (e.g., success, failed due to host, and failed due to authentication) can be determined at any time for a particular time interval by generating a report.

The Gateway is upgradeable to interoperate with a real-time event monitoring system such as OpenVision's Performance Manager.

Basic Request/Response Mappings

The following table shows the basic request/response mapping between the SET protocol and the LEGACY protocol.

| SET Request/Response Pair | LEGACY Request/Response Pair and Transaction Code |
|---|---|
| AuthReq, AuthRes | LEG/CTR (05) |
| AuthRevReq, AuthRevRes | LEG/CTR (99) |
| CapReq, Cap Res | LEG/CTR (42 or 44) |
| CapRevReq, CapRevRes | LEG/CTR (41) |
| CredReq, CredRes | LEG/CTR (40) |
| CredRevReq, CredRevRes | LEG/CTR (90) |
| BalReq, BalRes | CTA/CTL (48) |

Detailed Message Field Mappings

The following sections map the fields in LEGACY messages to fields in SET messages. The names of the SET fields are the names used in the SET ASN.1 specification. The full scope of the SET fields is listed in order to remove any ambiguity (but does not necessarily reflect actual naming conventions in source code).

LEGACY - Authorization Request Record (LEG)

| LEGACY - Authorization Request Record | Place in SET request to get LEGACY request data |
|---|---|
| (a) Host Processing Address | hard-coded at Gateway to "VERI" |
| (b) Record Type | hard-coded at Gateway to "LEG" |
| (c) Control | hard-coded at Gateway to "6" |
| (d) Originating Merchant Number | from Merchant Certificate in unwrapped SET request |
| (e) Sequence Number | generated at Gateway |
| (f) Original Sequence Number | generated at Gateway |
| (g) Date and Time of Original Transaction | |
| 05 - CC Authorization Request | AuthReq . AuthReqDate |
| 40 - CC Capture Credit | CredReq . CredDate |
| 41 - CC Capture Void | CapRevReq . CapRevDate |
| 42 - CC Capture Post (non AVS) | CapReq . CapDate |
| 44 - CC Capture Post (AVS) | CapReq . CapDate |
| 76 - CC Authorization Reversal | This transaction code will not be used. |
| (h) Device ID - part 1 | hard-coded at Gateway to binary zeros. |
| (i) Device ID - part 2 | The Terminal-id generated by Merchant System and delivered to the Gateway software as a result of decoding the SET request. |
| (j) Transaction Code | |
| 05 - CC Authorization Request | AuthReq received |
| 40 - CC Capture Credit | CredReq received |
| 41 - CC Capture Void | CapRevReq received |
| 42 - CC Capture Post (non AVS) | CapReq received (if CapReq . RespData . AVSResult is blank) |
| 44 - CC Capture Post (AVS) | CapReq received (if CapReq . RespData . AVSResult is non-blank) |
| 76 - CC Authorization Reversal | This transaction code will not be used. |
| (k) Alphabetic Card Issuer Code | computed at Gateway from PAN |
| 05 - CC Authorization Request | AuthReq . PI . PANData . PAN |
| 40 - CC Capture Credit | CredReq . RespData . CapToken . TokenOpaque . PAN |
| 41 - CC Capture Void | CapRevReq . RespData . CapToken . TokenOpaque . PAN |
| 42 - CC Capture Post (non AVS) | CapReq . RespData . CapToken . TokenOpaque . PAN |
| 44 - CC Capture Post (AVS) | CapReq . RespData . CapToken . TokenOpaque . PAN |
| 76 - CC Authorization Reversal | This transaction code will not be used. |
| (l) Authorization Amount | |
| 05 - CC Authorization Request | AuthReq . AuthReqAmt |
| 40 - CC Capture Credit | CredReq . CredReqAmt (could be different than CapToken) |
| 41 - CC Capture Void | CapRevReq . CapRevAmt |
| 42 - CC Capture Post (non AVS) | CapReq . CapReqAmt |
| 44 - CC Capture Post (AVS) | CapReq . CapReqAmt |
| 76 - CC Authorization Reversal | This transaction code will not be used. |
| (m) Cash Back Amount | hard-coded to "00000000" (EBCDIC) |
| (n) Card or Driver's License Data | |
| 05 - CC Authorization Request | |
| Account Number | AuthReq . PI . PANData . PAN |
| Expiry Date | AuthReq . PI . PANData . CardExpiration |
| 40 - CC Capture Credit | |
| Account Number | CredReq . RespData . CapToken . TokenOpaque . PI . PAN |
| Expiry Date | CredReq . RespData . CapToken . TokenOpaque . PI . CardExp |
| 41 - CC Capture Void | |
| Account Number | CapRevReq . RespData . CapToken . TokenOpaque . PI . PAN |
| Expiry Date | CapRevReq . RespData . CapToken . TokenOpaque . PI . CardExp |
| 42/44 - CC Capture Post (non AVS or AVS) | |
| Account Number | CapReq . RespData . CapToken . TokenOpaque . PI . PAN |
| Expiry Date | CapReq . RespData . CapToken . TokenOpaque . PI . CardExp |
| 76 - CC Authorization Reversal | This transaction code Will not be used. |
| (o) Additional Data | |
| 05 - CC Authorization Request | |
| ZIP Code | AuthReq . AVSData . ZIPCode (if VISA Card) blank (if non VISA Card) |
| 40 - CC Capture Credit | |
| BANK Reference Number | CredReq . RespData . LogRefID |

-continued

| LEGACY - Authorization Request Record (LEG) | |
|---|---|
| LEGACY - Authorization Request Record | Place in SET request to get LEGACY request data |
| 41 - CC Capture Void | |
| BANK Reference Number | CapRevReq . RespData . LogRefID |
| 42 - CC Capture Post | |
| Authorization Code | CapReq . RespData . AuthCode |
| 44 - CC Capture Post AVS | |
| (p) CPS ACI Flag | CapReq . RespData . CapToken . TokenOpaque . CPSAciFlag |
| (q) CPS Transaction ID | CapReq . RespData . CapToken . TokenOpaque . CPSTransId |
| (r) CPS Validation Code | CapReq . RespData . CapToken . TokenOpaque . CPSValCode |
| (s) Visa Response Code | CapReq . RespData . CapToken . TokenOpaque . VisaRespCode |
| (t) Merchant Category Code | CapReq . RespData . CapToken . TokenOpaque . MerchantCatCode |
| (u) Entry Mode | |
| (v) Original Authorization Amount | CapReq . RespData . CapToken . TokenOpaque . EntryMode CapReq . RespData . CapToken . AuthAmt |
| (w) AVS Result Code | CapReq . RespData . AVSResult |
| (x) Authorization Code | CapReq . RespData . AuthCode |
| 76 - CC Authorization Reversal | This transaction code will not be used. |

LEGACY—Authorization Request Response (CTR)

The field Settlement Date is returned by the host in a LEGACY Authorization Request Response (when a transaction is force posted). This Settlement Date field contains the day that a posted transaction will be settled between the Merchant and the Acquiring Bank. Because a bank desires that this date be made available to the Merchant for the purposes of financial record keeping, this field is returned to vPOS.

| LEGACY - Authorization Request Response | Place in SET response to put LEGACY data returned from host |
|---|---|
| (a) Host Processing Address | echoed by host, not included in SET response |
| (b) Record Type | echoed by host, not included in SET response |
| (c) Control | echoed by host, not included in SET response |
| (d) Settlement Date | echoed by host |
| (e) Sequence Number | echoed by host, not included in SET response |
| (f) Original Sequence Number | echoed by host, not included in SET response |
| (g) Account Indicator | not included in SET response |
| (h) Device ID - part 1 | echoed by host, not included in SET response |
| (i) Device ID - part 2 | echoed by host, included in SET response in a location to be determined by the Payment Protocols Team. The value echoed is the terminal-id as delivered in the SET request. |
| (j) Action Code | The Action code returned in the LEGACY response will be combined with the Error Code (if present) and translated to a canonical list of error codes. See section 0 for exactly where this canonical error code will be returned for each transaction type. |
| (k) Transaction Code | echoed by host, not included in SET response |
| (l) Authorization | |

| LEGACY - Authorization Request Response | Place in SET response to put LEGACY data returned from host |
|---|---|
| Amount | |
| 05 - CC Authorization Request | AuthResPayload . AuthAmt (if SalesInd = False) SaleResPayload . CapAmt (if SalesInd = True) |
| 40 - CC Capture Credit | CredRes . CredResSeq . CredResItem . CredActualAmt |
| 41 - CC Capture Void | CapRevRes . CapRevSeq . CapRevResItem . CaptureAmt |
| 42 - CC Capture Post (non AVS) | CapRes . CapRevSeq . CapResItem . CapResultPayload . CapAmt |
| 44 - CC Capture Post (AVS) | CapRes . CapRevSeq . CapResItem . CapResultPayload . CapAmt |
| 76 - CC Authorization Reversal | This transaction code will not be used. |
| (m) Authorization Code | |
| 05 - CC Authorization Request | AuthResorSale . RespData . AuthCode (if SalesInd=False) AuthResorSale . RespData . AuthCode (if SalesInd=True) |
| (n) AVS Result Code | AuthResorSale . RespData . AVSResult |
| (o) Reference Number AVS Result Data only received if transcode = 05 and VISA and approved but not captured | AuthResorSale . RespData . LOGRefId |
| (p) CPS ACI Flag | AuthResorSale . RespData . CapToken . TokenOpaque . CPSAciFlag |
| (q) CPS Transaction Id | AuthResorSale . RespData . CapToken . TokenOpaque . CPSTransId |
| (r) CPS Validation Code | AuthResorSale . RespData . CapToken . TokenOpaque . CPSValCode |
| (s) Visa Response Code | AuthResorSale . RespData . CapToken . TokenOpaque . VisaRespCode |
| (t) Merchant Category Code | AuthResorSale . RespData . CapToken . TokenOpaque . MerchantCatCode |
| (u) Entry Mode | AuthResorSale . RespData . CapToken . TokenOpaque . EntryMode |

Error Code Location in SET response messages

The following table shows the explicit SET field in which the canonical error code will be returned in SET response messages.

| SET Response Message | Location of Canonical Error Code |
|---|---|
| AuthRes | AuthResorSale . RespData . RespCode (if SalesInd = False) AuthResorSale . RespData . RespCode (if SalesInd = True) |
| AuthRevRes | AuthRev will not be supported by the Gateway |
| CapRes | CapRes . CapResSeq . CapResItem . CapCode |
| CapRevRes | CapRevRes . CapRevResSeq . DraftCaptureStatus |
| CredRes | CredRes . CredResSeq. CredResItem . CredCode |
| CredRevRes | CredRev will not be supported by the Gateway |
| BalRes | CapRes . CapResSeq . CapResItem . CapCode |

The canonical error response code values and descriptions were taken directly from "ISO 8583: 1987 section 4.3.8 Table 7".

Error Code Values in SET response messages

The above table itemizes the proposed mapping of LEGACY specific action codes and error code pairs to the canonical error codes that will be sent in the SET response messages.

VeriFone Proprietary SET Extensions

The SET protocol currently has no provisions to support "Balance Inquiry" requests. Balance Inquiry requests are used by the Merchant to query its Acquiring Bank as to various totals for the current days or past days transaction totals. The following two sections detail a proposed mapping between the LEGACY protocol and two new VeriFone proprietary SET extensions as follows: BalInq (Balance Inquiry) and BalRes (Balance Response). The BalInq request is used by vPOS to query the Gateway as to the transaction totals, and BalRes is the response sent by the Gateway to vPOS.

| LEGACY - Administrative Inquiry Record (CTA) | |
|---|---|
| LEGACY - Administrative Inquiry Record | Place in SET request to get LEGACY request data |
| (a) Host Processing Address | name-value pair |
| (b) Record Type | name-value pair |
| (c) Control | name-value pair |
| (d) Merchant Number | name-value pair |
| (e) Device ID - part 1 | name-value pair |
| (f) Device ID - part 2 | name-value pair |
| (g) Date and Time of Inquiry | name-value pair |
| (h) Sequence Number | name-value pair |
| (i) Transaction Code | name-value pair |
| (j) Feedback Level | name-value pair |
| 10 - Totals online and offline for the Merchant | |
| 20 - Totals online and offline for the Chain | |
| (k) Feedback Day | name-value pair |
| 0 - Today | |
| 1 - Yesterday | |
| 2 - Two Days Back | |
| 3 - Three Days Back | |
| (l) Feedback Type | name-value pair |
| 00 - All combined Visa and Mastercard Sales | |
| 10 - Mastercard Net Totals | |
| 20 - Visa Net Totals | |
| 40 - Discover Totals | |
| 50 - Amex Totals | |
| (m) Feedback ID | name-value pair |
| Level 10: 7 Digit Merchant | |
| Level 20: 5 Digit Chain | |

| LEGACY - Administrative Response Record (CTL) | | |
|---|---|---|
| LEGACY - Administrative Response Record | | Place in SET response to put LEGACY data returned from host |
| (a) | Host Processing Address | name-value pair |
| (b) | Record Type | name-value pair |
| (c) | Control | name-value pair |
| (d) | Settlement Date | name-value pair |
| (e) | Sequence Number | name-value pair |
| (f) | Device ID - part 1 | name-value pair |
| (g) | Device ID - part 2 | name-value pair |
| (h) | Action Code (O,D or E) | name-value pair |
| (i) | Transaction Code | name-value pair |
| Additional Data | | name-value pair |
| (j) | Error Code | |
| (k) | Total Item Count | |
| (l) | Total Sales Amount (Credit Card) | |
| (m) | Totals Sales Item Count | |
| (n) | Total Credits Amount (Credit Card) | |
| (o) | Total Credits Item Count (Credit Card) | |

Gateway Analysis for SET Message Handling

This section tackles general design considerations of the Gateway software and is not limited to LEGACY (unless specifically mentioned). The complete functional behavior of the Gateway will be described further below.

Replay Attack Handling

A replay attack at the Gateway is a request involving either of the following:
  a) the request is stale (the request was received "too late" with respect to the reqdate in the request). This window is specified by a configurable Gateway policy.
  b) the request is not stale but the exact rrpid (Request/Response Pair Id) has already been seen before in a request and still logged in the Gateway database. The <xid, mid, rrpid> tuple will be the primary key that determine whether a request had already been received. This will allow the possibility of the same rrpid to be generated from the same merchant but for a xid and also allow the same rrpid to be generated by a totally different merchant.

New Attempt vs. Retry Attempt

Messages sent between the vPOS and the Gateway may be lost in transit. This can happen either because of hardware or software problems in the Internet or for hardware or software reasons local to the Gateway or Merchant System. The question is then "How does a Gateway recognize an honest retry attempt from an initiator?" First, some background into the nature of a SET request is provided. SET requests have the following fields:

| | |
|---|---|
| xid | merchant's transaction id |
| mid | merchant id (contained in certificate) |
| tid | terminal id (from Merchant System) |
| rrpid | request response pair id |
| reqdate | request date (from Merchant System) |
| reqdata | request specific data |

Let the following tuple represent a generic SET request:
<xid, mid, tid, rrpid, reqdate, reqdata>

The merchant establishes the xid during the shopping phase with the consumer. The same xid is used for both the AuthReq and the CapReq and subsequent CreditReq requests. Using the same xid for many requests makes it impossible for the Gateway to distinguish between repeated transactions versus new transactions.

For example, how could a Gateway possibly determine whether two valid CredReq requests were to be interpreted as two individual credits or a retry of a single request.

request 1: <$xid_1$, $mid_m$, $tid_t$, $rrpid_1$, $reqdate_1$, $reqdata_1$> (perhaps a CredReq for $10.00)

request 2: <$xid_1$, $mid_m$, $tid_t$, $rrpid_2$, $reqdate_2$, $reqdata_1$> (perhaps a new CredReq for $10.00)

could also be interpreted as . . .

request 1: <$xid_1$, $mid_m$, $tid_t$, $rrpid_1$, $reqdate_1$, $reqdata_1$> (perhaps a CredReq for $10.00)

request 2: <$xid_1$, $mid_m$, $tid_t$, $rrpid_2$, $reqdate_2$, $reqdata_1$> (perhaps a retry of above)

The reqdates are different in both cases, because the date is generated along with the rrpid to thwart replay attacks. In this example, the Gateway will not be able to determine whether the second CreditReq should be performed or whether it is simply a retry to request 1 with $rrpid_1$. The Gateway must know whether or not to apply a new credit or to deliver a response that it may already have from the host (it may have came too late for the first attempt or have been lost on the way to vPOS). If no response was logged from the host for request 1, then the Gateway could repeat its original request to the host when receiving request 2. In a sense, the Gateway will act as an intelligent request and response cache.

The Gateway splits the rrpid number space into two parts. One main part that will remain the same for the same request across all its retry attempts and a smaller portion to indicate the number of retry attempts. Then, rrpidRetryCount=rrpid MOD MAXRETRIES (0 for initial request, >0 for a retry)

The initial rrpids generated by vPOS software are equal to 0 MOD MAXRETRIES, and in subsequent retries the lower order digits are incremented by one for each retry attempt. This requires extra data stored in the vPOS application. The vPOS software persistently stores the rrpid used (which contains the retry count of the transaction) so that repeated attempts will follow the correct semantics.

In general, the Gateway will support the following logic [assuming the second request is fresh and not a replay attack]:

If two requests,
request 1: <$xid_1$, $mid_m$, $tid_t$, $rrpid_1$, $reqdate_1$, $reqdata_1$>
request 2: <$xid_1$, $mid_m$, $tid_t$, $rrpid_2$, $reqdate_2$, $reqdata_1$>
are received at $t_1$ and $t_2$ (where $t_2 > t_1$) and, $$(rrpid_1 - (rrpid_1 \text{ MOD MAXRETRIES})) \equiv (rrpid_2 - (rrpid_2 \text{ MOD MAXRETRIES}))$$

then the Gateway will interpret the second request as a new request.
But if, $$(rrpid_1 - (rrpid_1 \text{ MOD } 100)) \neq (rrpid_2 - (rrpid_2 \text{ MOD MAXRETRIES}))$$

then the Gateway will interpret the second request as a retry request.

In addition to being able to distinguish between a retry and a new request, the proposed rrpid scheme can be used to determine how many vPOS requests were lost in the Internet. This is a useful value-added service, for example, for system management purposes.

Robustness and Error Handling Issues

There are several robustness issues that need to be addressed. The basic flow is that vPOS sends a request to the Gateway, the Gateway logs the SET key fields from the incoming attempt in the database. The Gateway then generates a host request, which it logs completely in the database. The host handles the request and generates a response that is directed towards the Gateway that when received is logged completely in the Gateway database. Finally, the Gateway generates a SET response to vPOS, the contents of which is not logged in the database.

If the Gateway has not received the request or receives the request but is not able to log the request in the database, then it is easily handled by a vPOS retry attempt. This recovery action needs no further discussion. In general, if the vPOS does not receive a reply to a request it has sent to the Gateway, then it must retry persistently until a response is received. Retry attempts from vPOS for the same request include the same base portion of the rrpid but a different value in the retry counter, as discussed above.

The Gateway handles replay attacks as discussed above.

If the Gateway receives a request that it has already received from vPOS, then there could be several possible dispositions:

a) the request had already been handled completely with the host, and a host response is in the Gateway database. In this case, the Gateway can simply translate the host response to a SET response and send it to vPOS.

b) the request had been sent to the host before (as determined by a database field), but a response from the host is not on file. In this case, the Gateway retries the host request.

If the vPOS times-out for any reason, then it retries later using an rrpid that indicates a retry attempt. If the Gateway receives a late-response (after vPOS has given up), then it simply logs it in the database for that retry attempt (if no retry attempt for the transaction is still outstanding at the host). There is a rare situation in which the original response could arrive so late that it could be confused with the response from a currently outstanding retry attempt with the host. This situation is logged, and the first response is not sent back to vPOS.

A response from the host indicating a successful transaction may get lost on the way back to the Gateway or not be able to be logged in persistent storage in the Gateway. In either case, vPOS is in a situation in which the retry request when received by the host may result in a response from the host indicating that the request is a duplicate. The vPOS software should be able to handle this situation. In the LEGACY case, when a duplicate post is received by the host, the second one automatically causes the first one to void, and the second transaction also fails. In this case, vPOS should retry the transaction under a new rrpid. If the transaction goes through end-to-end, then all effects of the previous transactions will not matter.

TokenOpaque Contents

The Gateway requires information captured at the time of an AuthReq that must be repeated to the host at the time of the associated CapReq. The mechanism of choice (built into SET) for this is enabled utilizing this data in the TokenOpaque token of the CapToken which is sent in an AuthRes. This CapToken is stored at the Merchant system and represented to the Gateway at the time of the CapReq. The format of a TokenOpaque is an OctetString.

The following general format (not specific to LEGACY) is proposed for capturing this information:

| Field Name | Field Data Type | Explanation/Example |
|---|---|---|
| VersionName | char(8) | "LEGACY" |
| Version-Revision | char(8) | "1.0" (generally <major, minor>) |
| PILength | integer | length of PI data |
| PI | unsigned char(PILength) | strongly encrypted |
| HostSpecData-Length | integer | length of host specific data |
| HostSpecData | unsigned char(HostSpecDataLength) | host specific data |

Host Specific Data (LEGACY-only)

For "LEGACY" version "1.0", it is proposed that newline separated "name[length]=value" pairs be used to store the host specific data. A null character will terminate the host specific data. The following host specific data (name value pairs) will be included:

BrandID
CPSACIFlag
CPSTransactionId
CPSValidationCode
VisaResponseCode
MerchantCategoryCode
EntryMode NOTE: PI contains PAN and ExpirnDate.

Proposal for AVS Data Encoding The "Address Verification" data element for the "Address Verification Service" (AVS) is defined in SET as an IA5String. Each host may require different data to be sent to use the AVS feature. The Gateway extracts the information from this to inter-work with the legacy systems. A well-defined format for the AVS data is generally required.

For example, the following data structure is utilized to deliver the AVS data.

StreetAddress1=800 El Camino Real\n
StreetAddress2=Suite 400\n
City=Menlo Park\n
StateProvince=CA\n
Country=USA\n
PostOfficeBox=\n
ZipPostalCode=94025\n
\n An empty line indicates the end of AVSData.

The detailed information that is available for the Address Verification Service depends on the Payment Window that captures the data from the consumer.

AVS Data (LEGACY-only)

For "LEGACY" version "1.0" the ZipPostalCode name value pair is required. The Gateway will only use the first 5 characters of this value.

Transaction Replay Attacks

The processing of Internet-based payment transactions is a coordinated interaction between the Internet Transaction Gateway and the vPOS servers that is based on the following principles. A vPOS terminal, as the initiator of the payment transaction, is responsible for the round-trip logical closure of the transaction. A vPOS will retry a transaction that has been initiated with the Gateway in which the response for the request was never received from the Gateway. A vPOS terminal selects out of a pre-assigned range, a Terminal-Id that is to be used by the Gateway in a request to the host processor. This data element is transported from the vPOS to the Gateway along with the payment-related information. The Terminal-Ids must be unique among the concurrent vPOS instances on a vPOS server system. However, the Terminal-Ids have no history. For example, a subsequent Force Post transaction need not use the same Terminal-Id as the original Authorization transaction. The vPOS is responsible for making sure that only one request is outstanding for the same <Merchant-id, Terminal-id> data elements from a vPOS server system. The Gateway does not know that a response was successfully received by vPOS. As a result, the vPOS is responsible for initiating any retry attempts. The Gateway does not initiate a retry attempt with the host processor without an explicit retry request from the vPOS. When asked to retry a request with the host, the Gateway performs a relational database look-up and delivers a response that has already been received from the host processor but was previously missed by the vPOS. This behavior of the Gateway is also known as the "transaction response cache." The Gateway needs to know that a vPOS request is a retry of something already sent. The prior request may or may not have been received. A solution for determining the difference between a retry attempt and a new request is described above. The vPOS understands the "canonical" error codes that it will receive via the Gateway and initiates the proper recovery action or generates the appropriate user-interface dialog or both.

Figure 26:
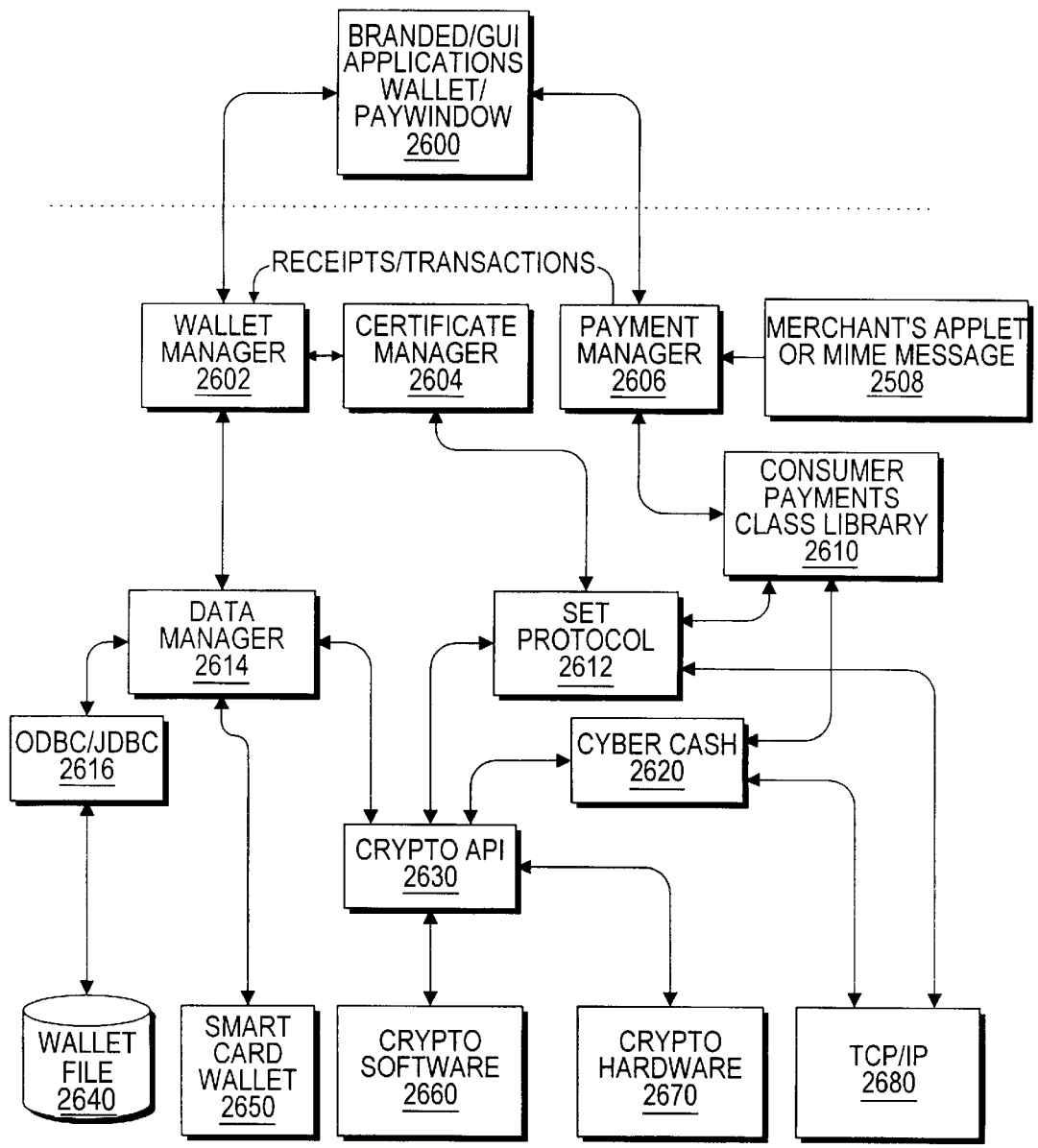
FIG. 26 is an architecture block diagram in accordance with a preferred embodiment.

FIG. 26 is an architecture block diagram in accordance with a preferred embodiment. Processing commences at function block 2600 where the Graphical User Interface (GUI) part of the application is initialized. GUI application 2600 provides the consumer with support for ordering and making payments during the shopping process. There are also GUI components provided for wallet creation; importing, certificate, and payment method creation and maintenance; and for transaction register review, and reporting. The screen designs, and their associated logic, for the helper applications and applets are individually discussed in detail below.

A Certificate Manager 2604 manages the automatic downloading of a consumer's certificate from a bank, validation of a consumer's and a merchant's certificates, and automatic requisition of certificate renewal.

A Payment Manager 2606 coordinates and completes the payment request that is received from the merchant system. The payment request is received via a MIME message in the native code implementation or via an applet in the Java implementation. The payment request received contains the final GSO, Ship-To name, merchant certificate, merchant URL, coupons, and the payment amount. Payment manager 2606 then communicates with the payment related GUI component to interact with the consumer to authorize and complete the payment transaction. Payment manager 2606 is also responsible for determining the payment protocol based on the consumer's payment instrument and the merchant's preferred payment protocol.

Payment manager 2606 includes a well-defined Application Programming Interface (API) that enables Original Equipment Manufacturers (OEMs) to interface with payment manager 2606 to make payments to specific HTTP sites.

Payment manager 2606 enforces standard operations in the payment process. For example, the receipt and the transaction record can automatically be transferred to the Wallet file once the payment is completed.

Figure 27:
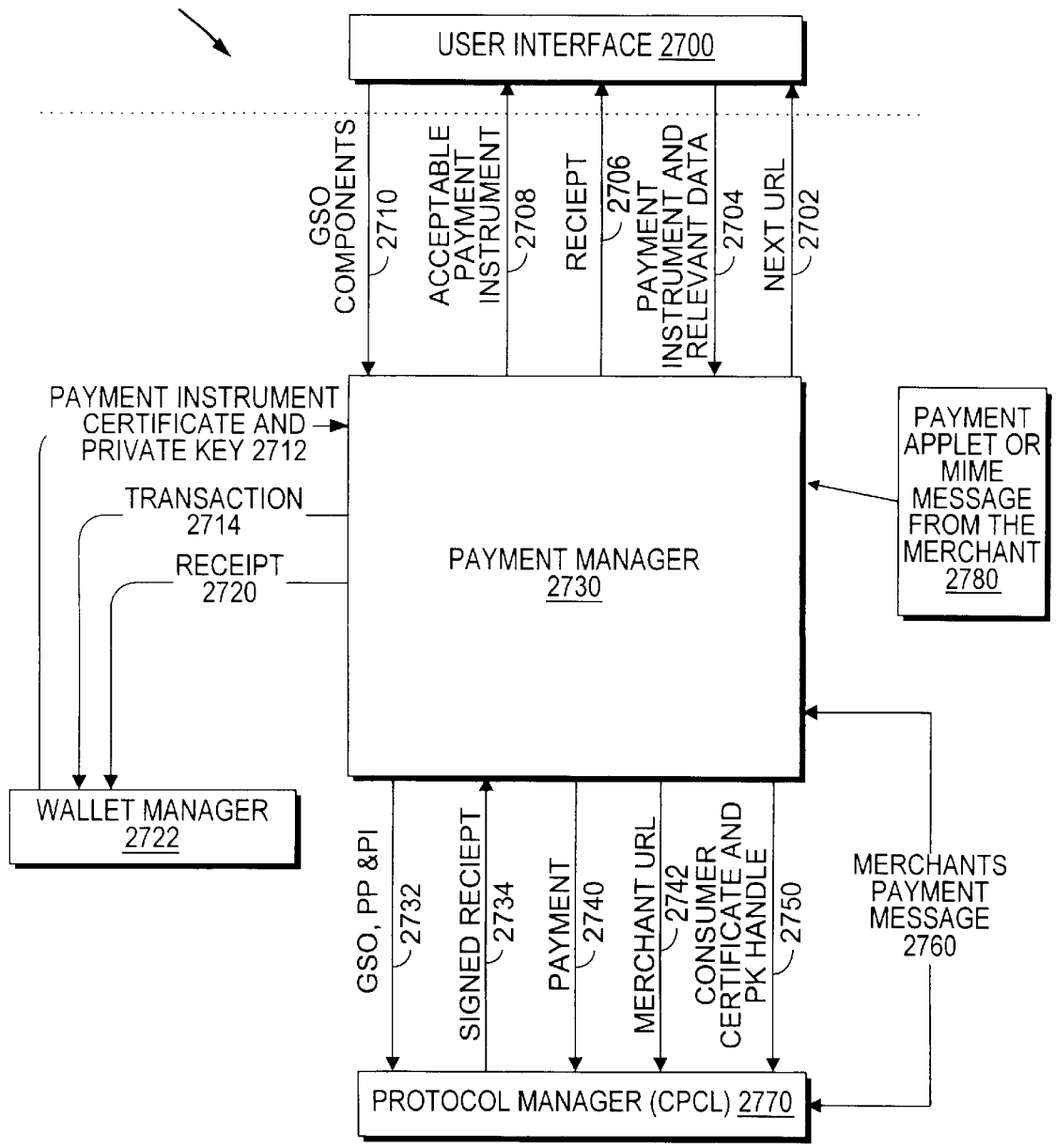
FIG. 27 is a block diagram of the payment manager architecture in accordance with a preferred embodiment.

FIG. 27 is a block diagram of the payment manager architecture in accordance with a preferred embodiment. A user (e.g., customer) interfaces with a payment manager 2730 via a user interface 2700 that responds to and sends a variety of transactions 2702, 2704, 2706, 2708, and 2710. The transactions include obtaining the next record, payment record, receipt, acceptance of the payment instrument, and GSO components. In turn, payment manager 2730 sends transactions 2714 and receipts 2720 to wallet manager 2722 and receives payment instruments, certificates, and private keys from a wallet manager 2722.

Payment manager 2730 also sends and receives transactions to a protocol manager 2770 including a merchant's payment message 2760, a consumer certificate and a PK handle 2750, a merchant URL 2742, a payment 2740, a signed receipt 2734 and a GSO, Selected Payment Protocol, and a Selected Payment Instrument 2732. Payment manager 2730 also accepts input from the payment applet or MIME message from the merchant as shown at function block 2780. One aspect of the payment processing is a Consumer Payments Class Library (CPCL) 2770, which encapsulates the payment protocols into a single API. By encapsulating the payment protocols, applications are insulated from protocol variations. A SET Protocol provides an implementation of the client-side component of the Secure Electronic Transaction (SET) Protocol. A complete implementation of the client-side component of the CyberCash micro-payment protocol is also provided.

Wallet Manager 2722 provides a standard interface to the wallet. Wallet Manager 2722 defines the wallet database structures and the payment instrument data structures, controls the access to the wallet, and provides concurrency checking if more than one application attempts to open the same wallet. The interface to wallet manager 2722 is published to allow OEMs to interface with the wallet manager and access the wallet database.

Wallet manager 2722 includes the following sub-components:

The Wallet Access component provides an interface to read and write wallet information.

The Transaction Manager component provides an interface to read and write transactions corresponding to a wallet into the wallet database.

The Payment Instrument Manager component manager provides a common interface to the specific payment instrument access components.

The Credit Card Access, Debit Card Access, Check Access components deal with a specific payment instrument. A Data Manager provides storage and retrieval of generic data items and database records. It is assumed that data fields, index fields, or entire data records can be marked as encrypted, and the encryption process is largely automated. The data manager has no specific knowledge of database records appropriate to different payment methods. This layer is separated out so as to reduce changes required when new payment methods are introduced. However, RSA key pairs and certificates might be considered as "simple" data types. This component also provides an abstraction, which supports wallet files stored on computer disk or in smart cards.

The Open Data Base Connectivity (ODBC)/Java Data Base Connectivity (JDBC) component provides Data Base Connectivity for formal database components. An embodiment of the Smart Card Wallet allows wallet data to be stored or secured by a cryptographic token or both.

A preferred embodiment includes a single file or directory of files comprising a "wallet", which includes personal information and information about multiple payment methods. These payment methods (Visa cards, debit cards, smart cards, and micro-payments) also include information such as account numbers, certificates, key pairs, and expiration dates. The wallet can also include all the receipts and transaction records pertaining to every payment made using the wallet. A Cryptographic API component provides a standard interface for RSA and related cryptographic software or hardware. This support includes encryption, signature, and key generation. Choice of key exchange algorithm, symmetric encryption algorithm, and signature algorithm are configurable. A base class stipulates generic behavior, and derived classes handle various semantic options (e.g., software-based cryptography versus hardware-based cryptography.)

The Cryptographic Software portion provides RSA and DES support. This may be provided utilizing the SUN, RSA, or Microsoft system components depending on the implementation selected for a particular customer. Cryptographic Hardware creates a lower level API which can underpin the Cryptography API and be utilized to replace Cryptography Software with an off-the-shelf cryptography engine. The message sequence charts describe the flow of messages and data between the consumer, the browser, or the various major components of the system of FIG. 26. The major components of the system are the Merchant system, which includes the vPOS, the PayWindow, and the Payment Gateway. The merchant system allows a consumer to shop, accept the payment transactions sent by the PayWindow application, and send payment transactions to the acquiring bank. The Consumer Payments Class Library (CPCL) module is a layer within the application, which sends the payment transactions securely from the consumer to the merchant.

Figure 28:
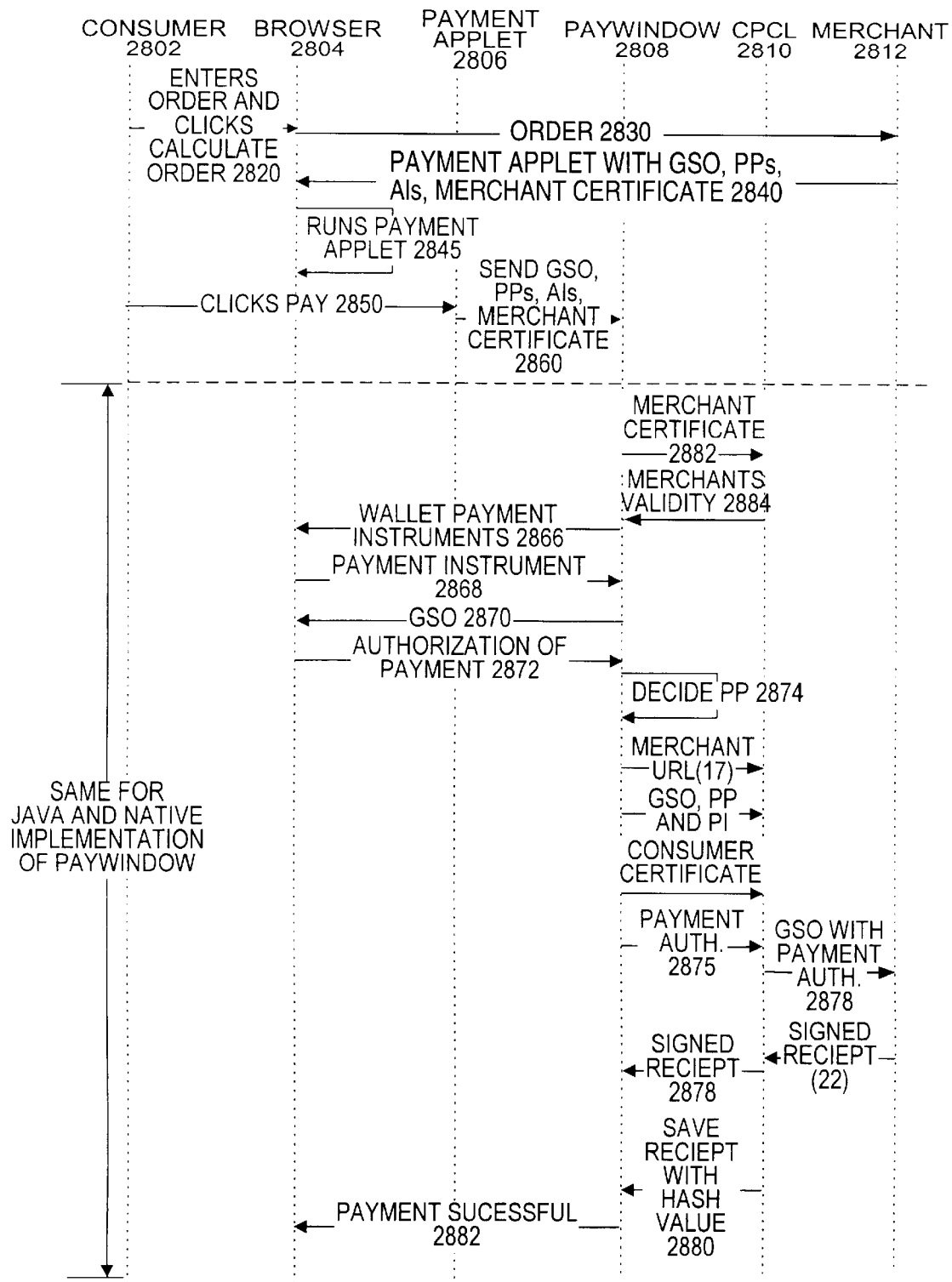
FIG. 28 is a Consumer Payment Message Sequence diagram in accordance with a preferred embodiment.

FIG. 28 is a Consumer Payment Message Sequence diagram in accordance with a preferred embodiment. The diagram presents the flow of messages between the consumer, the browser, the merchant system, the PayWindow application, and the CPCL. This message flow describes the payment process from the time an order is completed, and the consumer elects to pay, to the time the payment is approved, and the receipt is returned to the consumer. The difference between the Native implementation and Java implementation of the PayWindow application is in the delivery of the order information to the PayWindow. Once the order information is received by the PayWindow, the flow of messages and data is the same for both implementations. In the case of the Native implementation, the order information is delivered via a MIME message. This MIME message is sent to the PayWindow by the browser via a document file. In the Java implementation, the order information is delivered to the PayWindow by an applet. The merchant system sends an applet with the order information to the browser which in turn delivers the order to the PayWindow. Once the order is received, the PayWindow interacts with the consumer and the Protocol modules for the completion of the payment process.

Enters Order and Clicks Calculate Order 2820

This message represents the consumer order entry and the clicking of the 'Calculate Order' button. The consumer's shopping experience is all condensed into this one message flow for the purpose of highlighting the payment process. The actual implementation of the shopping process varies, however, the purpose does not, which is the creation of the order.

Order 2830

This message represents the order information, which is sent by the browser to the merchant via an HTML form.

Payment Applet with GSO, PPPs, AIs, merchant certificate, and URL 2840

On receipt of the order, the merchant system calculates the payment amount. This message represents the HTML page that is sent by the merchant system detailing the payment amount along with the Java payment applet, which contains the GSO, PPPs, AIs, merchant certificate, and URL.

Run Payment Applet 2845

The Java enabled browser runs the Payment applet. The applet displays a button called "Pay" for the consumer to click. This is embedded in the HTML page delivered by the merchant.

Clicks Pay 2850

This message represents the clicking of the Pay button on the browser by the consumer after confirming the payment amount.

GSO, PPPs, AIs, Merchant Certificate, and URL 2860

This message represents the GSO, PPPs, AIs, merchant certificate, and the merchant URL carried by the Java applet. The Java applet now delivers these to the PayWindow application.

Merchant Certificate 2862

This message represents the merchant's certificate, which is sent to the CPCL module for checking the validity of the merchant.

Merchant's Validity 2864

The CPCL modules examine the merchant's certificate and send this message to the PayWindow indicating whether or not the merchant is a valid merchant.

Wallet, Payment Instruments 2866

This message represents the wallets and payment instruments that is displayed to the consumer. Not all payment instruments from a wallet is shown to the consumer. Only the ones accepted by the merchant is shown.

Payment Instrument 2868

This message represents the payment instrument selected by the consumer. This message is created in the current design when the user double clicks on the payment image in the "Select Payment Method" Window.

GSO 2870

This indicates that the GSO is displayed to the consumer in the "Make Payment Authorization" screen.

Authorization of Payment 2872

This message represents the authorization of the payment by the consumer. The consumer authorizes the payment by clicking the 'Accept' button on the "Payment Authorization" screen.

Decide Payment Protocol 2874

Once the consumer authorizes the payment, the payment protocol is decided by PayWindow based on the merchant's Payment Protocol Preferences and the consumer selected payment instrument.

Payment Authorization 2875

These messages represent the merchant's URL, the GSO, the payment protocol (PP) to use, the account number, the certificate, and the private key handle (PK) associated with the payment instrument, which is sent to the protocol module.

GSO with Payment Authorization 2876

This message represents the payment instructions that is sent by the protocol module to the Merchant system. The GSO, PI, consumer certificate, and PK is packaged based on the payment protocol.

Signed Receipt 2878

This message represents the digitally signed transaction receipt received by the protocol module from the merchant.

Save Receipt with Hash Value 2880

The digitally signed transaction receipt is saved by the PayWindow for future reference.

Payment Successful 2882

This indicates that the transaction receipt and the 'payment successful' have been displayed to the consumer.

Certificate Processing

A payment instrument must be certified by a "certificate issuing authority" before it can be used on a computer network. In the case of credit card payments, the issuer may be one of the card issuing banks, but it may also be a merchant (e.g., SEARS), a transaction acquiring bank, or an association such as VISA or Mastercard.

Payment instrument information is stored in the consumer's wallet. The certificate that authorizes the payment instrument will be stored along with that data in a secured database. The process of acquiring a certificate is described below. A certificate can be delivered to a consumer in a preconfigured wallet. The consumer receives a wallet, which includes the certificate together with the necessary details associated with a payment instrument including a payment instrument bitmap that is authorized by a certificate issuing authority or the agencies represented by the issuing authority.

Obtaining a Certificate

A consumer will deliver or cause to be delivered information to a certificate issuing authority. FIG. 29 is an illustration of a certificate issuance form in accordance with a preferred embodiment. A user may fill out the form on-line, on paper and mail it in, or get his bank or credit card company to deliver it. The consumer delivered data will usually contain a public key belonging to a security key pair generated by consumer software. This information will normally be mailed to the consumer's address and actuated by a telephone call from the consumer. The certificate authority takes this information and uses it to validate that he is indeed entitled to use the payment method. This processing normally takes a few days to accomplish. Information will normally be exchanged with the organization issuing the payment method in the physical space if there is one and with credit agencies. The certificate information is loaded into the consumer's software to enable payment processing to proceed online.

In some cases the consumer will be able to select details about a payment instrument holder (wallet) he desires to own. This may be the icon representing a holder, the access password, or other information. After creating the certificate, the issuing authority can use information received in the certificate application to create a custom payment instrument holder ready to use. This payment instrument holder generally includes the following information. Payment instrument information including a card number 2900 and an expiration date 2902. Personal information including a name 2904, an address 2906, a social security number 2908, and a date of birth 2910.

Figure 30:
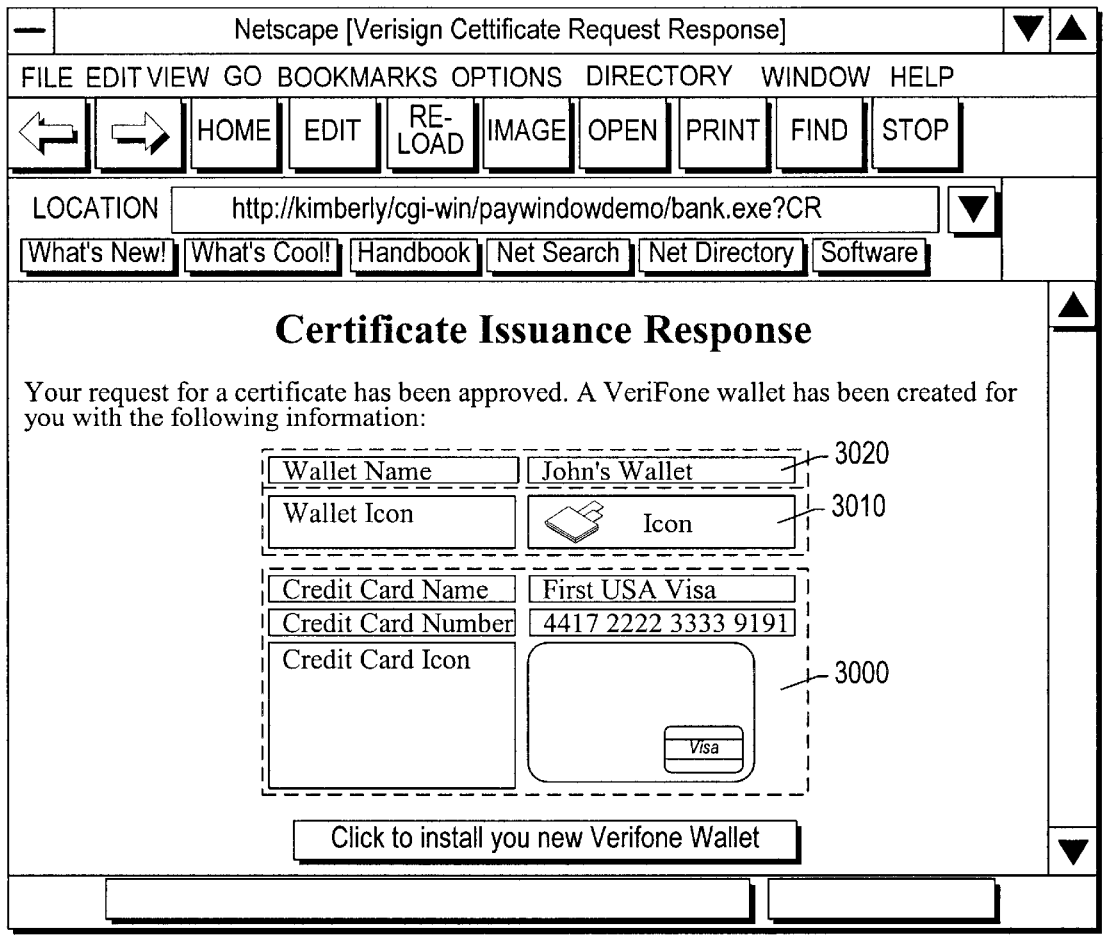
FIG. 30 illustrates a certificate issuance response in accordance with a preferred embodiment.

The associated certificate (e.g., the well-known X.500 standard), an associated public key, or in some cases public and private key pair (e.g., RSA), and an approved bitmap representing the payment instrument are provided to the requesting consumer. FIG. 30 illustrates a certificate issuance response in accordance with a preferred embodiment. An approved bitmap for a VISA card is shown at function block 3000. Also, a default payment holder 3010 and a default payment holder name are provided with the certificate issuance. After the consumer acquires payment instrument holder 3010, the payment instrument holder is immediately visible to him in his collection of payment instrument holders.

Figure 31:
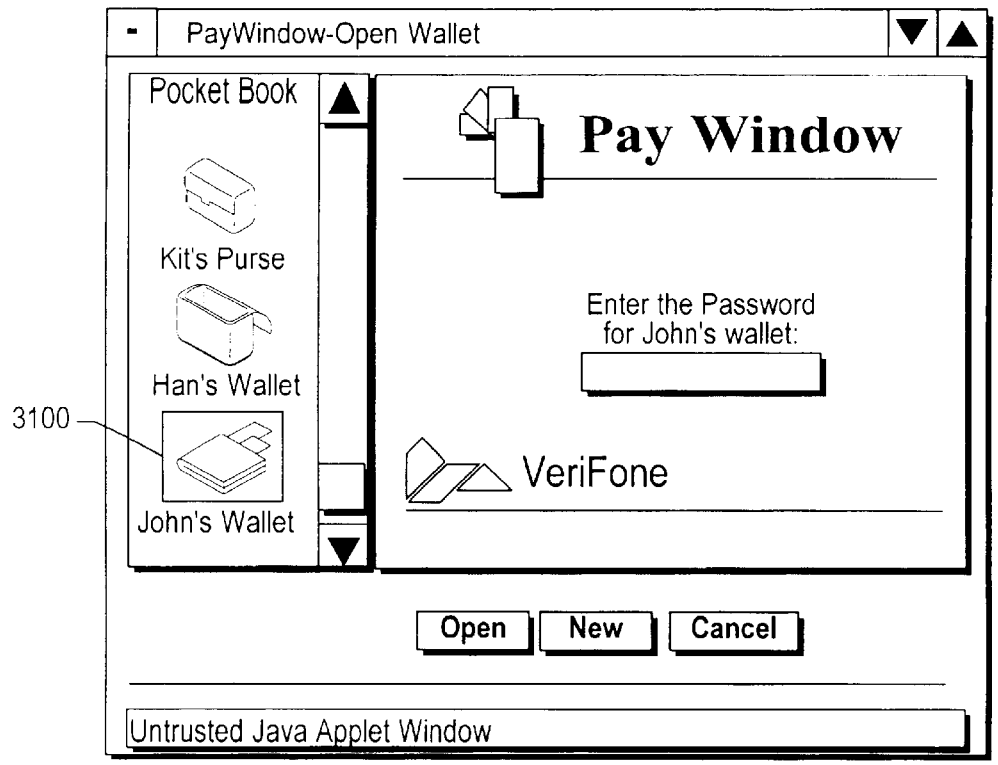
FIG. 31 illustrates a collection of payment instrument holders in accordance with a preferred embodiment.

FIG. 31 illustrates a collection of payment instrument holders in accordance with a preferred embodiment. A predefined payment instrument holder 3100 is the same JOHN's WALLET that was predefined based on defaults by the certificate issuance form.

Figure 32:
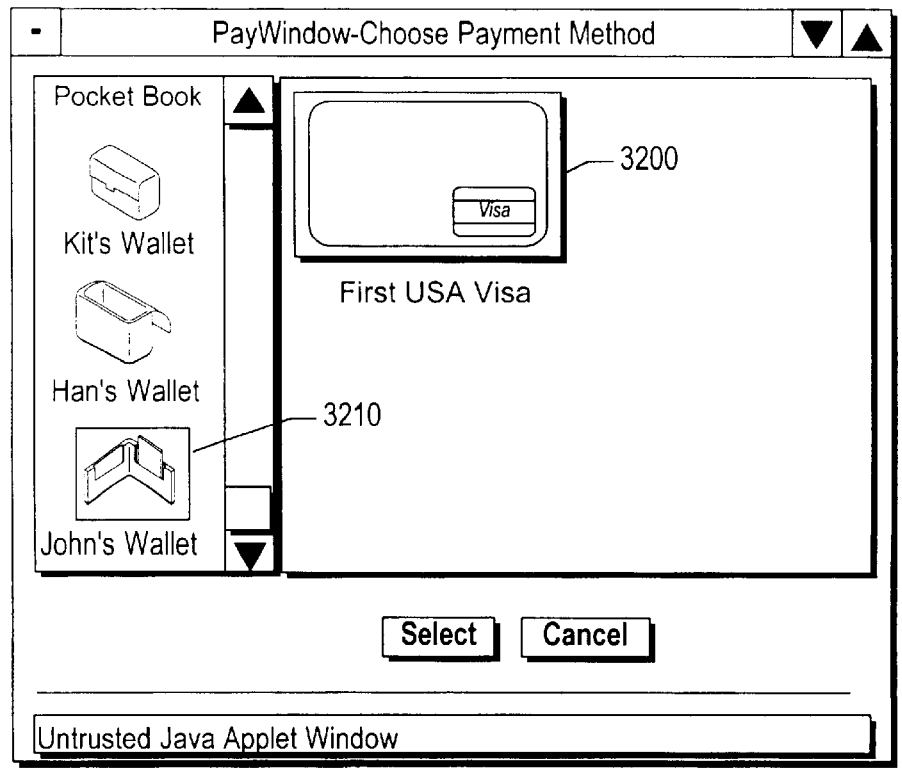
FIG. 32 illustrates a default payment instrument bitmap in accordance with a preferred embodiment.

FIG. 32 illustrates a default payment instrument bitmap 3200 associated with predefined payment instrument holder 3210 resulting from the consumer filling in and obtaining approval for a VISA card in accordance with a preferred embodiment.

Figure 33:
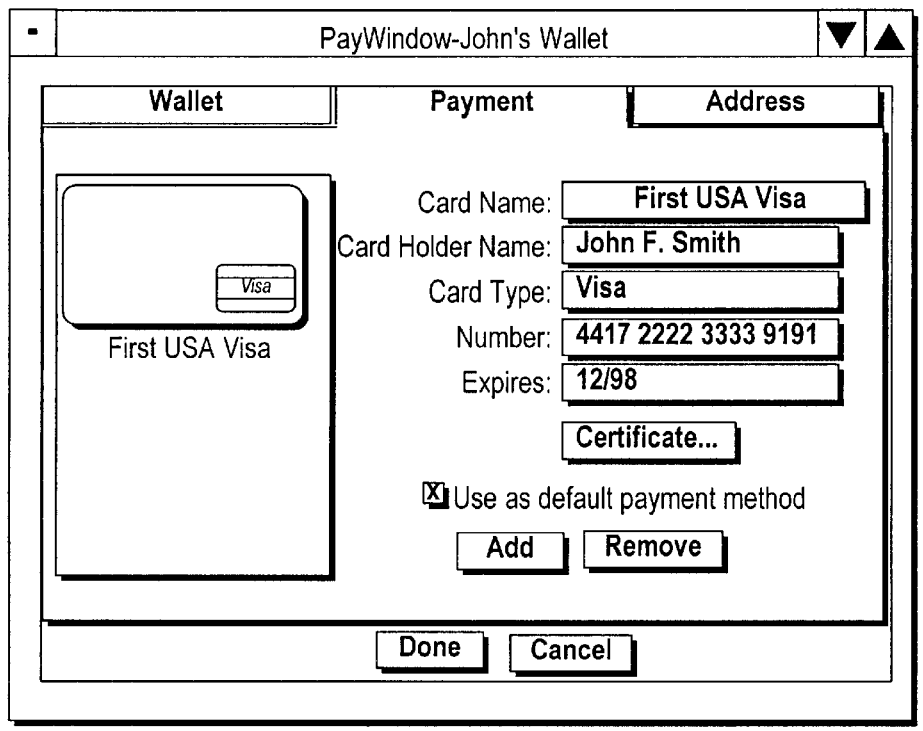
FIG. 33 illustrates a selected payment instrument with a fill-in-the-blanks for the cardholder in accordance with a preferred embodiment.

FIG. 33 illustrates a selected payment instrument with a fill-in-the-blanks for the cardholder in accordance with a preferred embodiment. The next time the payment instrument holder is opened in a payment context, the certificate issuing authority's approved instrument bitmap can be used to select the payment instrument and utilized to make purchases.

Figure 34:
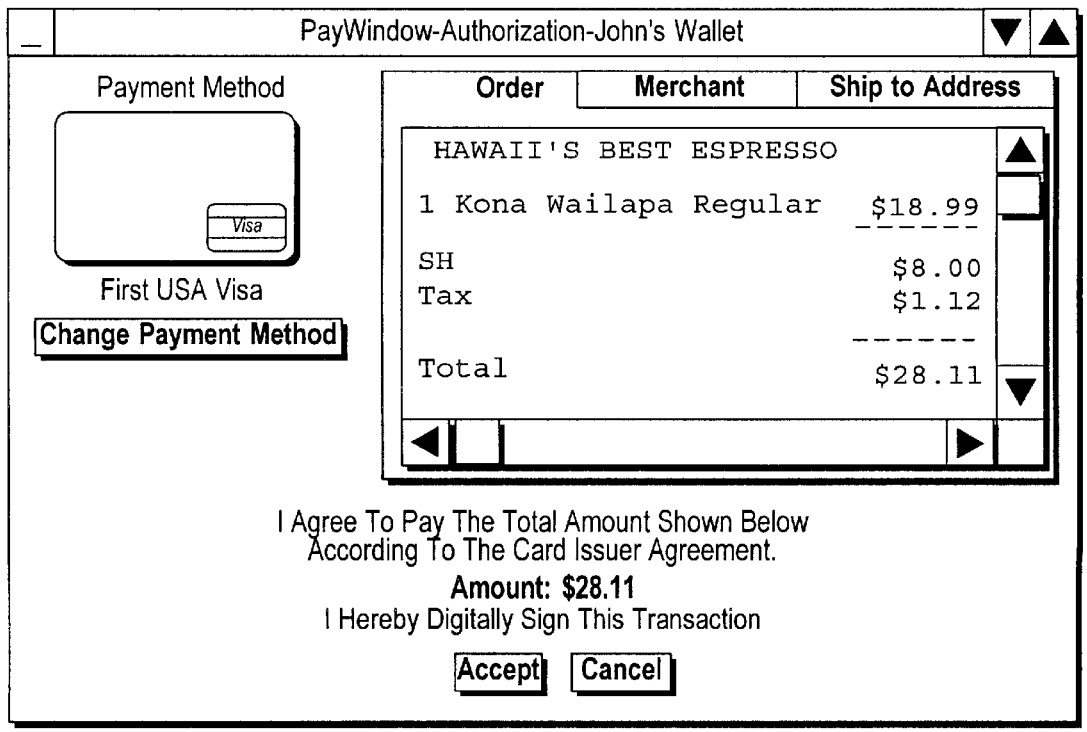
FIG. 34 illustrates a coffee purchase utilizing the newly defined VISA card in accordance with a preferred embodiment.

FIG. 34 illustrates a coffee purchase utilizing the newly defined VISA card in accordance with a preferred embodiment.

Figure 35:
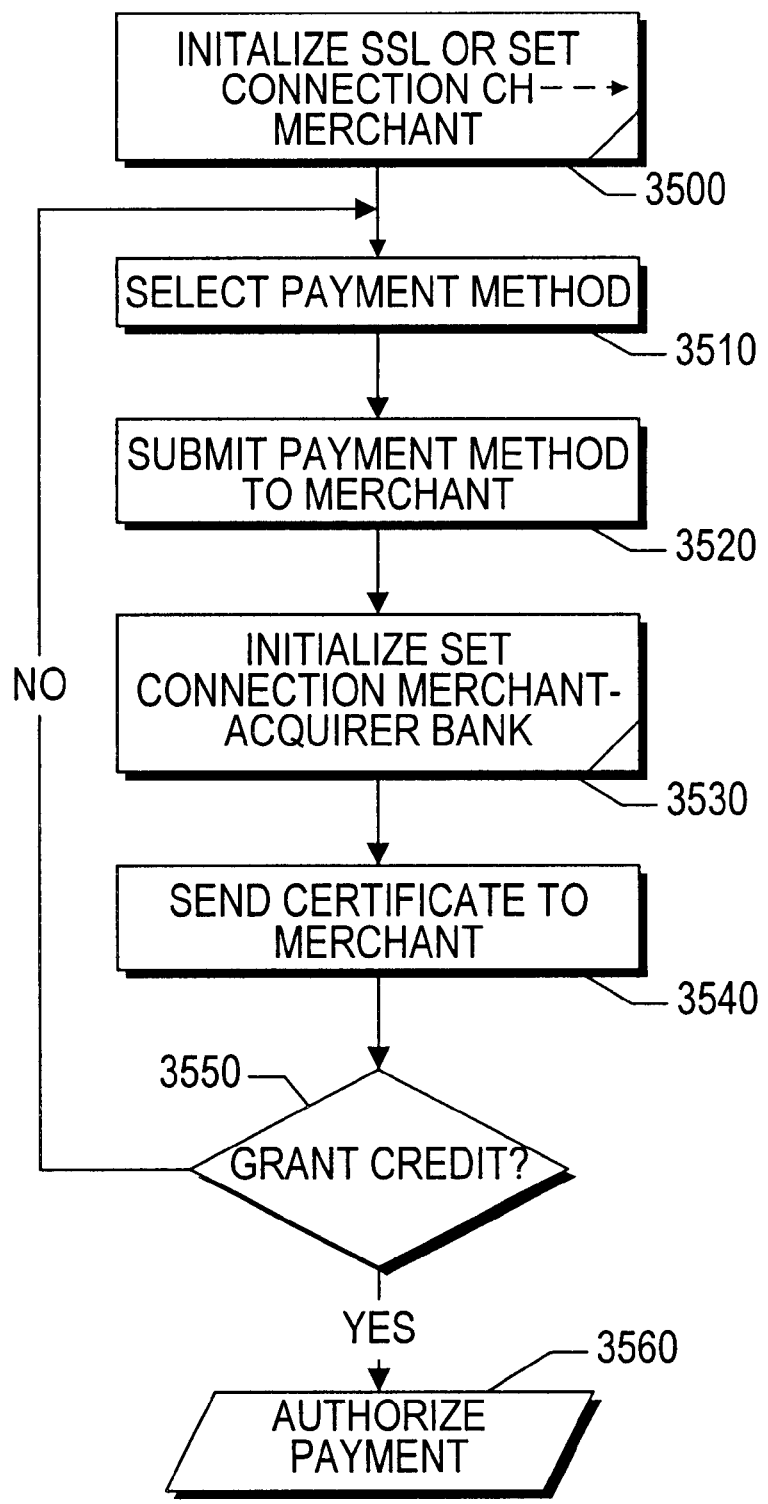
FIG. 35 is a flow diagram of conditional authorization of payment in accordance with a preferred embodiment.
Figure 36:
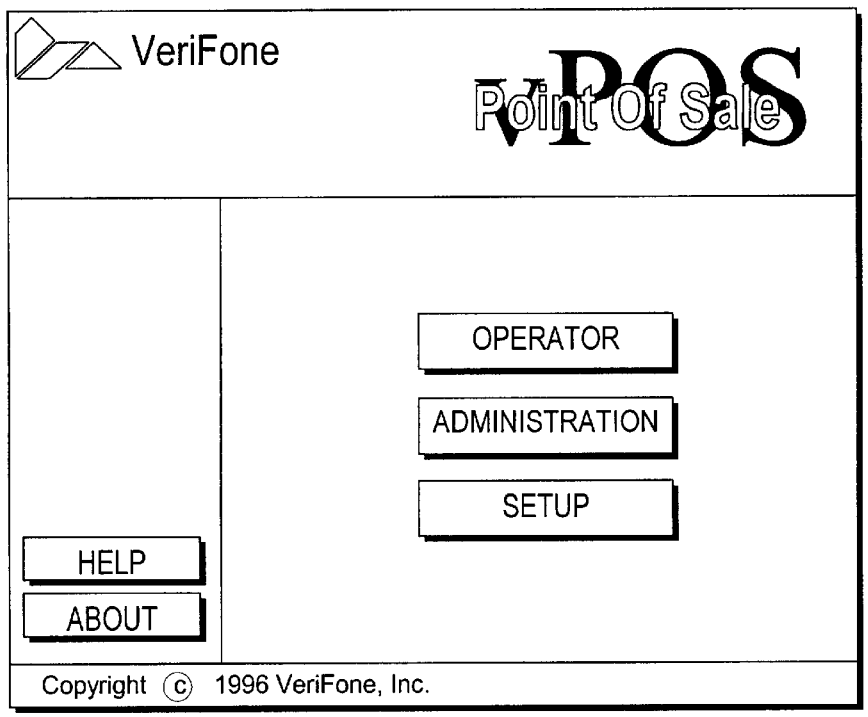
Figure 37:
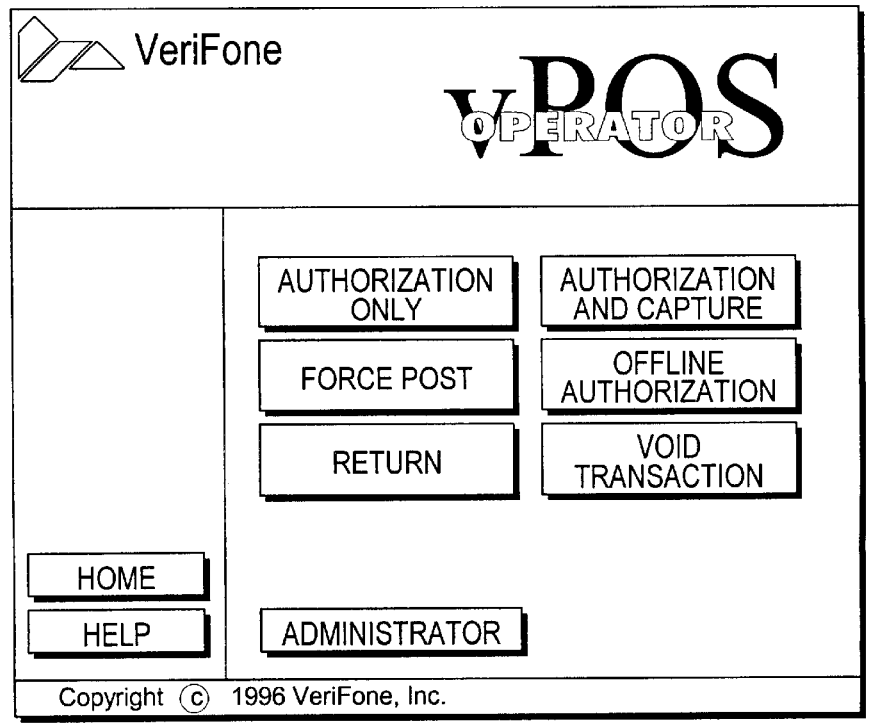
Figure 38:
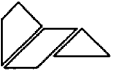
Figure 39:
Figure 44:
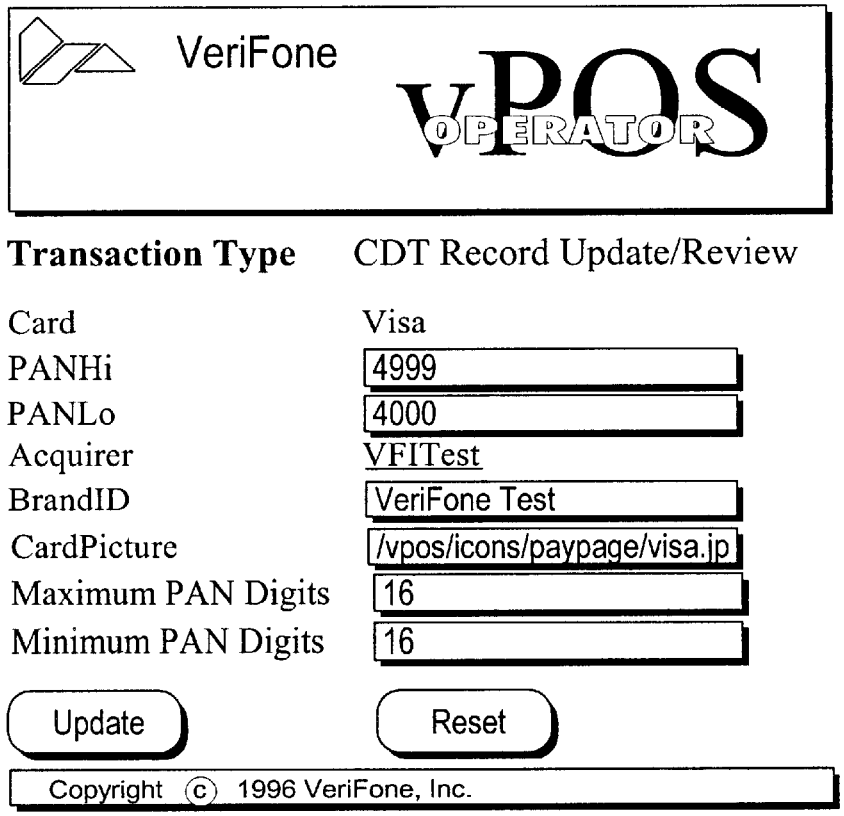
Figure 45:
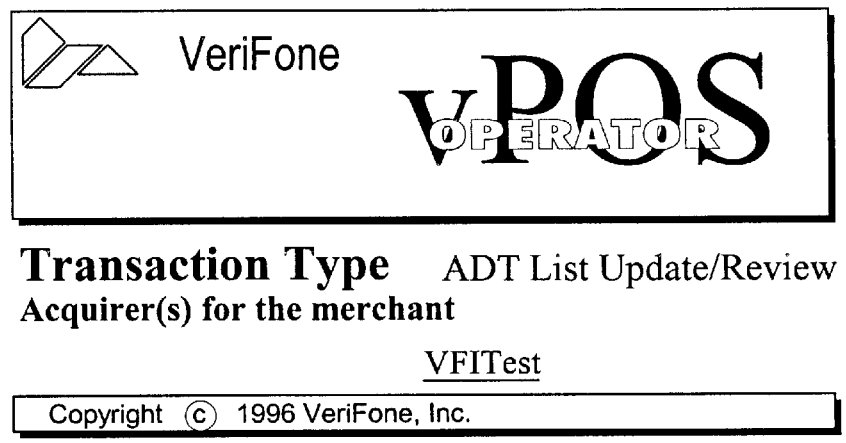
Figure 46:
Figure 47:
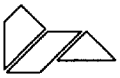

FIG. 35 is a flow diagram of conditional authorization of payment in accordance with a preferred embodiment. Processing commences at function block 3500 at which the program initializes the connection between the cardholder and the merchant for the purposes of shopping. After the cardholder completes shopping, a new SSL connection is established, which provides authenticating information to the merchant. At this point, the merchant is able to execute payment functionality (based on SSL or SET) conditionally, based upon the quality and character of the digital signature and the certificate used to validate the signature. Then, at function block 3510, the cardholder selects the payment instrument for the particular transaction. For example, payment instruments include VISA, MASTERCARD, AMERICAN EXPRESS, CHECK, SMART CARD, or DEBIT CARD. The payment method is then submitted to the merchant at function block 3520. The merchant then initializes the SET connection to the acquiring bank at function block 3530 if the connection is not already established. Then, at function block 3540, the certificate is submitted to the merchant from the acquiring bank. The certificate includes a public key portion and a private key used as an irrebutable digital signature to authenticate the parties to the transaction. The certificate also includes information on the level of credit risk, which allows a merchant to conditionally decide on the authorization or rejection of credit under a particular payment instrument based on their risk level and the merchant's personal comfort level with the ability of the cardholder to pay. This processing has not previously been possible, because the information returned from the authorizing bank did not include a level of credit risk a cardholder posed, rather it only contained credit rejected or approved information.

A detailed description of the Gateway internals is presented below in accordance with a preferred embodiment.

FIGS. 36 through 48 are vPOS screen displays in accordance with a preferred embodiment.

Figure 49:
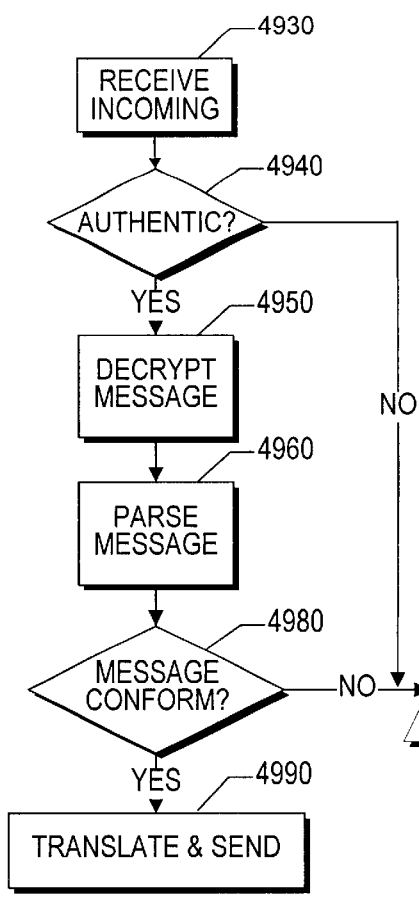
FIG. 49 shows how the vPOS authenticates an incoming response to a request in accordance with a preferred embodiment.

FIG. 49 shows how the vPOS authenticates an incoming response to a request in accordance with a preferred embodiment. Processing commences at function block 4930 when a message is received by the HTTPS, SET server, or other listener that originated the request to which this response corresponds. The message is passed to decision block 4940 to determine if the sending Gateway has transmitted an authentic message, and if the gateway is authorized to communicate with this vPOS. If the message is not authentic, then the message is logged as an error or possible attack, and the error is handled as shown in function block 4970. If the message is authentic, then the message is decrypted at function block 4950, and the PDU parses the message into name and value pairs. Then, based on the message type and the extended SET version information, the remaining message is parsed at function block 4960, and the message is checked for conformance to the appropriate specification as shown at decision block 4980. If the message does not conform, then it is logged and the error handled at function block 4970. If the message conforms to the proper specification in decision block 4980, then the message is translated into a standardized argument string to be passed to the appropriate executable or code entry point in the vPOS as shown in function block 4990. Thus, when a vPOS receives an incoming message from a Gateway and parses the Extended SET portion of the message, the message may cause the vPOS to execute a program that takes action or queries the user to take action.

Gateway Customization via the Extended SET Channel

Gateway customization in Extended SET is extremely powerful and a novel concept for vPOS processing. Each vPOS includes one or more "serial numbers" unique to each copy of the software (a serial number may be embedded in the software or may be a component of a public key certificate used in the software). Once a merchant has selected an acquirer and obtained the appropriate certificates, the vPOS can be customized utilizing the communication link and messages containing customization applications.

A bank distributes vPOS via different sales channels. The first sales channel is direct from a bank to an existing merchant with whom the bank already has an existing relationship. In this case, a version of vPOS already customized for a bank is sent to the merchant, either directly by a bank, or through a third-party distributor or service bureau. The customizations may involve modification or replacement of, for example, store front 1822, shopping cart 1824, pay page 1826, standard terminal administration transaction interface 1828–1830, or an extended terminal transaction interface 1834. This type of distribution is a standard model of distribution of software that is customized for small target market segments.

A distribution approach that innovatively uses the Extended SET channel is in which the potential merchant acquires, through some non-bank channel, a "generic" vPOS that has not yet been customized to interact with a specific bank. The generic vPOS can communicate with a "test gateway", which the merchant may use to experiment with the various features of vPOS and to test the integration of the vPOS into a total online storefront.

In order to actually transact business over the Internet, the merchant must first obtain a merchant ID from the merchant bank with which he signs an acquiring agreement. For online payment processing, the merchant must also obtain an appropriate set of digital credentials in the form of public key certificates and possibly additional passwords, depending on the financial institution. Once these credentials are obtained, the merchant is ready to customize the already-obtained generic vPOS to communicate with a merchant bank's gateway.

Using the built-in "serial number" certificate and the Test Gateway public key certificate (which is "hard-wired" into the vPOS software), it is possible to securely download a particular bank's customization applications to a specific copy of the vPOS software. Once the vPOS is appropriately configured, the last stage of customization download is to configure the vPOS so that it only responds to a public key certificate of the merchant's acquirer. This process is illustrated here in the context of a merchant who obtains a vPOS that talks to the VeriFone test gateway and desires to customize the vPOS to interact with a gateway at a bank.

The merchant has purchased a vPOS from a non-bank channel. The version communicates with the VeriFone Test Gateway. The merchant uses the gateway to learn about using vPOS and to test the integration of his storefront system with his payment system. The merchant also obtains certificates for payment processing from a bank, the merchant bank of choice for the merchant. The merchant is now ready to customize the generic vPOS to talk to the bank gateway.

Figure 50:
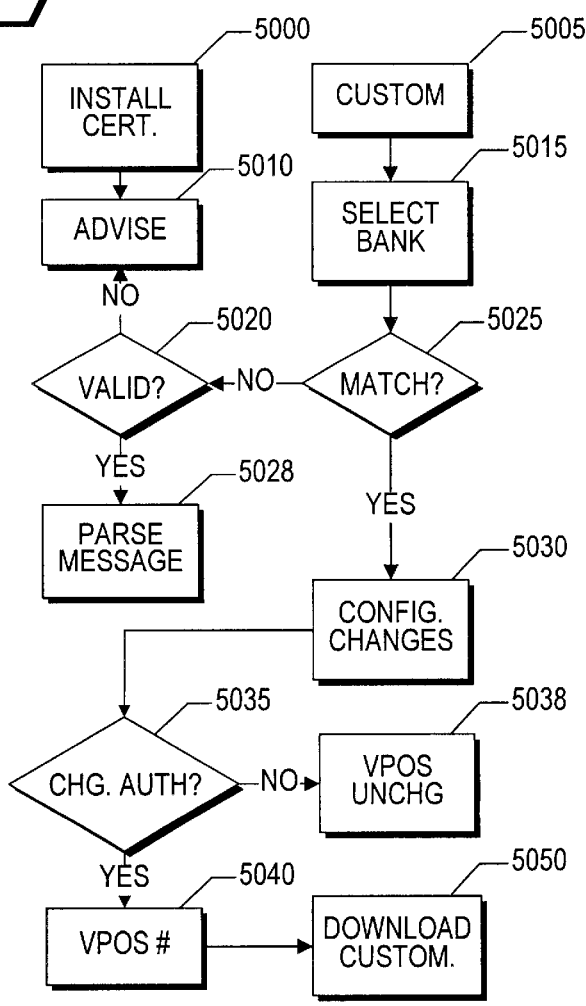
FIG. 50 is a flow diagram for the merchant interaction with the Test Gateway in accordance with a preferred embodiment.

FIG. 50 is a flow diagram for the merchant interaction with the Test Gateway in accordance with a preferred embodiment. The merchant begins at function block 5000 at which the newly-obtained merchant SET certificates are installed in the vPOS. The merchant then directs the vPOS to connect to the VeriFone Test Gateway by selecting this option from a vPOS terminal administration home page 5005. The choice of this option invokes an extended terminal admin page from the default set of such pages supplied with the generic version of vPOS. This program guides the customization process.

The merchant, interacting with the extended terminal admin page, navigates to the list of gateways, which is maintained by the Test Gateway and selects the bank to connect by selecting from the list of banks, at function block 5015. During this process, the merchant's public key certificates are uploaded to the Test Gateway, and checked (at decision block 5025) to verify that the certificates have been signed by the bank to customize the VPOS for the bank. If the certificates do not match, then the merchant is advised of the situation at function block 5028 and must select a different bank. If the certificates are not valid SET certificates as detected at decision block 5020, then the merchant is advised at function block 5028, and the session terminates. If the certificates are valid and match the selected bank, then customization continues at function block 5030.

The extended terminal administration program in vPOS receives a list of the customizations from the Test Gateway that must be performed to specialize the vPOS for a specific bank. Some of these customizations are mandatory, and others are optional. In function block 5030, the vPOS advises the merchant of the customizations, prompting for any choices that must be made by the merchant. The merchant's actions at this point drive decision block 5035, in which the vPOS either returns itself to the "generic" state and terminates the interaction, or begins the configuration of the vPOS, depending on the merchant's confirmation of the request to begin the configuration.

If the merchant has authorized the changes, then control is passed to function block 5040, in which the vPOS stores the certificates of any gateways that it will allow future configuration changes to be initiated from in its database. This may be only a specific bank, such as a bank and the Test Gateway, or other combinations. If only a single, non-Test, bank-owned gateway is allowed to download changes, the vPOS is no longer customizable for any other bank. Then, a new copy would be purchased by the merchant to have it customized for another bank. If the Test Gateway is still allowed to customize the vPOS, then the merchant could switch to another merchant bank and have the current vPOS updated to work with the new bank.

In function block 5050, the customizations are downloaded to the vPOS. The downloads comprise a set of HTML pages and a set of executable programs or scripts that read data from the merchant, perform various functions, and present data to the merchant. In general, the customizations downloaded may augment or replace in part or in whole any and all of function blocks 1822, 1824, 1826, 1828, 1830, or 1834 in FIG. 18A. At a minimum, the terminal "home page" will be replaced so that it points to the new functionality. At this point, the customization of the vPOS has been completed, and the merchant can now begin sending payment requests to the merchant bank or processor through the vPOS.

Gw ClearSetRequestHandler

Figure 51:
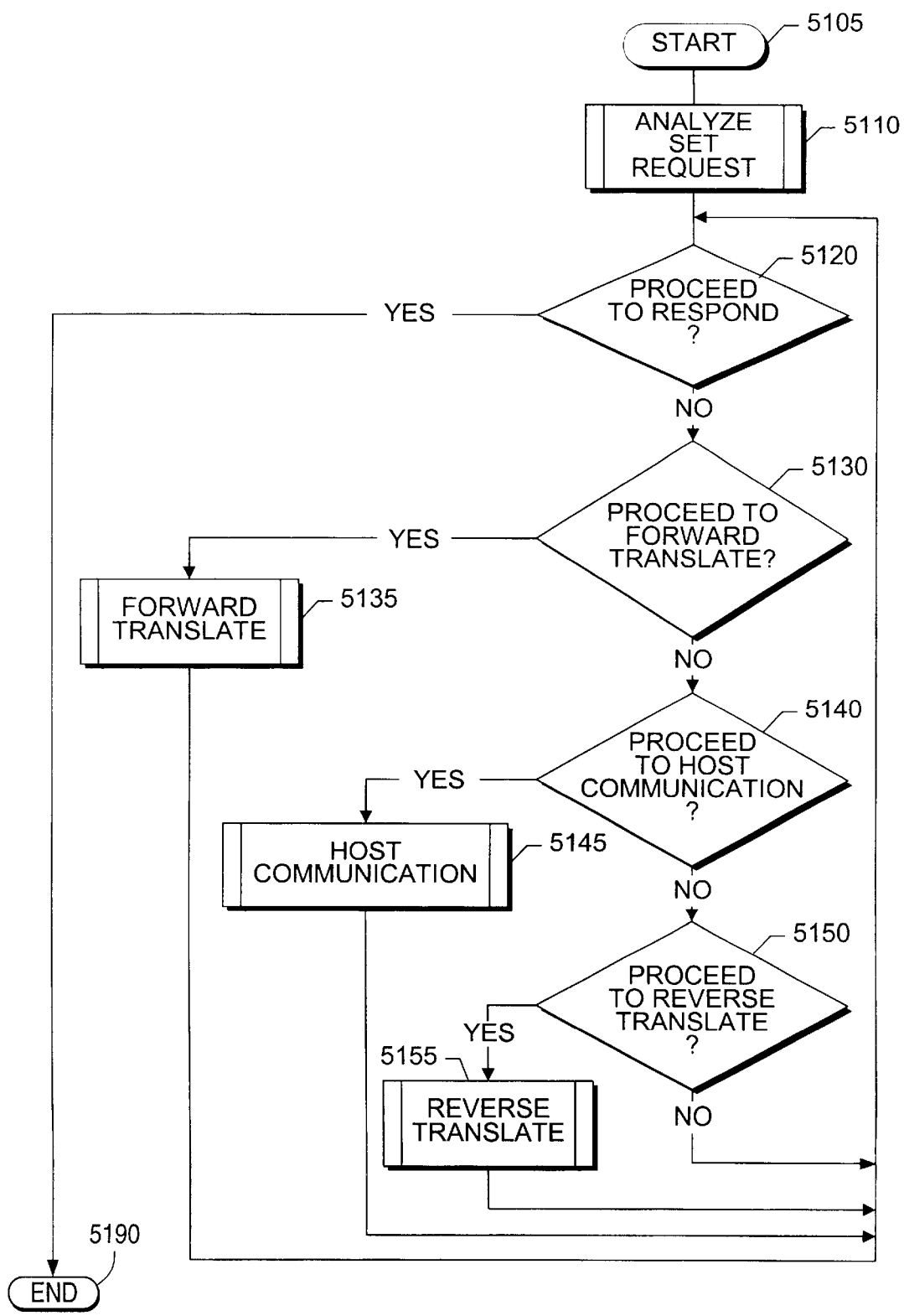
FIGS. 51, 52A, 52B, 53–55, 56A, 56B, and 57–61 are flow diagrams depicting the detailed logic of the Gateway in accordance with the preferred embodiment.

FIG. 51 is a flow diagram that depicts the execution of the GatewayClearSetRequestHandler routine in accordance with a preferred embodiment. Execution begins at Stage 5105. At Stage 5110, a SET analysis routine is called to analyze the SET request, as will be more fully disclosed below, and a status flag is set, which indicates the next stage to be performed by the Gateway. At stage 5120, the Gateway checks to see whether the status is set to indicate that a response should be provided to the user. If so, execution proceeds to stage 5190, which ends the request handling routine and returns control to a calling routine, which then provides a response to the user. Otherwise, execution proceeds to stage 5130. At stage 5130, the Gateway checks to see if the status is set to indicate that forward translation is required. Forward translation is necessary to translate an outgoing message into a format that can be understood by the host computer. If forward translation is indicated, then execution proceeds to stage 5135. At stage 5135, the outgoing message is forwarded translated, as more fully disclosed below with respect to FIG. 53. If no forward translation is indicated, for example, if an already-translated transaction is being retried, then execution proceeds to stage 5140. At stage 5140, the Gateway checks to see if the next stage is communication to the host. If so, the Gateway proceeds to stage 5145, and initiates host communication as will be more fully discussed below with respect to FIG. 54. If not, execution proceeds to stage 5150. At stage 5150, the Gateway checks to see whether reverse translation is indicated. Reverse translation translates a response from a host into a format useable by the calling routine. If reverse translation is indicated, then execution proceeds to Stage 5155, and the reverse translation is performed, as will be more fully discussed below with respect to FIG. 55. In any case, after either forward translation in stage 5135, host communication in stage 5145, or reverse translation in stage 5155, control returns to stage 5120 for further processing. As will be more fully disclosed below, the forward translation, host communication, and reverse translation routines manipulate status indicators to prevent the occurrence of an infinite loop.

The Gw_ClearSetRequestHandler routine as depicted in FIG. 51 may be implemented using the following C++ code:

```
int Gw_ClearSetRequestHandler(CPCLRequest*pRequest)
{
        gwAction            action;
        char                fatalError;
        CPCLCCRequest       *pVehicle = (CPCLCCRequest*) pRequest;
        CGW_Engine          *setTrans = (CGW_Engine*) pVehicle->GetContext( );
        action = setTrans->AnalyzeSetRequest(pVehicle&fatalError);
        while ((action!=GW_PROCEED_TO_RESPOND)&& (!fatalError)) {
            switch (action) {
                case GW_PROCEED_TO_FWD_XLAT:
                    action = setTrans->TranslateForward(pVehicle);
                    break;
                case GW_PROCEED_WITH_HOST_COMMS:
                    action = setTrans->DoHostCommunication(pVehicle);
                    break;
                case GW_PROCEED_TO_REV_XLAT:
                    action = setTrans->TranslateReverse(pVehicle);
                    break;
                case GW_PROCEED_TO_RESPOND:
                default:
```

```
                break;
            }
        }
    }
    // Response should be built, return up the protocol
    // stack so that it will encode and then crypt our response.
        if (fatalError) {
            // Set an error code for the protocol stack.
            pVehicle->SetError(eEInvalidRequest);
            return(0);
        }
        else {
            return(1);
        }
}
```

AnalyzeSetReguest

Figure 52A:
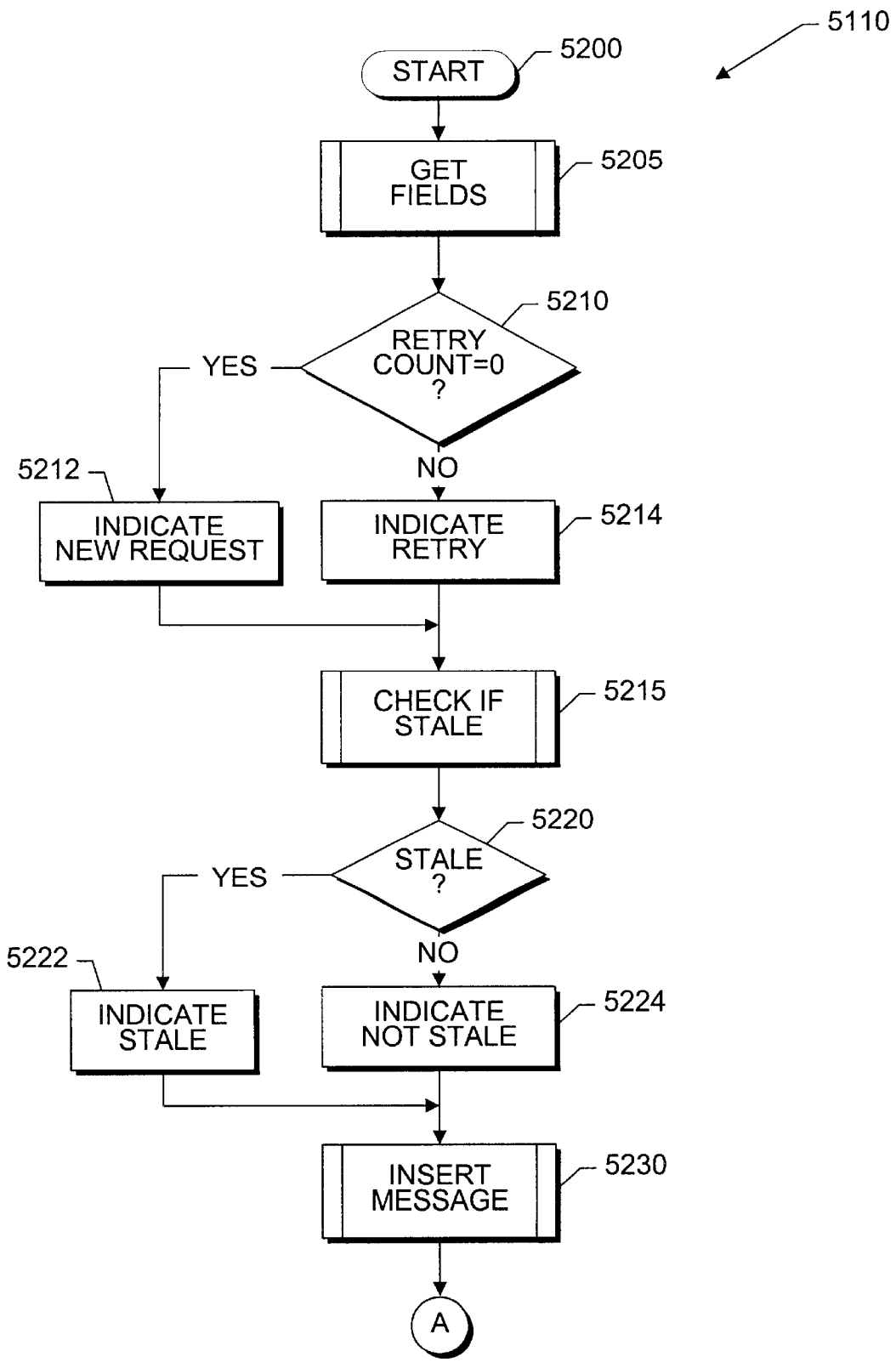
Figure 52B:
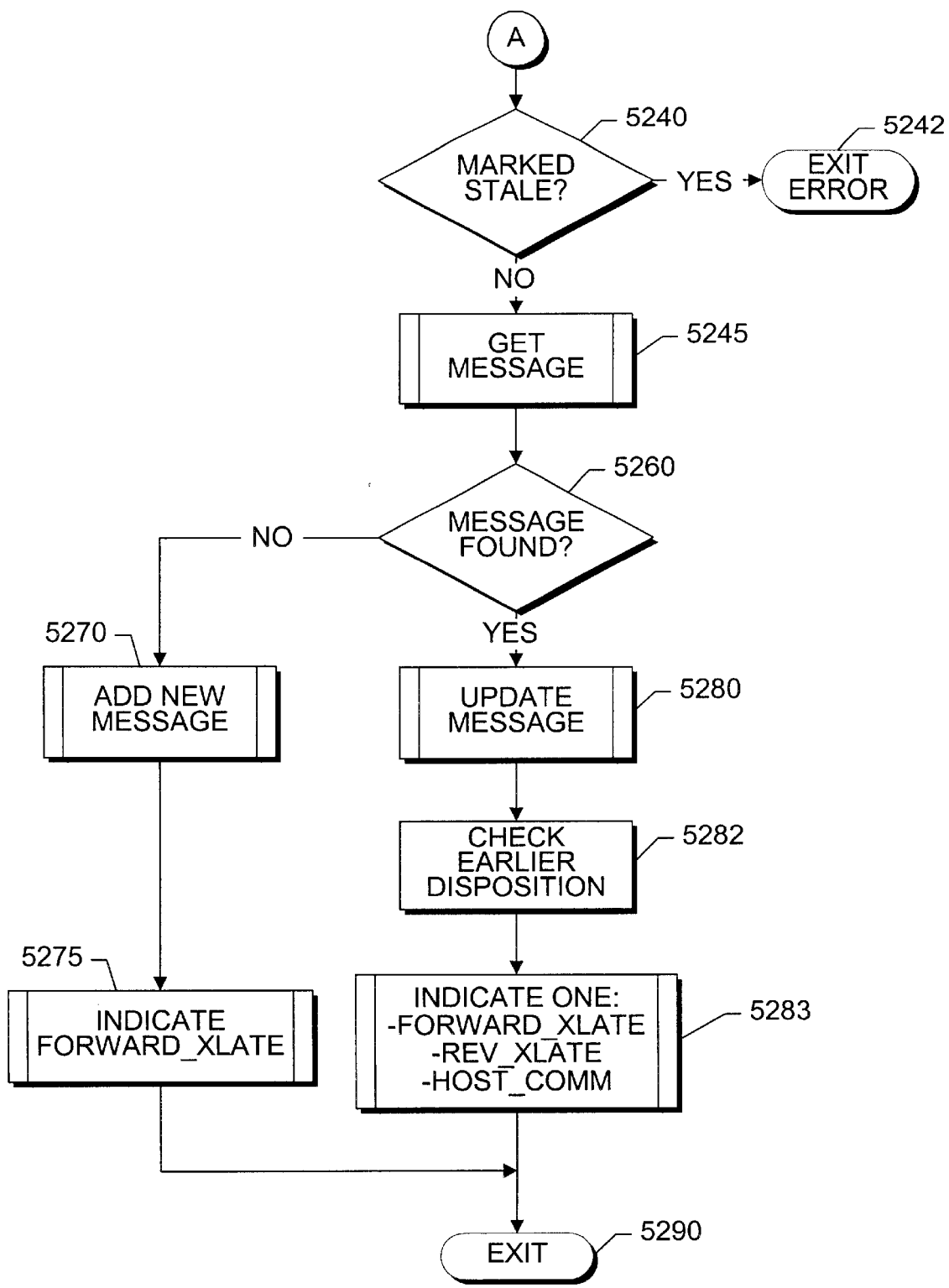

FIGS. 52A and 52B are flow diagrams that depict the execution of the AnalyzeSetRequest routine in accordance with a preferred embodiment. This routine is executed at stage 5110 as illustrated in FIG. 51. Execution begins at stage 5200. At stage 5205, the various fields in the SET record are obtained, as will be more fully disclosed below with respect to FIGS. 56A and 56B. At stage 5210, the Gateway checks the retry count. A retry count is zero indicates that the request being analyzed is a new request, and control proceeds to stage 5212, indicating a new request. If the retry account is non-zero, then this means that the request is a retry of a prior request, and control proceeds to stage 5214 at which a retry is indicated.

Following either stage 5212 or 5214, execution proceeds to stage 5215. At stage 5215, the Gateway checks to see whether the request represents a "stale request," as will be more fully described below with respect to FIG. 57. At stage 5220, the Gateway tests the result of the stale check from stage 5215. If the request is stale, then it is marked as stale in stage 5222. Otherwise, the record is marked as not stale at stage 5224. Following either stage 5222 or stage 5224, control proceeds to stage 5230. At stage 5230, a message representing the SET request is inserted into the database for tracking purposes, and control proceeds to stage 5240.

At stage 5240, the Gateway checks to see if the request had been marked stale at stage 5222. If so, it proceeds to stage 5242, exiting with an error condition. At stage 5245, the Gateway attempts to retrieve from the database a message corresponding to the current SET request, as will be fully disclosed below with respect to FIG. 59. Stage 5260 checks to see whether the message was successfully retrieved from the database. If the message was not found in the database, then this indicates that the SET request represents a new message, and control proceeds to stage 5270. At stage 5270, a new message representing the SET request is added to the database, as is more fully disclosed below with respect to FIG. 60. Because this is a new request, it must be processed from the beginning, including forward translation. Therefore, after the new message is added at stage 5270, control proceeds to stage 5275. At stage 5275, a status flag is set indicating that the next step to be performed for this message is for translation. If the message was found at stage 5260, then this indicates that the request represents a request that is already in progress. Therefore, control proceeds to stage 5280 to update the database with current information representing the request status. The update process is described in further detail below with respect to FIG. 61. Following stage 5280, control proceeds to stage 5282. At stage 5282, the Gateway checks to see the disposition in which the SET request was left as a result of partial processing. This is done, for example, by interrogating fields in the database record that indicate the steps that have already been performed for this request. At stage 5283, based on this status information, the Gateway indicates the next stage of processing to be performed: either forward translation, reverse translation, or communication with the host. After this status has been set, whether for a new request at stage 5275, or for an already-existing request at stage 5283, control proceeds to stage 5290, which exits the AnalyzeSetRequest routine, returning control to stage 5110 in FIG. 51.

The AnalyzeSetRequest routine as depicted in FIGS. 52A and 52B may be implemented using the following C++ code:

```
gwAction CGW_Engine::AnalyzeSetRequest(CPCLCCReques*pVehicle,char
*fatalError)
{
    gwAction        action;
    gwDBRC          dbrc;
    gwRC            rc;
    int             retryCount;
    char            staleMsgFlag;
    *fatalError=_FALSE; // Default to "all is OK".
    // Extract the key SET fields that are required. The key
    // SET fields contain the primary key elements of the "setmsg"
    // table.
    if ((rc=GetSetKeyFields(pVehicle))!=GW_SUCCESS) {
        switch(rc) {
            case GW_NOT_SUPPORTED:
                BuildSetErrorResponse(pVehicle,ISO_RESP_FUNC_NOT_SUPP);
                break;
            default:
```

```
                BuildSetErrorResponse(pVehicle,ISO_RESP_SYS_MALFUNC);
                break;
        }
        *fatalError=_TRUE;   // Only place we return this!
        return (GW_PROCEED_TO_RESPOND);
}
else {
    // Set this so that the front-end will be able to tell
    // whether enough information was derived from the request
    // in order to do update the "setmsg" log.
    m_haveKeyFields= 1;
}
// If the count of SET messages with current xid and rrpidbase is
// non-zero then the message is an honest retry otherwise it
// is a new request.
if ((dbrc=Gwdb_GetSetMsgRetryCount(&retryCount))== GWDB_SUCCESS) {
    if (retryCount == 0)
        m_setRequestClass= GW_SREQCL_NEW_REQUEST;
    else
        m_setRequestClass= GW_SREQCL_HONEST_RETRY;
}
else {
    BuildSetErrorResponse(pVehicle,ISO_RESP_SYS_MALFUNC);
    GW_LogError(LOG_ERR, "Gwdb_GetSetMsgRetryCount( ): %d", dbrc);
    return (GW_PROCEED_TO_RESPOND);
}
// Check whether the message is stale. If it is, we still
// insert it into the database shortly but we will not process
// it.
Gwdb_IsSetMsgStale(&staleMsgFlag);
if (staleMsgFlag==_TRUE)
        m_setRequestDisposition= GW_SREQDI_STALE;
else
        m_setRequestDisposition= GW_SREQDI_OK;// Not stale.
// Log the "SET message" in the database. If the insert fails
// then we must have a replay attack!
dbrc = Gwdb_InsertSetMsg( );
switch (dbrc) {
    case GWDB_SUCCESS:
        break;
    case GWDB_DUPLICATE_ON_INSERT:
        BuildSetErrorResponse(pVehicle,ISO_RESP_SECURITY_VIOLATION);
        dbrc = Gwdb_InsertReplayAttack( );
        if (dbrc != GWDB_SUCCESS) {
            GW_LogError(LOG_ERR, "Gwdb_InsertReplayAttack( ): %d", dbrc);
        }
        return (GW_PROCEED_TO_RESPOND);
        break;
    default:
        BuildSetErrorResponse(pVehicle,ISO_RESP_SYS_MALFUNC);
        GW_LogError(LOG_ERR, "Gwdb_InsertSetMsg( ): %d", dbrc);
        return (GW_PROCEED_TO_RESPOND);
        break;
}
// If the message is stale do no more.
if (m_setRequestDisposition== GW_SREQDI_STALE) {
    BuildSetErrorResponse(pVehicle,ISO_RESP_SECURITY_VIOLATION);
    return (GW_PROCEED_TO_RESPOND);
}
// If we reach this far in this function then:
//      i) the request is new or an honest retry AND
//      ii) the request is not stale AND
//      iii) a setmsg record has been added for this request.
// If there is already a "host message" then update the key
// with the new retry count. If there was not a "host message"
// then insert one.
dbrc = Gwdb_GetHostMsg( );
switch(dbrc) {
    case GWDB_SUCCESS:
        dbrc = Gwdb_UpdateHostMsgKeys( );
        break;
    case GWDB_ROW_NOT_FOUND:
        dbrc = Gwdb_InsertHostMsg( );
        if (dbrc != GWDB_SUCCESS) {
            BuildSetErrorResponse(pVehicle,ISO_RESP_SYS_MALFUNC);
        }
        return(GW_PROCEED_TO_FWD_XLAT);
        break;
    default:
```

```
            BuildSetErrorResponse(pVehicle,ISO_RESP_SYS_MALFUNC);
            GW_LogError(LOG_ERR, "Gwdb_GetHostMsg( ): %d", dbrc);
            return (GW_PROCEED_TO_RESPOND);
            break;
        }
    if (dbrc != GWDB_SUCCESS) {
        BuildSetErrorResponse(pVehicle,ISO_RESP_SYS_MALFUNC);
        GW_LogError(LOG_ERR "Gwdb_UpdateHostMsgKeys( ): %d", dbrc);
        return (GW_PROCEED_TO_RESPOND);
    }
    // If this request is an honest retry then determine if we
    // can "short circuit" a) the forward translation, b) the
    // communications to the host or c) the reverse translation
    // all of which will save time.
    if (m_setRequestClass== GW_SREQCL_HONEST_RETRY){
            switch (m_hostResponseDisposition){
        case GW_HRESDI_UNKNOWN:
            action = GW_PROCEED_TO_FWD_XLAT;
            break;
        case GW_HRESDI_RECEIVED_OK:
            action = GW_PROCEED_TO_REV_XLAT;
            break;
        case GW_HRESDI_REV_XLAT_FAILED:
            action = GW_PROCEED_TO_REV_XLAT;
            break;
        case GW_HRESDI_RECEIVE_FAILED:
        case GW_HRESDI_TIMEOUT;
            action = GW_PROCEED_WITH_HOST_COMMS;
            break;
        default:
            break;
        }
    }
    return (action);
}
```

TranslateForward

Figure 53:
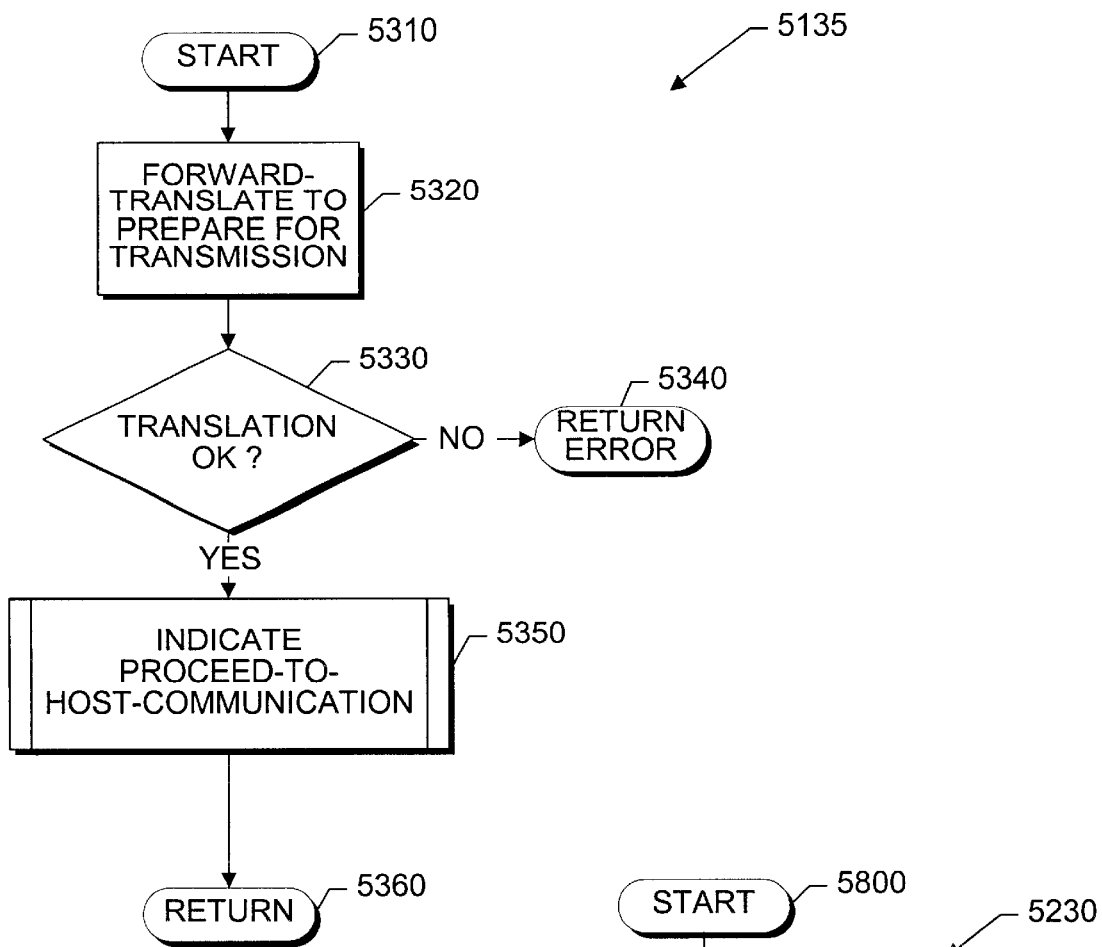

FIG. 53 is a flow diagram that depicts the execution of the TranslateForward routine, which is called by stage 5135 in FIG. 51, in accordance with a preferred embodiment. Execution begins at stage 5310. At stage 5320, the Gateway forward-translates the request to prepare it for transmission to the host. Forward translation includes packaging the fields in the request into a format that is understandable by the legacy system at the financial institution. The exact format of the translated request will vary from institution to institution. However, in general, the format will consist of a fixed length record with predetermined fields, using a standard character set such as ASCII or EBCDIC. At stage 5330, the Gateway checks to see whether the translation was successfully performed. If not, then control proceeds to stage 5340, which returns an error condition. If the translation was successful, then control proceeds to stage 5350. At stage 5350, the Gateway sets a status flag to indicate that the next stage to be performed for this SET request is to proceed to host communication. This will be used in the next iteration of the Gw_ClearSetRequestHandler routine as depicted in FIG. 51. After the status is set at stage 5350, the translate forward routine returns control at stage 5360.

The TranslateForward routine as depicted in FIG. 53 may be implemented using the following C++ code:

```
gwAction CGW_Engine::TranslateForward(CPCLCCRequest*pVehicle)
{
    gwRC        rc;
    gwDBRC      dbrc;
    rc = HM_TranslateForward(m_hostSpecificMessagepVehicle);
    if (rc == GW_SUCCESS) {
        return (GW_PROCEED_WITH_HOST_COMMS);
    }
    m_hostRequestDisposition= GW_HREQDI_FWD_XLAT_FAILED;
    BuildSetErrorResponse(pVehicle,ISO_RESP_FORMAT_ERR);
    dbrc = Gwdb_UpdateHostMsgRequestDisp( );
    if (dbrc != GWDB_SUCCESS) {
        GW_LogError(LOG_ERR, "Gwdb_UpdateHostMsgRequestDisp( ): %d",
dbrc);
    }
    return (GW_PROCEED_TO_RESPOND);
}
```

DoHostCommunication

Figure 54:
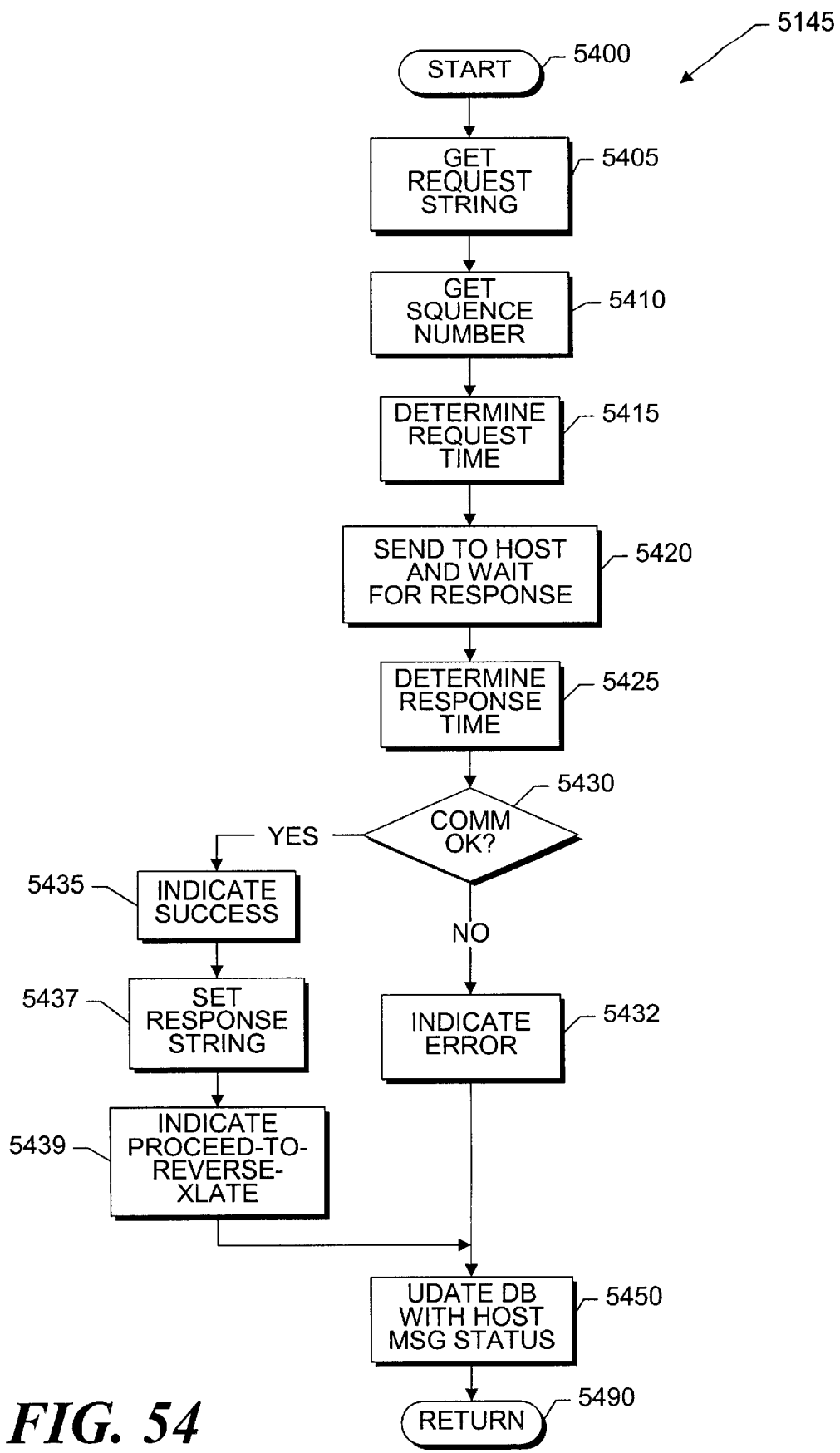

FIG. 54 is a flow diagram that depicts the execution of host communication, which is called by stage 5145 in FIG. 51 in accordance with a preferred embodiment. Execution begins at stage 5400. At stage 5405, the Gateway obtains from the request object the string representing the request text. At stage 5410, it obtains the sequence number for the request. At stage 5415, the Gateway determines the current time, in order to record the time at which the request is made. At stage 5420, the Gateway sends the request to the host and waits for a response from the host. When a response is received, execution continues at stage 5425. At stage 5425, the Gateway again checks the current time, thereby determining the time at which a response was received. At stage 5430, the Gateway checks to see whether the communication was successfully performed. If a communication was not successful, then the Gateway records that an error occurred at stage 5432. If the communication was successful, then at stage 5435, the Gateway indicates that the request was successfully sent and responded to. At stage 5437, the Gateway sets the response string based upon the response received at stage 5420. At stage 5439, the Gateway sets a status to indicate that reverse translation of the received response is required. Regardless of whether the communication was successful or unsuccessful, execution continues to stage 5450. At stage 5450, the database is updated with status information from the host communication. At stage 5490, control is returned to the calling routine.

The DoHostCommunication routine as depicted in FIG. 54 may be implemented using the following C++ code:

```
gwAction CGW_Engine::DoHostCommunication(CPCLCCRequest*pVehicle)
{
    gwHMRC          hmrc;
    gwDBRC          dbrc;
    gwAction        action = GW_PROCEED_TO_RESPOND;
    unsigned char   hostRequestMessage[HOSTREQ_SZ+1];
    int             hostRequestLength= 0;
    unsigned char   hostResponseMessage[HOSTREQ_SZ+1];
    int             hostResponseLength= 0;
    long            sequenceNo;
    HM_GetRequestString(m_hostSpecificMessage,&hostRequestMessage[0],
                    &hostRequestLength);
    HM_GetSequenceNo(m_hostSpecificMessage,&sequenceNo);
    time( &m_hostRequestTime);
    hmrc = SendToHostAndWait(
                    &hostRequestMessage[0],hostRequestLength,
                    &hostResponseMessage[0],&hostResponseLength);
    time( &m_hostResponseTime);
    switch(hmrc) {
        case GWHM_SUCCESS:
            m_hostRequestDisposition= GW_HREQDI_SENT_OK;
            m_hostResponseDisposition= GW_HRESDI_RECEIVED_OK;
        HM_SetResponseString(m_hostSpecificMessage,&hostResponseMessage[0],
                    hostResponseLength);
            action = GW_PROCEED_TO_REV_XLAT;
            break;
        case GWHM_SEND_FAILED:
            m_hostRequestDisposition= GW_HREQDI_SEND_FAILED;
            m_hostResponseDisposition= GW_HRESDI_UNKNOWN;
            break;
        case GWHM_RCV_FAILED:
            m_hostRequestDisposition= GW_HREQDI_SENT_OK;
            m_hostResponseDisposition= GW_HRESDI_RECEIVE_FAILED;
            break;
        case GWHM_RCV_TIMEOUT:
            m_hostRequestDisposition= GW_HREQDI_SENT_OK;
            m_hostResponseDisposition= GW_HRESDI_TIMEOUT;
            break;
        default:
            break;
    }
    if (hmrc != GWHM_SUCCESS) {
        BuildSetErrorResponse(pVehicle,ISO_RESP_ISSUER_INOP);
    }
    dbrc = Gwdb_UpdateHostMsgAllInfo(sequenceNo,
                    &hostRequestMessage[0],hostRequestLength,
                    &hostResponseMessage[0],hostResponseLength);
    if (dbrc != GWDB_SUCCESS) {
        BuildSetErrorResponse(pVehicle,ISO_RESP_SYS_MALFUNC);
        GW_LogError(LOG_ERR, "Gwdb_UpdateHostMsgAllInfo( ): %d", dbrc);
    }
    return (action);
}
```

TranslateReverse

Figure 55:
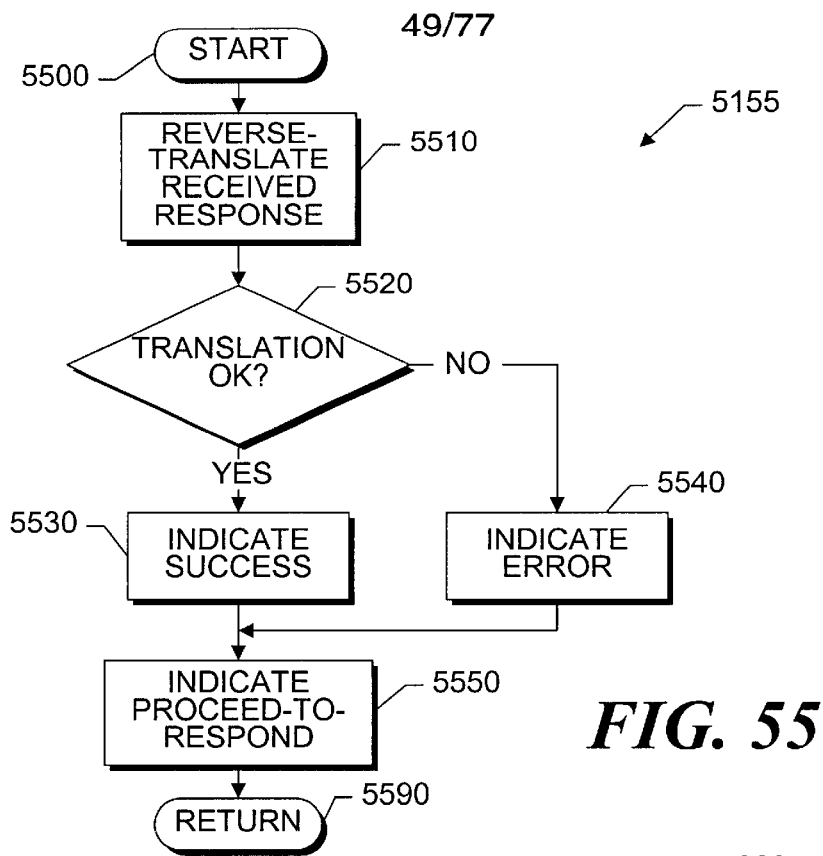

FIG. 55 is a flow diagram that depicts the operation of the TranslateReverse routine, as executed in stage 5155 in FIG. 51, in accordance with a preferred embodiment. Execution begins at stage 5500. At stage 5510, the Gateway reverse-translates the response received from the legacy system host. Reverse translation includes extracting data from the data records received from the legacy system and placing them in objects so that they are useable by the Gateway. At stage 5520, the Gateway checks to verify that translation was successful. If translation was successful, then control proceeds to stage 5530, at which a status flag is set indicating a successful translation. If translation was not successful, then control proceeds to stage 5540, at which the Status Flag is set to indicate an unsuccessful translation. Regardless of whether translation was successful or unsuccessful, execution proceeds to stage 5550. At stage 5550, a status flag is set to indicate that the next stage for the request is to provide a response from the Gateway. This stage is always executed, because, regardless of whether the translation or any other aspect of the transaction was successful, a response indicating either success or failure is returned by the Gateway. Control then proceeds to stage 5590, in which the TranslateReverse routine returns control to the calling routine in FIG. 51. It will be seen that the TranslateForward routine depicted in FIG. 53, the DoHostCommunication routine depicted in FIG. 54, and the TranslateReverse routine depicted in FIG. 55, each alter the status of the request. As a result, as the loop depicted in FIG. 51 executes a particular request will proceed through all three stages and finally to exit at stage 5190.

The TranslateReverse routine as depicted in FIG. 55 may be implemented using the following C++ code:

preferred embodiment. Execution begins at stage 5600. At stage 5610, the Gateway interrogates the request object to determine the request type. At stage 5620, the Gateway determines whether the request type is for authorization only. If the request type is not for authorization only, then execution proceeds to stage 5625. At stage 5625, the Gateway checks to see whether the request type is for a sale. If the request type is neither for authorization only nor for a sale, then execution proceeds to stage 5630. In stage 5630, the Gateway indicates that the request type is not a supported request, and proceeds to stage 5635, at which point it returns to the caller.

If the request type is either for authorization only or for a sale, then execution proceeds to stage 5640. At stage 5640, the Gateway initializes a container object to represent the request. At stage 5650, the Gateway extracts the transaction identifier (XID) for the transaction. At stage 5652, the Gateway extracts the merchant identifier (MID) for the transaction. At stage 5654, the Gateway extracts the retry request process identifier (RRPID) and the terminal identifier (TID) for the request. At stage 5656, the Gateway extracts the retry count associated with the current request. At stage 5660, a message data area is initialized with the extracted contents. The message area can then be used for

```
gwAction CGW_Engine::TranslateReverse(CPCLCCRequest*pVehicle)
{
    gwRC       rc;
    gwDBRC     dbrc;
rc = HM_TranslateReverse(m_hostSpecificMessagepVehicle);
if (rc == GW_SUCCESS) {
        // Success; we have a normal PDU to send back to VPOS!
        // If there is any problem further to this (eg: PCL/ASN libs)
        // that the frond-end is responsible for calling the method
        // LogSetErrorResponse( )on this engine instance.
        m_setResponseClass= GW_SRESCL_APP_NORMAL_PDU;
        m_setResponseDisposition= GW_SRESDI_SENT_OK;
        HM_GetResponseCode(m_hostSpecificMessage,m_setResponseCode);
    }
    else {
        m_hostResponseDisposition= GW_HRESDI_REV_XLAT_FAILED;
        BuildSetErrorResponse(pVehicle,ISO_RESP_INVALID_RESPONSE);
        dbrc = Gwdb_UpdateHostMsgResponseDisp( );
        if (dbrc != GWDB_SUCCESS) {
            GW_LogError(LOG_ERR, "Gwdb_UpdateHostMsgResponseDisp( ):
%d", dbrc);
        }
    }
    // Whether there was a translation error or not we need to respond.
    return (GW_PROCEED_TO_RESPOND);
}
```

GetSetKeyFields

Figure 56A:
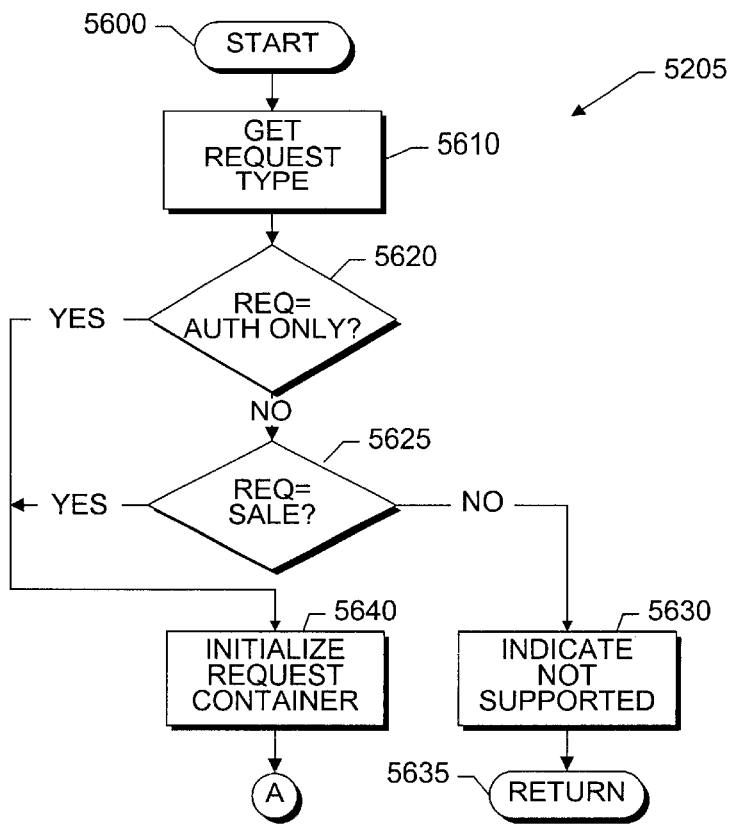
Figure 56B:
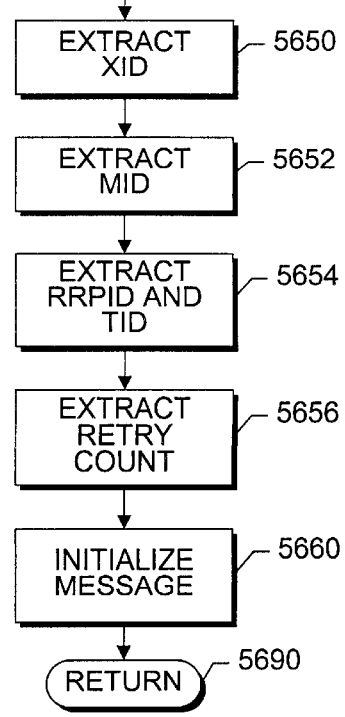

FIGS. 56A and 56B are flow diagrams that depict the execution of the GetSetKeyFields routine, which is called at stage 5205 as illustrated in FIG. 52A, in accordance with a further processing by the called routine. At stage 5690, the GetSetKeyFields routine returns control to the caller.

The GetSetKeyFields as depicted in FIGS. 56A and 56B may be implemented using the following C++ code:

```
gwRC CGW_Engine::GetSetKeyFields(CPCLCCRequest*pVehicle)
{
    gwRC          transRc = GW_SUCCESS;
    unsigned int  got;
    char          s_RrpidTid[2*XID_SZ];
    unsigned long rrpid;
    unsigned long tidOffset;
        m_setKeyFields.reqType= pVehicle->GetRequestType( );
        switch(m_setKeyFields.reqType){
```

```
        case CPCLRequest::CCAuthOnly:
        case CPCLRequest::CCSale:
            {
            // Initial cast to correct subclass.
            CASNAuthorizationRequestDataContainer*s_req =
                    ((CPCLCCAuthOnlyRequest*)pVehicle)->GetRequestContainer( )-
>get_data( )->get_data( );
// xid
            s_req->get_transaction_id( )->get_x_id( )->
            get_value((unsigned char *) &m_setKeyFields.xid,XID_SZ, &got);
// mid
#ifdefJUNE_3RD
            strncpy(m_setKeyFields.mid,"42581", MID_SZ);
#else
            // TODO: get code from Deepak for pulling MID out of s_req!
            strncpy(m_setKeyFields.mid,"42581", MID_SZ);
            // bah!
#endif
//---------------------------------------------------------
    // NOTE: We have agreed with VPOS team that the RRPID field
    //       will contain the following:
    //
    //       <rrpid><space><tid><null>
    //
    //    where <rrpid> is a string representing the rrpid value
    //    and <tid> is a string representing the tid value.
    //
//---------------------------------------------------------
            memset(s_RrpidTid,'\0', sizeof(s_RrpidTid));
            s_req->get_AuthorizationRequestData_extensions( )->
                    get_auth_req_res_pair_id( )->
                    get_value((unsigned char *) &s_RrpidTid,sizeof(s_RrpidTid),&got);
            // get rrpid and offset to the tid.
    sscanf(s_RrpidTid,"%d %n", &rrpid, &tidOffset);
            // rrpidBase and retryCount
            m_setKeyFields.retryCount= rrpid % 100;
            m_setKeyFields.rrpidBase= rrpid - m_setKeyFields.retryCount;
            // tid
    strncpy(m_setKeyFields.tid,(s_RrpidTid+tidOffset),TID_SZ);
            // reqDate
            GW_GetTimeFromASNTime(&(m_setKeyFields.merchantTime),
                    s_req->get_authorization_request_date( );
            break;
            }
        case CPCLRequest::CCAuthReversal:       // == Void
        case CPCLRequest::CCCreditReversal:
        case CPCLRequest::CCCapture:
        case CPCLRequest::CCCredit:             // == Refund|Return
        case CPCLRequest::CCCaptureReversal:    // == Void
        // case eBalInquiry:
            transRc = GW_NOT_SUPPORTED;
            break;
        default:
            transRc = GW_NOT_SUPPORTED;
            break;
        }
    // Initialize the host message will with the key fields "in the clear"!
    if (m_hostSpecificMessage== NULL) {
        transRc = GW_FAILED;
    }
    else {
        HM_Initialize(m_hostSpecificMessage,&m_setKeyFields);
    }
    return (transRc);
}
```

Gwdb IsSetMsgStale

Figure 57:
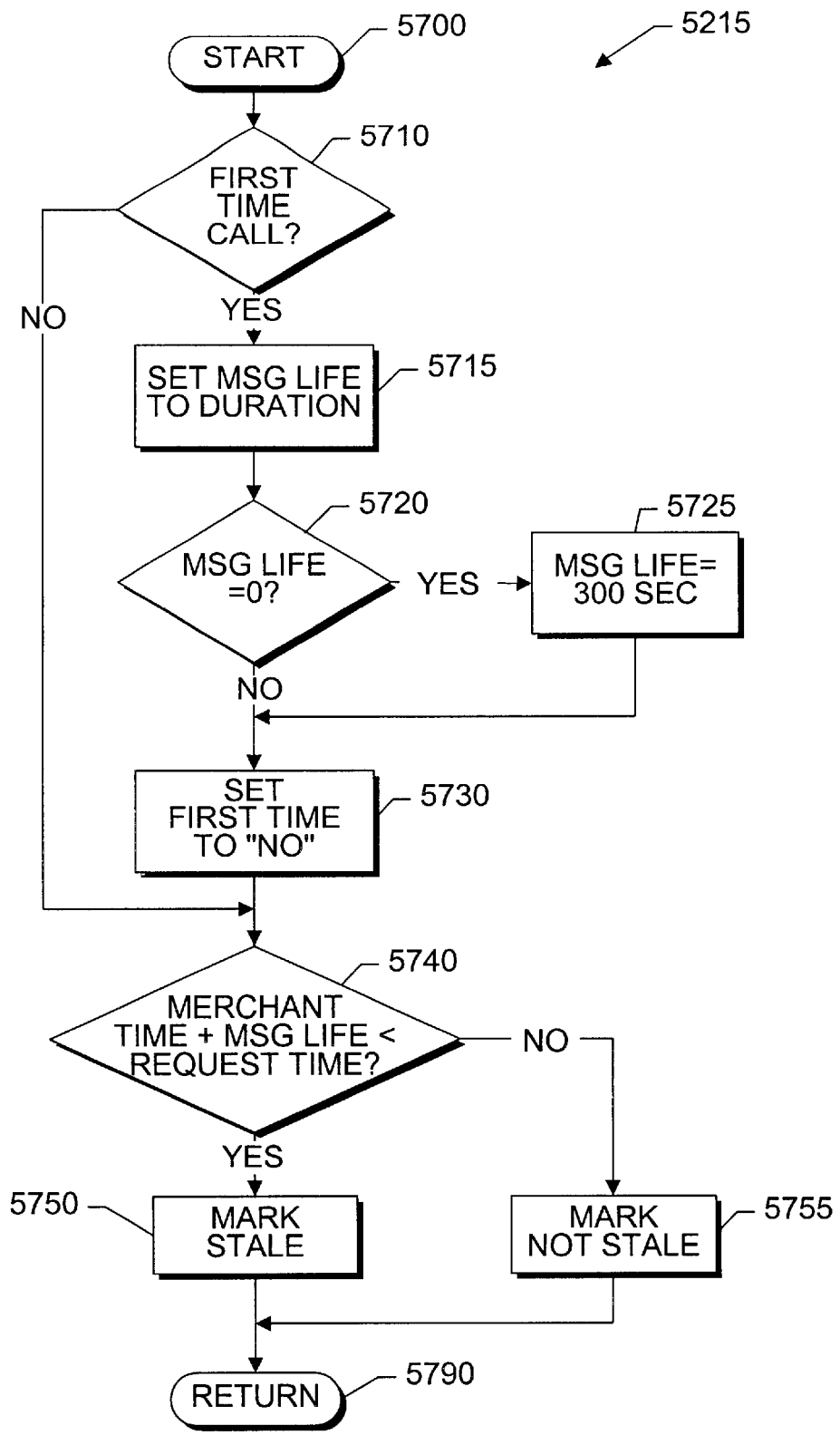

FIG. 57 is a flow diagram that depicts the execution of the Gwdb_IsSetMsgStale routine, which is called by stage 5215 as illustrated in FIG. 52A, in accordance with a preferred embodiment. Execution begins at stage 5700. At stage 5710, the Gateway determines whether this is the first time the Gwdb_IsSetMsgStale routine has been called for this request. If this is the first time, then stages 5715 through 5730 are performed; otherwise, those stages are not performed. At stage 5715, a field representing the message life is initialized to a predetermined duration. The message life is a field that will be used to determine how long the message representing the transaction will remain valid. The use of the message life field prevents a transaction that is effectively lost due to extensive processing delays from being processed. At stage 5720, the Gateway checks to see if the value of the message life is equal to zero. If the message life is equal to zero, then a default value (e.g., 300 seconds or 5 minutes), is assigned to the message life at stage 5725. At stage 5730, an indicator for this request is set to indicate that first time processing has already been performed for this request. This flag is the same flag interrogated at stage 5710 and is used to prevent successive reinitialization of the message life field.

At stage 5740, the Gateway determines whether the merchant's time stamp plus the value of the message life is less than the time of the request. If so, then the request is considered stale and is marked stale at stage 5750. If not, then the request is not considered stale and is marked not stale at stage 5755. Following either of stage 5750 or 5755, the Gwdb_IsSetMsgStale exits at stage 5790.

The Gwdb_IsSetMsgStale routine as depicted in FIG. 57 may be implemented using the following C++ code:

```
void CGW_Engine::Gwdb_IsSetMsgStale(char*staleFlag)
{
  static char gotStaleDuration=0;
  static long setMsgLife;
  static char   *funcName= "Gwdb_IsSetMsgStale";
  // Only get this once per process lifetime.
  if (gotStaleDuration==0) {
    FILE *fp;
    char duration[INI_MAXLNSZ+1];
    if((fp=OpenIniFile())!=NULL) {
      setMsgLife= 0;
      (void)iniGetParameter(fp,"GATEWAYADMIN", "SetMsgLife",
duration);
      setMsgLife = atol(duration);// could return 0; handled later.
      (void)CloseIniFile(fp);
    }
    if(setMsgLife==0) {
      setMsgLife = 5 * 60; // Default to 5 minutes;
    }
  gotStaleDuration= 1;
  }
// If the message has expired its lifetime.
  if((m_setKeyFields.merchantTime+setMsgLife)<m_setRequestTime)
    *staleFlag=_TRUE;      // request is stale.
  else
    *staleFlag=_FALSE; // honour request, it is not stale.
  return;
}
```

Gwdb InsertSetMsg

Figure 58:
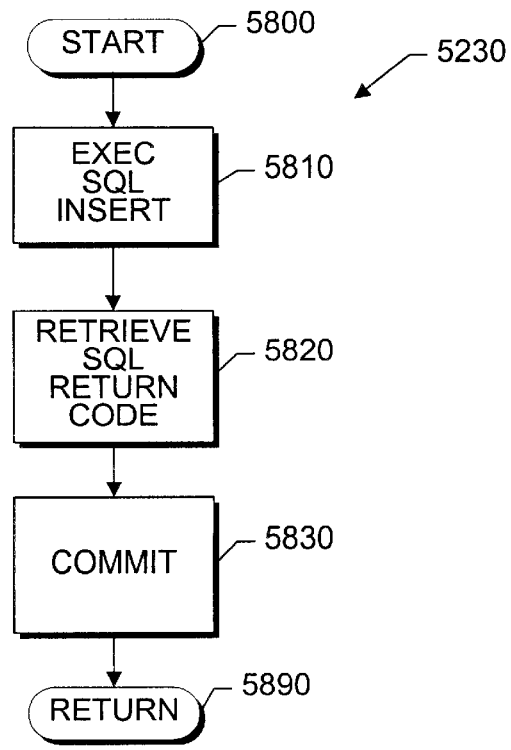

FIG. 58 is a flow diagram that depicts the execution of the Gwdb_InsertSetMsg routine, which is called at stage 5230 as illustrated in FIG. 52A, in accordance with a preferred embodiment. Execution begins at stage 5800. At stage 5810, the routine invokes a database insert function by, for example, executing an SQL INSERT command. At stage 5820, the database return code is obtained in order to be used as a return code from the Gwbd_InsertSetMsg routine. At stage 5830, a database commit function is performed, thereby instructing the database engine to commit the database changes to a permanent recording (e.g., by writing the information to the file or by journalizing the change made by the INSERT function or both). At stage 5890, the routine returns control to the calling program.

The Gwdb_InsertSetMsg as depicted in FIG. 58 may be implemented using the following C++ code:

```
gwDBRC CGW_Engine::Gwdb_InsertSetMsg()
{
EXEC SQL BEGIN DECLARE SECTION;
  // Key.
    char   *h_xid          = &(m_setKeyFields.xid[0]);
    long   h_rrpidBase     = m_setKeyFields.rrpidBase;
    int    h_retryCount    = m_setKeyFields.retryCount;
// Columns to insert into.
    char   *h_mid          = &(m_setKeyFields.mid[0]);
    char   *h_tid          = &(m_setKeyFields.tid[0]);
    char   h_merchantTime[26];
    int    h_requestType   = (int)m_setKeyFields.reqType;
char h_requestTime[26];
    int    h_requestClass       = (int)m_setRequestClass;
    int    h_requestDisposition = (int)m_setRequestDisposition;
char h_responseTime[26];
    int    h_responseClass       = (int)m_setRequestClass;
    int    h_responseDisposition = (int)m_setResponseDisposition;
    char   *h_responseCode       = m_setResponseCode;
EXEC SQL END DECLARE SECTION;
static char *funcName= "Gwdb_InsertSetMsg";
    gwDBRC dbrc;
GW_MakeDateString(h_merchantTime,
&(m_setKeyFields.merchantTime));
    GW_MakeDateString(h_requestTime,&m_setRequestTime);
    GW_MakeDateString(h_responseTime,&m_setResponseTime);
EXEC SQL INSERT INTO setmsg
    (
        xid, rripidbase, retrycount, mid, tid,
        merchanttime,
        requesttype,
        requesttime,
        requestclass, requestdisposition,
        responsetime,
        responseclass,responsedisposition,responsecode
    )
    VALUES
    (
        :h_xid,:h_rrpidBase,:h_retryCount,:h_mid,:h_tid,
        TO_DATE(:h_merchantTime,
        'DY MON DD HH24:MI:SS YYYY'),
        :h_requestType,
        TO_DATE(:h_requestTime,
        'DY MON DD HH24:MI:SS YYYY'),
        :h_requestClass,:h_requestDisposition,
        TO_DATE(:h_responseTime,
        'DY MON DD HH24:MI:SS YYYY'),
        :h_responseClass,
        :h_responseDisposition,:h_responseCode
    );
    dbrc = Db_Error(funcName);
(void)Db_Commit(funcName);
return (dbrc);
}
```

Gwbd GetHostMsg

Figure 59:
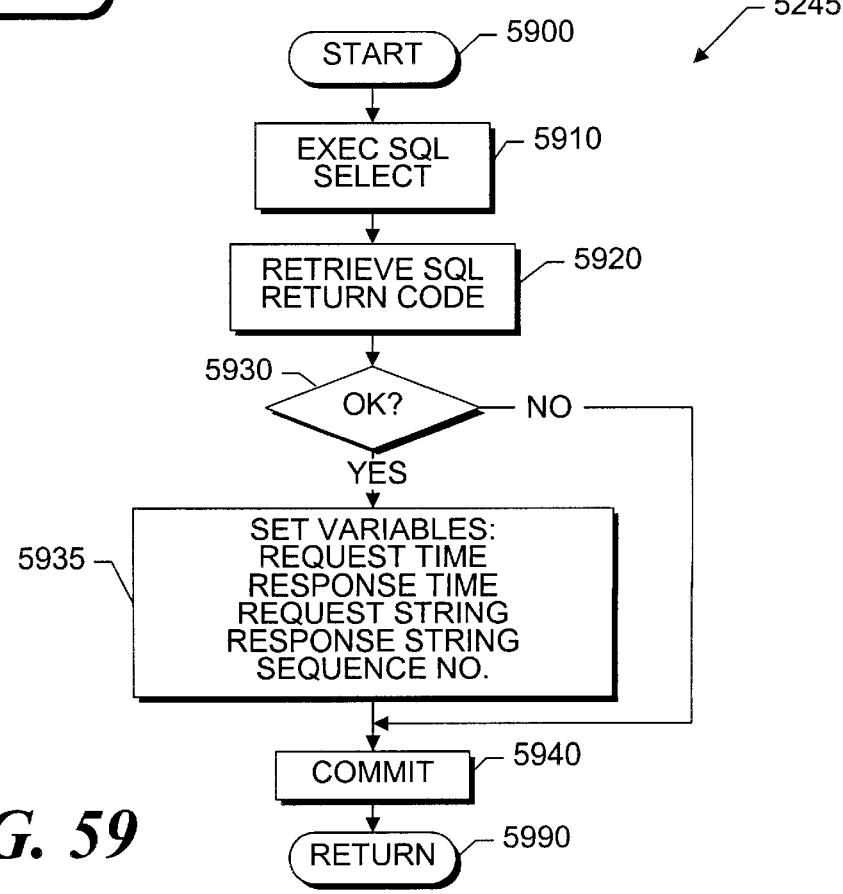

FIG. 59 is a flow diagram that depicts the execution of the Gwbd_GetHostMsg routine, which is called at stage 5245 as shown in FIG. 52B, in accordance with a preferred embodiment. Execution begins at stage 5900. At stage 5910, the routine invokes a database select function by, for example, executing an SQL SELECT command. At stage 5920, the database return code is obtained in order to be used as a return code from the Gwbd_InsertSetMsg routine. At stage 5930, the Gateway checks to see whether the database retrieve operation was successfully performed. If so, execution proceeds to stage 5935. At stage 5935, the Gateway sets a number of status variables from the values retrieved from the database records, which include the time the request was made, the time a response was received, the contents of the request string, the contents of the response string, and a sequence number for this request. At stage 5940, a commit operation is performed. At stage 5900, control returns to the calling program.

The Gwdb_GetHostMsg as depicted in FIG. 59 may be implemented using the following C++ code:

```
gwDBRC CGW_Engine::Gwdb_GetHostMsg()
{
    struct tm    requestTimeTM;
    struct tm    responseTimeTM;
EXEC SQL BEGIN DECLARE SECTION;
    // Key.
        char    *h_xid        = &(m_setKeyFields.xid[0]);
        long    h_rrpidBase   = m_setKeyFields.rrpidBase;
    // Indicator Variables.
        short   h_requestStringInd;
        short   h_responseStringInd;
    // Columns to retrieve.
        long    h_sequenceNo  = 0;
        int     *h_reqYear=   &requestTimeTM.tm_year;
        int     *h_reqMonth=  &requestTimeTM.tm_mon;
        int     *h_reqDay=    &requestTimeTM.tm_mday;
        int     *h_reqHour=   &requestTimeTM.tm_hour;
        int     *h_reqMinute= &requestTimeTM.tm_min;
        int     *h_reqSecond= &requestTimeTM.tm_sec
        int     *h_requestDisposition =(int *) &m_hostRequestDisposition;
        VARCHARh_requestString[128];
        int     *h_resYear =  &responseTimeTM.tm_year;
        int     *h_resMonth = &responseTimeTM.tm_mon;
        int     *h_resDay =   &responseTimeTM.tm_mday;
        int     *h_resHour =  &responseTimeTM.tm_hour;
        int     *h_resMinute = &responseTimeTM.tm_min;
        int     *h_resSecond = &responseTimeTM.tm_sec;
        int     *h_responseDisposition =
                (int *) &m_hostResponseDisposition;
        VARCHARh_responseString[128];
EXEC SQL END DECLARE SECTION;
        static char  *funcName = "Gwdb_GetHostMsg";
        gwDBRC dbrc;
        // Set the "tm" structures to null. Set tm_isdst to -1 so that the
        // mktime() function will determine if whether Daylight Savings Time
        // is active.
        memset(&requestTimeTM,'\0', sizeof(tm));
        requestTimeTM.tm_isdst=-1;
        memset(&responseTimeTM,'\0', sizeof(tm));
        responseTimeTM.tm_isdst=-1;
EXEC SQL SELECT
        sequenceno,
        TO_NUMBER(TO_CHAR(requesttime,'YYYY'))-1900,
        // see "man mktime"
        TO_NUMBER(TO_CHAR(requesttime,'MM'))-1,
        // see "man mktime"
        TO_NUMBER(TO_CHAR(requesttime,'DD')),
        TO_NUMBER(TO_CHAR(requesttime,'HH24')),
        TO_NUMBER(TO_CHAR(requesttime,'MI')),
        TO_NUMBER(TO_CHAR(requesttime,'SS')),
        requestdisposition,requeststring,
        TO_NUMBER(TO_CHAR(responsetime,'YYYY'))-1900,
        // see "man mktime"
        TO_NUMBER(TO_CHAR(responsetime,'MM'))-1,
        // see "man mktime"
        TO_NUMBER(TO_CHAR(responsetime,'DD')),
        TO_NUMBER(TO_CHAR(responsetime,'HH24')),
        TO_NUMBER(TO_CHAR(responsetime,'MI')),
        TO_NUMBER(TO_CHAR(responsetime,'SS')),
responsedisposition,responsestring
        INTO
:h_sequenceNo,
:h_reqYear,:h_reqMonth,:h_reqDay,:hreqHour,:h_reqMinute,
:h_reqSecond,:h_requestDisposition,
:h_requestString:h_requestStringInd,:h_resYear,
:h_resMonth,:h_resDay,:h_resHour,:h_resMinute,:h_resSecond,
:h_responseDisposition,:h_responseString:h_responseStringInd
        FROM
            hostmsg
        WHERE
            xid = :h_xid AND
            rrpidbase = :h_rrpidBase;
    dbrc = Db_Error(funcName);
    if(dbrc == GWDB_SUCCESS) {
        if(h_requestStringInd==-1)h_requestString.len=0;
        if(h_responseStringInd==-1)h_responseString.len=0;
        m_hostRequestTime= mktime( &requestTimeTM);
        m_hostResponseTime= mktime ( &responseTimeTM);
        HM_SetRequestString(m_hostSpecificMessage,
            h_requestString.arr,
            h_requestString.len);
        HM_SetResponseString(m_hostSpecificMessage,
            h_responseString.arr,
            h_responseString.len);
        HM_SetSequenceNo(m_hostSpecificMessage,h_sequenceNo);
    }
    (void)Db_Commit(funcName);
    return(dbrc);
}
```

Gwdb InsertHostMsg

Figure 60:
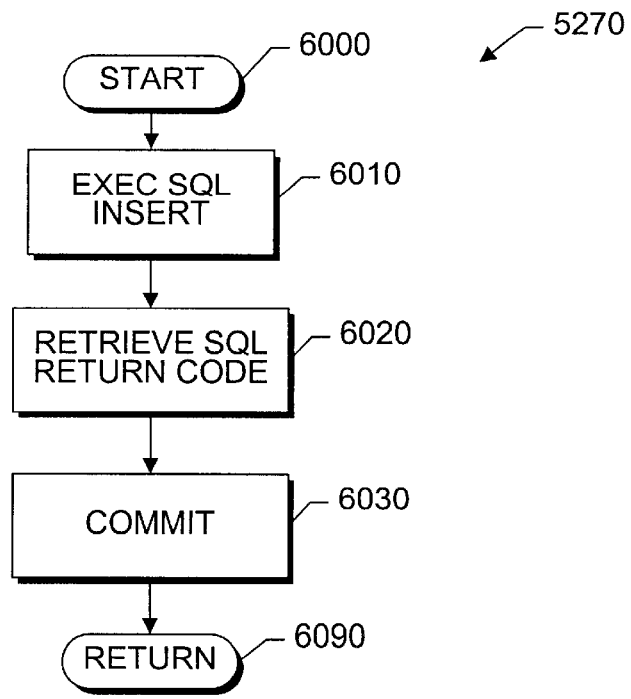

FIG. 60 is a flow diagram that depicts the execution of the Gwdb_InsertHostMsg routine, which is called at stage 5270 as illustrated in FIG. 52B, in accordance with a preferred embodiment. Execution begins at stage 6000. At stage 6010, the routine invokes a database insert function by, for example, executing an SQL INSERT command. At stage 6020, the database return code is obtained in order to be used as a return code from the Gwbd_InsertSetMsg routine. At stage 6040, a commit operation is performed. At stage 6090, the routine returns control to the calling program.

The Gwdb_InsertHostMsg as depicted in FIG. 60 may be implemented using the following C++ code:

```
gwDBRC CGW_Engine::Gwdb_InsertHostMsg()
{
EXEC SQL BEGIN DECLARE SECTION;
    // Key.
        char    *h_xid        = &(m_setKeyFields.xid[0]);
        long    h_rrpidBase   = m_setKeyFields.rrpidBase;
        int     h_retryCount  = m_setKeyFields.retryCount;
    // Columns to insert into.
        long    h_sequenceNo  = 0
        char    h_requestTime[26];
        int     h_requestDisposition = (int)m_hostRequestDisposition;
        char    h_responseTime[26];
        int     h_responseDisposition = (int)m_hostResponseDisposition;
EXEC SQL END DECLARE SECTION;
    static char  *funcName= "Gwdb_InsertHostMsg";
    gwDBRC dbrc;
    GW_MakeDateString(h_requestTime,&m_hostRequestTime);
    GW_MakeDateString(h_responseTime,&m_hostResponseTime);
    EXEC SQL INSERT INTO hostmsg
        (
            xid, rrpidbase,retrycount,
            sequenceno,
            requesttime,
            requestdisposition,
            responsetime,
            responsedisposition
        )
        VALUES
        (
            :h_xid,:h_rrpidBase,:h_retryCount,
            :h_sequenceNo,
            TO_DATE(:h_requestTime,
            'DY MON DD HH24:MI:SS YYYY'),
            :h_requestDisposition,
            TO_DATE(:h_responseTime,
            'DY MON DD HH24:MI:SS YYYY'),
            :h_responseDisposition
        );
    dbrc = Db_Error(funcName);
    (void)Db_Commit(funcName);
    return(dbrc);
}
```

Gwdb UpdateSetMso,ResponseInfo

Figure 61:
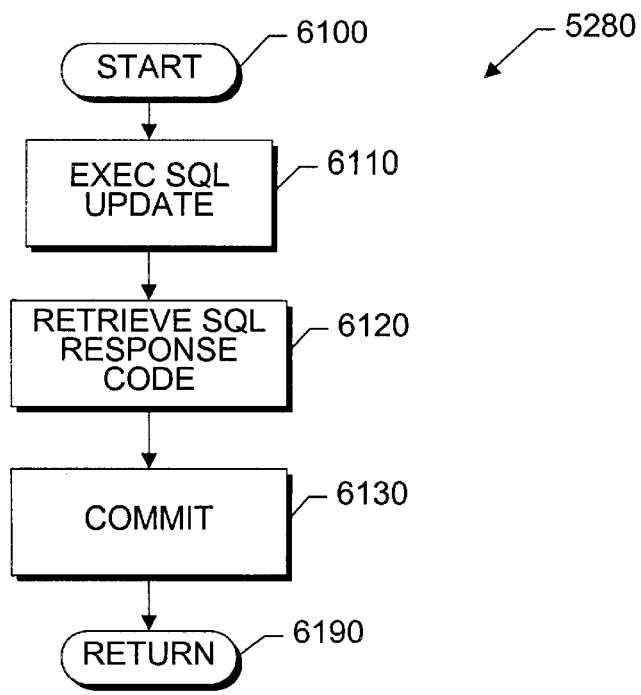

FIG. 61 is a flow diagram that depicts the execution of the Gwdb_UpdateSetMsgResponseInfo routine, in accordance with a preferred embodiment. Execution begins at stage 6100. At stage 6110, the routine invokes a database update function by, for example, executing an SQL UPDATE command. At stage 6120, the database return code is obtained in order to be used as a return code from the Gwbd_UpdateSetMsgResponseInfo routine. At stage 6130, a commit operation is performed. At stage 6190, the routine returns control to the calling program.

The Gwdb_UpdateSetMsgResponseInfo as depicted in FIG. 61 may be implemented using the following C++ code:

```
gwDBRC CGW_Engine::Gwdb_UpdateSetMsgResponseInfo()
{
EXEC SQL BEGIN DECLARE SECTION;
    // Key.
    char    *h_xid                  = &(m_setKeyFields.xid[0]);
    long    h_rrpidBase             = m_setKeyFields.rrpidBase;
    int     h_retryCount            = m_setKeyFields.retryCount;
    // Columns to update.
    char    h_responseTime[26];
    int     h_responseClass         = (int)m_setResponseClass;
    int     h_responseDisposition   = (int)m_setResponseDisposition;
    char    *h_responseCode         = m_setResponseCode;
EXEC SQL END DECLARE SECTION;
    static char  *funcName= "Gwdb_UpdateSetMsgResponseInfo";
    gwDBRC dbrc;
    GW_MakeDateString(h_responseTime,&m_setResponseTime);
    EXEC SQL UPDATE setmsg SET
    responsetime= TO_DATE(:h_responseTime,'DY MON DD HH24:MI:SS YYYY'),
        responseclass= :h_responseClass,
        responsedisposition= :h_responseDisposition,
        responsecode= :h_responseCode
    WHERE
        xid = :h_xid AND
        rrpidbase = :hrrpidBase AND
        retrycount= :h_retryCount;
    dbrc = Db_Error(funcName);
    (void)Db_Commit(funcName);
    return(dbrc);
}
```

Figure 62:
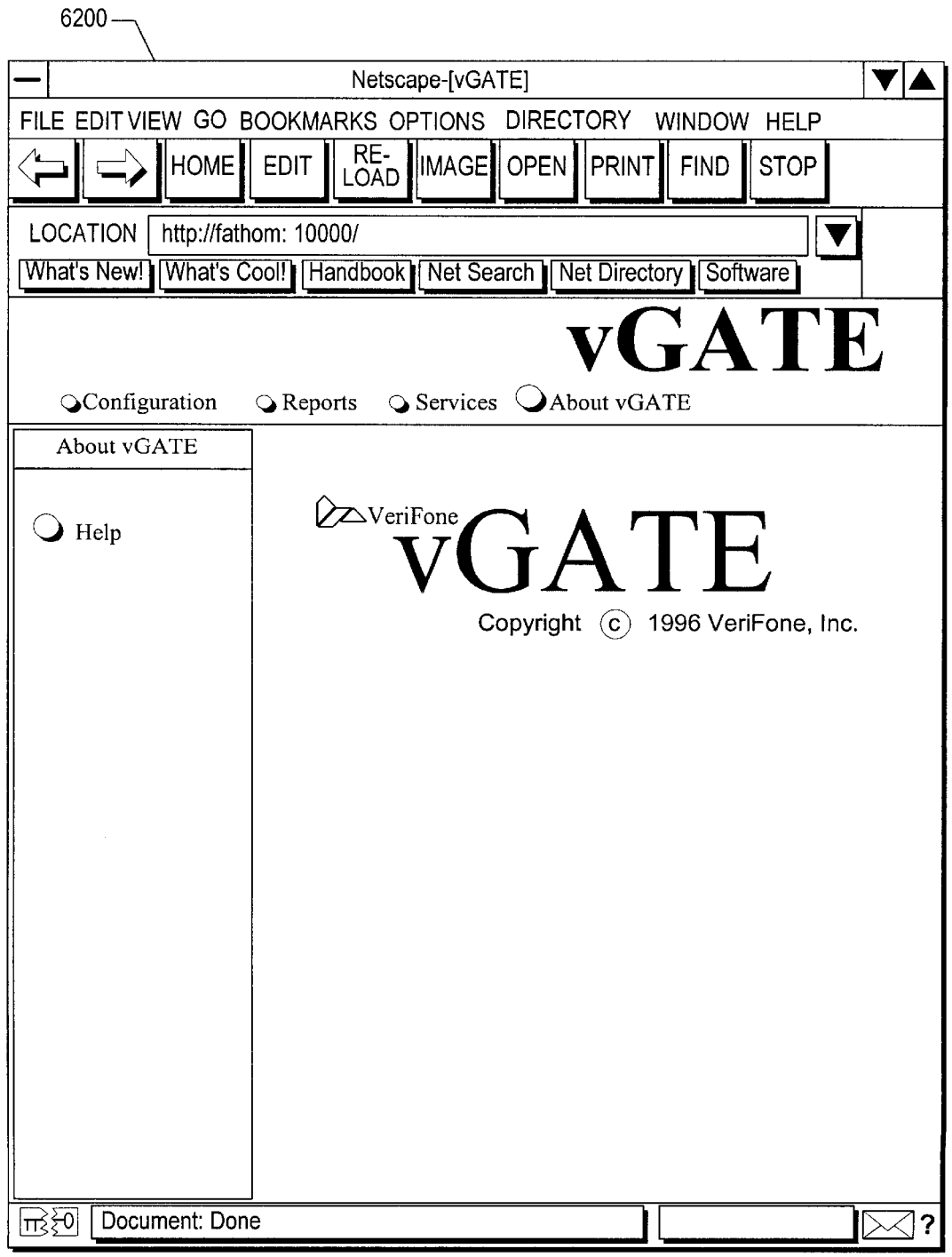
FIG. 62 is the main administration display for the Gateway in accordance with a preferred embodiment.

FIG. 62 is the main administration display for the Gateway in accordance with a preferred embodiment. A set of menu selections are presented at 6200, which will be described in more detail for each display.

Figure 63:
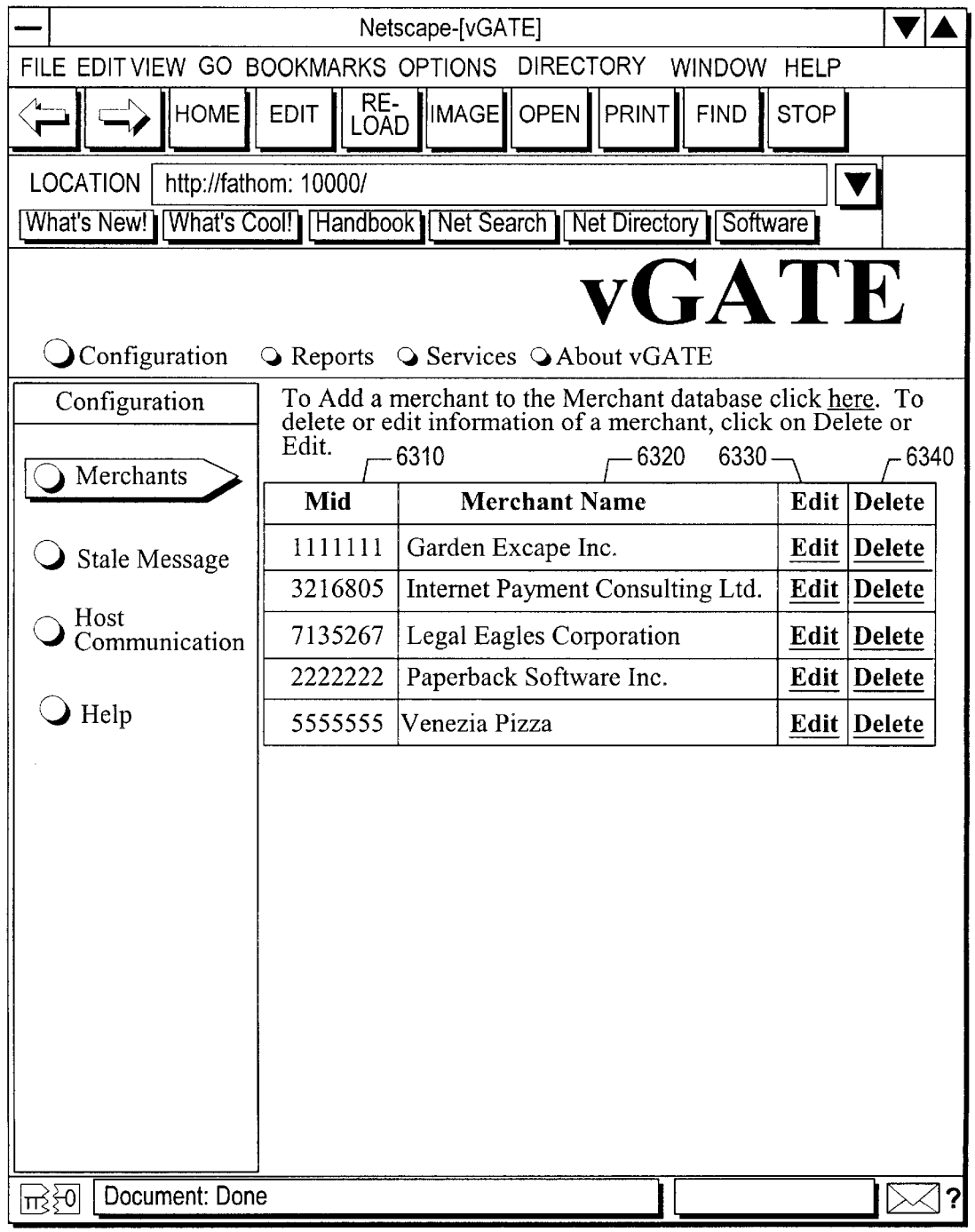
FIG. 63 is a configuration panel in accordance with a preferred embodiment.

FIG. 63 is a configuration panel in accordance with a preferred embodiment. The configuration panel provides access to management information for configuring a gateway management information database. A Merchant Identifier (Mid) 6310 is a thirty character, alphanumeric field that uniquely defines a merchant. A Merchant Name 6320 is a fifty character, alphanumeric field; Edit field 6330 and Delete field 6340 are hyperlinks to detailed panels for modifying information in the management information database.

Figure 64:
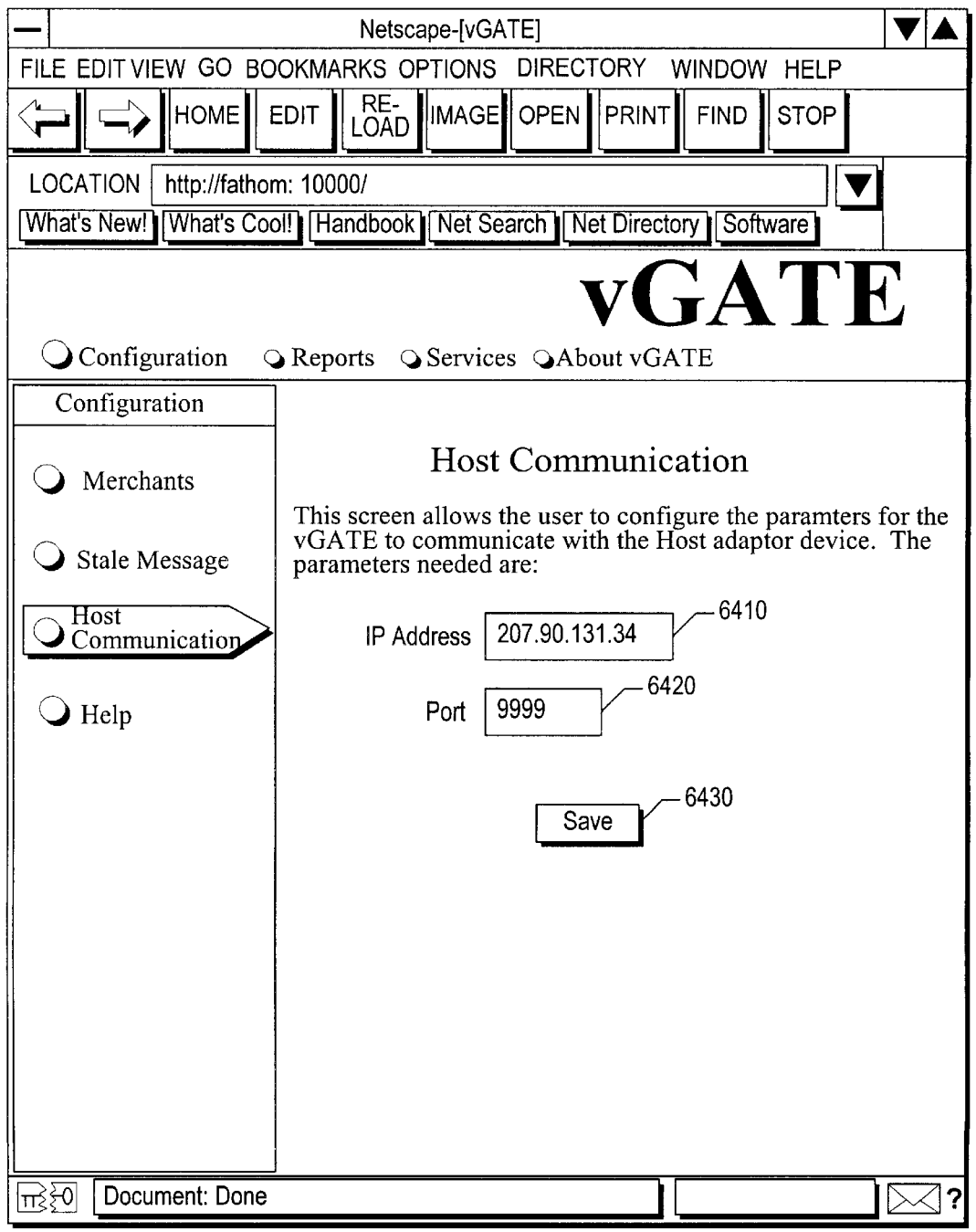
FIG. 64 is a host communication display for facilitating communication between the gateway and the acquirer payment host in accordance with a preferred embodiment.

FIG. 64 is a host communication display for facilitating communication between the Gateway and the acquirer payment host in accordance with a preferred embodiment. An IP Address Field 6410 includes the Internet Protocol address for communicating via TCP/IP to the Internet. A TCP logical port field 6420 uniquely identifies the port for accessing the Internet, and a SAVE field 6430 invokes storing of the host communication information in the database.

Figure 65:
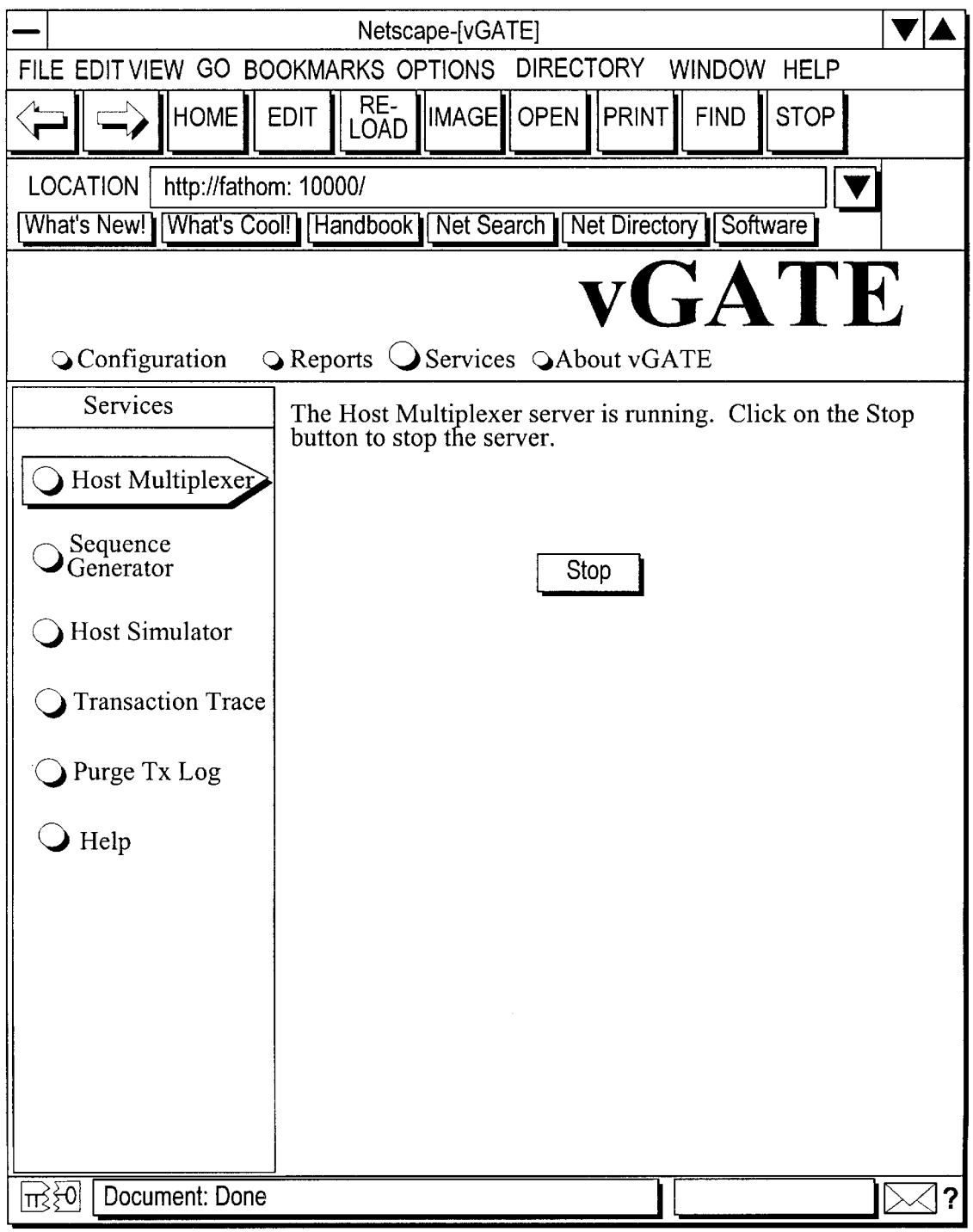
FIG. 65 is a Services display in accordance with a preferred embodiment.

FIG. 65 is a Services display in accordance with a preferred embodiment. The service display initiates portions of the Gateway such as host multiplexer 2130 of FIG. 21.

Figure 66:
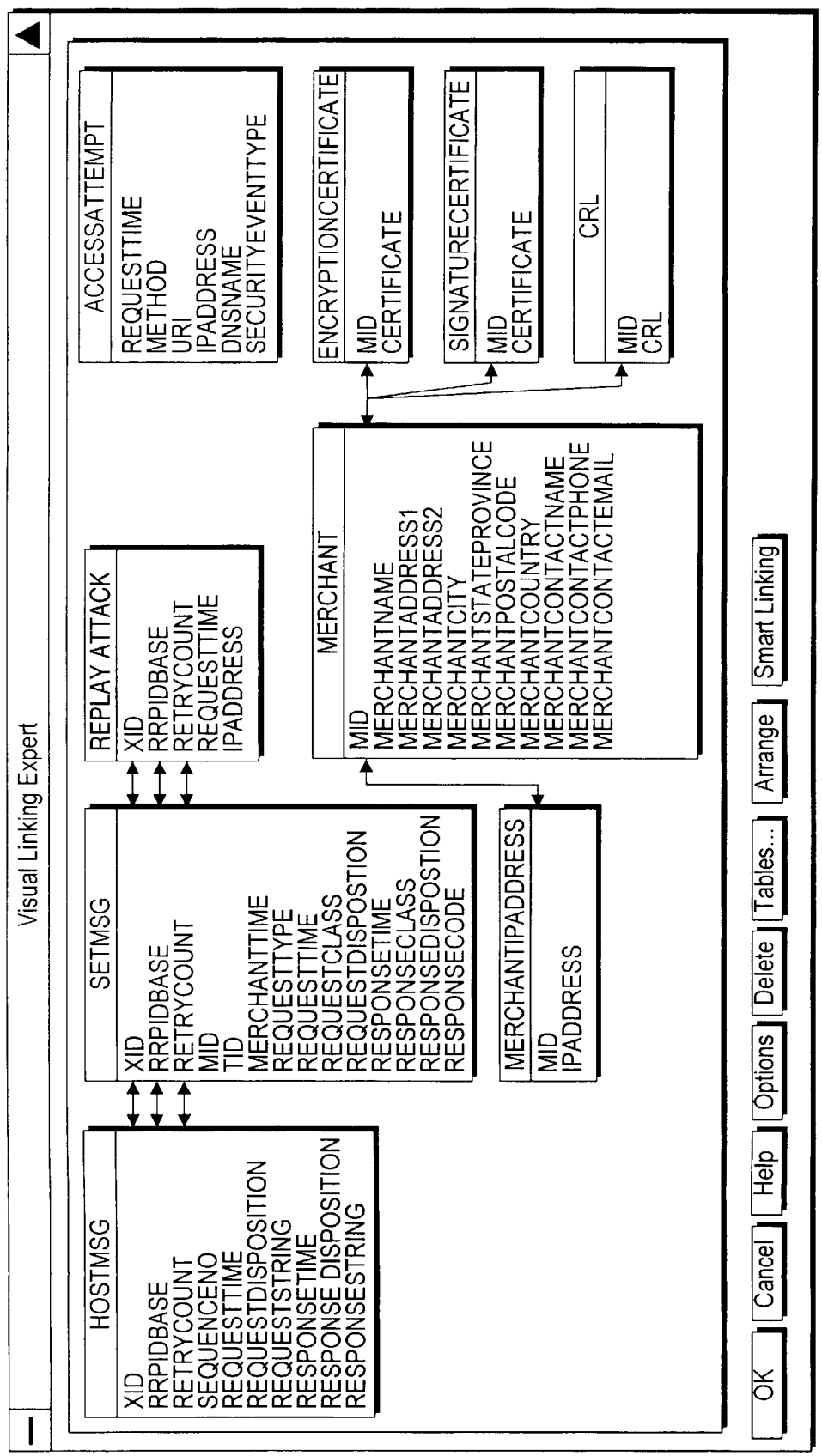
FIG. 66 is a graphical representation of the gateway transaction database in accordance with a preferred embodiment.

FIG. 66 is a graphical representation of the gateway transaction database in accordance with a preferred embodiment. Each of the fields represents a portion of the internet database schema.

In today's environment, value is generally transferred in one of two ways: via bank-to-bank transfers, which may be initiated in response to actions by clearing houses, and which use services such as FedWire or First Data Resources; and via card-to-card transfers of electronic cash in schemes such as Mondex. In the Mondex scheme, value is transferred from one smart card to another smart card by inserting cards one at a time into a personal computer or a pair of personal computers connected by a dedicated line. A value transfer protocol is employed to transfer the value as described on the Mondex Purse Functionality training material. The transactions are performed face-to-face with trusted hardware utilizing a secure, dedicated communication link. VeriFone, Inc., a leading global provider of secure payment solutions, supports Mondex smart cards just as Visa, MasterCard, or other credit cards are supported. This support enables VeriFone to offer hardware and software for "electronic cash" payment. VeriFone's family of smart card system products allows retail merchant and consumer Mondex smart cards to interface and to facilitate digital cash payments for all goods and services currently purchased with coins and currency.

Mondex is a smart card-based electronic cash payment system being introduced by banks around the world. Because the microprocessors contained on the Mondex smart cards can communicate securely with one another, cash-equivalent value can be stored in the cards, thereby enabling consumers to purchase goods at retail stores and on the Internet. However, if the smart cards are utilized on the Internet without otherwise securing the transaction, interception and fraudulent transactions are possible. Such fraud results not from the transfer of value onto some device other than a Mondex card, but rather from misrepresentation on the part of the holder of a Mondex card (e.g., promising delivery of goods after acceptance of cash, but then not following through).

Solutions in accordance with a preferred embodiment enable merchants to add Mondex chip card capability to their existing applications. In addition to supporting the Mondex electronic cash system, VeriFone chip card payment solutions are available for processing smart card-based stored-value, credit and debit programs of other payment associations. Meeting high international security standards, the system features an integrated dual track reader that can run both magnetic stripe and smart card-based applications. Additionally, the optional graphics display supports a variety of icons, logos, and various non-Roman character sets such as Arabic, Cyrillic, Chinese, and Japanese.

Recently, the Internet was proposed as a communication medium connecting personal computers with specialized reader hardware similar to the Verifone hardware described above. However, the Internet is not a secure communication medium and value transfer was not secured. Thus, a solution was necessary to shore up the Internet with secure value transfer processing to facilitate smart card processing over the Internet. In addition, support was required to ensure that no third party could hijack a value transfer transaction. This would occur if someone diverted the transaction before it even started. In the prior art face-to-face solution, both parties can confirm the other party's identity. However, the Internet separates the parties with miles of wire.

Figure 67:
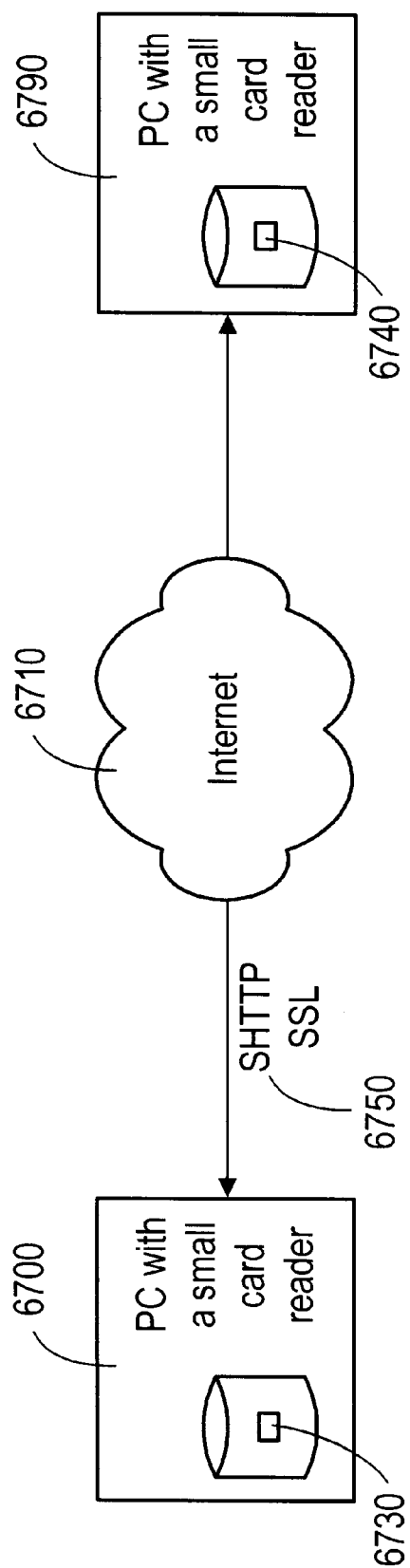
FIG. 67 is a block diagram of a secure method for transferring value from one smart card to another in accordance with a preferred embodiment.

FIG. 67 is a block diagram of a secure method for transferring value from one smart card to another in accordance with a preferred embodiment. Devices 6700 and 6790 are personal computers with chip card readers such as the Mondex purse described in the Mondex system documentation. Digital certificates 6730 and 6740 are utilized in conjunction with digital signatures to ensure that both parties are who they say they are. In addition, a secure transport protocol 6750, such as SHTTP or SSL as described above, is utilized to ensure that the information flowing over the Internet 6710 is secure. Digital certificates and digital signatures positively identify the parties and establish a secure communication link before beginning a transaction. Identity information could even be displayed before beginning the transaction to provide further security. Optionally, the display could indicate that a hierarchy was broken and present a suspicion factor to the user. Then, if a user demands confirmation before recommencing the transaction with the identified party, security would be maintained. The authenticating actions that the parties perform in addition to the exchange of digital certificates and signatures could also entail the exchange of parameters of the transfer. For example, how much money should be exchanged, what currency, the terms of the transfer such as interest and how long payments would last. Then, the chip card could begin its dialog with the corresponding chip card along the line of established procedures to exchange value.

The Mondex scheme is unique when compared with host-based systems such as VisaCash, in that it is a totally off-line system. With schemes such as VisaCash, the smart cards themselves must reconcile their value and transaction history with that of a financial host machine. In the Mondex scheme, value transfer is purely card-to-card and completely offline, in effect creating a new currency that is an alternative to cash, but which is backed by cash held in escrow by an approved party (in the case of Mondex, a Mondex Value Originator).

With the advent of card-to-card electronic cash schemes, replacing conventional settlement techniques with instantaneous transfer of monetary value, the Internet (either the public Internet, or a private, virtual IP network (e.g., VPN) with performance guarantees), combined with a stored value, electronic cash system like Mondex, can completely alter credit card processing as we know it today.

Figure 68:
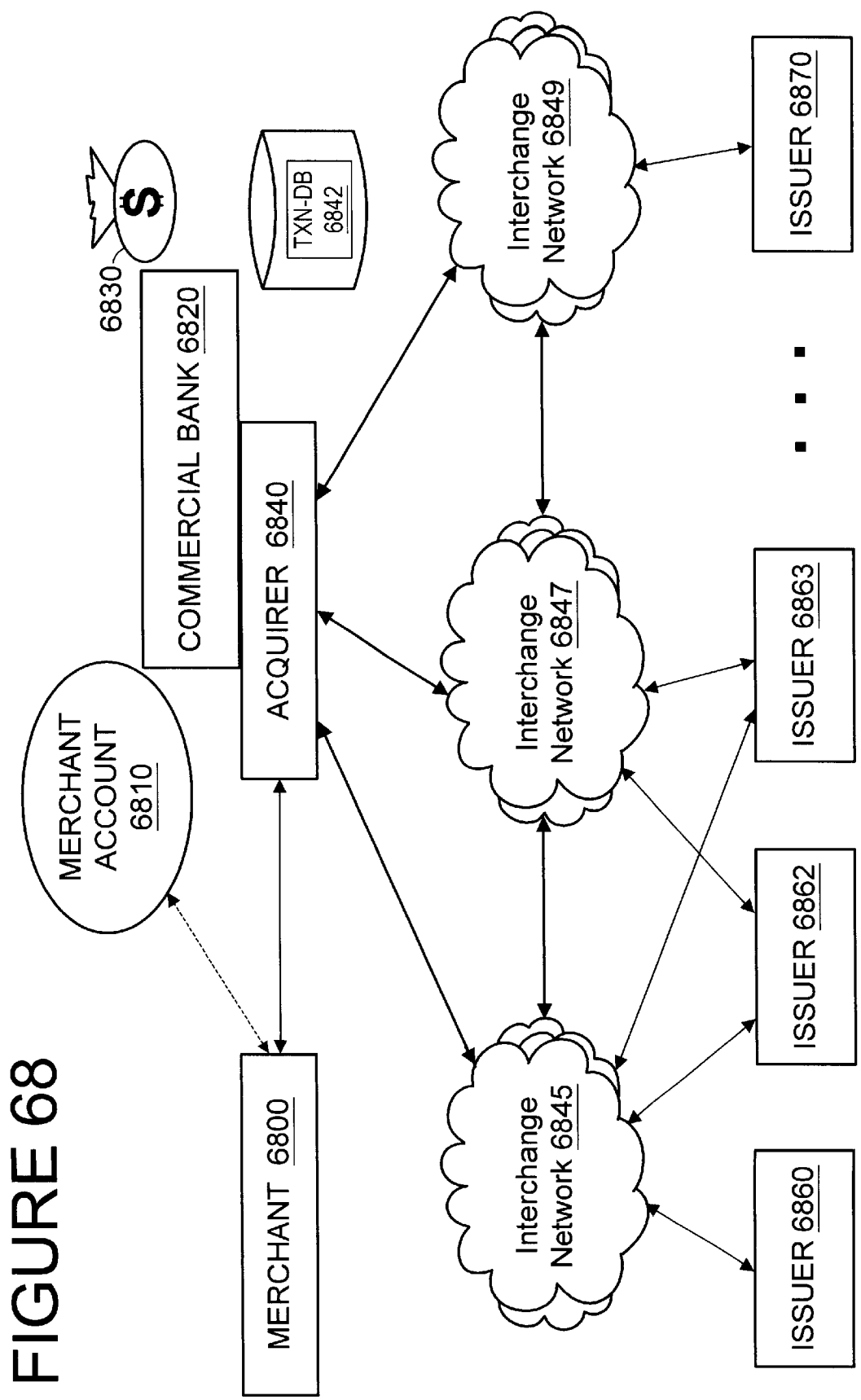
FIG. 68 is a block diagram illustrating a traditional acquirer service.

FIG. 68 is a block diagram illustrating a traditional acquirer service. A merchant 6800 has a merchant account 6810 that is held at a commercial bank 6820 as represented by a bag of money 6830. When merchant 6800 is presented with a credit card or other payment method, merchant 6800 contacts an acquirer 6840, with which he has already established a business relationship, to determine if the transaction is covered by an issuer 6860, 6862, 6863, or 6870. Acquirer 6840 requests an authorization for the purchase by communicating via an interchange network 6845, 6847, or 6849, or in some cases, a dedicated private network, to communicate to the particular issuer 6860, 6862, 6863, or 6870. Acquirer 6840 also utilizes a transaction database 6842 to store all message requests and responses that are transmitted between merchant 6800 and acquirer 6840; and acquirer 6840 and issuers 6860, 6862, 6863, or 6870. For example, an authorization message could be a merchant 6800 to acquirer 6840 request that is translated into an acquirer 6840 to issuer 6860, 6862, 6863, or 6870 request. An issuer 6860, 6862, 6863, or 6870 to acquirer 6840 response is transmitted back from the issuer 6860, 6862, 6863, or 6870 and is translated back into an acquirer 6840 to merchant 6800 response. All four strings of characters associated with the messages may be stored in transaction database 6842 for complete transaction integrity.

Figure 69:
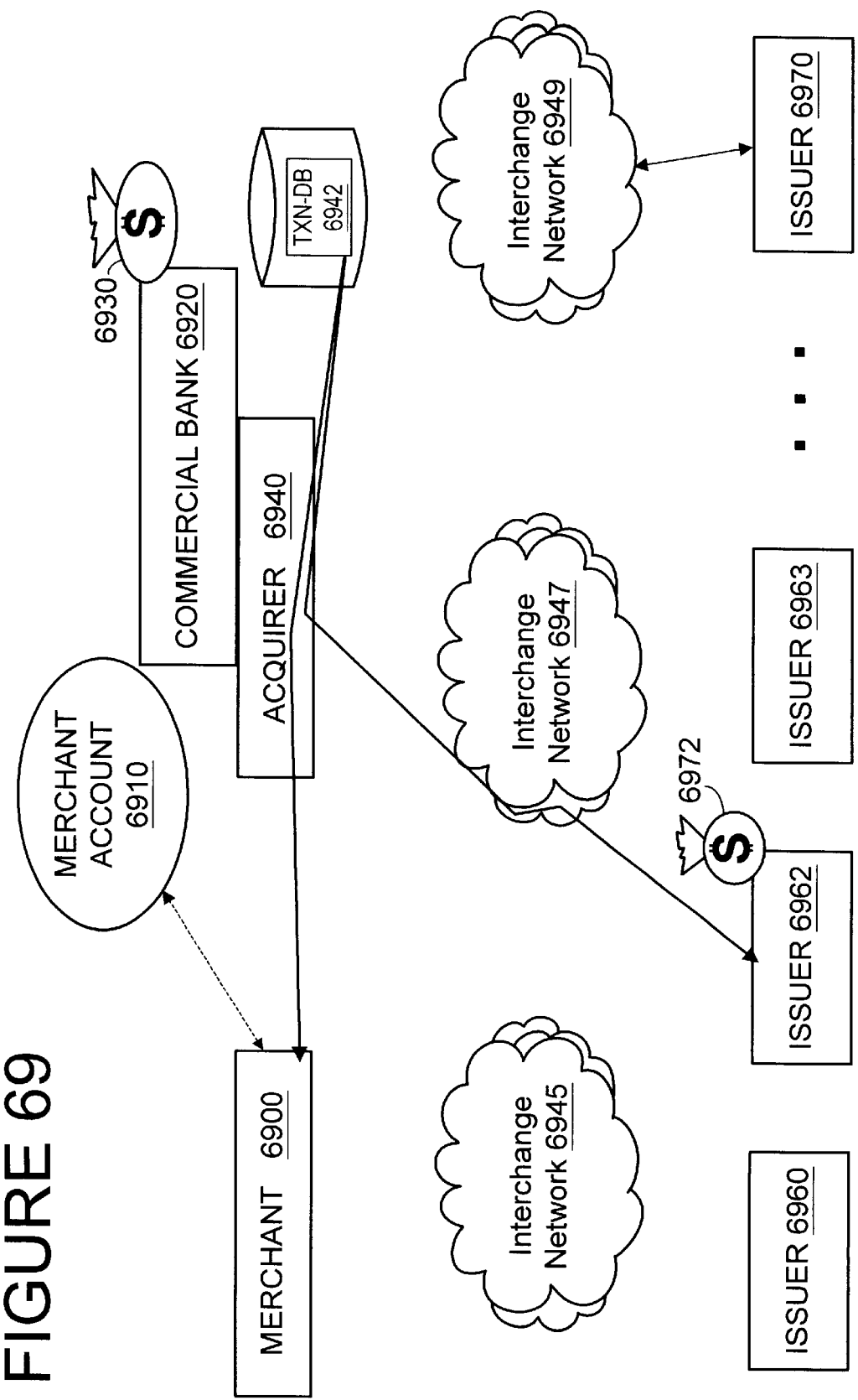
FIG. 69 is a block diagram illustrating a traditional acquirer service.

FIG. 69 is a block diagram illustrating a traditional acquirer service. A merchant 6900 has a merchant account 6910 that is held at a commercial bank 6920 as represented by a bag of money 6930. When merchant 6900 is presented with a credit card or other payment method, merchant 6900 contacts an acquirer 6940 to determine if the transaction is covered by issuer 6962. Acquirer 6940 determines authorization by communicating to an interchange network 6947 to communicate to issuer 6962. Acquirer 6940 also utilizes a transaction database 6942 to obtain all message requests and responses that are transmitted between merchant 6900 and acquirer 6940; and acquirer 6940 and issuer 6962. Acquirer 6940 utilizes switching and transaction processing programs, which access transaction database 6942 to obtain the proper data string for communicating through interchange network 6947 or other network, utilizing an agreed-upon protocol to issuer 6962. Issuer 6962 determines whether the transaction should be authorized based on lists of inactive accounts, the credit limit, and spending pattern that has transpired to date on the particular credit card and transmits an indicia of authorization via acquirer 6940 to merchant 6900.

Figure 70:
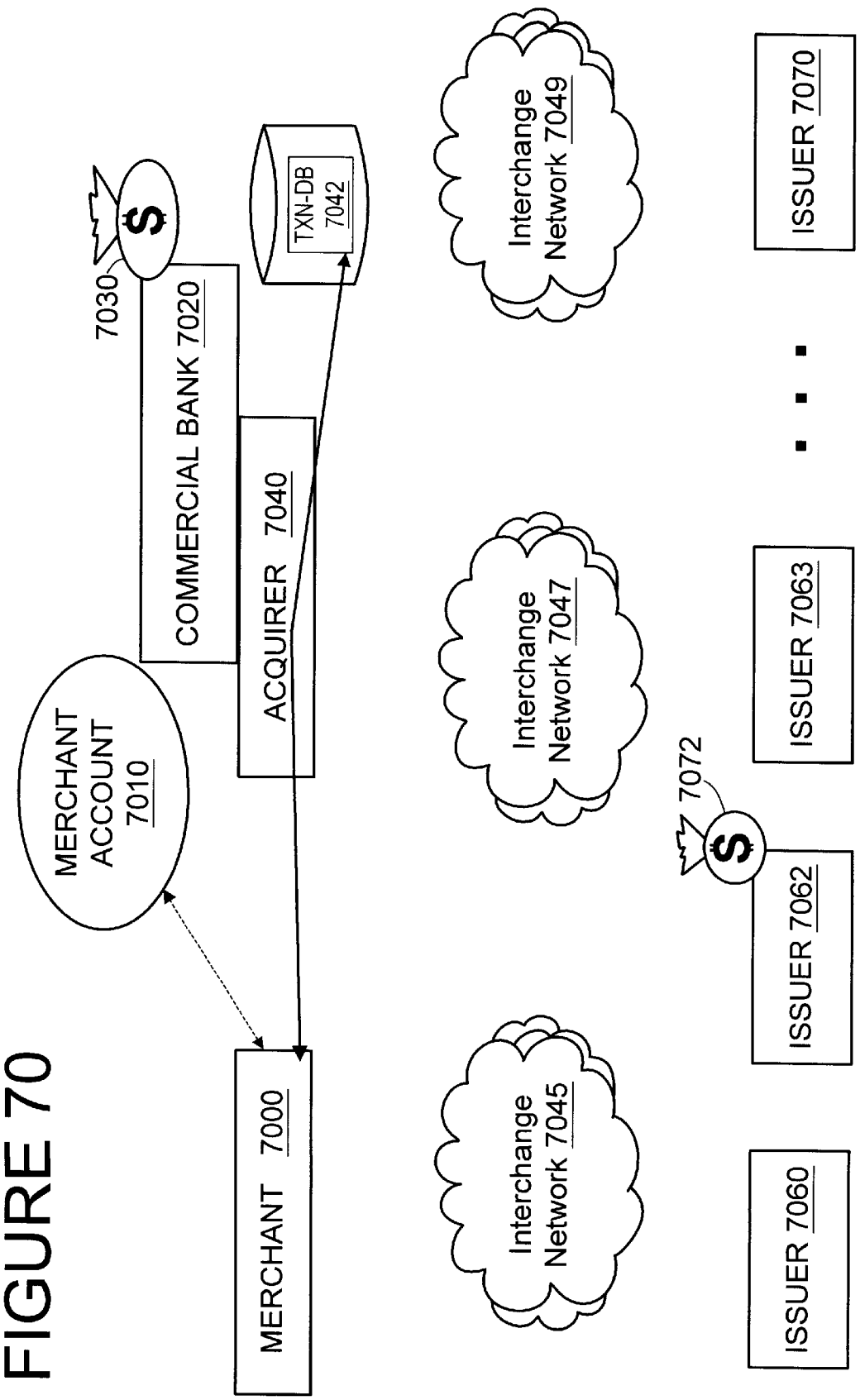
FIG. 70 is a block diagram illustrating a traditional acquirer service.

FIG. 70 is a block diagram illustrating a traditional acquirer service. A merchant 7000 has a merchant account 7010 that is held at a commercial bank 7020 as represented by a bag of money 7030. When merchant 7000 has shipped goods or otherwise delivered service to the cardholder, merchant 7000 contacts an acquirer 7040, which had performed the prior authorization of FIG. 69, to request payment for the transaction previously approved by an issuer 7062. This is called a "capture" transaction. Note that in cases where merchant 7000 is providing immediate fulfillment of goods or services, such as in a physical retail environment, the "capture" transaction may be combined with the "authorization" transaction of FIG. 69, to create a single "sale" transaction.

Acquirer 7040 aggregates all "capture requests" from all merchants serviced by acquirer 7040, in preparation for end-of-day (EOD) settlement with other financial institutions. Periodically, merchant account 7010 is "batch closed" or "cut-off," meaning that an end-of-day event is posted, and all cash due to or due from the merchant will be transferred to or from the merchant account after acquirer 7040 has obtained funds from issuing banks 7060, 7062, 7063, and 7070, via a settlement service. The cut-off of merchant account 7010 may be initiated by merchant 7000 or acquirer 7040, depending on specific business rules determined by acquirer 7040. Based on the cut-off time, an acquirer database 7042 will contain a specific set of transactions, which must be covered by a funds transfer from issuer 7062 to acquirer 7040.

Figure 71:
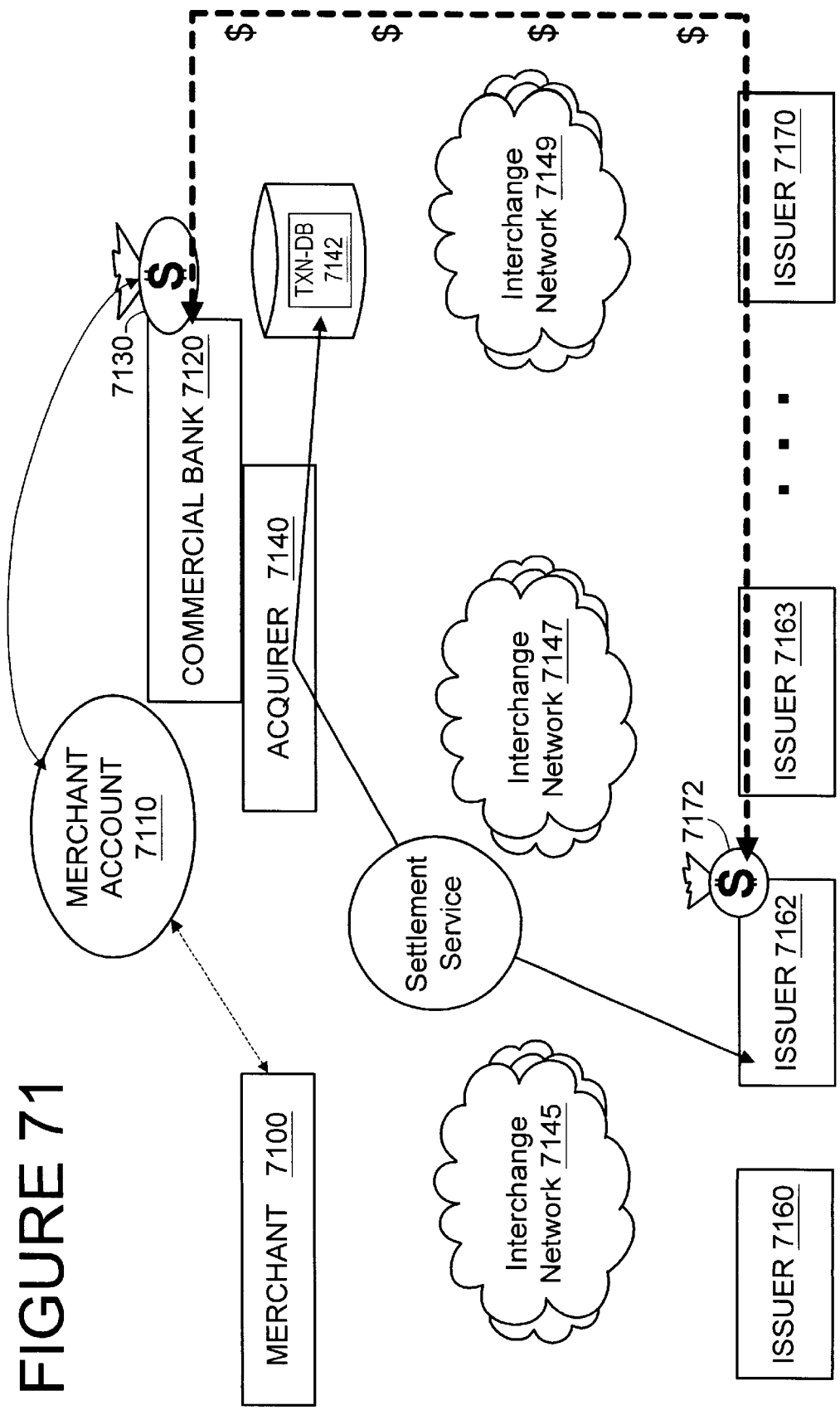
FIG. 71 is a block diagram illustrating a traditional acquirer service.

FIG. 71 is a block diagram illustrating a traditional acquirer service. A merchant 7100 has a merchant account 7110 that is held at a commercial bank 7120 as represented by a bag of money 7130. Periodically (typically once a day), an acquirer 7140 aggregates all merchant transactions pending for all transaction batches closed since the last settlement date and settles those transactions so as to fund merchant 7100. Acquirer 7140 utilizes an in-house or (more commonly) an outsourced settlement service 7180 to determine its net credit or debit position with each of the issuing banks 7160, 7162, 7163, and 7170 with which it has a relationship. The settlement service calculates the net payments due to or from each financial institution, which participates in the settlement and coordinates the transfer of funds to or from a single account held by the settlement service in a Federally-approved location, generally with the Federal Reserve. For any acquirer-issuer relationship, the net result is a flow of funds from issuer 7162 to acquirer 7140. For a given merchant 7100, acquirer 7140 uses the proceeds from the settlement with all issuers 7160, 7162, 7163, . . . 7170 to fund the merchant's account 7110 according to the transactions posted in acquirer database 7142.

Thus, as illustrated in FIGS. 68–71, in the current environment, an acquirer serves three main functions. First, the acquirer serves as a switch for the merchant's authorization requests to be sent to the appropriate issuer. Second, the acquirer serves as an aggregator of transactions, which simplifies the movement of money during settlement. The movement of the money itself is generally done via FedWire, Visa, or FDR (Federal Reserve). In this way, a merchant does not have to have a relationship with hundreds of different issuing banks. Third, the acquirer is responsible for risk management, which entails evaluating a merchant for credit-worthiness, which also requires the acquirer to assume the risks of a merchant perpetrating fraud or going bankrupt.

Figure 76:
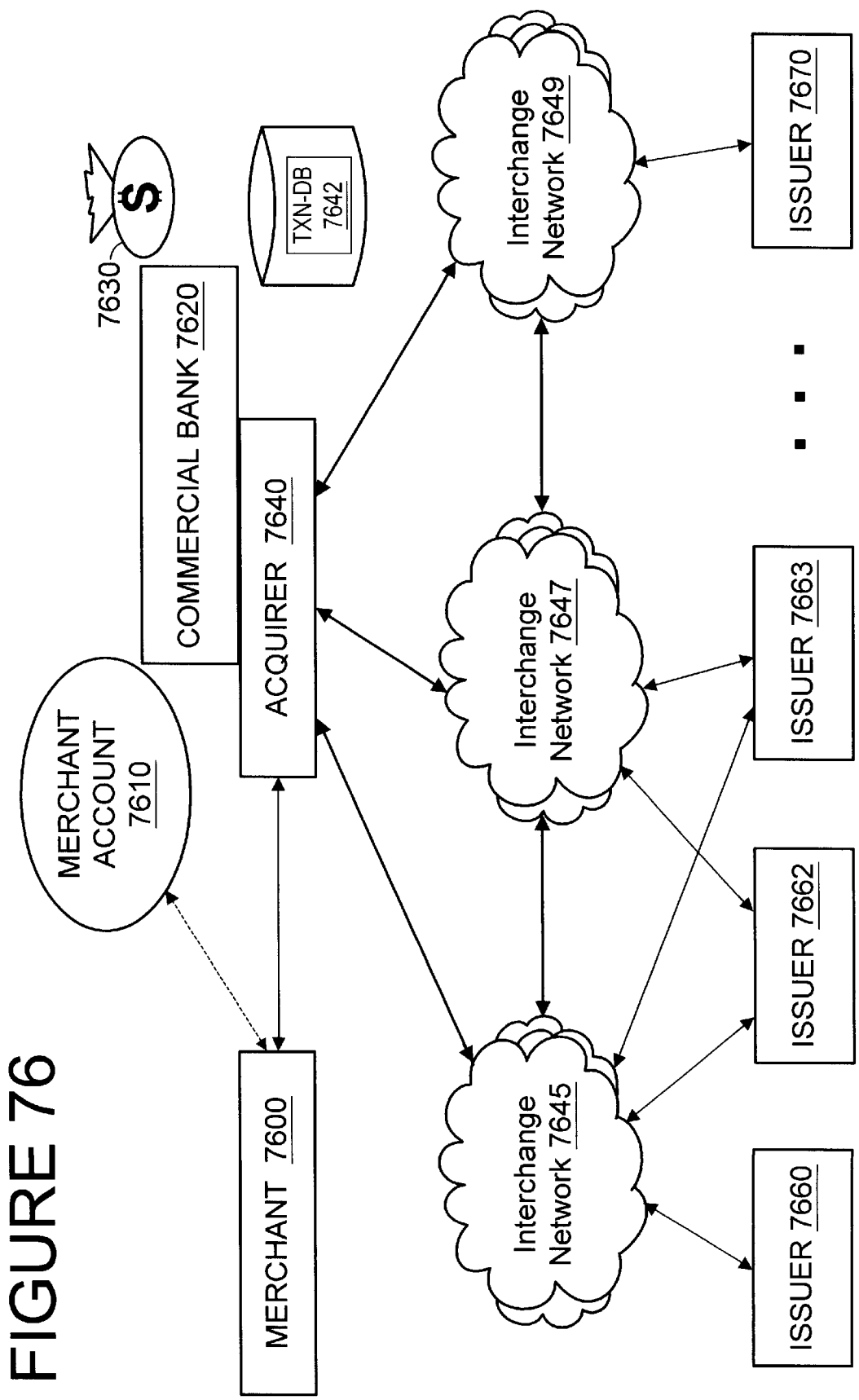
FIG. 76 is a block diagram illustrating an acquirer service in accordance with a preferred embodiment.
Figure 77:
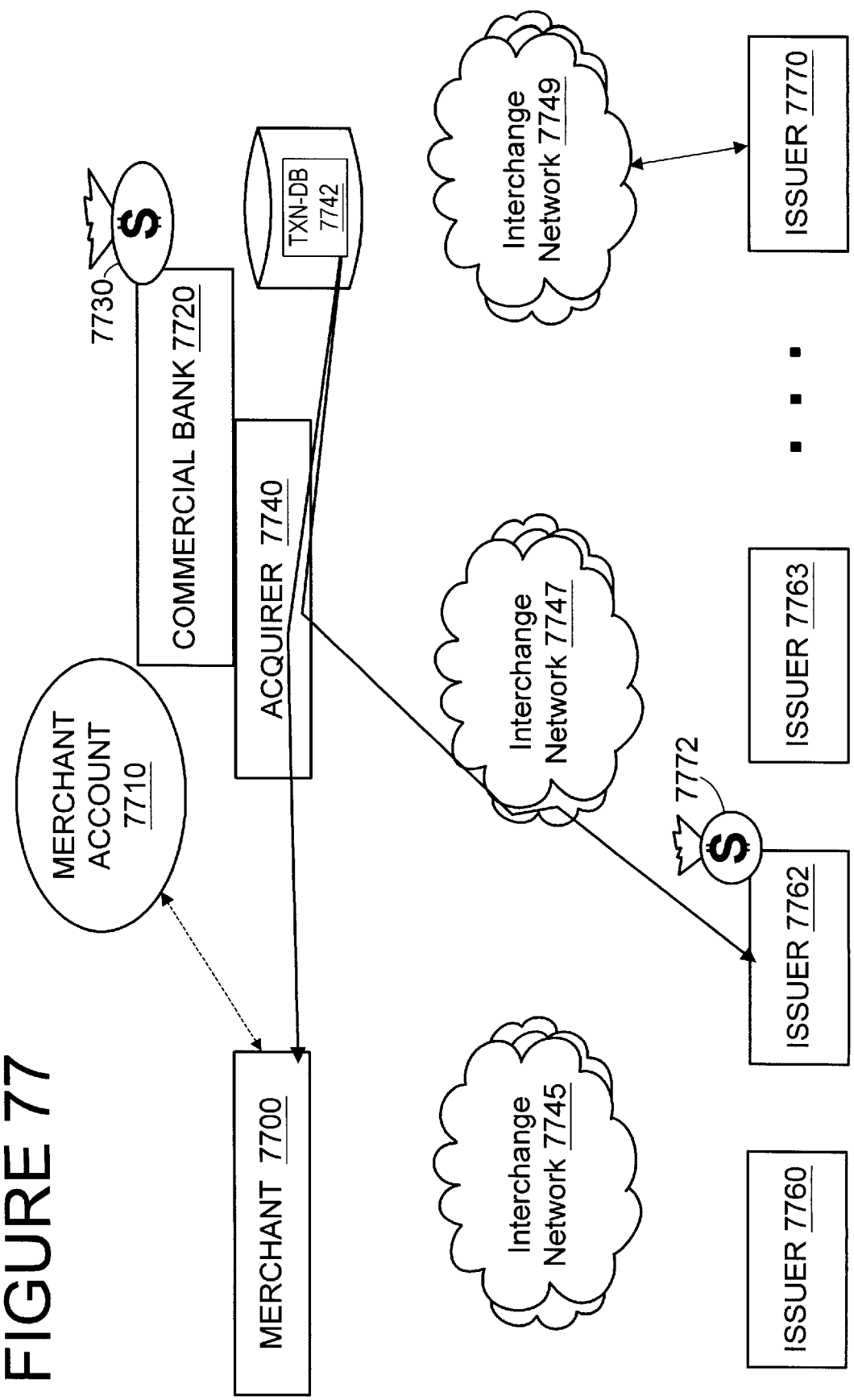
FIG. 77 is a block diagram illustrating an acquirer service in accordance with a preferred embodiment.
Figure 78:
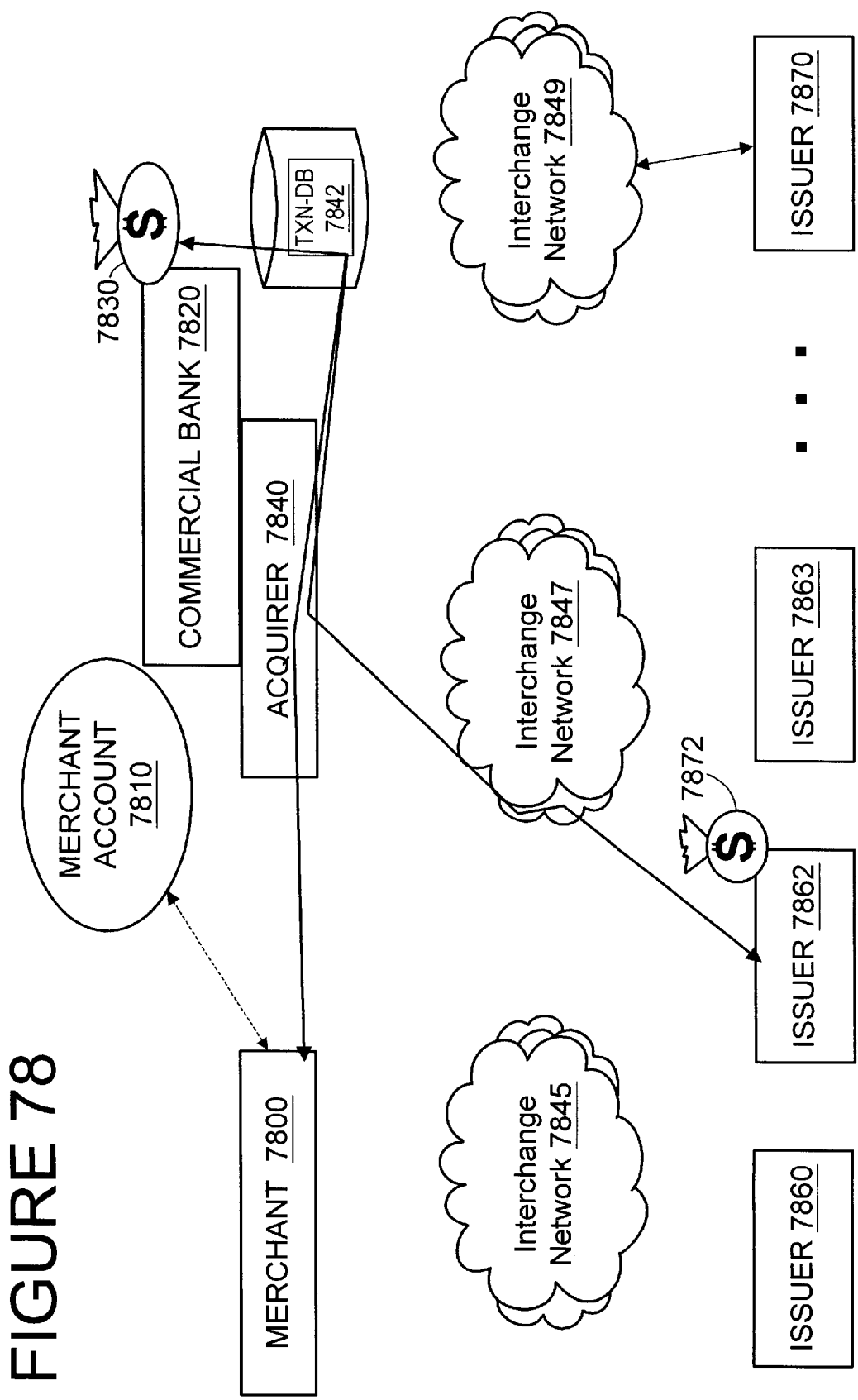
FIG. 78 is a block diagram illustrating an acquirer service in accordance with a preferred embodiment.

However, the use of electronic cash to facilitate settlement and monetary transfer allows for optimizations to the procedures used today by issuers and acquirers. Accordingly, three preferred embodiments will now be described, which differ, for example, in the frequency with which settlement is done and the parties involved in the settlement. Which of the three preferred embodiments is most useful is a function of business practices and the regulatory environment in which the financial institutions operate. FIGS. 72–75 illustrate preferred embodiment A, in which electronic cash transfer replaces conventional settlement. FIGS. 76–78 illustrate preferred embodiment B, in which real-time settlement occurs, transferring monetary value (or a notation thereof) with each credit or debit transaction. FIGS. 79–82 illustrate preferred embodiment C, in which real-time settlement occurs directly between the merchant and the issuer, without need for an acquirer relationship. Various combinations of the methods taught in each of these preferred embodiments may be employed, for example, to optimize transaction processing as a function of available infrastructure.

Figure 72:
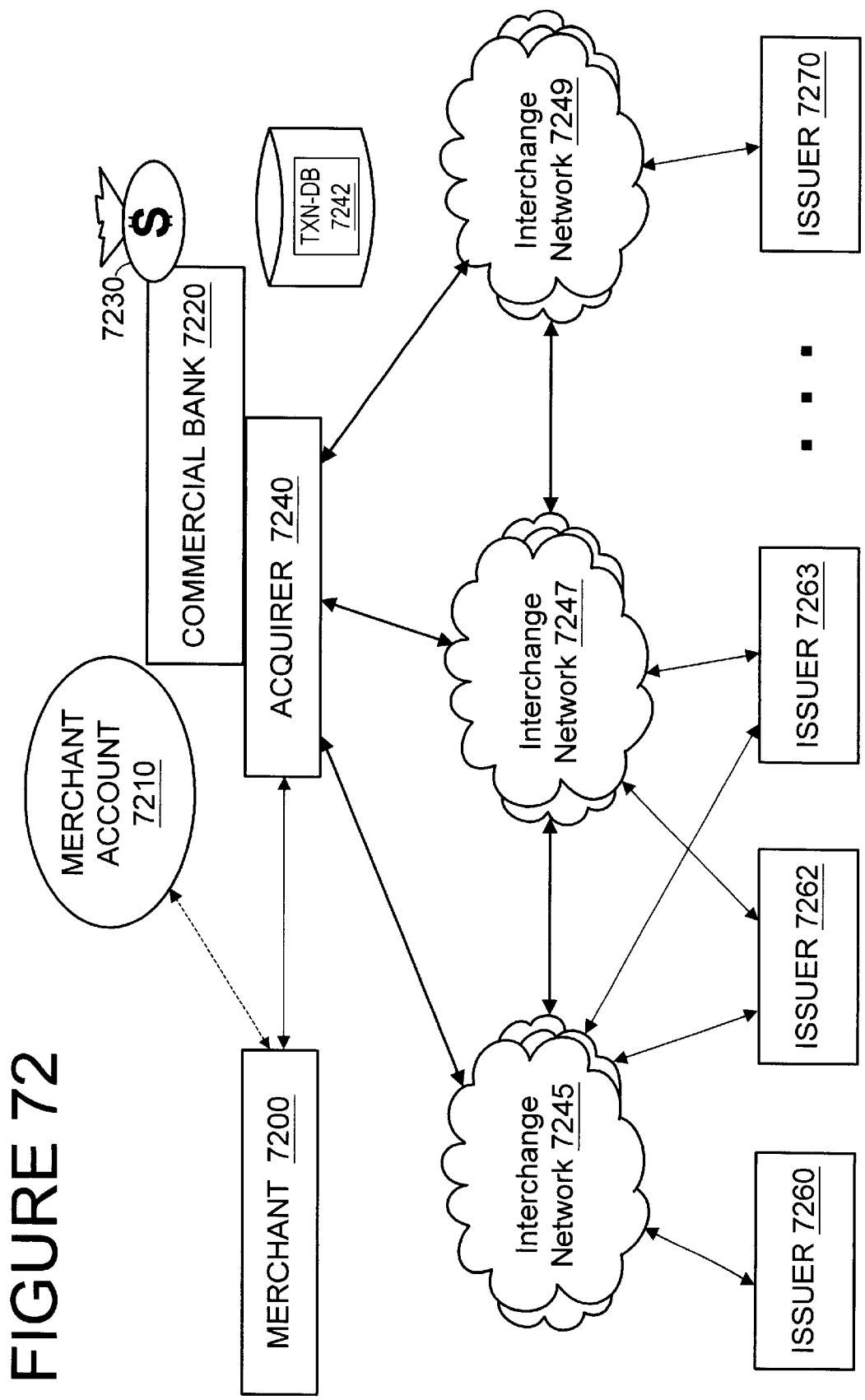
FIG. 72 is a block diagram illustrating an acquirer service in accordance with a preferred embodiment.

FIG. 72 is a block diagram illustrating an acquirer service in accordance with preferred embodiment A. A merchant 7200 has a merchant account 7210 that is held at a commercial bank 7220 as represented by a bag of money 7230. When merchant 7200 is presented with a credit card or other payment method, merchant 7200 contacts an acquirer 7240, with which he has already established a business relationship, to determine if the transaction is covered by issuer 7260, 7262, 7263, or 7270. Acquirer 7240 requests an authorization for the purchase by communicating via an interchange network 7245, 7247, or 7249, or in some cases, a dedicated private network, to communicate to the particular issuer 7260, 7262, 7263, or 7270. Acquirer 7240 also utilizes a transaction database 7242 to store all message requests and responses that are transmitted between merchant 7200 and acquirer 7240; and acquirer 7240 and issuers 7260, 7262, 7263, or 7270. For example, an authorization message could be a merchant 7200 to acquirer 7240 request that is translated into an acquirer 7240 to issuer 7260, 7262, 7263, or 7270 request. An issuer 7260, 7262, 7263 or 7270 to acquirer 7240 response is transmitted back from issuer 7260, 7262, 7263 or 7270 and is translated back into an acquirer 7240 to merchant 7200 response. All four strings of characters associated with the messages may be stored in a transaction database 7242 for complete transaction integrity.

Figure 73:
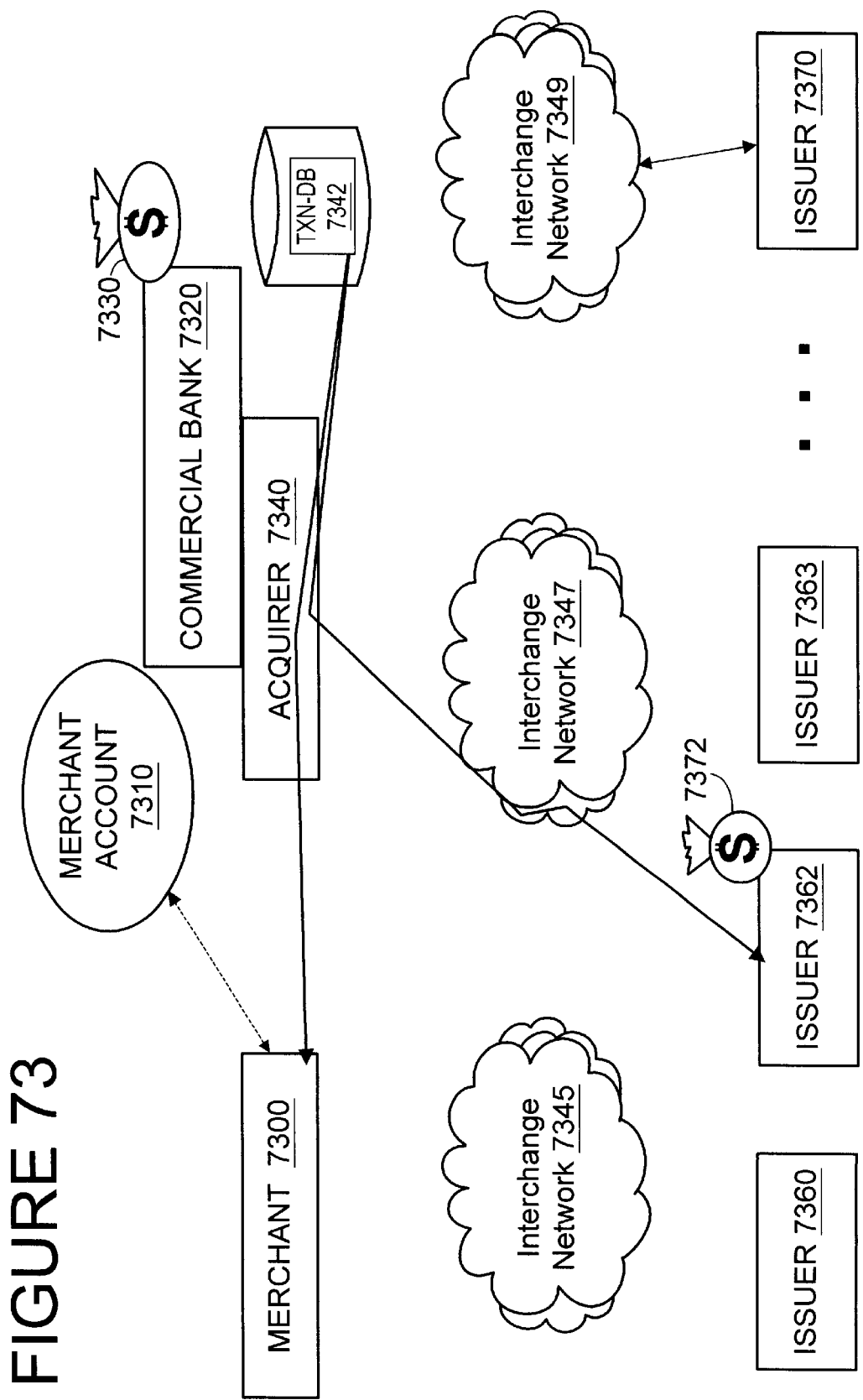
FIG. 73 is a block diagram illustrating an acquirer service in accordance with a preferred embodiment.

FIG. 73 is a block diagram illustrating an acquirer service in accordance with preferred embodiment A. A merchant 7300 has a merchant account 7310 that is held at a commercial bank 7320 as represented by a bag of money 7330. When merchant 7300 is presented with a credit card or other payment method, merchant 7300 contacts an acquirer 7340 to determine if the transaction is covered by an issuer 7362. Acquirer 7340 determines authorization by communicating to an interchange network 7347 to communicate to issuer 7362. Acquirer 7340 also utilizes a transaction database 7342 to obtain all message requests and responses that are transmitted between merchant 7300 and acquirer 7340; and acquirer 7340 and issuer 7362. Acquirer 7340 utilizes switching and transaction processing programs, which access transaction database 7342 to obtain the proper data string for communicating through interchange network 7347 or other network, utilizing an agreed-upon protocol to issuer 7362. Issuer 7362 determines whether the transaction should be authorized based on lists of inactive accounts, the credit limit, and spending pattern that has transpired to date on the particular credit card and transmits an indicia of authorization via acquirer 7340 to merchant 7300.

Figure 74:
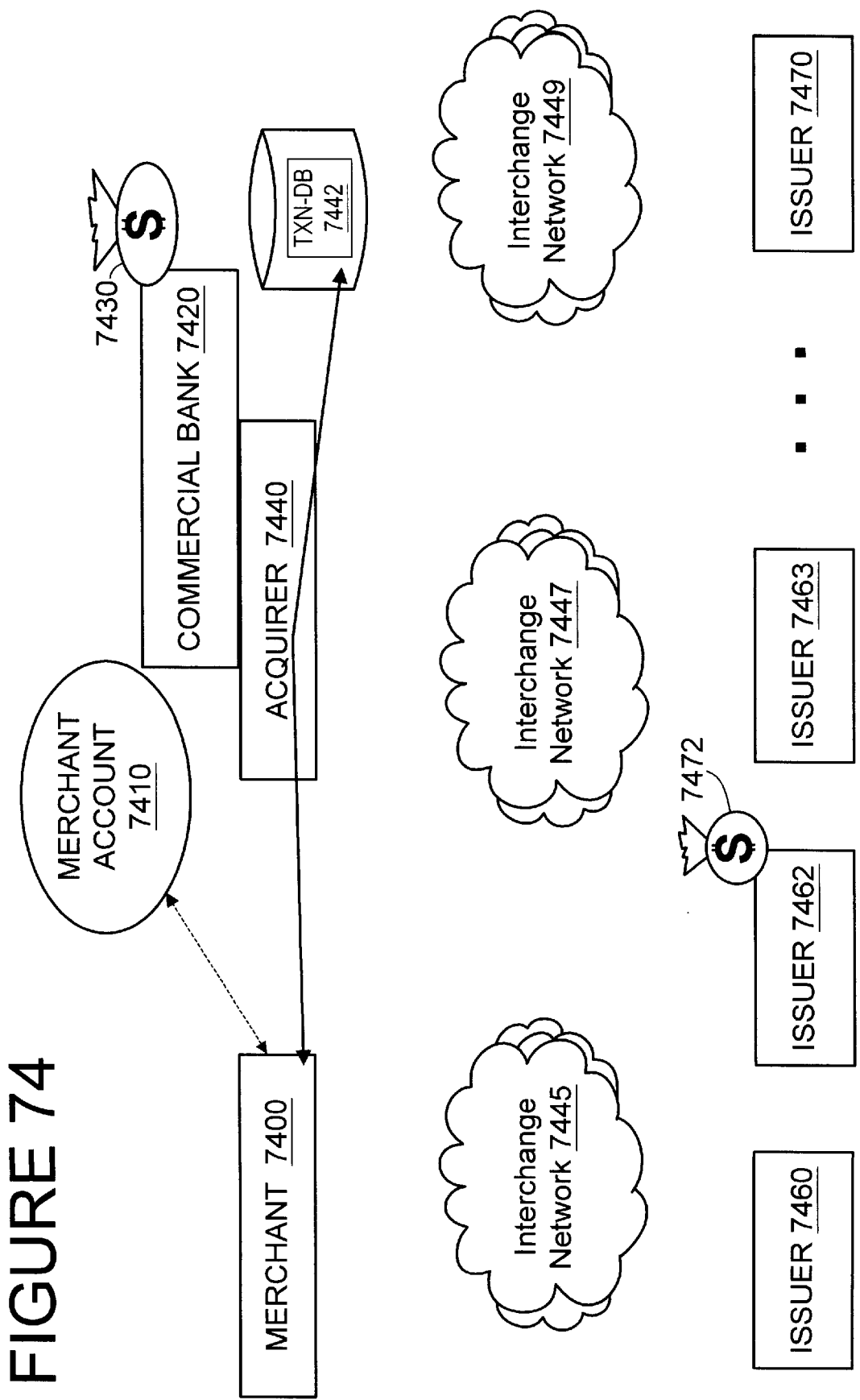
FIG. 74 is a block diagram illustrating an acquirer service in accordance with a preferred embodiment.

FIG. 74 is a block diagram illustrating an acquirer service in accordance with preferred embodiment A. A merchant 7400 has a merchant account 7410 that is held at a commercial bank 7420 as represented by a bag of money 7430. When merchant 7400 has shipped goods or otherwise delivered service to the cardholder, merchant 7400 contacts acquirer 7440, which had performed the prior authorization of FIG. 73, to request payment for the transaction previously approved by issuer 7462. This is called a "capture" transaction. Note that in cases where the merchant 7400 is providing immediate fulfillment of goods or services, such as in a physical retail environment, the "capture" transaction may be combined with the "authorization" transaction of FIG. 72, to create a single "sale" transaction. Acquirer 7440 aggregates all "capture requests" from all merchants serviced by the acquirer, in preparation for end-of-day (EOD) settlement with other financial institutions. Periodically, merchant account 7410 is "batch closed" or "cut-off," meaning that an end-of-day event is posted, and all cash due to or due from the merchant will be transferred to or from the merchant account after acquirer 7440 has obtained funds from issuing banks 7460, 7462, 7463, and 7470, via a settlement service. The cut-off of merchant account 7410 may be initiated by merchant 7400 or acquirer 7440, depending on specific business rules determined by the acquirer. Based on the cut-off time, an acquirer database 7442 will include a specific set of transactions that must be covered by a funds transfer from issuer 7462 to acquirer 7440. This portion of preferred embodiment A (as discussed above with respect to FIGS. 72 through 74 ) is in conformance with the accepted practice for processing captures today.

Figure 75:
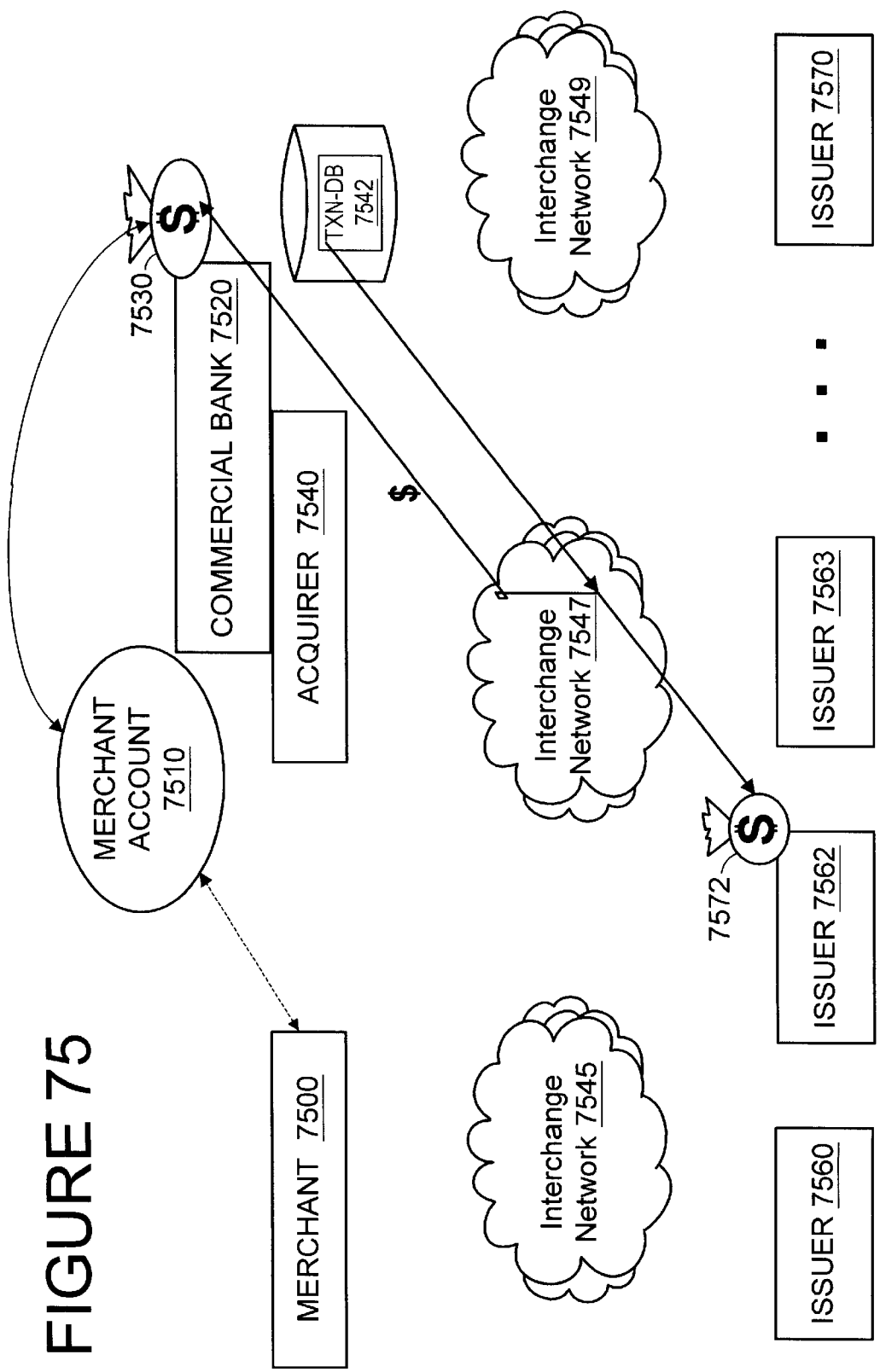
FIG. 75 is a block diagram illustrating an acquirer service in accordance with a preferred embodiment.

FIG. 75 is a block diagram illustrating an acquirer service in accordance with preferred embodiment A. A merchant 7500 has a merchant account 7510 that is held at a commercial bank 7520 as represented by a bag of money 7530. Periodically (typically once a day), an acquirer 7540 aggregates all merchant transactions pending for all transaction batches closed since the last settlement date and settles those transactions so as to fund the merchant. Acquirer 7540 executes a program that interrogates an acquirer transaction database 7542 to determine its net credit or debit position with each of the issuing banks 7560, 7562, 7563, and 7570 with which it has a relationship. Acquirer 7540 then reconciles with each issuer 7560, 7562, 7563, and 7570 to determine the net payments due to or from each financial institution. For each acquirer-issuer relationship, the net result is a flow of funds from issuer 7562 to acquirer 7540 directly from issuer to acquirer (or vice versa), utilizing an electronic cash scheme such as Mondex, and completely bypassing the Federal Reserve and any clearinghouse type of settlement service. This portion of preferred embodiment A differs significantly from accepted practice today, and is enabled by the advent of electronic cash. The actual transfer of funds via electronic cash may be effected using an interchange network 7547 or any other network. For a given merchant 7500, acquirer 7540 uses the proceeds from the pair-wise settlement with all issuers 7560, 7562, 7563, and 7570 to fund the merchant's account 7510 according to the transactions posted in acquirer database 7542.

The use of electronic cash to effect settlement advantageously means that no fees need be paid to a third-party settlement service such as Visa, FDR, or a clearinghouse. It also advantageously allows for settlement to be performed as frequently as specified by agreement between acquirer 7540 and issuer 7562.

FIGS. 76–78 illustrate preferred embodiment B, in which real-time settlement occurs, transferring monetary value (or a notation thereof) with each credit or debit transaction.

FIG. 76 is a block diagram illustrating an acquirer service in accordance with preferred embodiment B. A merchant 7600 has a merchant account 7610 that is held at a commercial bank 7620 as represented by a bag of money 7630. When merchant 7600 is presented with a credit card or other payment method, merchant 7600 contacts an acquirer 7640, with which he has already established a business relationship, to determine if the transaction is covered by issuer 7660, 7662, 7663, or 7670. The acquirer requests an authorization for the purchase by communicating via an interchange network 7645, 7647, or 7649, or in some cases, a dedicated private network, to communicate to the particular issuer 7660, 7662, 7663, or 7670. Acquirer 7640 also utilizes a transaction database 7642 to store all message requests and responses that are transmitted between merchant 7600 and acquirer 7640; and acquirer 7640 and issuers 7660, 7662, 7663, or 7670. For example, an authorization message could be a merchant 7600 to acquirer 7640 request that is translated into an acquirer 7640 to issuer 7660, 7662, 7663, or 7670 request. An issuer 7660, 7662, 7663, or 7670 to acquirer 7640 response is transmitted back from issuer 7660, 7662, 7663 or 7670 and is translated back into an acquirer 7640 to merchant 7600 response. All four strings of characters associated with the messages may be stored in the transaction database 7642 for complete transaction integrity.

FIG. 77 is a block diagram illustrating an acquirer service in accordance with preferred embodiment B. A merchant 7700 has a merchant account 7710 that is held at a commercial bank 7720 as represented by a bag of money 7730. When merchant 7700 is presented with a credit card or other payment method, merchant 7700 contacts an acquirer 7740 to determine if the transaction is covered by an issuer 7762. Acquirer 7740 determines authorization by communicating to an interchange network 7747 to communicate to issuer 7762. Acquirer 7740 also utilizes a transaction database 7742 to obtain all message requests and responses that are transmitted between merchant 7700 and acquirer 7740; and acquirer 7740 and issuer 7762. Acquirer 7740 utilizes switching and transaction processing programs, which access transaction database 7742 to obtain the proper data string for communicating through interchange network 7747 or other network, utilizing an agreed-upon protocol to issuer 7762. Issuer 7762 determines whether the transaction should be authorized based on lists of inactive accounts, the credit limit, and spending pattern that has transpired to date on the particular credit card and transmits an indicia of authorization via acquirer 7740 to merchant 7700. This portion of preferred embodiment B (as discussed above with respect to FIGS. 76 and 77) is in conformance with the accepted practice for processing authorizations today.

FIG. 78 is a block diagram illustrating acquirer service in accordance with preferred embodiment B. A merchant 7800 has a merchant account 7810 that is held at a commercial bank 7820 as represented by a bag of money 7830. When merchant 7800 has shipped goods or otherwise delivered service to the cardholder, merchant 7800 contacts an acquirer 7840, which had performed the prior authorization of FIG. 77, to request payment for the transaction previously approved by an issuer 7862. This is called a "capture" transaction. Note that in cases where merchant 7800 is providing immediate fulfillment of goods or services, such as in a physical retail environment, the "capture" transaction may be combined with the "authorization" transaction of FIG. 69, to create a single "sale" transaction. Acquirer 7840 translates the "capture request" from the merchants into a format acceptable to issuer 7862 and sends the request to issuer 7862. In the capture response, issuer 7862 includes cash represented by a bag of money 7872 to cover the transaction, represented electronically, for example as Mondex value. There is no further settlement needed, because the issuer has already paid the acquirer for the transaction (less and fees due issuer 7862 from acquirer 7840). This portion of preferred embodiment B differs significantly from accepted practice today, and is enabled by the advent of electronic cash. The actual transfer of funds via electronic cash may be effected using interchange network 7847 or any other network.

Periodically, merchant account 7810 is "batch closed" or "cut-off," meaning that an end-of-day event is posted. The cut-off of merchant account 7810 may be initiated by merchant 7800 or acquirer 7840, depending on specific business rules determined by the acquirer. Based on the cut-off time, acquirer database 7842 will include a specific set of transactions that have already been covered by the transfer of funds from issuer 7862 to acquirer 7840 incrementally during each capture transaction. Batch operations are solely for merchant 7800 to be able to balance with acquirer 7840.

A hybrid between preferred embodiments A and B allows for the inclusion of a notation of money to be transferred, rather than true electronic cash, with each capture response from issuer 7862 to acquirer 7840. Then, as in preferred embodiment A, acquirer 7840 and issuer may periodically settle with each other via the transfer of true electronic cash.

FIGS. 79–82 illustrate preferred embodiment C, in which real-time settlement occurs directly between the merchant and the issuer, without need for an acquirer relationship. This embodiment is enabled both by the advent of electronic cash, and by the advent of open networks such as the Internet, which use open routing mechanisms and host naming mechanisms.

Figure 79:
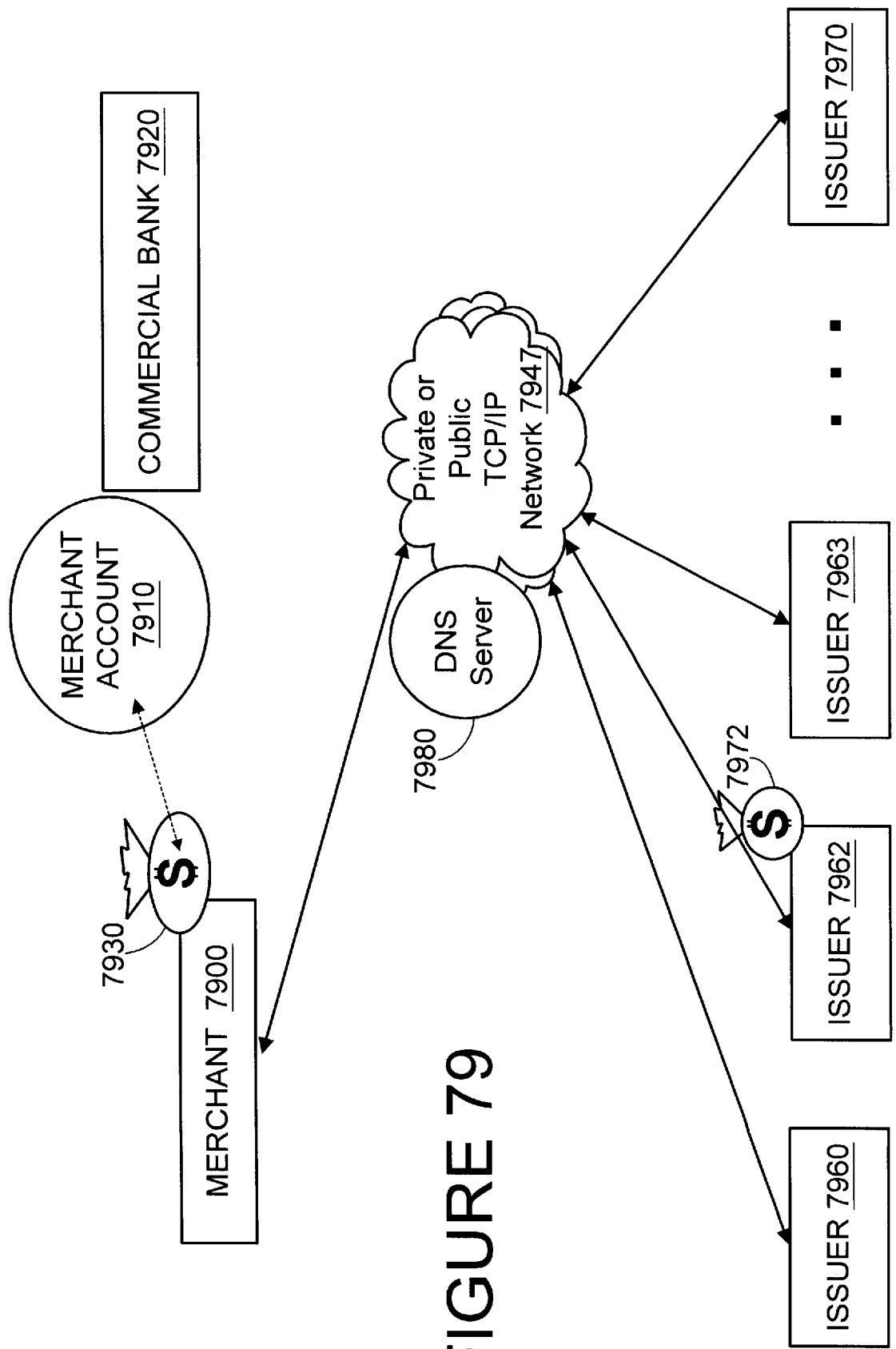
FIG. 79 is a block diagram illustrating a merchant authorization system in accordance with a preferred embodiment.

FIG. 79 is a block diagram illustrating a merchant authorization system in accordance with preferred embodiment C. Processing commences when a merchant 7900 contacts an issuer 7960, 7962, 7963, or 7970 to determine if a consumer is authorized for payments. The merchant has a merchant account 7910 at a commercial bank 7920. Merchant 7900 contacts issuers utilizing an Internet or other network connection 7947 utilizing a Domain Name Server (DNS) 7980 to coordinate communication through network 7947 to issuers 7960, 7962, 7963, or 7970 and determine authorization of funds 7972. The use of DNS 7980 allows merchant 7900 to determine where to route a specific authorization request as a function of the card number being authorized. For example, suppose that banknet.com has been established as the primary DNS for the authorization network. An issuing bank 7962 with a Bank ID Number (BIN) of "422637"

might be assigned a domain name as BIN 422637.banknet.com, which the banknet.com DNS 7980 could then resolve into a specific IP address to route the request from merchant 7900 to issuer 7962. Because the BIN is included in the credit or debit card's primary account number (PAN), software at the merchant site extracts the PAN, constructs the domain name from the PAN, and queries banknet.com DNS 7980 to obtain the proper IP address. Accordingly, the acquirer's traditional task of acting as a switch has been relegated to public switched networks.

Figure 80:
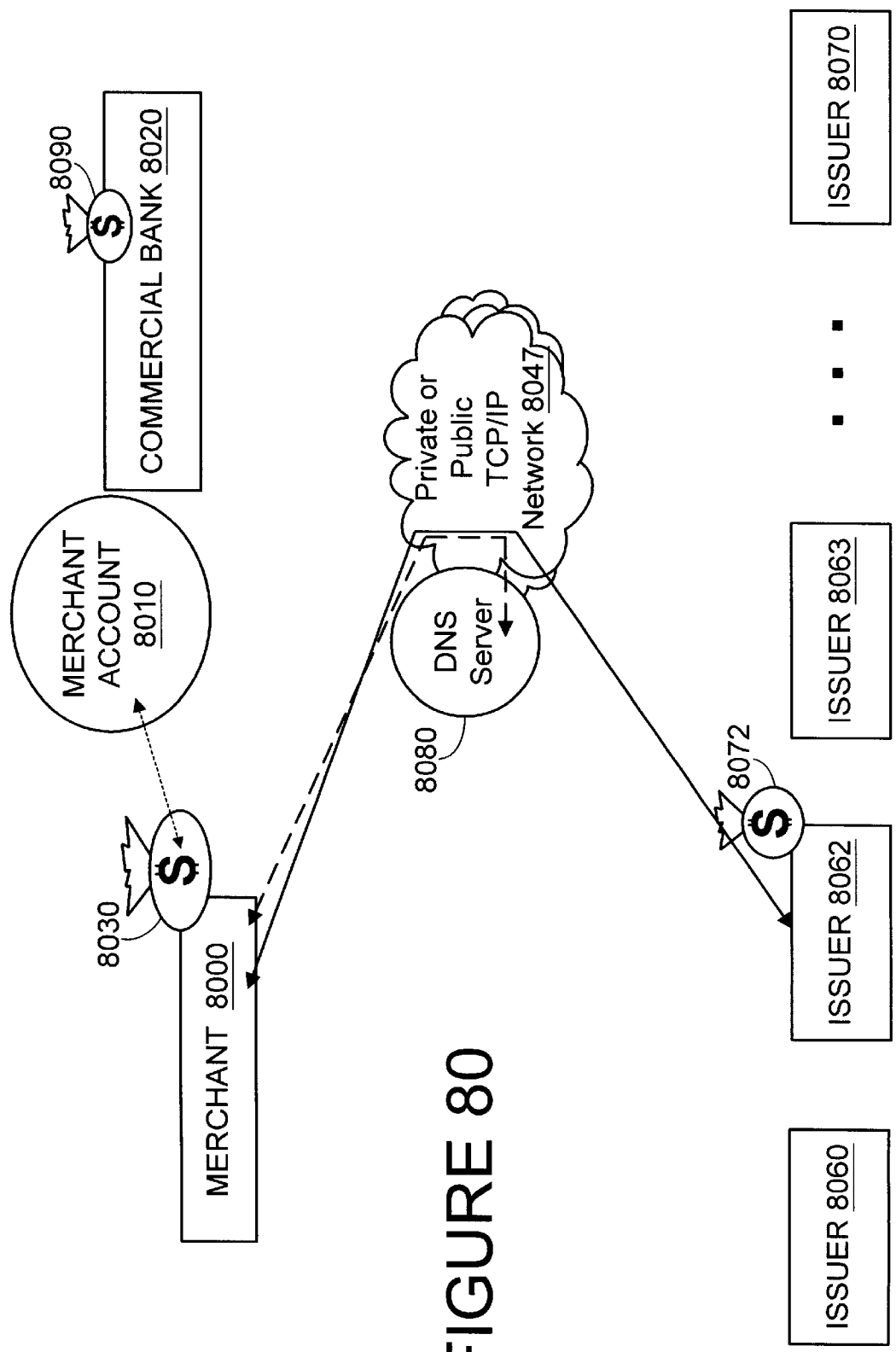
FIG. 80 is a block diagram illustrating a merchant authorization system for authorizing payment in accordance with a preferred embodiment.

FIG. 80 is a block diagram illustrating a merchant authorization system for authorizing payment in accordance with preferred embodiment C. A merchant 8000 contacts an issuer 8060, 8062, 8063, or 8070 to obtain authorization for a transaction by communicating through a public or private TCP/IP network 8047 under the guidance of a DNS server 8080. Merchant 8000 contacts an issuer 8062 utilizing an Internet or other network connection 8047 utilizing a DNS 8080 to coordinate communication through network 8047 to issuer 8062 and determine authorization of funds 8072. Once the authorization is determined, issuer 8062 communicates the authorization response directly to merchant 8000.

Figure 81:
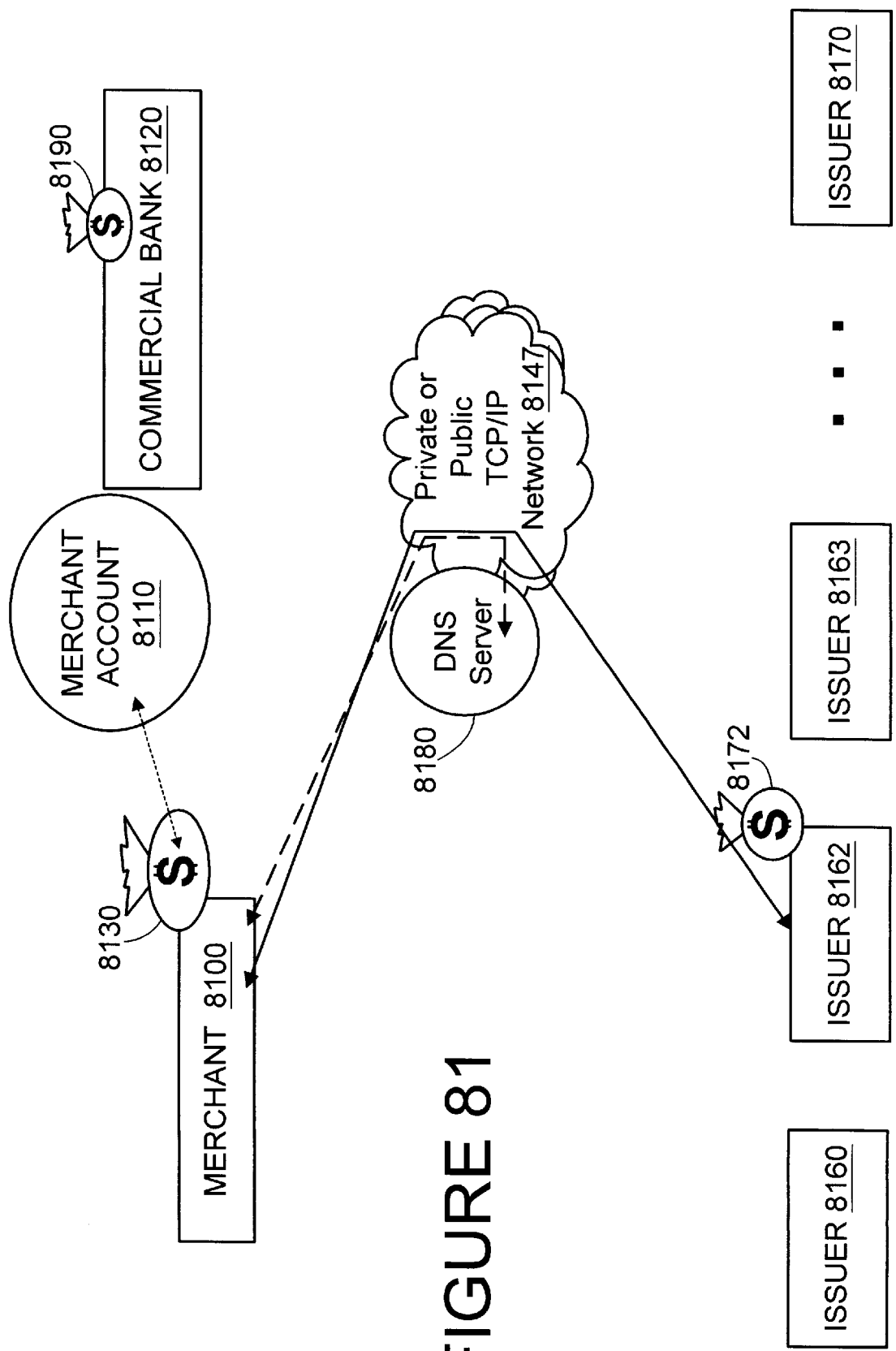
FIG. 81 is a block diagram illustrating a merchant capture system for transmitting capture information and receiving payment in accordance with a preferred embodiment.

FIG. 81 is a block diagram illustrating a merchant capture system for transmitting capture information and receiving payment in accordance with preferred embodiment C. A merchant 8100 contacts an issuer 8160, 8162, 8163, or 8170 to submit a capture request and to obtain payment for a previously authorized transaction, by communicating through a public or private TCP/IP network 8147 under the guidance of a DNS server 8180. When merchant 8100 has shipped goods and is ready to request payment, merchant 8100 contacts the same issuer 8162 that issued the authorization, utilizing an Internet or other network connection 8147 utilizing DNS 8180 to coordinate communication through network 8147 to issuer 8162 and request disbursement of funds 8172. Once the capture request is received by issuer 8162 and is validated as corresponding to a previous authorization, issuer 8162 communicates the capture response directly to merchant 8100 and includes cash in the capture response to cover the transaction, represented electronically, for example, as a Mondex value. Funds 8130 are transferred to merchant 8100 directly, not to an acquirer. They may be immediately redirected to an account 8110 at a commercial bank 8120 as represented by a bag of money 8190 or they may reside at merchant 8100 on a device 8130 such as a smart card for storing electronic cash. There is no further settlement needed, because the issuer has already paid the merchant for the transaction (less and fees due the issuer from the merchant). This portion of preferred embodiment C differs significantly from accepted practice today and is enabled by the advent of electronic cash and a network that supports direct connections from merchants to issuers such as the Internet.

Figure 82:
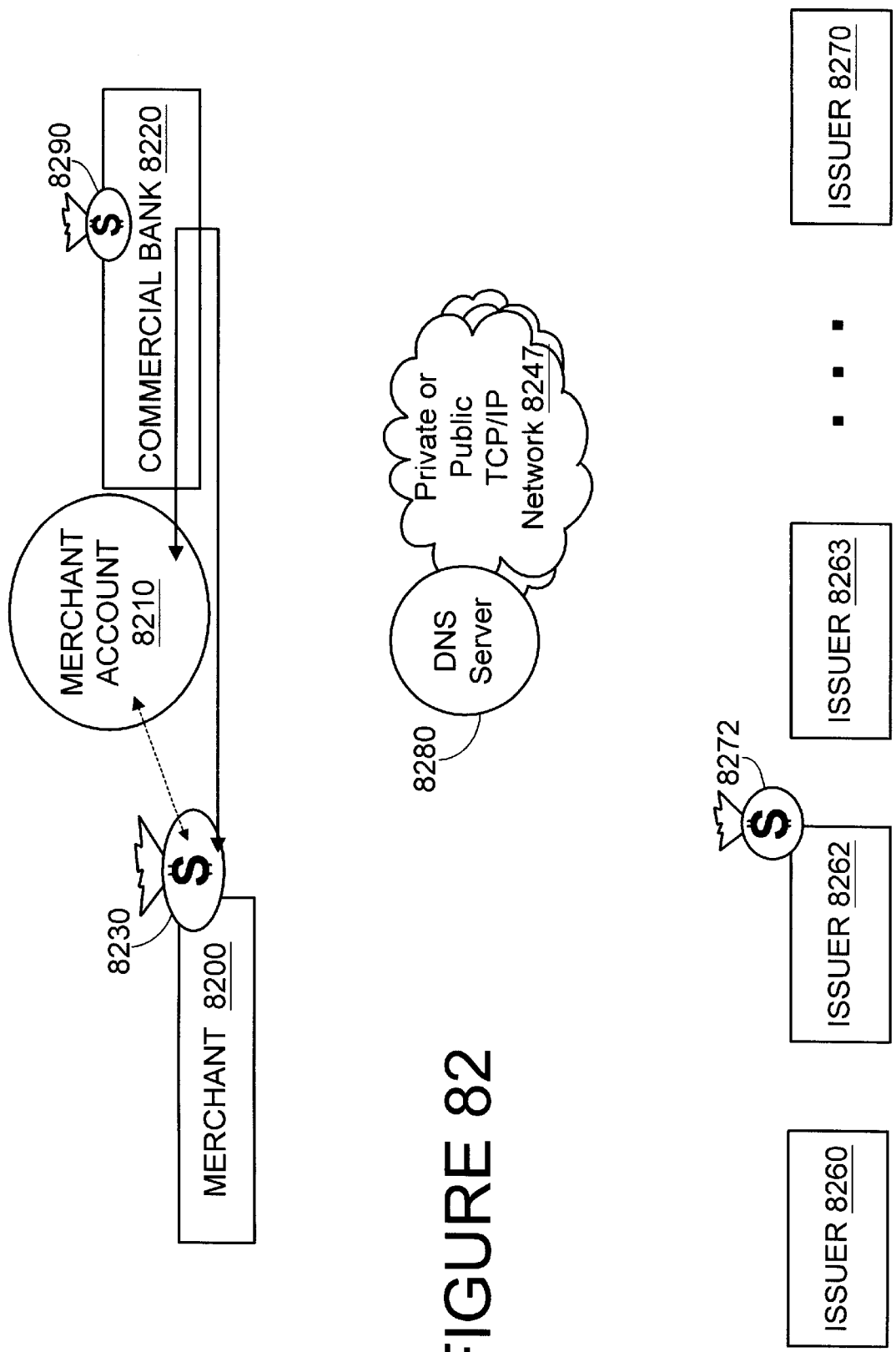
FIG. 82 is a block diagram illustrating a merchant system for transferring payment from a merchant device such as a smart card to a commercial bank in accordance with a preferred embodiment.

In a preferred embodiment, it is possible for a single "sale" message to convey all the information of the authorization and capture messages, if the goods are delivered immediately. In that case, a single message flows from merchant to issuer and back, with the response carrying the electronic cash. In such cases, the transaction flow is the same as that for FIG. 81, and the need for the flow of FIG. 80 disappears. FIG. 82 is a block diagram illustrating a merchant system for transferring payment from a merchant device such as a smart card to a commercial bank in accordance with a preferred embodiment. A merchant 8200 transfers funds 8230 to a merchant account 8210 at a commercial bank 8220 as represented by a bag of money 8290. This is done via a means of electronic cash transfer, such as the Mondex card-to-card protocol. The need for this step is to move money accumulated at merchant 8200 to the merchant's commercial bank 8220, so that the merchant's electronic cash storage device does not fill up, and so that the money can be put to other uses for merchant 8200.

The only problem with the system described above is that with the acquirer out of the message path, there is no possibility of the acquirer doing any aggregation, so we need to bypass the bank's role as aggregator. However, if aggregation functions are provided by smart card manufacturers, such as Mondex, this problem is solved, because smart card transactions are designed to scale from very small to very large payments. In the medium scale, for every authorization approved by an issuing bank, the merchant could send the capture back to the issuer, and, along with the capture response, the issuer transmits money back electronically that is stored on a smart card. Periodically, the merchant uploads the cash on the smart card into the merchant's bank account with the acquirer. In this way, the merchant is serving as its own aggregator. With the acquirer out of the aggregation loop, there is no longer a problem with the acquirer not being in the message path between the merchant and the issuer. The issuer gateway handles the smart card transactions. The acquirer's role in bearing merchant-related risk may be addressed in several different ways, all of which involve business, rather than technical issues. For example, the commercial bank may assume this risk, as the acquirer does in today's operating mode, or the issuers themselves may take on this risk. Either of these solutions may entail utilizing network operators to assist in detecting certain types of fraud. Also, fraud databases operated by Visa, MasterCard, and others may be available on a fee-for-service basis for issuers and merchants.

Figure 83:
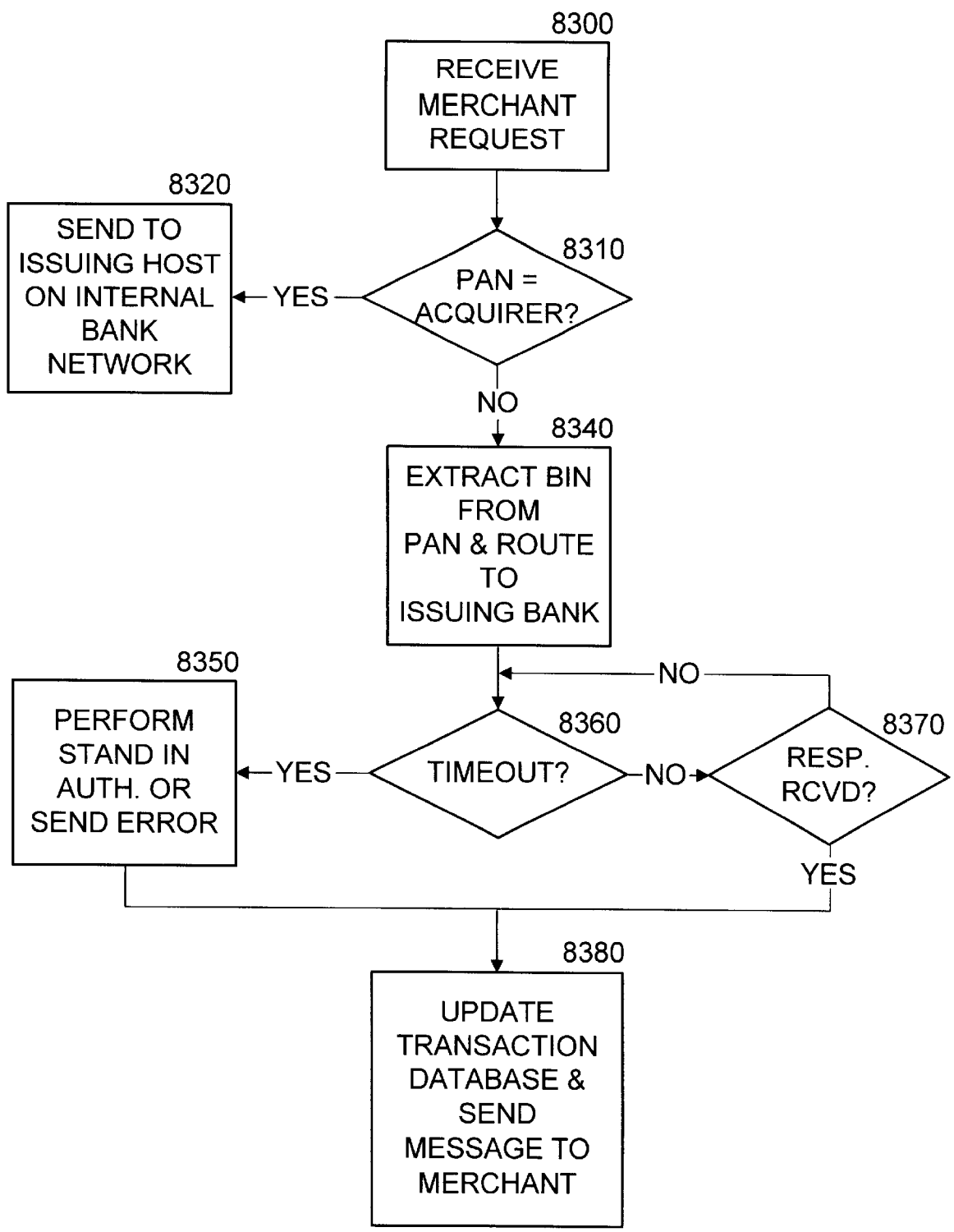
FIG. 83 is a flow diagram of the authorization flow from an acquirer's view in accordance with accepted practice and in accordance with a preferred embodiment.

FIG. 83 is a flow diagram of the authorization flow from an acquirer's view in accordance with accepted practice and in accordance with preferred embodiments A and B. Processing commences at function block 8300 when a merchant request is received. Then, a test is performed at decision block 8310 to determine if the Primary Authorization Number (PAN) belongs to the same bank as the acquirer. If it is the same, then at function block 8320, the merchant request is sent to the issuing host on an internal bank network. If the PAN is not the acquirer, then at function block 8340 the bin number is extracted from the PAN, and the request is routed to the issuing bank. Then, at decision block 8360, a test is performed to see if the timeout period has expired. If the timeout period has expired, then at function block 8350, stand-in authorization is performed by the merchant, or a send error is prepared. If the timeout period has not elapsed, then another test is performed to determine if the response from the issuing bank has been received. If not, then processing is passed to decision block 8360 to determine if the timeout period has expired. If the response has been received from the issuing bank at decision block 8370, then processing passes to function block 8380 to update the transaction database and send a message to the merchant indicating either an error from function block 8350, or a successful response back from the issuing bank in decision block 8370.

Figure 84:
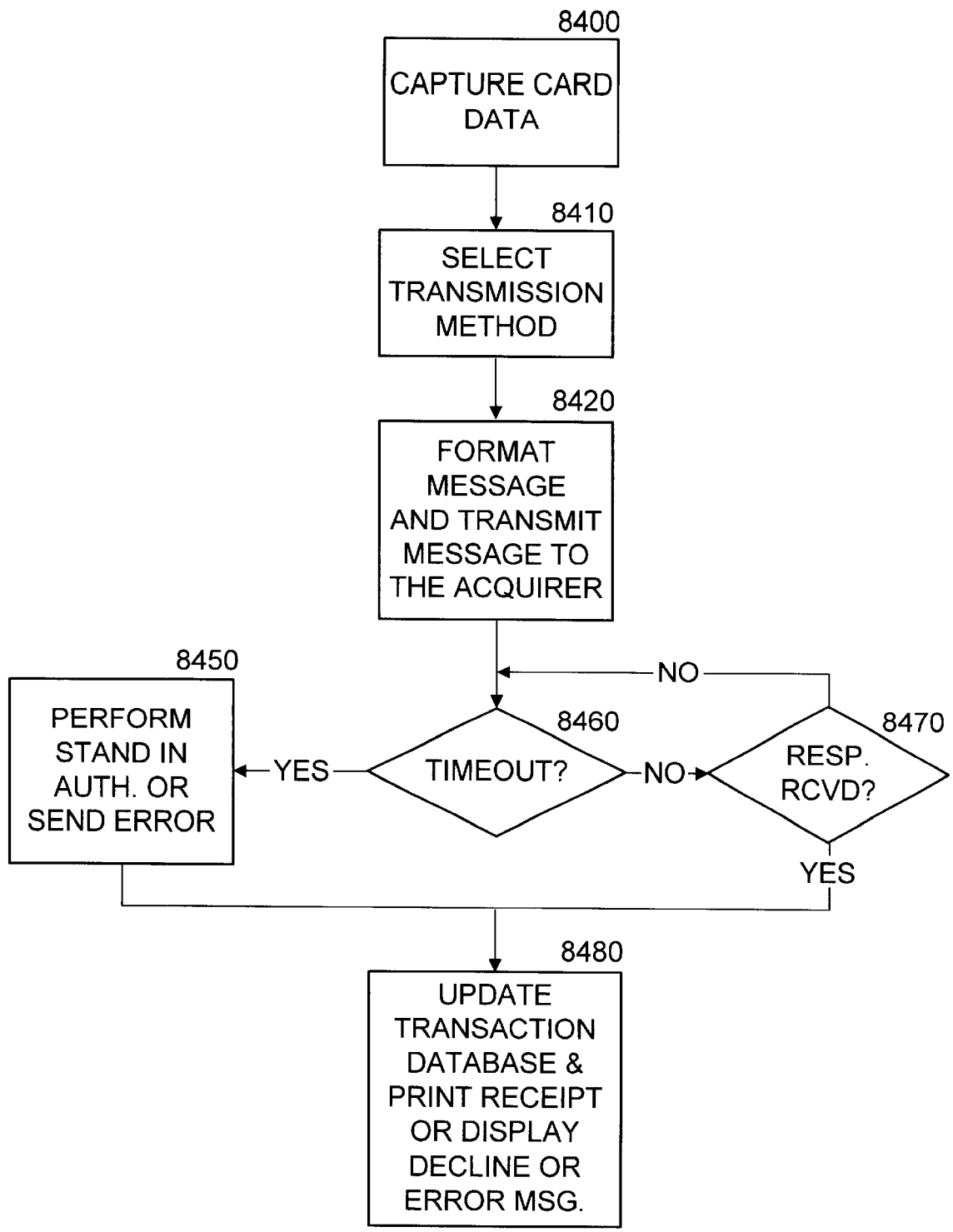
FIG. 84 is a flow diagram illustrating the operation of an authorization flow from a merchant's view in accordance with accepted practice and in accordance with a preferred embodiment.

FIG. 84 is a flow diagram illustrating the operation of an authorization flow from a merchant's view in accordance accepted practice and in accordance with preferred embodiments A and B. Processing commences at function block 8400 where the card data from the credit card is captured. Then, a transmission method is selected at function block 8410, and a message is formatted and transmitted to the acquirer at function block 8420. A loop is commenced thereafter to await response from the acquirer utilizing a test at decision block 8460 to determine if a timeout period has elapsed. If the timeout period has expired, then at function block 8450, stand-in authorization is performed by the merchant (if allowed), or a send error is prepared. If the timeout period has not elapsed, then another test is performed to determine if the response from the issuing bank has been received. If not, then processing is passed to decision block 8460 to determine if the timeout period has expired. If the response has been received from the issuing bank at decision block 8470, then processing passes to function block 8480 to update the transaction database, print a receipt, and display a decline or error message indicating either an error from function block 8450, or a successful response back from the issuing bank at decision block 8470.

Figure 85:
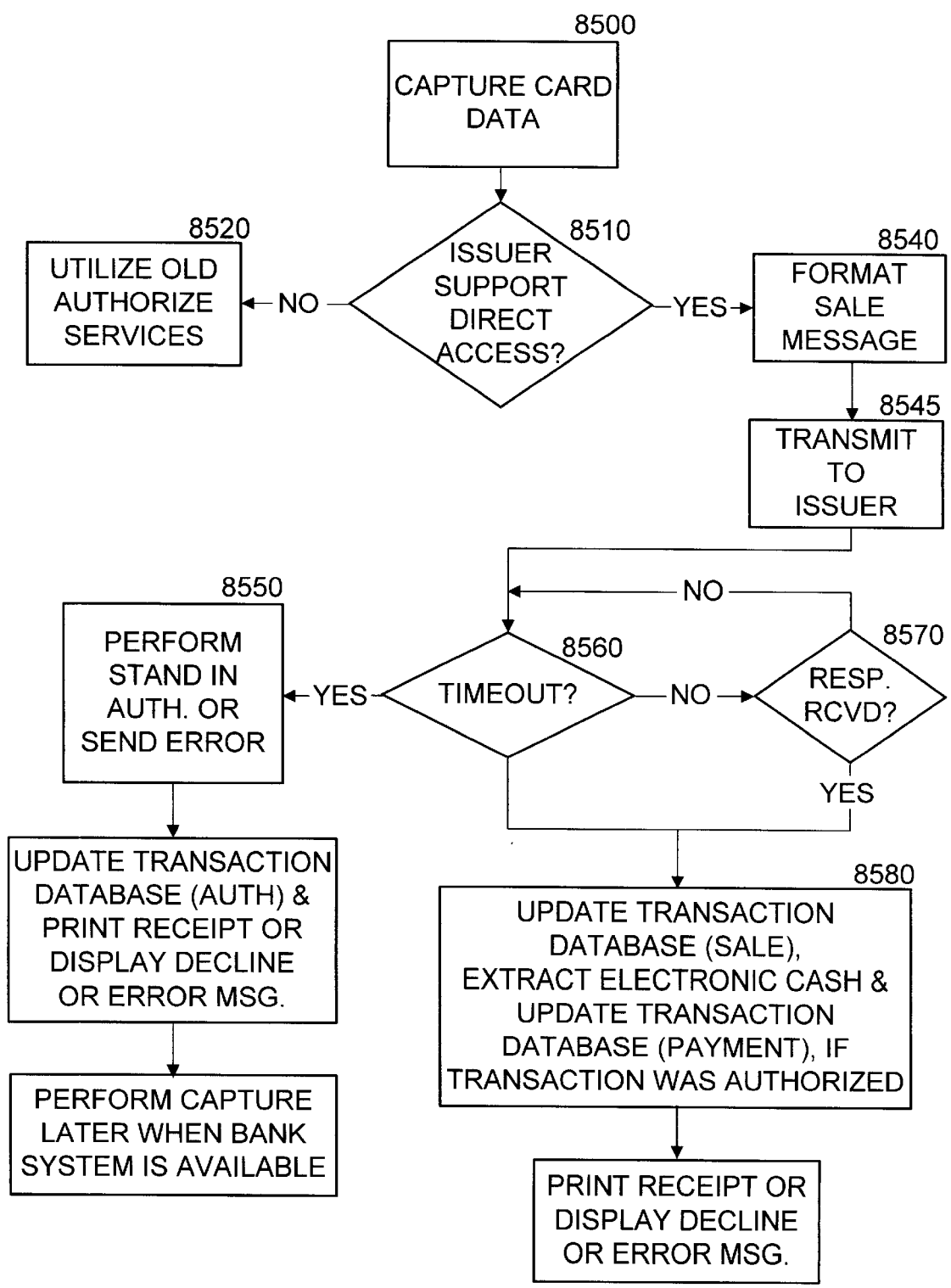
FIG. 85 is a flow diagram illustrating the operation of an authorization flow from a merchant's view in accordance with a preferred embodiment.

FIG. 85 is a flow diagram illustrating the operation of an authorization flow from a merchant's view in accordance with preferred embodiments A, B, and C. Processing commences at function block 8500 at which card data is captured. Then, a test is performed at decision block 8510 to determine if the issuer supports direct access. If the issuer does not support direct access, then at function block 8520 the old authorize services are utilized. The old authorize services correspond to the flow diagram of FIG. 84 (from function block 8410 onward). If the issuer supports direct access, then a message is formatted at function block 8540 and the message is transmitted to the issuer at function block 8545. Then, at decision block 8560, a test is performed at stage 8570 to see if the timeout period has expired. If the timeout period has expired, then at function block 8550, stand-in authorization is performed by the merchant (if allowed), or a send error is prepared. If the timeout period has not elapsed, then another test is performed to determine if the response from the issuing bank has been received. If not, then processing is passed to decision block 8560 to determine if the timeout period has expired. If the response has been received from the issuing bank at decision block 8570, then processing passes to function block 8580 to update the transaction database and send a message to the merchant indicating either an error from function block 8550, or a successful response back from the issuing bank in decision block 8570.

Figure 86:
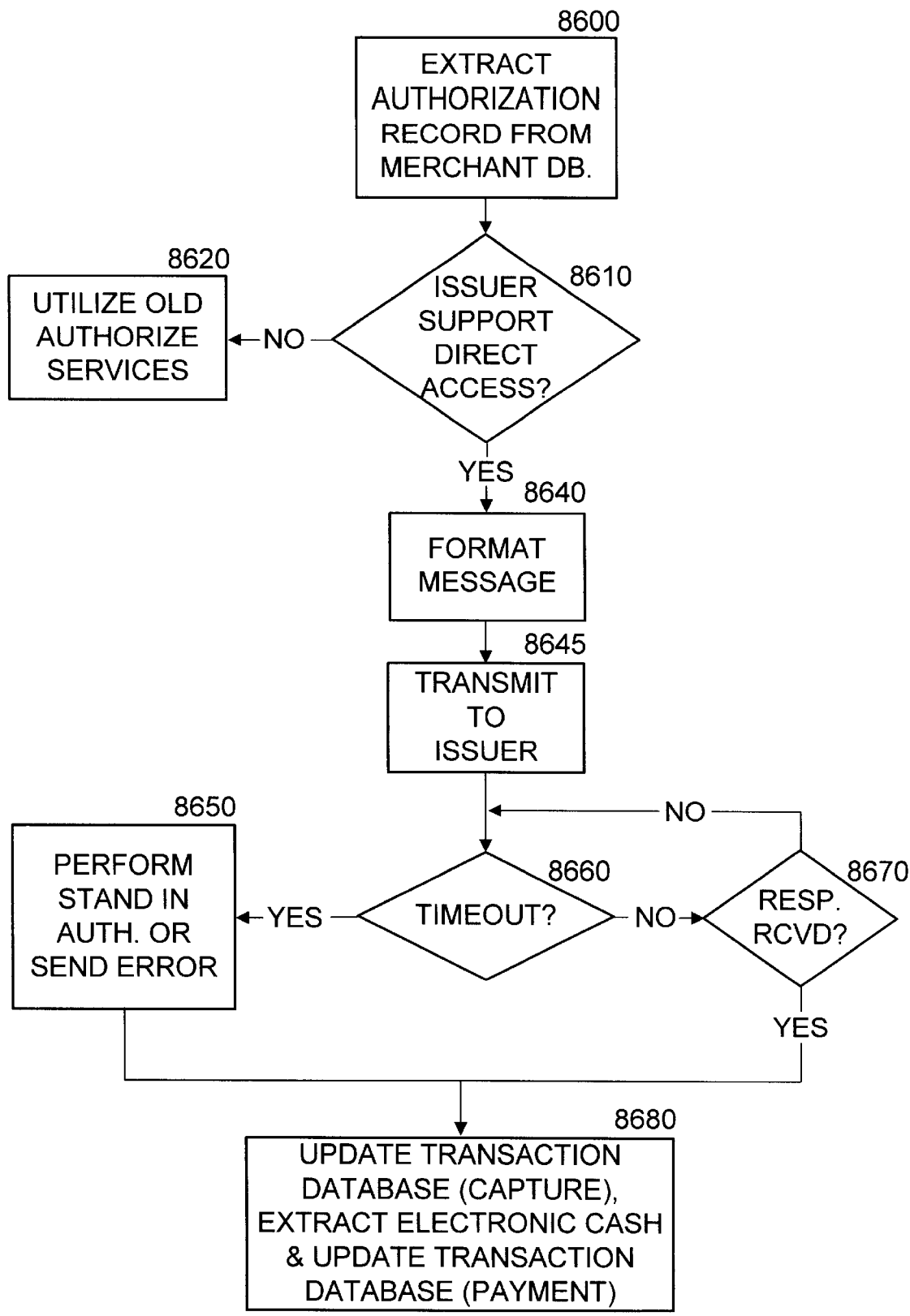
FIG. 86 is a flow diagram illustrating the operation of a capture flow from a merchant's view in accordance with a preferred embodiment.

FIG. 86 is a flow diagram illustrating the operating of a capture flow from a merchant's view in accordance with preferred embodiments A, B, and C. Processing commences at function block 8600 at which an authorization record is extracted from a merchant database. Then, at decision block 8610, a test is performed to determine if an issuer supports direct access. If the issuer does not support direct access, then the logic from the old authorize services is utilized as illustrated at function block 8620. If the issuer does support direct access at decision block 8610, then a message for the issuer is formatted at function block 8640, and the message is transmitted to the issuer as illustrated at function block 8645. Then, at decision block 8660 a test is performed to see if the timeout period has expired. If the timeout period has expired, then at function block 8650, stand-in authorization is performed by the merchant, or a send error is prepared. If the timeout period has not elapsed, then another test is performed to determine if the response from the issuing bank has been received. If not, then processing is passed to decision block 8660 to determine if the timeout period has expired. If the response has been received from the issuing bank at decision block 8670, then processing passes to function block 8680 to update the transaction database to reflect the captured information, extract electronic cash, and update the transaction database to reflect payment and send a message to the merchant indicating either an error from function block 8650 or a successful response back from the issuing bank in decision block 8670.

Figure 87:
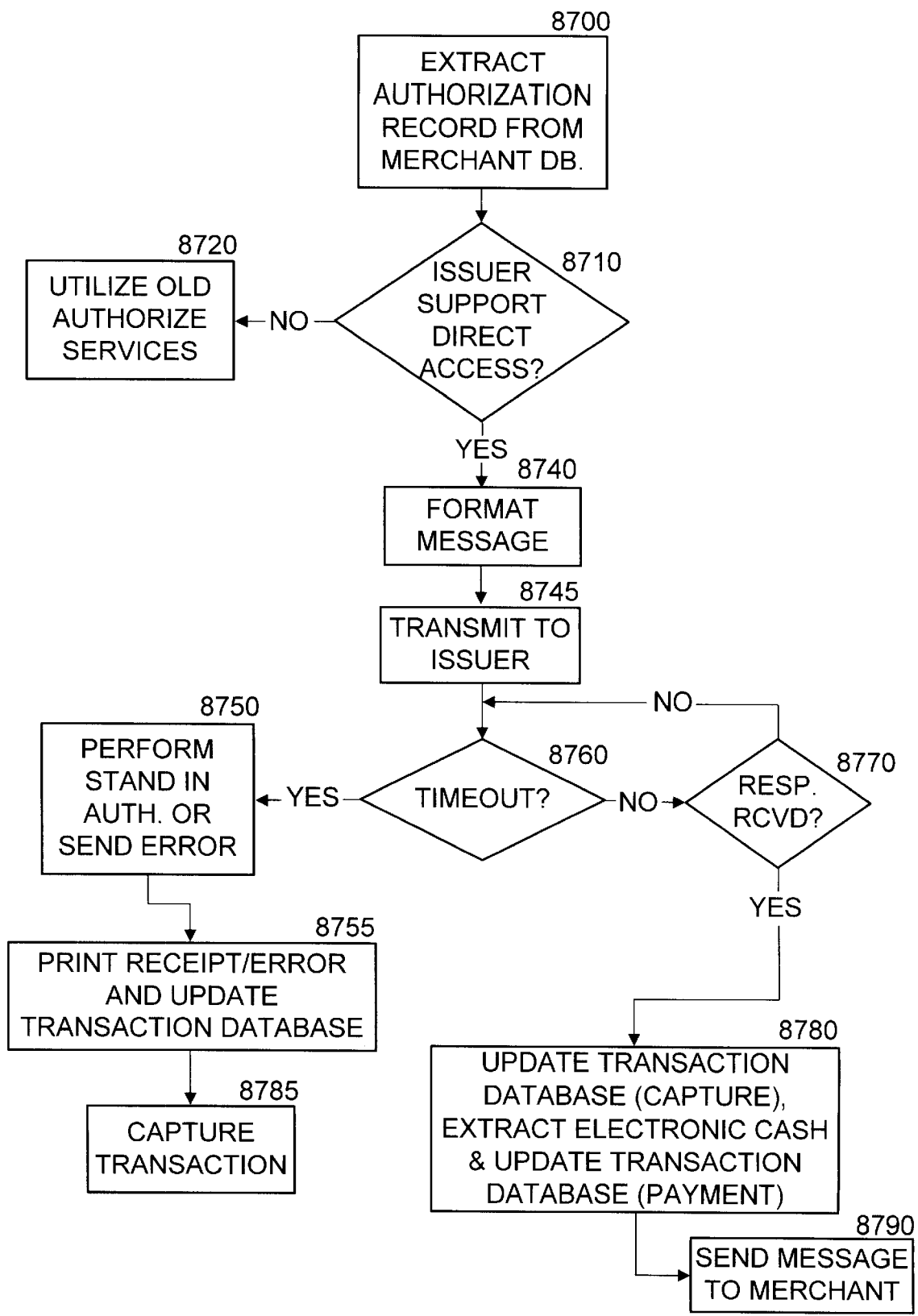
FIG. 87 is a flow diagram illustrating the operation of a capture flow from a merchant's view in accordance with a preferred embodiment.

FIG. 87 is a flow diagram illustrating the operation of a capture flow from a merchant's view in accordance with preferred embodiments A, B, and C. Processing commences at function block 8700 at which authorization record is extracted from a merchant database. Then, at decision block 8710, a test is performed to determine if an issuer supports direct access. If the issuer does not support direct access, then the logic from the old authorize services is utilized (as illustrated at function block 8720). If the issuer does support direct access at decision block 8710, then a sale request message for the issuer is formatted at function block 8740, and the message is transmitted to the issuer as illustrated at function block 8745. Then, at decision block 8760, a test is performed to see if the timeout period has expired. If the timeout period has expired, then at function block 8750, stand-in authorization is performed by the merchant, or a send error is prepared. The merchant then prints a receipt or error, and updates the transaction database at function block 8755. A capture transaction will need to be done later, when the issuer is available, as shown at function block 8785. If the timeout period has not elapsed, then another test is performed to determine if the response from the issuing bank has been received. If not, then processing is passed to decision block 8760 to determine if the timeout period has expired. If the response has been received from the issuing bank at decision block 8770, then processing passes to function block 8780 to update the transaction database to reflect the captured information, extract electronic cash, update the transaction database to reflect payment, and at function block 8790, send a message to the merchant indicating either an error from function block 8750 or a successful response back from the issuing bank at decision block 8770.

Although particular embodiments of the present invention have been shown and described, it will be obvious to those skilled in the art that changes and modifications can be made without departing from the present invention in its broader aspects and, therefore, the appended claims are to encompass within their scope all such changes and modifications that fall within the true scope of the present invention.

What is claimed is:

1. A method for consummating a plurality of electronic transactions between a plurality of electronic terminals, a first electronic device, and a second electronic device comprising:

establishing a communication between the plurality of electronic terminals and a first electronic device, comprising:

coupling a first electronic terminal and the first electronic device via a first communication linkage;

coupling the first electronic device and the second electronic device via a second communication linkage;

transmitting payment information corresponding to a payment instrument of a party, from the first electronic terminal to the first electronic device;

forwarding the payment information to the second electronic device;

receiving the payment information at the second electronic device;

evaluating the payment information based on the payment instrument by the second electronic device;

transmitting approval of the transaction from the second electronic device to the first electronic device;

storing a record of the transaction approval at the first electronic device;

forwarding approval of the transaction from the first electronic device to the first electronic terminal, wherein said transmitting payment information, said forwarding the payment information, said receiving, said evaluating, said transmitting approval, said storing, and said forwarding approval are performed during said communication; and settling the plurality of transactions by periodically initiating payment from the second electronic device to the first electronic device using a direct electronic transmission of monetary value from the second electronic device to the first electronic device, the electronic transmission of monetary value based on the sum of each of the plurality of transactions between the plurality of electronic terminals and the first electronic device that were approved by the second electronic device during a settlement period.

2. The method as recited in claim 1 wherein the first electronic device comprises an acquirer device, the second electronic device comprises an issuer device, the party is a consumer, and the plurality of electronic terminals comprise merchant terminals or consumer terminals or both, wherein the payment instrument comprises a card issued by an issuer to a consumer.

3. The method as recited in claim 1, wherein at least one communication linkage uses the Internet Protocol (IP).

4. The method as recited in claim 1, wherein evaluating the payment information is completed based on the payment instrument to determine a credit risk.

5. The method as recited in claim 1, wherein the transmission via at least one communication linkage is encrypted.

6. The method as recited in claim 1, wherein the payment instrument is a credit card.

7. The method as recited in claim 1, wherein the payment instrument is a debit card.

8. The method as recited in claim 1, wherein the first electronic device determines a location of the second electronic device using a network locator device.

9. An apparatus that consummates a plurality of electronic transactions between a plurality of electronic terminals, a first electronic device, and a second electronic device, comprising:

logic that establishes at least one communication between the plurality of electronic terminals and a first electronic device, comprising:

logic that couples a first electronic terminal and the first electronic device via a first communication linkage;

logic that couples the first electronic device and the second electronic device via a second communication linkage;

logic that transmits payment information corresponding to a payment instrument of a party, from the first electronic terminal to the first electronic device;

logic that forwards the payment information to the second electronic device;

logic that receives the payment information at the second electronic device;

logic that evaluates the payment information using the payment instrument by the second electronic device;

logic that transmits approval of the transaction from the second electronic device to the first electronic device;

logic that stores a record of the transaction approval at the first electronic device;

logic that forwards approval of the transaction from the first electronic device to the first electronic terminal, wherein said logic that transmits payment information, said logic that forwards the payment information, said logic that receives, said logic that evaluates, said logic that transmits approval, said logic that stores, and said logic that forwards approval operate during said communication; and logic that settles the plurality of transactions by periodically initiating payment from the second electronic device to the first electronic device using a direct electronic transmission of monetary value from the second electronic device to the first electronic device, the electronic transmission of monetary value based on the sum of each of the plurality of transactions between the plurality of electronic terminals and the first electronic device that were approved by the second electronic device during a settlement period.

10. The apparatus as recited in claim 9 wherein the first electronic device comprises an acquirer device, the second electronic device comprises an issuer device, the party is a consumer, and the plurality of electronic terminals comprise merchant terminals or consumer terminals or both, wherein the payment instrument comprises a card issued by an issuer to a consumer.

11. The apparatus as recited in claim 9, wherein at least one communication linkage uses the Internet Protocol (IP).

12. The apparatus as recited in claim 9, wherein evaluating the payment information is completed based on the payment instrument to determine a credit risk.

13. The apparatus as recited in claim 9, wherein the transmission via at least one communication linkage is encrypted.

14. The apparatus as recited in claim 9, wherein the payment instrument is a credit card.

15. The apparatus as recited in claim 9, wherein the payment instrument is a debit card.

16. The apparatus as recited in claim 9, wherein the first electronic device determines a location of the second electronic device using a network locator device.

17. A computer program embodied on a computer-readable medium for consummating an electronic transaction between a first electronic device, a second electronic device, and a third electronic device, comprising:

a code segment that establishes a communication between the plurality of electronic terminals and a first electronic device, comprising:

a code segment that couples a first electronic terminal and the first electronic device via a first communication linkage;

a code segment that couples the first electronic device and the second electronic device via a second communication linkage;

a code segment that transmits payment information corresponding to a payment instrument of a party, from the first electronic terminal to the first electronic device;

a code segment that forwards the payment information to the second electronic device;

a code segment that receives the payment information at the second electronic device;

a code segment that evaluates the payment information based on the payment instrument by the second electronic device;

a code segment that transmits approval of the transaction from the second electronic device to the first electronic device;

a code segment that stores a record of the transaction approval at the first electronic device;

a code segment that forwards approval of the transaction from the first electronic device to the first electronic terminal, wherein said code segment that transmits payment information, said code segment that forwards the payment information, said code segment that receives, said code segment that evaluates, said code segment that transmits approval, said code segment that stores, and said code segment that forwards approval operate during said communication; and a code segment that settles the plurality of transactions by periodically initiating payment from the second electronic device to the first electronic device using a direct electronic transmission of monetary value from the second electronic device to the first electronic device, the electronic transmission of monetary value based on the sum of each of the plurality of transactions between the plurality of electronic terminals and the first electronic device that were approved by the second electronic device during a settlement period.

18. The computer program as recited in claim 17 wherein the first electronic device comprises an acquirer device, the second electronic device comprises an issuer device, the party is a consumer, and the plurality of electronic terminals comprise merchant terminals or consumer terminals or both, wherein the payment instrument comprises a card issued by an issuer to a consumer.

19. The computer program as recited in claim 17, wherein at least one communication linkage utilizes the Internet Protocol (IP).

20. The computer program as recited in claim 17, wherein evaluating the payment information is completed based on the payment instrument to determine a credit risk.

21. The computer program as recited in claim 17, wherein the transmission via at least one communication linkage is encrypted.

22. The computer program as recited in claim 17, wherein the payment instrument is a credit card.

23. The computer program as recited in claim 17, wherein the payment instrument is a debit card.

24. The computer program as recited in claim 17, wherein the first electronic device determines a location of the second electronic device using a network locator device.

* * * * *